United States Patent
Fujisawa et al.

(10) Patent No.: US 10,133,109 B2
(45) Date of Patent: *Nov. 20, 2018

(54) LCD DEVICE

(71) Applicant: DIC Corporation, Tokyo (JP)

(72) Inventors: Toru Fujisawa, Kita-adachi-gun (JP); Go Sudo, Kita-adachi-gun (JP); Shuuhei Yamamoto, Kita-adachi-gun (JP); Kazunori Maruyama, Kita-adachi-gun (JP); Haruyoshi Takatsu, Kita-adachi-gun (JP); Marina Goto, Kita-adachi-gun (JP); Fumiaki Kodera, Kita-adachi-gun (JP); Keumhee Jang, Kita-adachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/118,678

(22) PCT Filed: Feb. 12, 2015

(86) PCT No.: PCT/JP2015/053822
§ 371 (c)(1),
(2) Date: Aug. 12, 2016

(87) PCT Pub. No.: WO2015/122457
PCT Pub. Date: Aug. 20, 2015

(65) Prior Publication Data
US 2017/0045765 A1    Feb. 16, 2017

(30) Foreign Application Priority Data

Feb. 14, 2014 (JP) .................. 2014-027008
Nov. 5, 2014 (JP) .................. 2014-225181

(51) Int. Cl.
| | | |
|---|---|---|
| *G02F 1/1333* | (2006.01) | |
| *G02F 1/1334* | (2006.01) | |
| *C09K 19/54* | (2006.01) | |
| *G02F 1/1337* | (2006.01) | |
| *C09K 19/02* | (2006.01) | |
| *C09K 19/30* | (2006.01) | |
| *C09K 19/56* | (2006.01) | |

(52) U.S. Cl.
CPC ........ *G02F 1/1334* (2013.01); *C09K 19/0216* (2013.01); *C09K 19/3001* (2013.01); *C09K 19/3066* (2013.01); *C09K 19/544* (2013.01); *C09K 19/56* (2013.01); *G02F 1/133788* (2013.01); *G02F 2001/13345* (2013.01)

(58) Field of Classification Search
CPC .............. C09K 19/544; C09K 19/0216; C09K 19/3001; C09K 19/3066; C09K 19/56; G02F 1/1333; G02F 1/1334; G02F 1/133788; G02F 2001/13345
USPC .......................................... 428/1.1; 349/182
See application file for complete search history.

(56) References Cited

U.S. PATENT DOCUMENTS

| | | |
|---|---|---|
| 2006/0158589 A1 | 7/2006 | Nishi et al. |
| 2012/0069289 A1 | 3/2012 | Taugerbeck et al. |
| 2012/0242234 A1 | 9/2012 | Long et al. |
| 2013/0114034 A1 | 5/2013 | Archetti et al. |
| 2013/0119311 A1 | 5/2013 | Jansen et al. |
| 2013/0306910 A1 | 11/2013 | Goetz et al. |
| 2014/0078446 A1 | 3/2014 | Guo et al. |
| 2015/0029452 A1 | 1/2015 | Ogawa et al. |
| 2015/0085230 A1 | 3/2015 | Guo |
| 2016/0272889 A1* | 9/2016 | Ogawa ............... C09K 19/0403 |
| 2016/0289560 A1* | 10/2016 | Ogawa ............... C09K 19/0403 |

FOREIGN PATENT DOCUMENTS

| | | |
|---|---|---|
| CN | 103207469 A | 7/2013 |
| CN | 103631045 A | 3/2014 |
| JP | 2002-31821 A | 1/2002 |
| JP | 2002-265475 A | 9/2002 |
| JP | 2002-303869 A | 10/2002 |
| JP | 2004-279549 A | 10/2004 |
| JP | 2006-188668 A | 7/2006 |
| JP | 2008-276197 A | 11/2008 |
| JP | 2012-513482 A | 6/2012 |
| JP | 2012-219270 A | 11/2012 |
| JP | 2012-527495 A | 11/2012 |
| JP | 2013-536271 A | 9/2013 |
| JP | 2013-538249 A | 10/2013 |
| KR | 10-2013-0124370 A | 11/2013 |
| WO | 2013/037315 A1 | 3/2013 |

OTHER PUBLICATIONS

International Search Report dated May 19, 2015, issued in counterpart International Application No. PCT/JP2015/053822 (2 pages).

* cited by examiner

*Primary Examiner* — Geraldina Visconti
(74) *Attorney, Agent, or Firm* — Westerman, Hattori, Daniels & Adrian, LLP

(57) ABSTRACT

Provided is an LCD device having excellent high speed responsiveness. This LCD device contains a polymer or a copolymer in a liquid crystal composition sandwiched between two transparent substrates, at least one of which has an electrode, and the content of the polymer or the copolymer is 1% by mass or greater and less than 40% by mass of the total mass of the liquid crystal composition and the polymer or the copolymer. This LCD device can be applied to various operation modes such as TN, STN, ECB, VA, VA-TN, IPS, FFS, a π cell, OCB, and cholesteric liquid crystals.

15 Claims, 20 Drawing Sheets

Fine Black Line → Gap of Polymer

Alignment Direction
(Paralell Direction)

Photopolymerizable monomer Concentration Dependence of V-T Characteristics

Photopolymerizable Monomer Concentration Dependence of Response Time

Drive Voltage and Transmittance with Respect to Addition Amount of Monomer

LCD DEVICE

TECHNICAL FIELD

The present invention relates to an LCD device.

BACKGROUND ART

In a field sequential fall color display system that does not require a color filter, a backlight that is sequentially lit as "red→green→blue" is used. In typical CRTs or liquid crystal displays, the frame time is 16.7 ms, but in the field sequential full color display system, the frame time is 5.6 ms, and thus, high speed responsiveness is required.

As an indicator of the high speed responsiveness, the sum of τd and τr is exemplified. τd is the fall response time of the liquid crystal, and τr is the rise response time of the liquid crystal. To satisfy the high speed responsiveness in the field sequential full color display system, it is desired that the sum of τd and τr is less than 1.5 ms.

Currently, in the market, the liquid crystal material called a nematic liquid crystal is generally used in flat panel displays such as a TV, a monitor, a cellular phone, a smart phone, and a tablet terminal. However, since the nematie liquid crystal has a slow response speed of from about ten milliseconds to several milliseconds, improvement is demanded. Since the response speed is significantly influenced by the rotational viscosity γ1 and the elastic constant of the liquid crystal, improvement has been studied by development of novel compounds and optimization of the composition, but progress of the improvement has been slow. In contrast, in a ferroelectric liquid crystal (FLC) using a smectic liquid crystal, a high speed response of several hundred microseconds is capable. However, since the ferroelectric: liquid crystal has only two states of a bright state and a dark state, intermediate gradation display necessary for a full color display is not easy, an thus, a technique such as area gradation is used.

Among FLC, a polymer stabilized V shaped-FLC (PSV-FLC) device formed of a mixture of FLC and a monomer is a device in which a fine polymer network has been formed in a ferroelectric liquid crystal, and is capable of intermediate gradation display in addition to the high speed responsiveness which is a feature of FLC, and also has improved impact, resistance compared with FLC in the related art (for example, refer to PTL 1).

In addition, in a composite material of a nematic liquid crystal and a polymer, if 70% by mass or greater of a polymerizable compound is added to a nematic liquid crystal medium, a high speed response of several tens of microseconds is obtained, but if a drive voltage exceeds about 80 V, it is not suitable for practical use, and effective birefringence becomes an order of magnitude or greater lower than the liquid crystal birefringence used, and thus, the transmittance of a device is reduced. On the other hand, a polymer-stabilised (PS) or a polymer-sustained alignment (PSA) display which mainly induces pretilt by forming a fine projection structure obtained by polymerizing or cross linking in the glass substrate interface by UV photopolymerization with applying or without applying a voltage after 0.3% by mass or greater and less than 1% by mass of one or more types of polymerizable compounds is added to a liquid crystal medium has been proposed (for example, refer to PTLs 2 to 6).

However, even in these devices, there was room for improvement in terms of high speed responsiveness. In particular, regarding high speed response of the rise speed of a liquid crystal display apparatus, various techniques such as viscosity reduction of a liquid crystal composition, increasing dielectric constant, elastic constant reduction, and imparting a pretilt angle, or improvement of a driving method such as an overdrive method, but regarding the fall speed, effective technique other than viscosity reduction of a liquid crystal composition has not been found at present, and thus, improvement is demanded.

CITATION LIST

Patent Literature

[PTL 1] JP-A-2002-31821
[PTL 2] JP-A-2013-536271
[PTL 3] JP-A-2013-538249
[PTL 4] JP-A-2012-527495
[PTL 5] JP-A-2012-513482
[PTL 6] JP-A-2012-219270

SUMMARY OF INVENTION

Technical Problem

An object of the present invention is to provide an LCD device excellent in high transmittance and high speed responsiveness by improving the fall time of a liquid crystal, while preventing increase in a drive voltage, preventing reduction of birefringence, and improving transmittance.

Solution to Problem

The present inventor focused on the optimal content of a polymerizable compound for the purpose of achieving high speed response by forming a polymer network having refractive anisotropy and an alignment function in the entire liquid crystal cell, in a liquid crystal composition and a polymerisable liquid crystal composition containing a polymerizable compound, and completed the present invention.

[1] An LCD device, in which a polymer or a copolymer is contained in a liquid crystal composition sandwiched between two transparent substrates, at least one of which has an electrode, and the content of the polymer or the copolymer is 1% by mass or greater and less than 40% by mass of the total mass of the liquid crystal composition and the polymer or the copolymer.

[2] The LCD device according to [1], having a polymer network as a polymer or a copolymer in the liquid crystal composition and an alignment layer for aligning a liquid crystal composition on a transparent substrate.

[3] The LCD device according to [2], in which the polymer network has uniaxial refractive index anisotropy, and an optical axis direction or an easy alignment axial direction of the polymer network is the same as an easy alignment axial direction of a low molecular weight liquid crystal.

[4] The LCD device according to any one of [1] to [3], in which liquid crystal molecules of a low molecular weight liquid crystal are formed to have a pretilt angle of 0° to 90° with respect to the transparent substrate.

[5] The LCD device according to any one of [2] to [4], in which a polymer network layer having a thickness of at least 0.5% or greater of a cell thickness with respect to a cell sectional direction is formed.

[6] The LCD device according to any one of [1] to [5], in which a polymer having refractive index anisotropy or an easy alignment axial direction in the liquid crystal composition is obtained by polymerizing a polymerizable compound in a liquid crystal composition sandwiched between two transparent substrates, at least one of which has an electrode, by irradiation with energy rays while maintaining the temperature of a liquid crystal layer at −50° C. to 30° C.

[7] The LCD device according to any one of [1] to [6], in which a polymer having refractive index anisotropy or an easy alignment axial direction in the liquid crystal composition is obtained by polymerizing a polymerizable compound in a liquid crystal composition sandwiched between two transparent, substrates, at least one of which has an electrode, by irradiation with energy rays while applying a voltage such that a pretilt angle before irradiation with energy rays becomes 0.1 to 30 degrees.

[8] The LCD device according to [6] or [7], which is obtained by using one or two or more selected from compounds represented by each of the following Formulas (V) and (VI) as the polymerizable compound.

[Chem. 1]

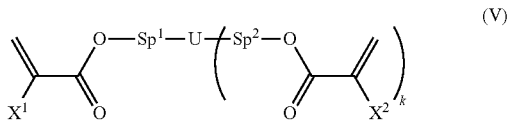

In the formula, $X^1$ and $X^2$ each independently represent a hydrogen atom or a methyl group, $Sp^1$ and $Sp^2$ each independently represent a single bond, an alkylene group having 1 to 12 carbon atoms, or —O—(CH$_2$)$_s$— (in the formula, s represents an integer of 1 to 11, and an oxygen atom is bonded to an aromatic ring), U represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom and may be substituted with an alkyl group having 5 to 20 carbon atoms (the alkylene group in the group may be substituted with an oxygen atom as long as an oxygen atom is not adjacent to another oxygen atom) or a cyclic substituent, and k represents an integer of 1 to 5. An arbitrary hydrogen atom in all 1,4-phenylene groups in the formula may be substituted with —CH$_3$, —OCH$_3$, a fluorine atom, or a cyano group.

[Chem. 2]

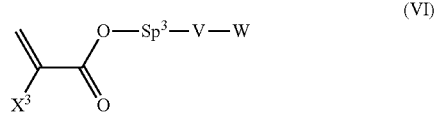

In the formula, $X^3$ represents a hydrogen atom or a methyl group, $Sp^3$ represents a single bond, an alkylene group having 1 to 12 carbon atoms, or —O—(CH$_2$)$_t$— (in the formula, t represents an integer of 2 to 11, and an oxygen atom is bonded to an aromatic ring), V represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom and may be substituted with an alkyl group having 5 to 20 carbon atoms (the alkylene group in the group may be substituted with an oxygen atom as long as an oxygen atom is not adjacent to another oxygen atom) or a cyclic substituent, and W represents a hydrogen atom, a halogen atom, or an alkyl group having 1 to 15 carbon atoms. An arbitrary hydrogen atom in all 1,4-phenylene groups in the formula may be substituted with —CH$_3$, —OCH$_3$, a fluorine atom, or a cyano group.

[9] The LCD device according to [8], which is obtained by using one or two or more of compounds represented by Formula (V) in which $Sp^1$ and $Sp^2$ are the same, as the polymerizable compound.

[10] The LCD device according to [9], which is obtained by using two or more of compounds represented by Formula (V) in which $Sp^1$ and $Sp^2$ are the same as each other, the compounds having different $Sp^1$ and $Sp^2$ from each other as the polymerizable compound.

[11] The LCD device according to any one of [1] to [10], which is obtained by using a liquid crystal composition containing a liquid crystal compound represented by the following Formula (LC).

[Chem. 3]

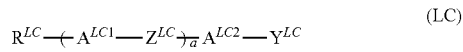

In Formula (LC), $R^{LC}$ represents an alkyl group having 1 to 15 carbon atoms. One or two or more CH$_2$ groups in the alkyl group may be substituted with —O—, —CH=CH—, —CO—, —OCO—, —COO—, or —C≡C— as long as an oxygen atom is not directly adjacent to another oxygen atom, and one or two or more hydrogen atoms in the alkyl group may be arbitrarily substituted with a halogen atom. $A^{LC1}$ and $A^{LC2}$ each independently represent a group selected from the group consisting of the following groups (a), (b), and (c).

(a) a trans-1,4-cyclohexylene group (one CH$_2$ group or two or more non-adjacent CH$_2$ groups present in this group may be substituted with an oxygen atom or a sulfur atom), (b) a 1,4-phenylene group (one CH group or two or more non-adjacent CH groups present in this group may be substituted with an oxygen atom), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group.

One or two or more hydrogen atoms included in the group (a), (b), or (c) each may be substituted with a fluorine atom, a chlorine atom, —CF$_3$, or —OCF$_3$.

$Z^{LC}$ represents a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—.

$Y^{LC}$ represents a hydrogen atom, a fluorine atom, a chlorine atom, a cyano group, or an alkyl group having 1 to 15 carbon atoms. One or two or more CH$_2$ groups in the alkyl group may be substituted with —O—, —CH=CH—, —CO—, —OCO—, —COO—, —C≡C—, —CF$_2$O—, or —OCF$_2$— as long as an oxygen atom is not directly adjacent to another oxygen atom, and one or two or more hydrogen atoms in the alkyl group may be arbitrarily substituted by halogen atoms.

a represents an integer of 1 to 4. When a represents 2, 3, or 4, in a case where a plurality of $A^{LC1}$'s are present in Formula (LC), the plurality of $A^{LC1}$'s may be the same as or different from each other, and in a case where a plurality of $Z^{LC}$'s are present, the plurality of $Z^{LC}$'s may be the same as or different from each other.

The LCD device according to any one of [6] to [11], in which a polymer network having refractive index anisotropy or an easy alignment axial direction is formed using a polymerizable liquid crystal composition containing a polymerizable compound in an amount of 1% by mass or greater and less than 10% by mass.

[13] The LCD device according to any one of [6] to [11], in which a polymer network having refractive index anisotropy or an easy alignment axial direction is formed using a polymerizable liquid crystal composition containing a polymerizable compound of 10% by mass or greater and less than 40% by mass.

[14] The LCD device according to any one of [6] to [13], which is obtained by using one or two or more of compounds represented by the following Formula (X1b) as the polymerizable compound.

[Chem. 4]

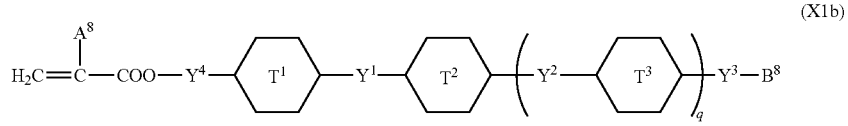

(X1b)

In the formula, $A^8$ represents a hydrogen atom or a methyl group, six-membered rings $T^1$, $T^2$ and $T^3$ each independently represent any one of the following formulas (where q represents an integer of 1 to 4).

[Chem. 5]

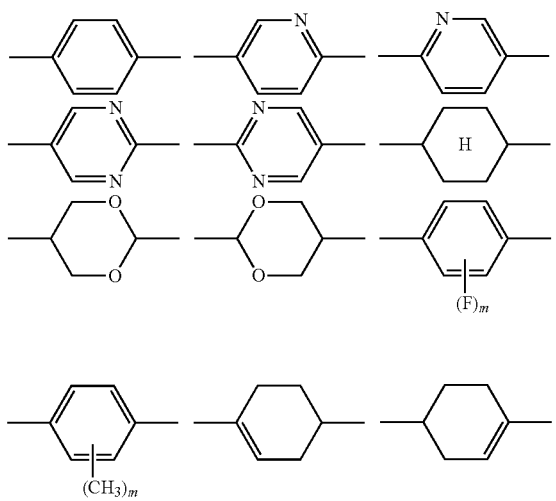

q represents 0 or 1, $Y^1$ and $Y^2$ each independently represent a single bond, —$CH_2CH_2$—, —$CH_2O$—, —$OCH_2$—, —COO—, —OCO—, —C≡C—, —CH═CH—, —CF═CF—, —$(CH_2)_4$—, —$CR_2CR_2CR_2O$—, —$OCH_2CH_2CH_2$—, —CH═$CHCH_2CH_2$—, or —$CH_2CH_2CH$═CH—, $Y^3$ and $Y^4$ each independently represent a single bond or an alkylene group having 1 to 12 carbon atoms (one or two or more methylene groups in the alkylene group each may be independently substituted with an oxygen atom, —CO—, —COO—, or —OCO— as long as an oxygen atom is not directly bonded to another oxygen atom, and one or two- or more hydrogen atoms in the alkylene group each may be independently substituted with a fluorine atom, a methyl group, or an ethyl group), and $B^8$ represents a hydrogen atom, a cyano group, a halogen atom, an alkyl group having 1 to 12 carbon atoms, or an alkylene group in which the terminal has an acryloyl group or a methacryloyl group.

[15] The LCD device according to any one of [6] to [14], which is obtained by using one or two or more of compounds represented by the following Formula (X1a) as the polymerizable compound.

[Chem. 6]

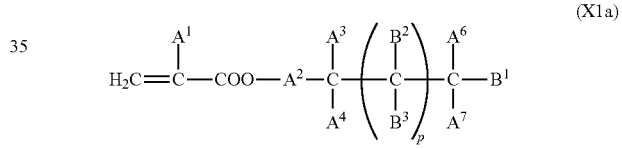

(X1a)

In the formula, $A^1$ represents a hydrogen atom or a methyl group, $A^2$ represents a single bona or an alkylene group having 1 to 8 carbon atoms (one or two or more methylene groups in the alkylene group each may be independently substituted with an oxygen atom, —CO—, —COO—, or —OCO— as long as an oxygen atom is not directly bonded to another oxygen atom, and one or two or more hydrogen atoms in the alkylene group each may be independently substituted with a fluorine atom, a methyl group, or an ethyl group), $A^3$ and $A^6$ each independently represent a hydrogen atom, a halogen atom, or an alkyl group having 1 to 14 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or an alkyl group having 1 to 17 carbon atoms), $A^4$ and $A^7$ each independently represent a hydrogen atom, a halogen atom, or an alkyl group having 1 to 10 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or an alkyl group having 1 to 9 carbon atoms), p represents 0 to 10, $B^1$, $B^2$, and $B^3$ each independently represent a hydrogen atom or a linear or branched alkyl group having 1 to 10 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or a trialkoxysilyl group having 3 to 6 carbon atoms).

The LCD device according to any one of [6] to [15], which is obtained by using one or two or more of compounds represented by the following Formula (Vb) as the polymerizable compound.

[Chem. 7]

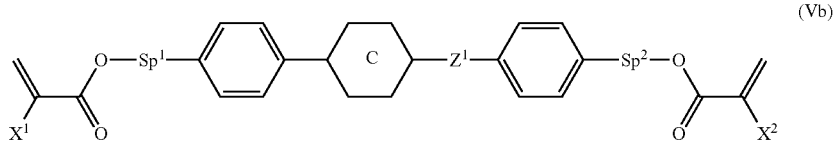

(Vb)

In the formula, $X^1$ and $X^2$ each independently represent a hydrogen atom or a methyl group, $Sp^1$ and $Sp^2$ each independently represent a single bond, an alkylene group having 1 to 12 carbon atoms, or —O—$(CH_2)_s$— (in the formula, s represents an integer of 1 to 11, and an oxygen atom is bonded to an aromatic ring), $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond, C represents a 1,4-phenylene group, a trans-1,4-cyclohexylene group, or a single bond, and an arbitrary hydrogen atom in all 1,4-phenylene groups in the formula may be substituted with a fluorine atom.

[17] The LCD device according to any one of [6] to [16], which is obtained by using one or two or more of compounds having a photo-alignment function as the polymerizable compound.

[18] The LCD device according to [17], in which at least one compound having a photo-alignment function is a compound exhibiting photoisomerization.

[19] The LCD device according to [1] to [18], in which the cell structure is a VA mode, an IPS mode, an FFS mode, a VA-TN mode, a TH mode, or an ECB mode.

[20] The polymerizable liquid crystal composition according to [1] to [19].

Advantageous Effects of Invention

According to the present invention, it is possible to provide an LCD device excellent in high transmittance and high speed responsiveness by improving the fail time of a liquid crystal, while preventing increase in a drive voltage, preventing reduction of birefringence, and improving transmittance.

DESCRIPTION OF EMBODIMENTS

Figure 1:
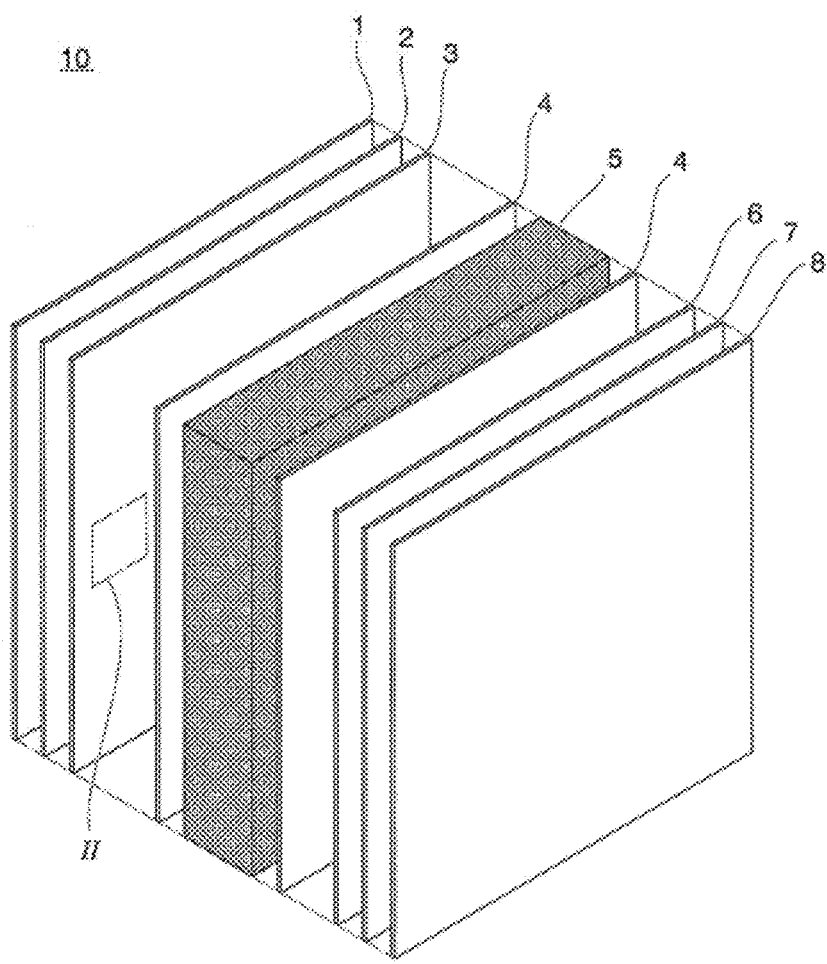
FIG. 1 is a schematic diagram of an LCD device of the present invention.

<Liquid Crystal Composition>
[Liquid Crystal Compound]

The liquid crystal composition used in the present invention preferably contains a liquid crystal compound represented by Formula (LC).

[Chem. 8]

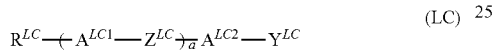

(LC)

In Formula (LC), $R^{LC}$ represents an alkyl group having 1 to 15 carbon atoms. One or two or more $CH_2$ groups in the alkyl group may be substituted with —O—, —CH=CH—, —CO—, —OCO—, —COO—, or —C≡C— such that oxygen atoms are not directly adjacent, and one or two or more hydrogen atoms in the alkyl group may be arbitrarily substituted with halogen atoms. Although the alkyl group represented by $R^{LC}$ may be a branched group or a linear group, respectively, the alkyl group is preferably a linear group.

In Formula (LC), $A^{LC1}$ and $A^{LC2}$ each independently represent a group selected from the group consisting of the following groups (a), (b), and (c).

(a) a trans-1,4-cyclohexylene group (one $CH_2$ group or two or more non-adjacent $CH_2$ groups present in this group may be substituted with an oxygen atom or a sulfur atom), (b) a 1,4-phenylene group (one CH group or two or more non-adjacent CH groups present in this group may be substituted with a nitrogen atom), and (c) a 1,4-bicyclo(2.2.2)octylene group, a naphthalene-2, 6-diyl group, a decahydronaphthalene-2,6-diyl group, a 1,2, 3,4-tetrahydronaphthalene-2,6-diyl group, or a chroman-2, 6-diyl group.

One or two or more hydrogen atoms included in the group (a), (b), or (c) each may be substituted with a fluorine atom, a chlorine atom, —$CF_3$, or —$OCF_3$.

In Formula (LC), $Z^{LC}$ represents a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—.

In Formula (LC), $Y^{LC}$ represents a hydrogen atom, a fluorine atom, a chlorine atom, a cyano group, or an alkyl group having 1 to 15 carbon atoms. One or two or more $CH_2$ groups in the alkyl group may be substituted with —O—, —CH=CH—, —CO—, —OCO—, —COO—, —C≡C—, —$CF_2O$—, or —$OCF_2$— such that oxygen atoms are not directly adjacent, and one or two or more hydrogen atoms in the alkyl group may be arbitrarily substituted by halogen atoms.

In Formula (LC), a represents an integer of 1 to 4. a represents 2, 3, or 4, in a case where a plurality of $A^{LC1}$'s are present in Formula (LC), the plurality of $A^{LC1}$'s may be the same as or different from each other, and in a case where a plurality of $Z^{LC}$'s are present, the plurality of $Z^{LC}$'s may be the same as or different from each other.

The compound represented by Formula (LC) is preferably one type or two or more types of compounds selected from the compound group represented by the following Formula (LC1) or (LC2).

[Chem. 9]

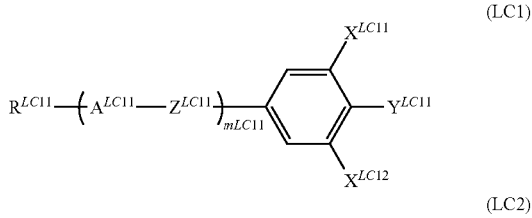

(LC1)

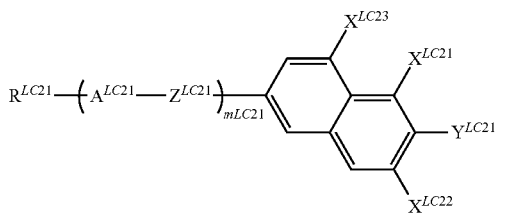

(LC2)

In Formula (LC1) or (LC2), $R^{LC11}$ and $R^{LC21}$ each independently represent an alkyl group having 1 to 15 carbon atoms, one or two or more $CH_2$ groups in the alkyl group may be substituted with —O—, —CH=CH—, —CO—, —OCO—, —COO—, or —C≡C— such that oxygen atoms are not directly adjacent, and one or two or more hydrogen atoms in the alkyl group may be arbitrarily substituted by halogen atoms. In the compound represented by Formula (LC1) or (LC2), $R^{LC11}$ and $R^{LC21}$ each independently preferably represent an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms, and still more preferably linear, and the alkenyl group most preferably represents any one of the following structures.

[Chem. 10]

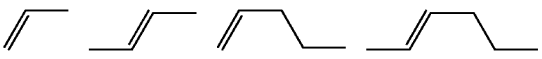

(In the formulas, the right terminal is bonded to the ring structure.)

In Formula (LC1) or (LC2), $A^{LC11}$ and $A^{LC21}$ each independently represent any one of the following structures. In the structures, one or two or more $CH_2$ groups in the cyclohexylene group may be substituted with oxygen atoms, one or two or more CH groups in the 1,4-phenylene group may be substituted with nitrogen atoms, and one or two or more hydrogen atoms in the structure may be substituted with fluorine atoms, chlorine atoms, —$CF_3$'s, or —$OCF_3$'s.

[Chem. 11]

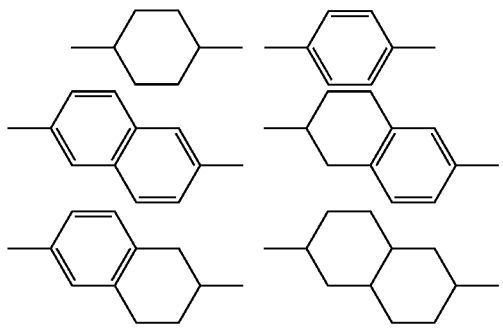

In the compound represented by Formula (LC1) or (LC2), $A^{LC11}$ and $A^{LC21}$ each independently preferably have any one of the following structures.

[Chem. 12]

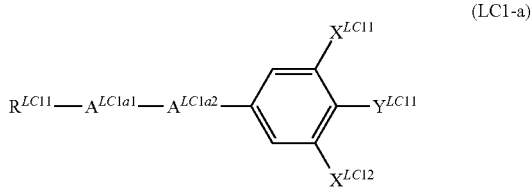

In Formula (LC1) or (LC2), $X^{LC11}$, $X^{LC12}$, and $X^{LC21}$ to $X^{LC23}$ each independently represent a hydrogen atom, a chlorine atom, a fluorine atom, a —CF$_3$ or —OCF$_3$, and $Y^{LC11}$ and $Y^{LC21}$ each independently represent a hydrogen atom, a chlorine atom, a fluorine atom, a cyano group, —CF$_3$, —OCH$_2$F, —OCHF$_2$, or —OCF$_3$. In the compound represented by Formula (LC1) or (LC2), $Y^{LC11}$ and $Y^{LC21}$ each independently preferably represent a fluorine atom, a cyano group, —CF$_3$, or —OCF$_3$, more preferably a fluorine atom or —OCF$_3$, and particularly preferably a fluorine atom.

In Formula (LC1) or (LC2), $Z^{LC11}$ and $Z^{LC21}$ each independently represent a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—. In the compound represented by Formula (LC1) or (LC2), $Z^{LC11}$ and $Z^{LC21}$ each independently preferably represent a single bond, —CH$_2$CH$_2$—, —COO—, —OCO—, —OCH$_2$—, —CH$_2$O—, —OCF$_2$—, or —CF$_2$O—, more preferably a single bond, —CH$_2$CH$_2$—, —OCH$_2$—, —OCF$_2$—, or —CF$_2$O—, and still more preferably a single bond, —OCH$_2$—, or —CF$_2$O—.

In Formula (LC1) or (LC2), $m^{LC11}$ and $m^{LC21}$ each independently represent an integer of 1 to 4. In the compound represented by Formula (LC1) or (LC2), $m^{LC11}$ and $m^{LC21}$ each independently preferably represent 1, 2, or 3, in the case of regarding the storage stability at low temperatures and the response speed as important, more preferably 1 or 2, and in the case of improving the upper limit value of the nematic phase upper limit temperature, more preferably 2 or 3. In Formula (LC1) or (LC2), in a case where a plurality of $A^{LC11}$, $A^{LC21}$, $Z^{LC11}$, and $Z^{LC21}$ are present, these may be the same as or different from each other.

The compound represented by Formula (LC1) is preferably one type or two or more types of compounds selected from the group consisting of compounds represented by each of the following Formulas (LC1-a) to (LC1-c).

[Chem. 13]

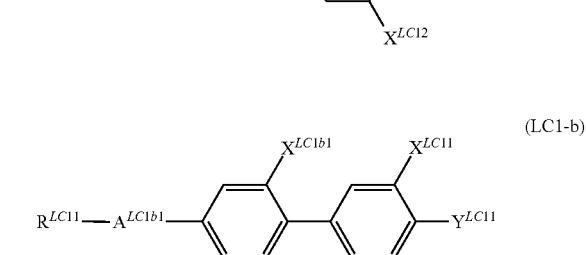

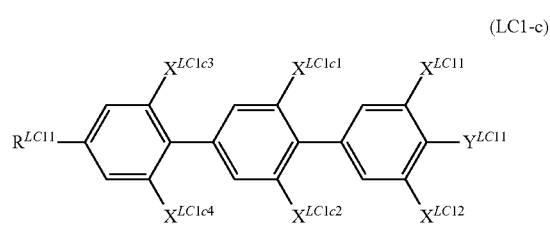

In Formulas (LC1-a) to (LC1-c), $R^{LC11}$, $Y^{LC11}$, $X^{LC11}$, and $X^{LC12}$ each independently represent the same meaning as $R^{LC11}$, $Y^{LC11}$, $X^{LC11}$, and $X^{LC12}$ in Formula (LC1). In the compounds represented by each of Formulas (LC1-a) to (LC1-c), $R^{LC11}$'s each independently preferably represent an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms. In addition, $X^{LC11}$ and $X^{LC12}$ each independently preferably represent a hydrogen atom or a fluorine atom, and $Y^{LC11}$'s each independently preferably represent a fluorine atom, —CF$_3$, or —OCF$_3$.

In Formulas (LC1-a) to (LC1-c), $A^{LC1a1}$, $A^{LC1a2}$, and $A^{LC1b1}$ each represent a trans-1,4-cyclohexylene group, a tetrahydropyran-2,5-diyl group, or a 1,3-dioxane-2,5-diyl group. In addition, in Formulas (LC1-a) to (LC1-c), $X^{LC1b1}$, $X^{LC1b2}$, and $X^{LC1c1}$ to $X^{LC1c4}$ each independently represent a hydrogen atom, a chlorine atom, a fluorine atom, —CF$_3$, or —OCF$_3$. In the compounds represented by each of Formulas (LC1-a) to (LC1-c), $X^{LC1b1}$, $X^{LC1b2}$, and $X^{LC1c1}$ to $X^{LC1c4}$ each independently preferably represent a hydrogen atom or a fluorine atom.

The compound represented by Formula (LC1) is also preferably one type or two or more types of compounds selected from the group consisting of compounds represented by each of the following Formulas (LC1-d) to (LC1-p).

[Chem. 14]

(LC1-d)

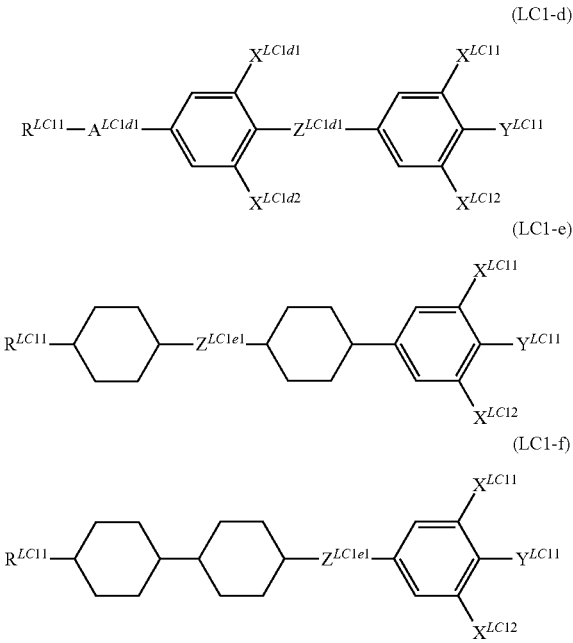

(LC1-e)

(LC1-f)

[Chem. 15]

(LC1-g)

(LC1-h)

(LC1-i)

[Chem. 16]

(LC1-j)

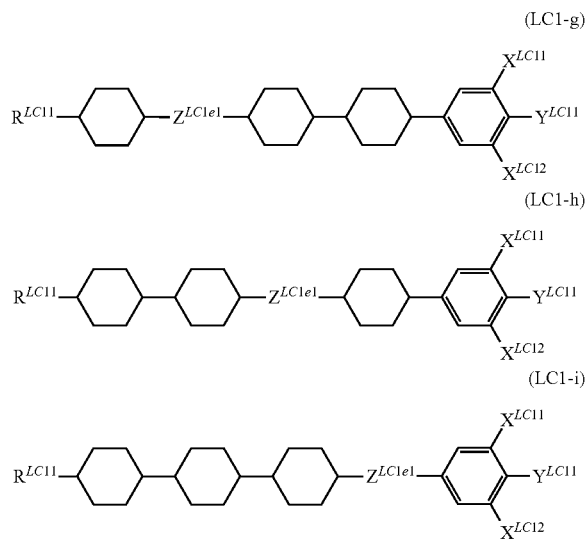

(LC1-k)

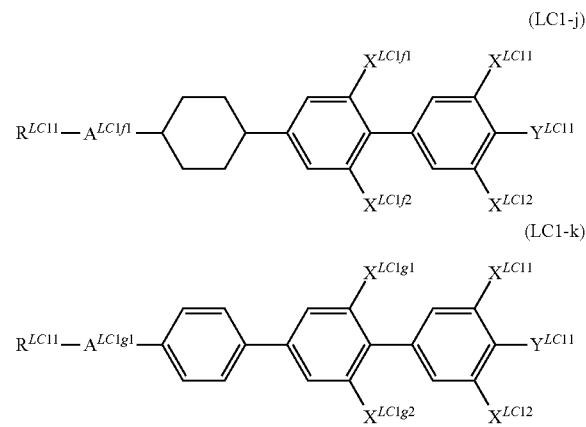

[Chem. 17]

(LC1-l)

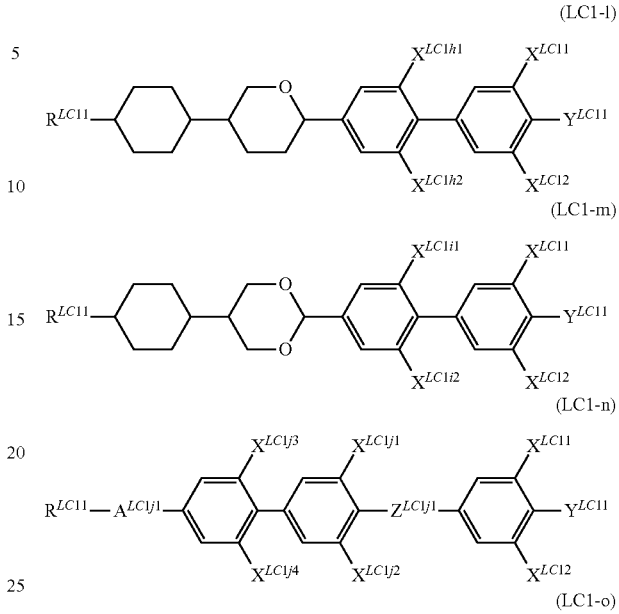

(LC1-m)

(LC1-n)

(LC1-o)

(LC1-p)

In Formulas (LC1-d) to (LC1-p), $R^{LC11}$, $Y^{LC11}$, $X^{LC11}$, and $X^{LC12}$ each independently represent the same meaning as $R^{LC11}$, $Y^{LC11}$, $X^{LC11}$, and $X^{LC12}$ in Formula (LC1). In the compounds represented by each of Formulas (LC1-d) to (LC1-p), $R^{LC11}$'s each independently preferably represent an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms. In addition, $X^{LC11}$ and $X^{LC12}$ each independently preferably represent a hydrogen atom or a fluorine atom. $Y^{LC11}$'s each independently preferably represent a fluorine atom, —$CF_3$, or —$OCF_3$.

In Formulas (LC1-d) to (LC1-p), $A^{LC1d1}$, $A^{LC1f1}$, $A^{LC1g1}$, $A^{LC1j1}$, $A^{LC1k1}$, $A^{LC1k2}$, and $A^{LC1m1}$ to $A^{LC1m3}$ each independently represent a 1,4-phenylene group, a trans-1,4-cyclohexylene group, a tetrahydropyran-2,5-diyl group, or a 1,3-dioxane-2,5-diyl group.

In Formulas (LC1-d) to (LC1-p), $X^{LC1d1}$, $X^{LC1d2}$, $X^{LC1f1}$, $X^{LC1f2}$, $X^{LC1g1}$, $X^{LC1g2}$, $X^{LC1h1}$, $X^{LC1h2}$, $X^{LC1i1}$, $X^{LC1i2}$, $X^{LC1j1}$, to $X^{1j4}$, $X^{LC1k1}$, $X^{LC1k2}$, $X^{LC1m1}$, and $X^{LC1m2}$ each independently represent a hydrogen atom, a chlorine atom, a fluorine atom, —$CF_3$, or —$OCF_3$. In the compounds represented by each of Formulas (LC1-d) to (LC1-m), $X^{LC1d1}$ to $X^{LC1m2}$ each independently preferably represent a hydrogen atom or a fluorine atom.

In Formulas (LC1-d) to (LC1-p), $Z^{LC1d1}$, $Z^{LC1e1}$, $Z^{LC1j1}$, $Z^{LC1k1}$, and $Z^{LC1m1}$ each independently represent a single bona, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—. In the compounds represented by each of Formulas (LC1-d) to (LC1-p), $Z^{LC1d1}$ to $Z^{LC1m1}$ each independently preferably represent a single bond, —CH$_2$CH$_2$—, —(CH$_2$)$_4$—, —CF$_2$O—, or —OCH$_2$—.

The compounds represented by each of Formulas (LC1-d) to (LC1-p) are preferably one type or two or more types of compounds selected from the group consisting of compounds represented by each of the following Formulas (LC1-1) to (LC1-45). In Formulas (LC1-1) to (LC1-45), $R^{LC11}$'s each independently represent an alkyl group having 1 to 7 carbon atoms.

[Chem. 18]

(LC1-1)
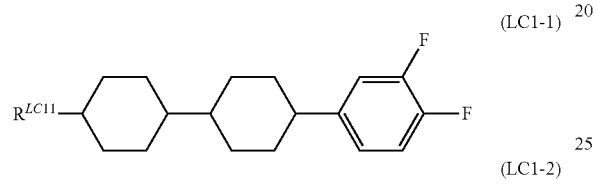

(LC1-2)

(LC1-3)
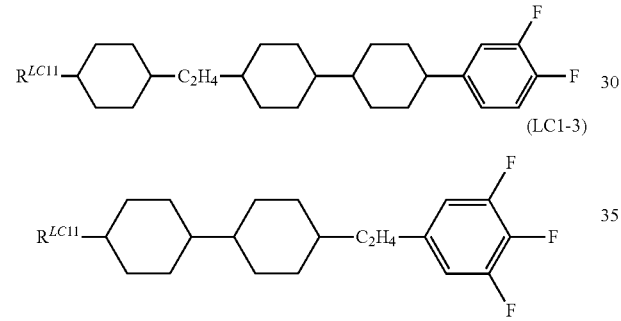

[Chem. 19]

(LC1-4)

(LC1-5)

(LC1-6)
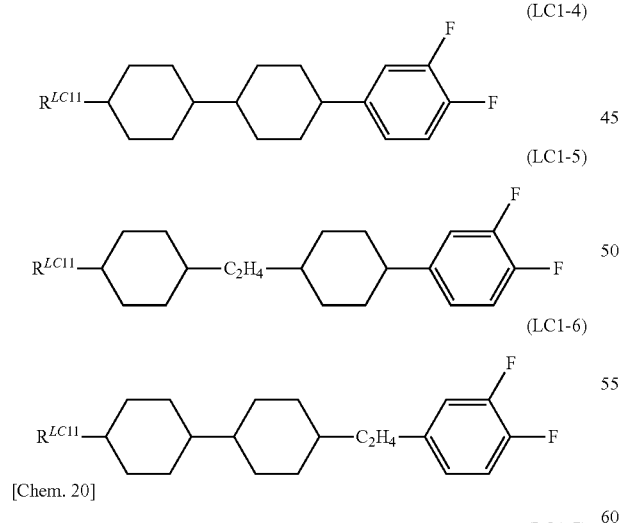

[Chem. 20]

(LC1-7)

(LC1-8)
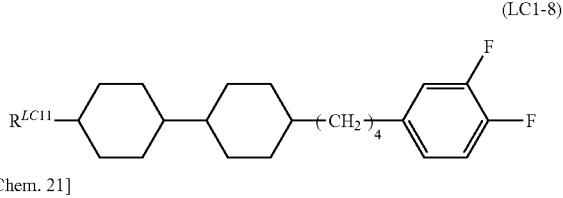

[Chem. 21]

(LC1-9)

(LC1-10)
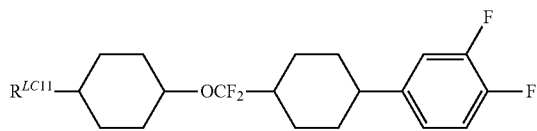

[Chem. 22]

(LC1-11)

(LC1-12)
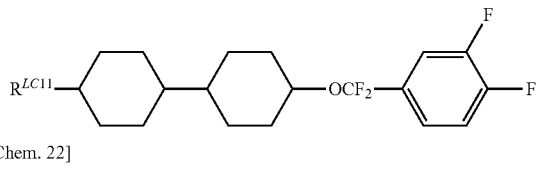

[Chem. 23]

(LC1-13)

(LC1-14)

(LC1-15)
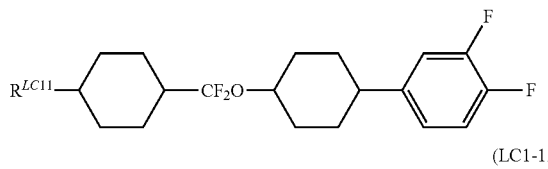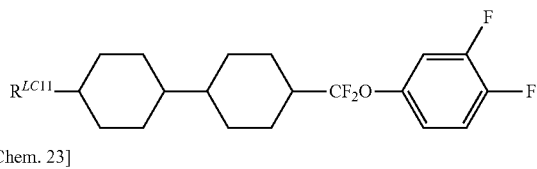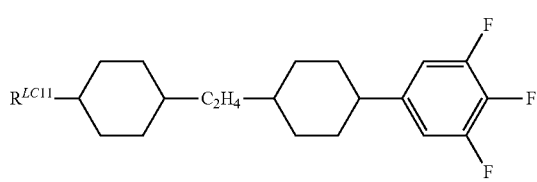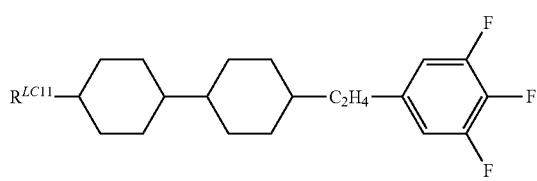

[Chem. 24]
(LC1-16)
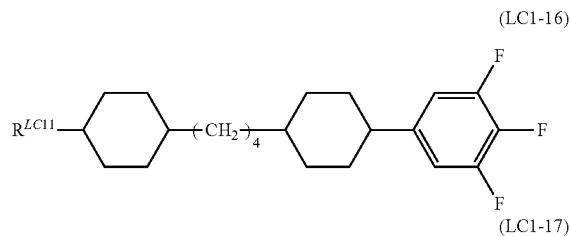
(LC1-17)
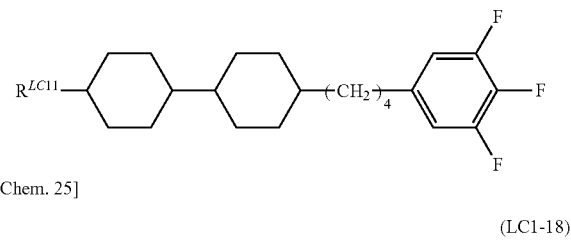
[Chem. 25]
(LC1-18)
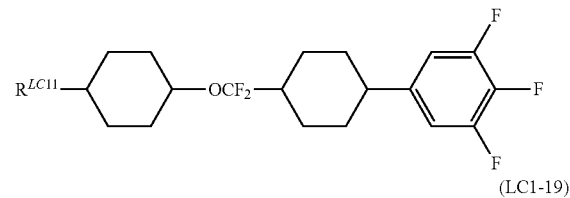
(LC1-19)
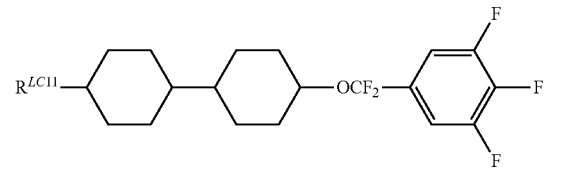
[Chem. 26]
(LC1-20)
(LC1-21)
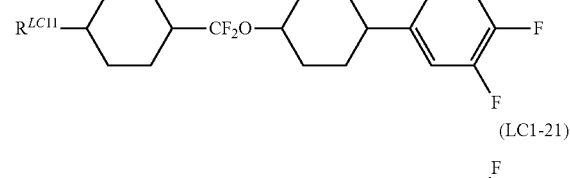
[Chem. 27]
(LC1-22)
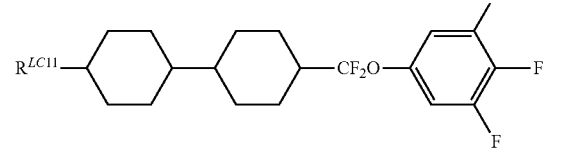
(LC1-23)
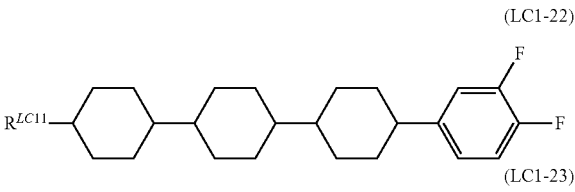
(LC1-24)
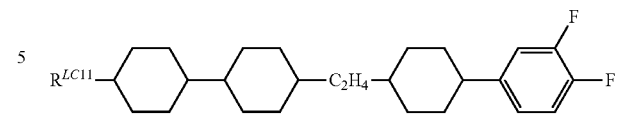
[Chem. 28]
(LC1-25)
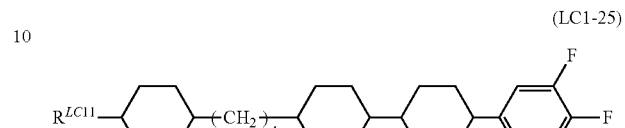
(LC1-26)
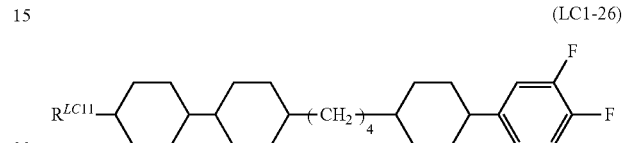
(LC1-27)
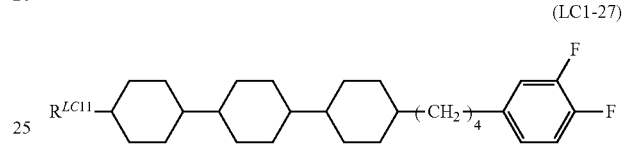
[Chem. 29]
(LC1-28)
(LC1-29)
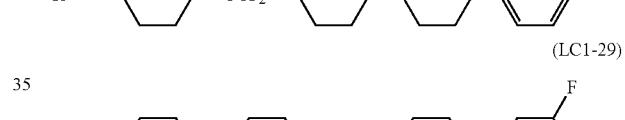
[Chem. 30]
(LC1-30)
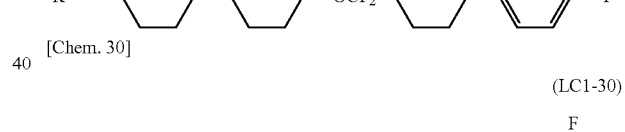
(LC1-31)
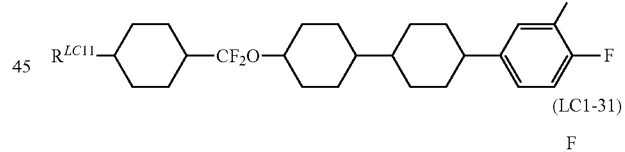
(LC1-32)
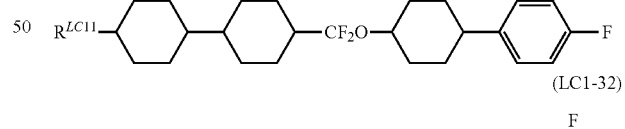
[Chem. 31]
(LC1-33)
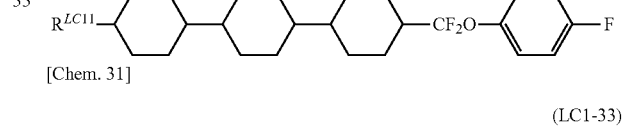
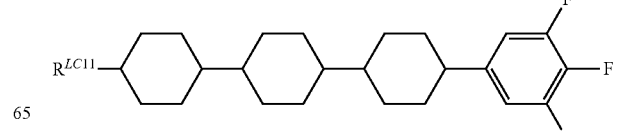

(LC1-34)
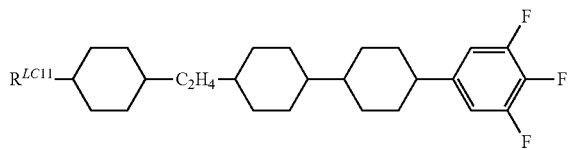
(LC1-35)
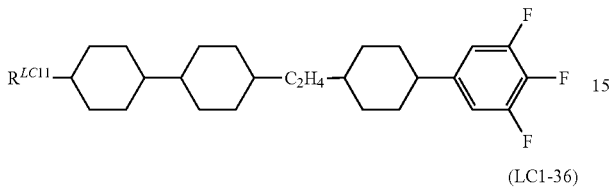
(LC1-36)
[Chem. 32]
(LC1-37)
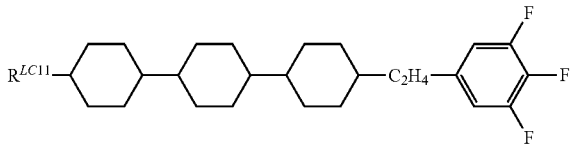
(LC1-38)
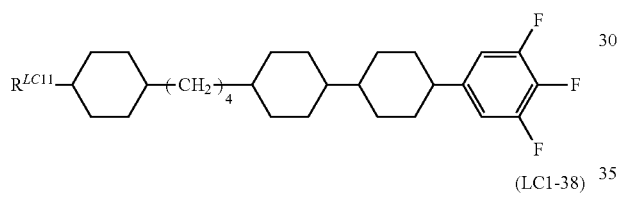
(LC1-39)
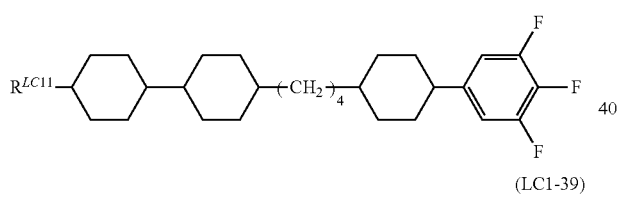
[Chem. 33]
(LC1-40)
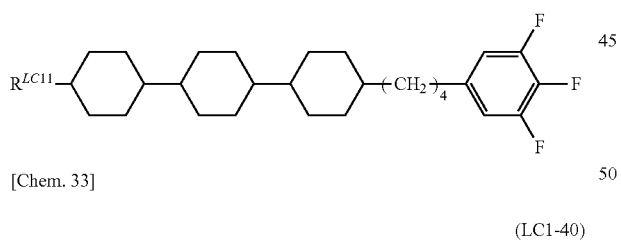
(LC1-41)
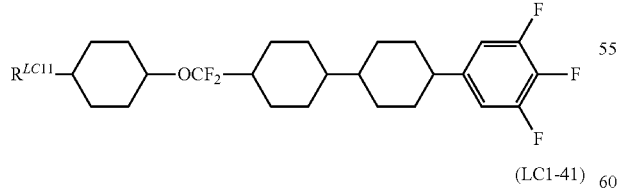
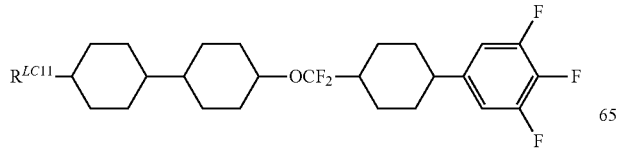
(LC1-42)
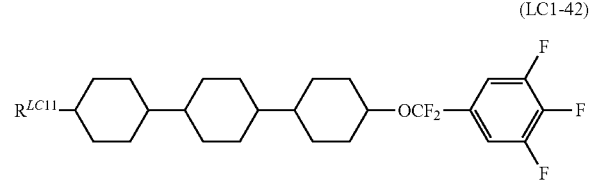
[Chem. 34]
(LC1-43)
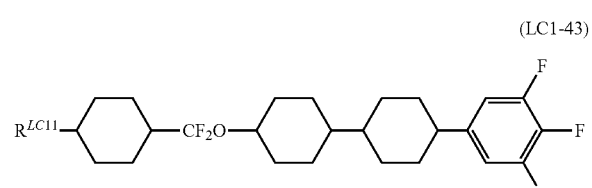
(LC1-44)
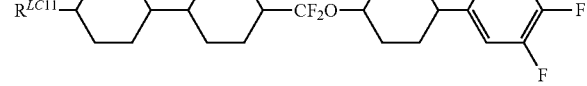
(LC1-45)
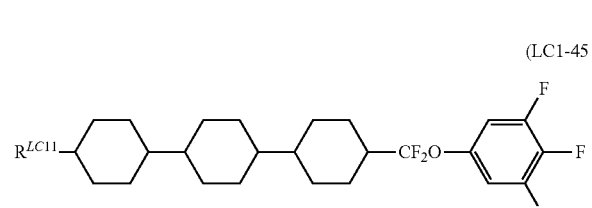
The compound represented by Formula (LC2) is preferably one type or two or more types of compounds selected from the group consisting of compounds represented by each of the following Formulas (LC2-a) to (LC2-g).
[Chem. 35]
(LC2-a)
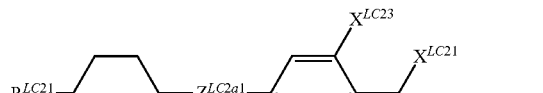
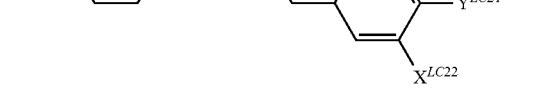
(LC2-b)
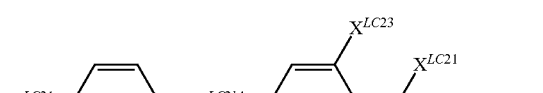
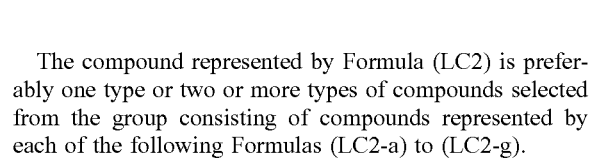

-continued

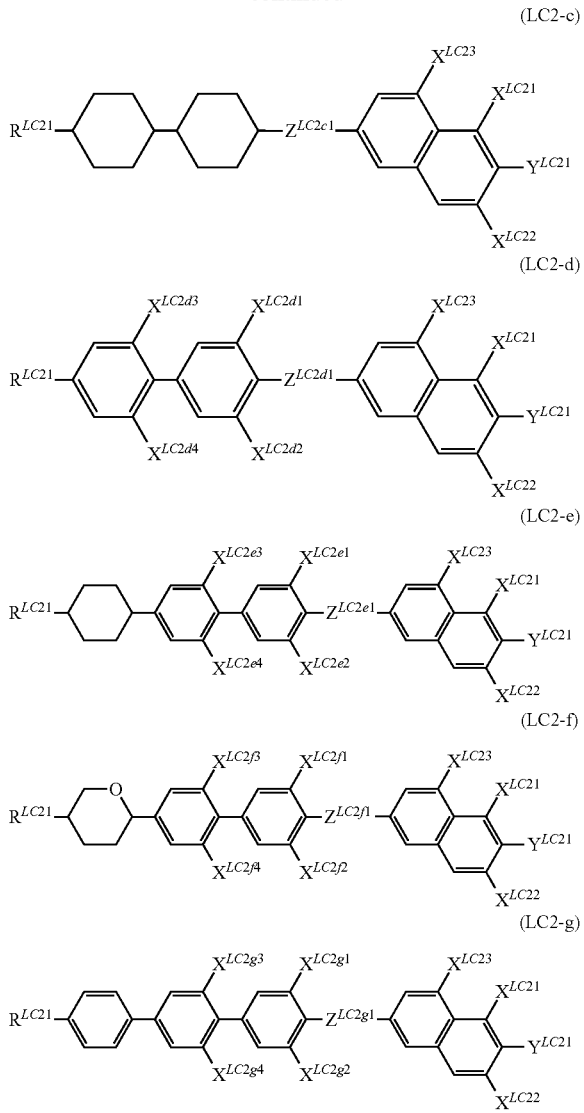

(LC2-c)

(LC2-d)

(LC2-e)

(LC2-f)

(LC2-g)

In Formulas (LC2-a) to (LC2-g), $R^{LC21}$, $Y^{LC21}$, and $X^{LC21}$ to $X^{LC23}$ each independently represent the same meaning as $R^{LC21}$, $Y^{LC21}$, and $X^{LC21}$ to $X^{LC23}$ in Formula (LC2). In the compounds represented by each of Formulas (LC2-a) to (LC2-g), $R^{LC21}$'s each independently preferably represent an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms. In addition, $X^{LC21}$ and $X^{LC23}$ each independently preferably represent a hydrogen atom or a fluorine atom, and $Y^{LC21}$'s each independently preferably represent a fluorine atom, —$CF_3$, or —$OCF_3$.

In Formulas (LC2-a) to (LC2-g), $X^{LC2d1}$ to $X^{LC2d4}$, $X^{LC2e1}$ to $X^{LC2e4}$, $X^{LC2f1}$ to $X^{LC2f4}$, and $X^{LC2g1}$ to $X^{LC2g4}$ each independently represent a hydrogen atom, a chlorine atom, a fluorine atom, —$CF_3$, or —$OCF_3$. In the compounds represented by each of Formulas (LC2-a) to (LC2-g), $X^{LC2d1}$ to $X^{LC2g4}$ each independently preferably represent a hydrogen atom or a fluorine atom.

In Formulas (LC2-a) to (LC2-g), $Z^{LC2a1}$, $Z^{LC2b1}$, $Z^{LC2c1}$, $Z^{LC2d1}$, $Z^{LC2e1}$, $Z^{L2f1}$, and $Z^{LC2g1}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—. In the compounds represented by each of Formulas (LC2-a) to (LC2-g), $Z^{LC2a1}$ to $Z^{LC2g4}$ each independently preferably represent —$CF_2O$— or —$OCH_2$—.

The compound represented by Formula (LC) is also preferably one type or two or more types of compounds selected from the compound group represented by each of the following Formulas (LC3) to (LC5).

It is preferred to contain one or two or more of the compounds selected from the group consisting of compounds represented by the following Formulas (LC3) to (LC5).

[Chem. 36]

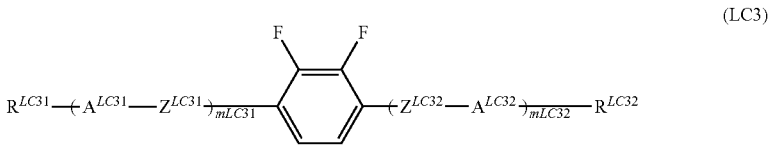

(LC3)

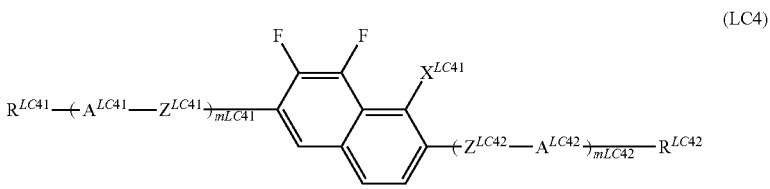

(LC4)

(LC5)

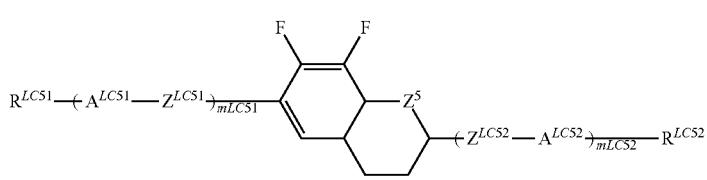

In Formula, $R^{LC31}$, $R^{LC32}$, $R^{LC41}$, $R^{LC42}$, $R^{LC51}$, and $R^{LC52}$ each independently represent an alkyl group having 1 to 15 carbon atoms, one or two or more $CH_2$ groups in the alkyl group may be substituted with —O—, —CH=CH—, —CO—, —OCO—, —COO—, or —C≡C— such that oxygen atoms are not directly adjacent, one or two or more hydrogen atoms in the alkyl group may be arbitrarily substituted by halogen atoms, $A^{LC31}$, $A^{LC32}$, $A^{LC41}$, $A^{LC42}$, $A^{LC51}$, and $A^{LC52}$ each independently represent any one of the following structures.

[Chem. 37]

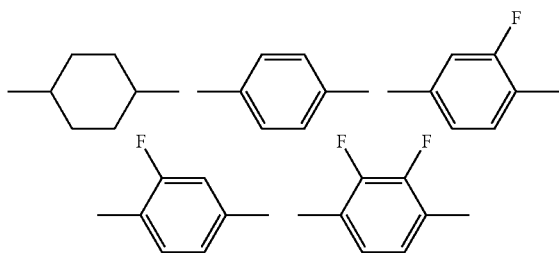

One or two or more $CH_2$ groups in the cyclohexylene group in the structure may be substituted with oxygen atoms, one or two or more CH groups in the 1,4-phenylene group may be substituted with nitrogen atoms, and one or two or more hydrogen atoms in the structure may be substituted with fluorine atoms, chlorine atoms, —$CF_3$'s, or —$OCF_3$'s.), $Z^{LC31}$, $Z^{LC32}$, $Z^{LC41}$, $Z^{LC42}$, $Z^{LC51}$, and $Z^{LC51}$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, $Z^5$ represents —$CH_2$— or an oxygen atom, $X^{LC41}$ represents a hydrogen atom or a fluorine atom, $m^{LC31}$, $m^{LC32}$, $m^{LC41}$, $m^{LC42}$, $m^{LC51}$, and $m^{LC52}$ each independently represent 0 to 3, $m^{LC31}+m^{LC32}$, $m^{LC41}+m^{LC42}$, and $m^{LC51}+m^{LC52}$ is 1, 2, or 3, and in a case where a plurality of $A^{LC31}$ to $A^{LC52}$, $Z^{LC31}$ to $Z^{LC52}$ are present, these may be the same as or different from each other.

$R^{LC31}$ to $R^{LC52}$ each independently preferably represent an alkyl group having 1 to 7 carbon atoms, an alkoxy group having 1 to 7 carbon atoms, or an alkenyl group having 2 to 7 carbon atoms, and the alkenyl group most preferably represents any one of the following structures.

[Chem. 38]

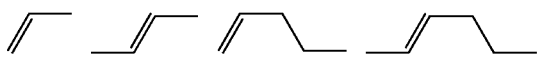

In the formulas, the right terminal is bonded to the ring structure.

$A^{LC31}$ to $A^{LC52}$ each independently preferably represent any one of the following structures.

[Chem. 39]

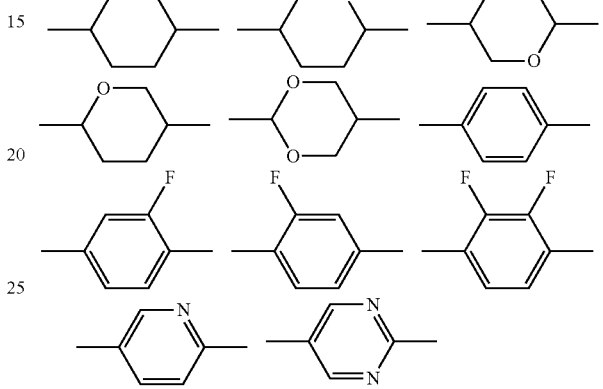

$Z^{LC31}$ to $Z^{LC51}$ each independently preferably represent a single bond, —$CH_2O$—, —COO—, —OCO—, —$CH_2CH_2$—, —$CF_2O$—, —$OCF_2$—, or —$OCH_2$—.

The compound represented by Formula (LC3), (LC4), or (LC5) preferably contains at least one compound selected from the compound group represented by Formula (LC3-1), (LC4-1), or (LC5-1).

[Chem. 40]

(LC3-1)

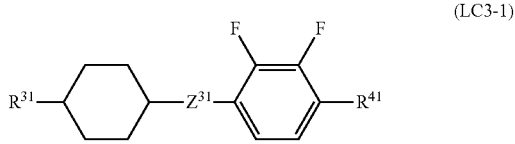

(LC4-1)

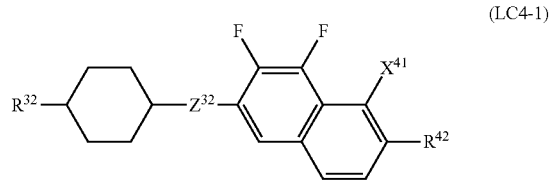

(LC5-1)

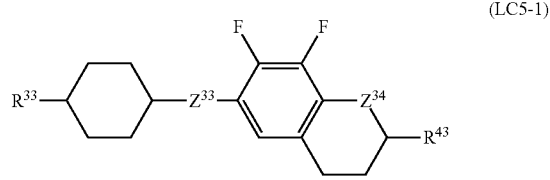

In the formulas, $R^{31}$ to $R^{33}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^{41}$ to $R^{43}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $Z^{31}$ to $Z^{33}$ each represent a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—, $X^{41}$ represents a hydrogen atom or a fluorine atom, and $Z^{34}$ represents —CH$_2$— or an oxygen atom.

In Formulas (LC3-1) to (LC5-1), $R^{32}$ to $R^{33}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, still more preferably an alkyl group having 3 to 5 carbon atoms or an alkenyl group having 2 carbon atoms, and particularly preferably an alkyl group having 3 carbon atoms.

$R^{41}$ to $R^{43}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably an alkyl group having 1 to 5 carbon atoms, an alkoxy group having 1 to 5 carbon atom, an alkenyl group having 4 to 8 carbon atoms, or an alkenyloxy group having 3 to 8 carbon atoms, more preferably an alkyl group having 1 to 3 carbon atoms or an alkoxy group having 1 to 3 carbon atoms, still more preferably an alkyl group having 3 carbon atoms or an alkoxy group having 2 carbon atoms, and particularly preferably an alkoxy group having 2 carbon atoms.

$Z^{31}$ to $Z^{33}$ each represent, a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—, and preferably represent a single bond, —CH$_2$CH$_2$—, —COO—, —OCH$_2$—, —CH$_2$O—, —OCF$_2$—, or —CF$_2$O—, and more preferably represent a single bond or —CH$_2$O—.

In the liquid crystal composition, the compound selected from the compound group represented by Formula (LC3-1), (LC4-1), or (LC5-1) is preferably contained within 5% to 50% by mass, preferably within 5% to 40% by mass, more preferably 5% to 30% by mass, more preferably 8% to 27% by mass, and still more preferably 10% to 25% by mass.

As the compound represented by Formula (LC3-1), specifically, compounds represented by each of the following Formulas (LC3-11) to (LC3-15) are preferable,

[Chem. 41]

(LC3-11)
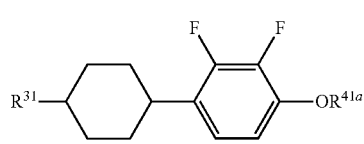

(LC3-12)
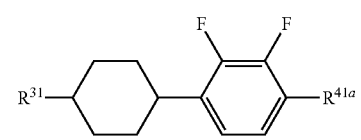

(LC3-13)
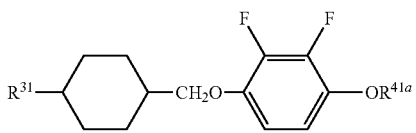

-continued (LC3-14)
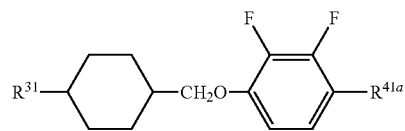

(LC3-15)
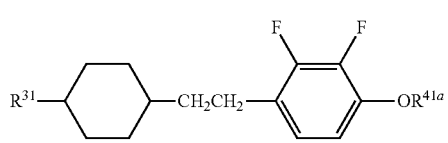

In the formula, $R^{31}$ represents an alkyl group having 1 to 5 carbon atoms or an alkenyl group having 2 to 5 carbon atoms, and $R^{41a}$ represents an alkyl group having 1 to 5 carbon atoms.

As the compound represented by Formula (LC4-1), specifically, compounds represented by each of the following Formulas (LC4-11) to (LC4-14) are preferable.

[Chem. 42]

(LC4-11)
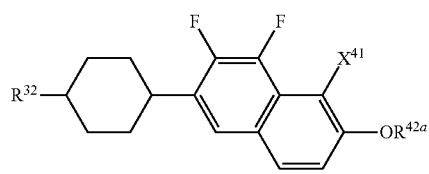

(LC4-12)
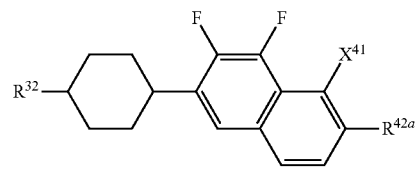

(LC4-13)
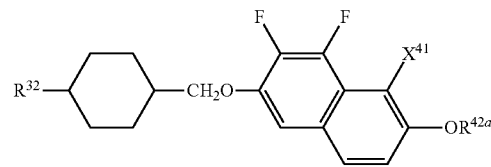

(LC4-14)
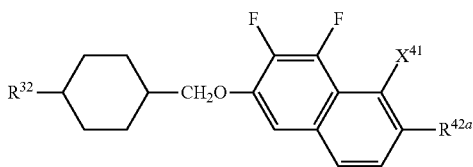

In the formulas, $R^{32}$ represents an alkyl group having 1 to 5 carbon atoms or an alkenyl group having 2 to 5 carbon atoms, $R^{42a}$ represents an alkyl group having 1 to 5 carbon atoms, and $X^{41}$ represents a hydrogen atom or a fluorine atom.)

As the compound represented by Formula (LC5-1), specifically, compounds represented by each of the following Formulas (LC5-11) to (LC5-14) are preferable.

[Chem. 43]

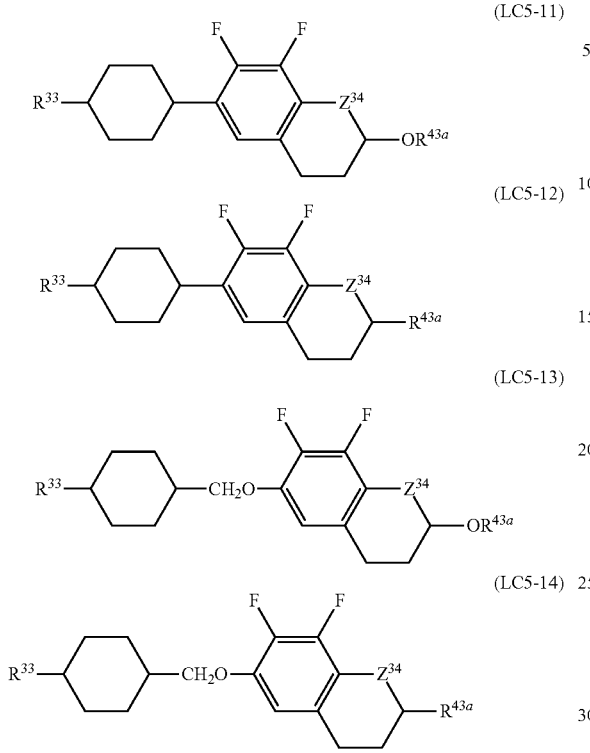

(LC5-11)
(LC5-12)
(LC5-13)
(LC5-14)

[Chem. 44]

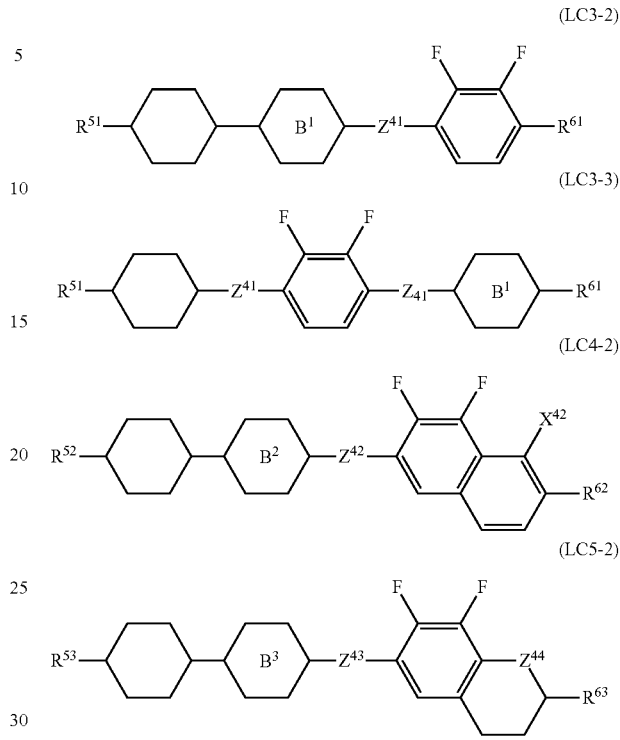

(LC3-2)
(LC3-3)
(LC4-2)
(LC5-2)

In the formulas, $R^{33}$ represents an alkyl group having 1 to 5 carbon atoms or an alkenyl group having 2 to 5 carbon atoms, $R^{43a}$ represents an alkyl group having 1 to 5 carbon atoms, and $Z^{34}$ represents —$CH_2$— or an oxygen atom.)

In Formulas (LC3-11), (LC3-13), (LC4-11), (LC4-13), (LC5-11), and (LC5-13), $R^{31}$ to $R^{33}$ are preferably the same embodiment as those in Formulas (LC3-1) to (LC5-1). $R^{41a}$ to $R^{41c}$ each preferably represent an alkyl group having 1 to 3 carbon atoms, more preferably an alkyl group having 1 or 2 carbon atoms, and particularly preferably an alkyl group having 2 carbon atoms.

In Formulas (LC3-12), (LC3-14), (LC4-12), (LC4-14), (LC5-12), and (LC5-14), $R^{31}$ to $R^{33}$ are preferably the same embodiment as those in Formulas (LC3-1) to (LC5-1). $R^{41a}$ to $R^{41c}$ each preferably represent an alkyl group having 1 to 3 carbon atoms, more preferably an alkyl group having 1 or 3 carbon atoms, and particularly preferably an alkyl group having 3 carbon atoms.

Among Formulas (LC3-11) to (LC5-14), to increase the absolute value of dielectric anisotropy, Formula (LC3-11), (LC4-11), (LC5-11), (LC3-13), (LC4-13), or (LC5-13) is preferable, and Formula (LC3-11), (LC4-11), or (LC5-11) is more preferable.

The liquid crystal layer in the LCD device of the present invention preferably contains one type or two or more types of compounds represented by each of Formulas (LC3-11) to (LC5-14), more preferably contains one type or two types, and particularly preferably contains one type or two types of compounds represented by Formula (LC3-1).

In addition, the compound represented by Formula (LC3), (LC4), or (LC5) preferably contains at least one compound selected from the compound group represented by Formula (LC3-2), (LC4-2), or (LC5-2).

In the formula, $R^{51}$ to $R^{53}$ each represent, an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^{61}$ to $R^{63}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $B^1$ to $B^3$ each may be substituted with a fluorine atom and represent a 1,4-phenylene group or a trans-1,4-cyclohexylene group, $Z^{41}$ to $Z^{43}$ each represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—, $X^{42}$ represents a hydrogen atom or a fluorine atom, and $Z^{44}$ represents —$CH_2$— or an oxygen atom.

In Formulas (LC3-2), (LC4-2), and (LC5-2), $R^{51}$ to $R^{53}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, still more preferably an alkyl group having 3 to 5 carbon atoms or an alkenyl group having 2 carbon atoms, and particularly preferably an alkyl group having 3 carbon atoms.

$R^{61}$ to $R^{63}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably an alkyl group having 1 to 5 carbon atoms, an alkoxy group having 1 to 5 carbon atoms, an alkenyl group having 4 to 8 carbon atoms, or an alkenyloxy group having 3 to 8 carbon atoms, more preferably an alkyl group having 1 to 3 carbon atoms or an alkoxy group having 1 to 3 carbon atoms, still more preferably an alkyl group having 3 carbon atoms or an alkoxy group having 2 carbon atoms, and particularly preferably an alkoxy group having 2 carbon atoms.

$B^{31}$ to $B^{33}$ each may be substituted with a fluorine atom and represent a 1,4-phenylene group or a trans-1,4-cyclohexylene group, and preferably represent an unsubstituted 1,4-phenylene group or a trans-1,4-cyclohexylene group, and more preferably a trans-1,4-cyclohexylene group.

$Z^{41}$ to $Z^{43}$ each represent, a single bond, —CH═CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—, and preferably represent a single bond, —CH$_2$CH$_2$—, —COO—, —OCH$_2$—, —CH$_2$O—, —OCF$_2$—, or —CF$_2$O—, and more preferably represent a single bond or —CH$_2$O—.

The compound represented by Formula (LC3-2), (LC3-3), (LC4-2), or (LC5-2) is preferably contained within 10% to 60% by mass, more preferably within 20% to 50% by mass, more preferably 25% to 45% by mass, more preferably 28% to 42% by mass, and still more preferably 30% to 40% by mass in the liquid crystal composition.

As the compound represented by Formula (LC3-2), specifically, compounds represented by each of the following Formulas (LC3-21) to (LC3-29) are preferable.

In addition, as the compound represented by Formula (LC3-3), compounds represented by each of the following Formulas (LC3-31) to (LC3-33) are preferable.

[Chem. 45]

(LC3-21)
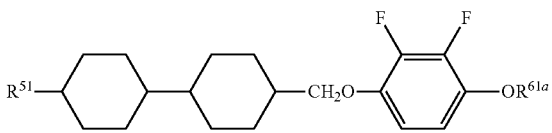

(LC3-22)
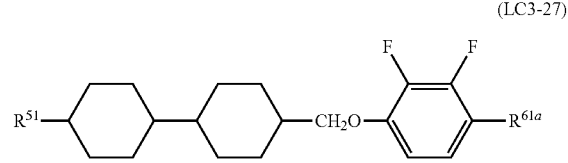

(LC3-23)
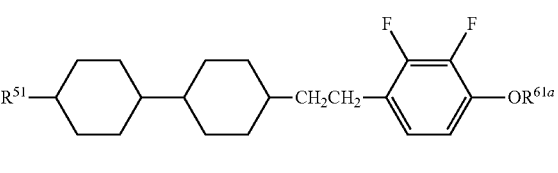

(LC3-24)
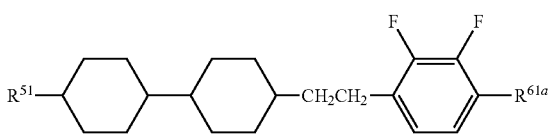

(LC3-25)
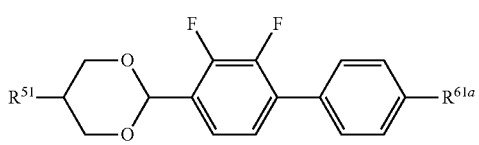

(LC3-26)
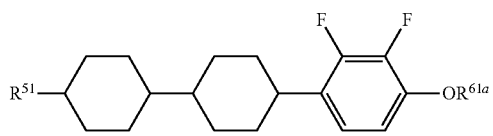

(LC3-27)
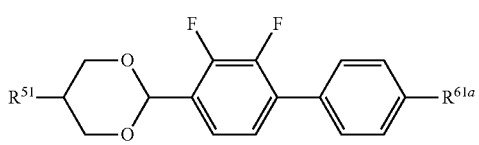

(LC3-28)
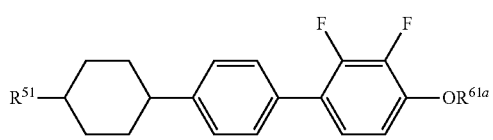

(LC3-29)
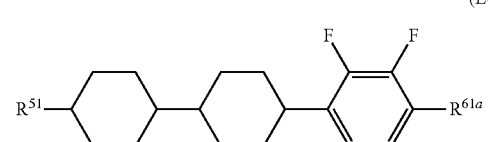

(LC3-31)
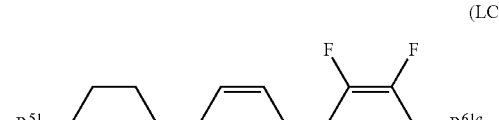

(LC3-32)
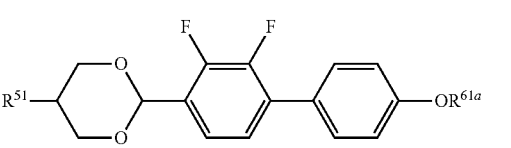

(LC3-33)
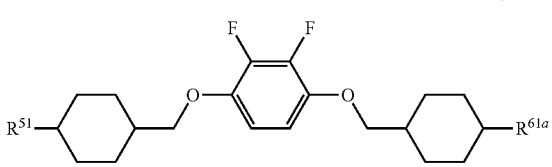

In the formula, $R^{51}$ represents an alkyl group having 1 to 5 carbon atoms or an alkenyl group having 2 to 5 carbon atoms, $R^{61a}$ represents an alkyl group having 1 to 5 carbon atoms, and $R^{51}$ and $R^{61a}$ are preferably the same embodiment as $R^{51}$ and $R^{61}$ in Formula (LC3-2).

As the compound represented by Formula (LC4-2), specifically, compounds represented by each of the following Formulas (LC4-21) to (LC4-26) are preferable.

[Chem. 46]

(LC4-21)
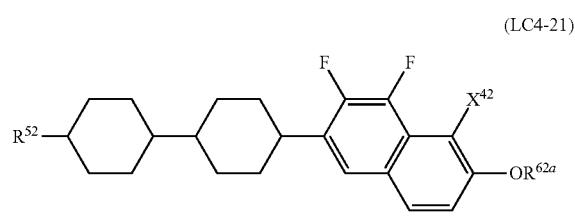

(LC4-22)
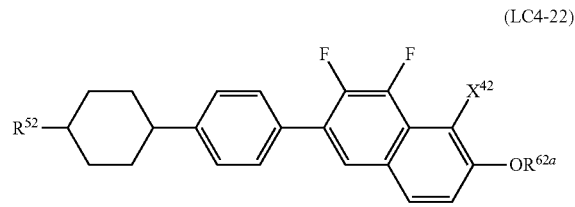

(LC4-23)
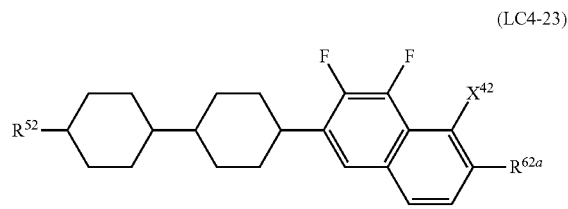

(LC4-24)
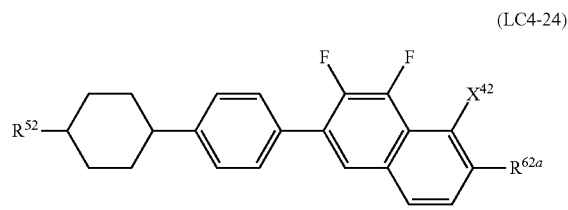

(LC4-25)
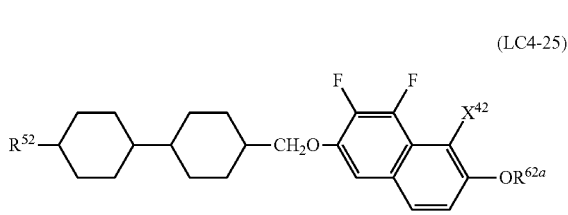

(LC4-26)
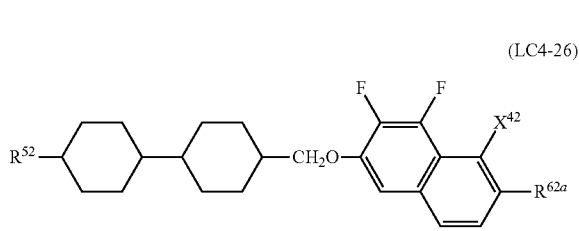

In the formulas, $R^{52}$ represents an alkyl group having 1 to 5 carbon atoms or an alkenyl group having 2 to 5 carbon atoms, $R^{62}a$ represents an alkyl group having 1 to 5 carbon atoms, and $X^{42}$ represents a hydrogen atom or a fluorine atom, and $R^{52}$ and $R^{62}a$ are preferably the same embodiment as $R^{52}$ and $R^{62}$ in Formula (LC4-2).

As the compound represented by Formula (LC5-2), specifically, compounds represented by each of the following Formulas (LC5-21) to (LC5-26) are preferable.

[Chem. 47]

(LC5-21)
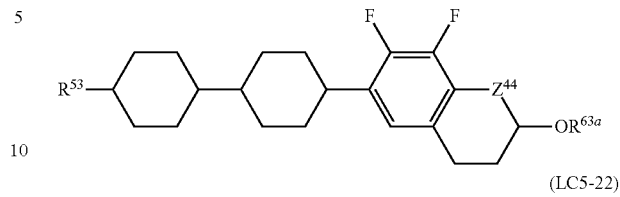

(LC5-22)
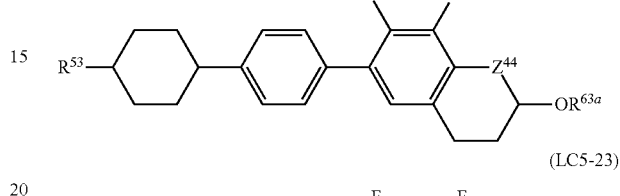

(LC5-23)
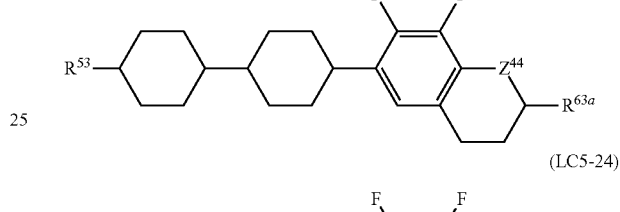

(LC5-24)
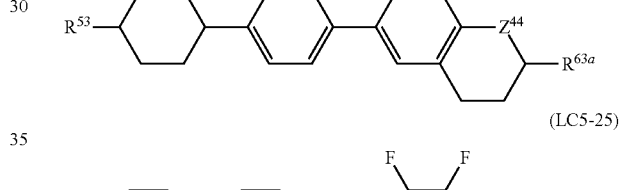

(LC5-25)
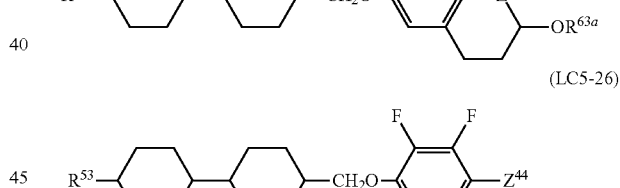

(LC5-26)

In the formulas, $R^{53}$ represents an alkyl group having 1 to 5 carbon atoms or an alkenyl group having 2 to 5 carbon atoms, $R^{63a}$ represents an alkyl group having 1 to 5 carbon atoms, and $W^2$ represents —$CH_2$— or an oxygen atom, and $R^{53}$ and $R^{63a}$ are preferably the same embodiment as $R^{53}$ and $R^{63}$ in Formula (LC5-2).

In Formulas (LC3-21), (LC3-22), (LC3-25), (LC4-21), (LC4-22), (LC4-25), (LC5-21), (LC5-22), and (LC5-25), $R^{51}$ to $R^{53}$ are preferably the same embodiment as those in Formulas (LC3-2), (LC4-2), and (LC5-2). $R^{61a}$ to $R^{63a}$ each preferably represent an alkyl group having 1 to 3 carbon atoms, more preferably an alkyl group having 1 or 2 carbon atoms, and particularly preferably an alkyl group having 2 carbon atoms.

In Formulas (LC3-23), (LC3-24), (LC3-26), (LC4-23), (LC4-24), (LC4-26), (LC5-23), (LC5-24), and (LC5-26), $R^{51}$ to $R^{53}$ are preferably the same embodiment as those in Formulas (LC3-2), (LC4-2), and (LC5-2). $R^{61a}$ to $R^{63a}$ each preferably represent an alkyl group having 1 to 3 carbon atoms, more preferably an alkyl group having 1 or 3 carbon atoms, and particularly preferably an alkyl group having 3 carbon atoms.

Among Formulas (LC3-21) to (LCS-26), to increase the absolute value of dielectric anisotropy, Formula (LC3-21), (LC3-22), (LC3-25), (LC4-21), (LC4-22), (LC4-25), (LC5-21), (LC5-22), or (LC5-25) is preferable.

One type or two or more types of compounds represented by Formula (LC3-2), (LC4-2), or (LC5-2) can be contained, and at least one or more types of compounds in which $B^1$ to $B^3$ each represent a 1,4-phenylene group and compounds in which $B^1$ to $B^3$ each represent a trans-1,4-cyclohexylene group are preferably contained, respectively.

In addition, the compound represented by Formula (LC3) is preferably one type or two or more types of compounds selected from the compound group represented by the following Formula (LC3-a) or (LC3-b).

[Chem. 48]

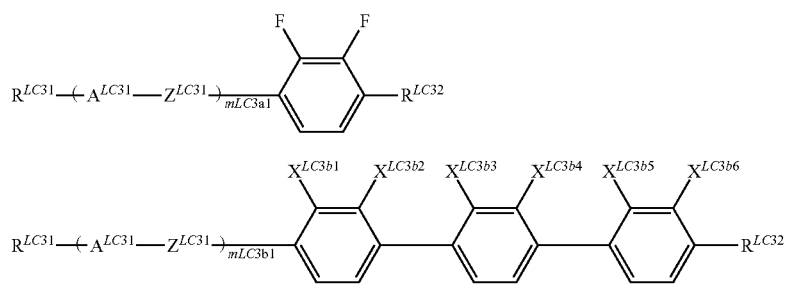

(LC3-a)

(LC3-b)

In the formulas, $R^{LC31}$, $R^{LC32}$, $A^{LC31}$, and $Z^{LC31}$ each independently have the same meaning as $R^{LC31}$, $R^{LC32}$, $A^{LC31}$, and $Z^{LC31}$ in Formula (LC3), $X^{LC3b1}$ to $X^{LC3b6}$ each represent a hydrogen atom or a fluorine atom, in the case of at least one combination of $X^{LC3b1}$ and $X^{LC3b2}$ or $X^{LC3b3}$ and $X^{LC3b4}$, these represent fluorine atoms, $m^{LC3a1}$ is 1, 2, or 3, $m^{LC3b1}$ represents 0 or 1, and in a case where a plurality of $A^{LC31}$'s and $Z^{LC31}$'s are present, these may be the same as or different from each other.

$R^{LC31}$ and $R^{LC32}$ each independently preferably represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$A^{LC31}$ preferably represents a 1,4-phenylene group, a trans-1,4-cyclohexylene group, a tetrahydropyran-2,5-diyl group, or a 1,3-dioxane-2,5-diyl group, more preferably a 1,4-phenylene group, or a trans-1,4-cyclohexylene group.

$Z^{LC31}$ preferably represents a single bond, —$CH_2O$—, —COO—, —OCO—, or —$CH_2CH_2$—, and more preferably represents a single bond.

Formula (LC3-a) preferably represents the following Formula (LC3-a1).

[Chem. 49]

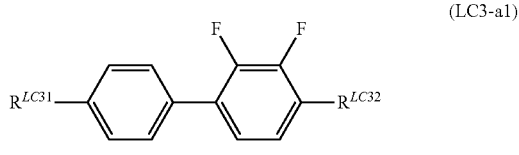

(LC3-a1)

In the formula, $R^{LC31}$ and $R^{LC32}$ each independently represent the same meaning as $R^{LC31}$ and $R^{LC32}$ in Formula (LC3).

$R^{LC31}$ and $R^{LC32}$ each independently preferably represent an alkyl group having 1 to 7 carbon atoms, an alkoxy group having 1 to 7 carbon atoms, or an alkenyl group having 2 to 7 carbon atoms, and it is more preferable that $R^{LC31}$ represents an alkyl group having 1 to 7 carbon atoms and $R^{LC32}$ represents an alkoxy group having 1 to 7 carbon atoms.

Formula (LC3-b) preferably represents any one of the following Formulas (LC3-b1) to (LC3-b12), more preferably Formula (LC3-b1), (LC3-b6), (LC3-b8), or (LC3-b11), still more preferably Formula (LC3-b1) or (LC3-b6), and most preferably Formula (LC3-b1).

[Chem. 50]

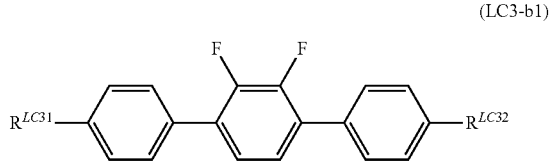

(LC3-b1)

(LC3-b2)

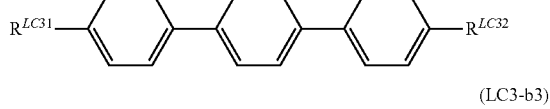

(LC3-b3)

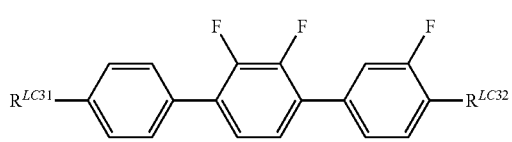

-continued (LC3-b4)
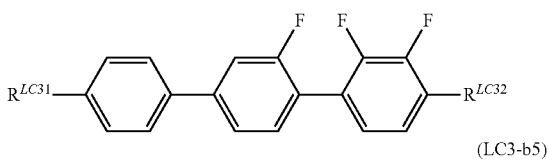

(LC3-b5)
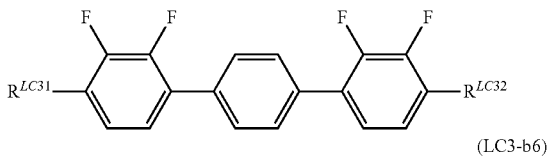

(LC3-b6)
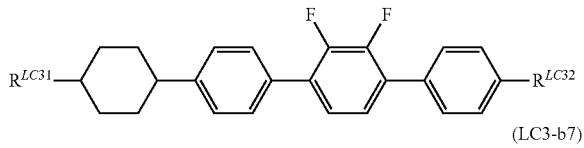

(LC3-b7)
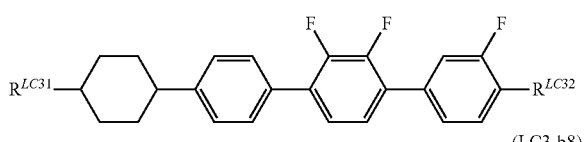

(LC3-b8)
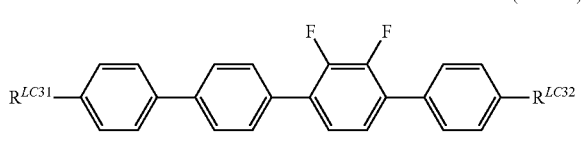

(LC3-b9)
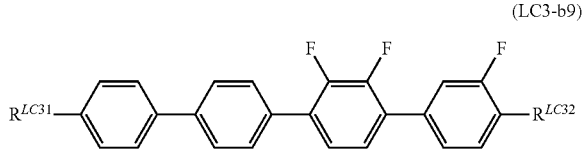

(LC3-b10)
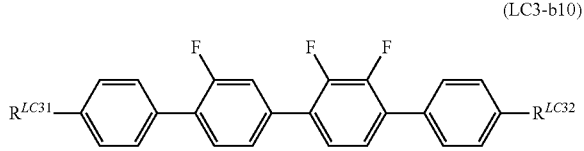

(LC3-b11)
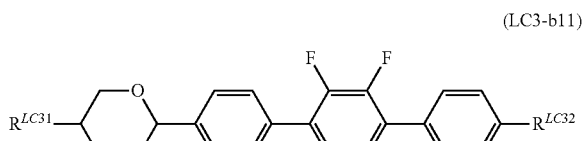

(LC3-b12)
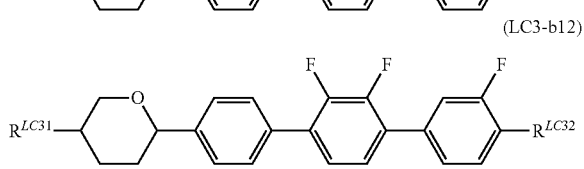

In the formulas, $R^{LC31}$ and $R^{LC32}$ each independently represent the same meaning as $R^{LC31}$ and $R^{LC32}$ in Formula (LC3).

$R^{LC31}$ and $R^{LC32}$ each independently preferably represent an alkyl group having 1 to 7 carbon atoms, an alkoxy group having 1 to 7 carbon atoms, or an alkenyl group having 2 to 7 carbon atoms, and it is more preferable that $R^{LC31}$ represents an alkyl group having 2 or 3 carbon atoms and $R^{LC32}$ represents an alkyl group having 2 carbon atoms.

In addition, the compound represented by Formula (LC4) is preferably a compound represented by any one of the following Formulas (LC4-a) to (LC4-c), and the compound represented by Formula (LC5) is preferably a compound represented by any one of the following Formulas (LC5-a) to (LC5-c).

[Chem. 51]

(LC4-a)
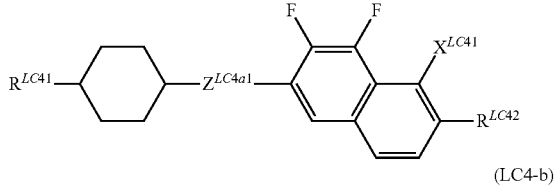

(LC4-b)
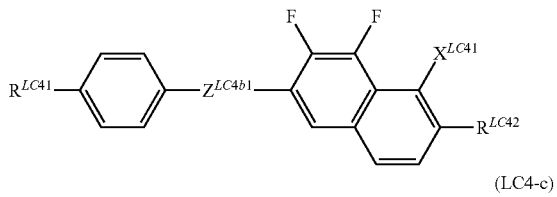

(LC4-c)
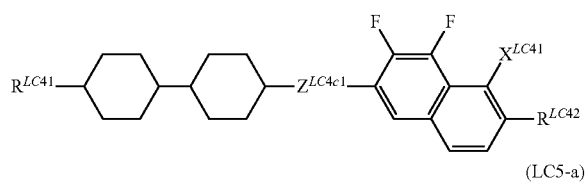

(LC5-a)
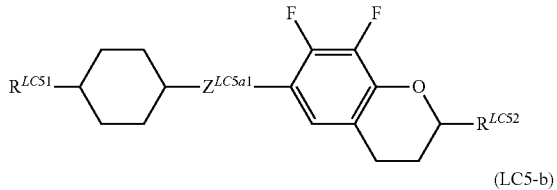

(LC5-b)
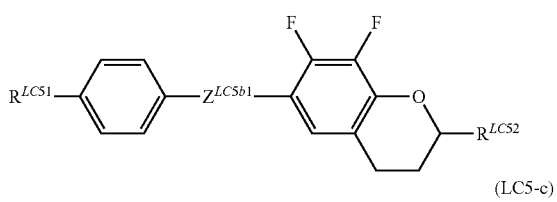

(LC5-c)
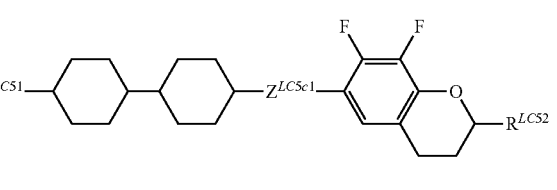

In the formula, $R^{LC41}$, $R^{LC42}$, and $X^{LC41}$ each independently represent the same meaning as $R^{LC41}$, $R^{LC42}$, and $X^{LC41}$ in Formula (LC4), $R^{LC51}$ and $R^{LC52}$ each independently represent the same meaning as $R^{LC51}$ and $R^{LC52}$ in Formula (LC5), and $Z^{LC4a1}$, $Z^{LC4b1}$, $Z^{LC4c1}$, $Z^{LC5a1}$, $Z^{LC5b1}$, and $Z^{LC5c1}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—.)

$R^{LC41}$, $R^{LC42}$, $R^{LC51}$, and $R^{LC52}$ each independently preferably represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$Z^{LC4a1}$ to $Z^{LC5c1}$ each independently preferably represent a single bond, —CH$_2$O—, —COO—, —OCO—, or —CH$_2$CH$_2$—, and more preferably represent a single bond.

The compound represented by Formula (LC) is also preferably one type or two or more types of compounds selected from compounds represented by the following Formula (LC6), with the proviso that the compounds represented by each of Formulas (LC1) to (LC5) are excluded.

[Chem. 52]

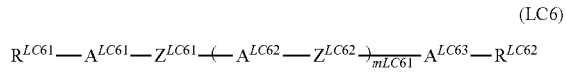
(LC6)

In Formula (LC6), $R^{LC61}$ and $R^{LC62}$ each independently represent an alkyl group having 1 to 15 carbon atoms. One or two or more CH$_2$ groups in the alkyl group may be substituted with —O—, —CH=CH—, —CO—, —OCO—, —COO—, or —C≡C— such that oxygen atoms are not directly adjacent, and one or two or more hydrogen atoms in the alkyl group may be substituted with halogen atoms. In the compound represented by Formula (LC6), $R^{LC61}$ to $R^{LC62}$ each independently preferably represent an alkyl group having 1 to 7 carbon atoms, an alkoxy group having 1 to 7 carbon atoms, or an alkenyl group having 2 to 7 carbon atoms, and the alkenyl group most preferably represents any one of the following structures.

[Chem. 53]

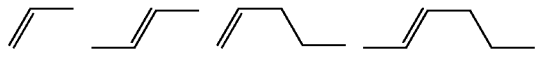

(In the formulas, the right terminal is bonded to the ring structure.)

In Formula (LC6), $A^{LC61}$ to $A^{LC63}$ each independently represent any one of the following structures. In the structures, one or two or more CH$_2$CH$_2$ groups in a cyclohexylene group may be substituted with —CH=CH—'s, —CF$_2$O—'s, or —OCF$_2$—'s, and one or two or sore CH groups in a 1,4-phenylene group may be substituted with nitrogen atoms.

[Chem. 54]

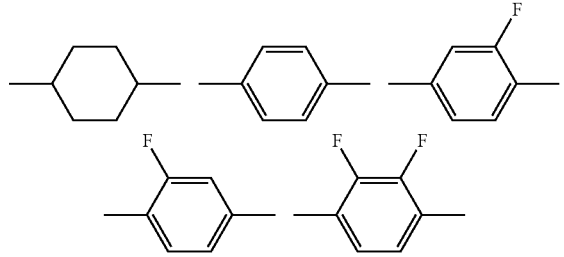

In the compound represented by Formula (LC6), $A^{LC61}$ to $A^{LC63}$ each independently preferably represent any one of the following structures.

[Chem. 55]

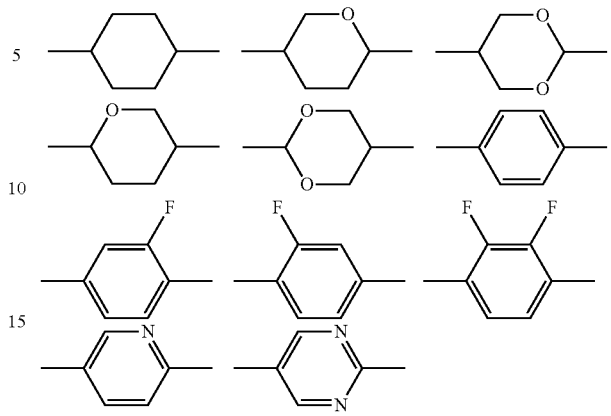

In Formula (LC6), $Z^{LC61}$ and $Z^{LC62}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, and mLC61 represents 0 to 3. In the compounds represented by Formula (LC6), $Z^{LC61}$ and $Z^{LC62}$ each independently preferably represent a single bond, —CH$_2$CH$_2$—, —COO—, —OCH$_2$—, —CH$_2$O—, —OCF$_2$—, or —CF$_2$O—.

The compound represented by Formula (LC6) is preferably one type or two or more types of compounds selected from the group consisting of compounds represented by each of the following Formulas (LC6-a) to (LC6-v). In Formulas (LC6-a1) to (LC6-p1), $R^{LC61}$ and $R^{LC62}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

[Chem. 56]

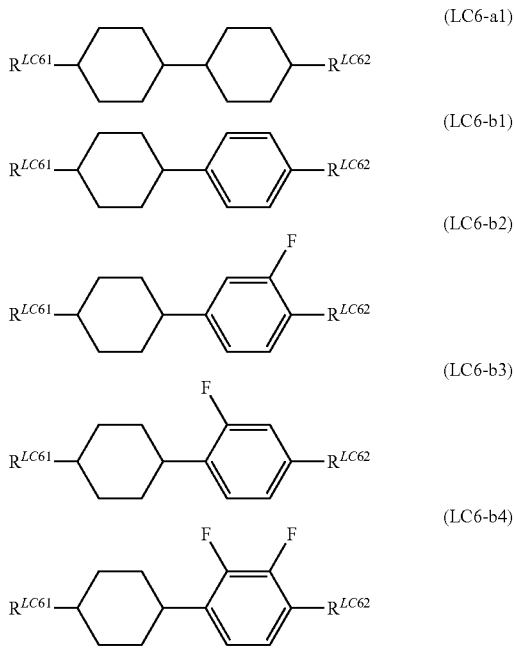

(LC6-c1) 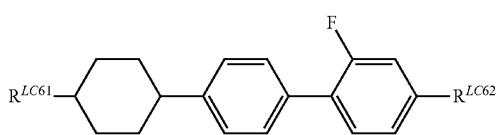
(LC6-c2) 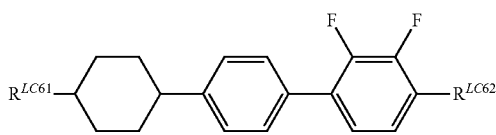
(LC6-c3) 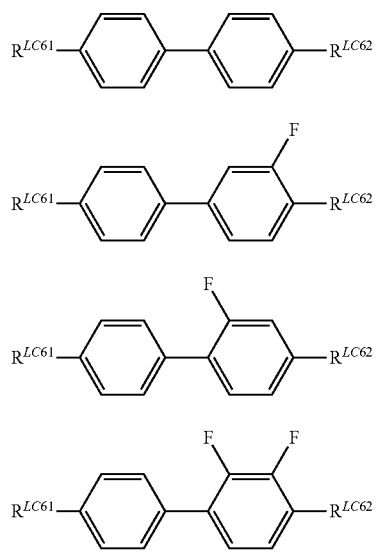
(LC6-c4)
[Chem. 57]
(LC6-d1) 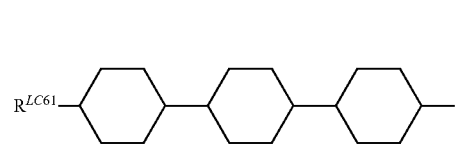
(LC6-e1) 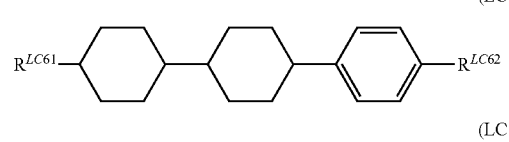
(LC6-e2) 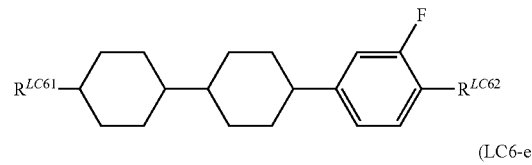
(LC6-e3) 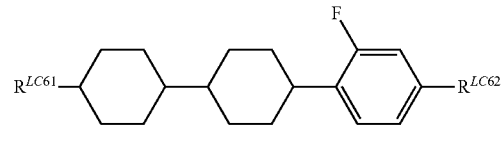
(LC6-e4) 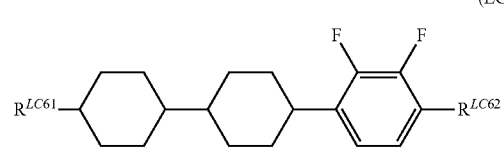
(LC6-f1) 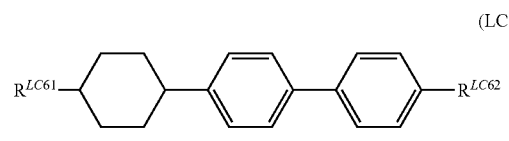
(LC6-f2) 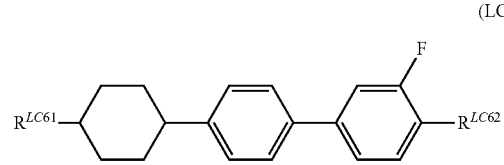
(LC6-f3) 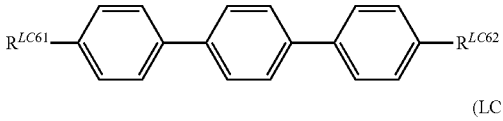
(LC6-f4) 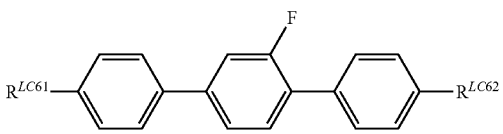
[Chem. 58]
(LC6-g1) 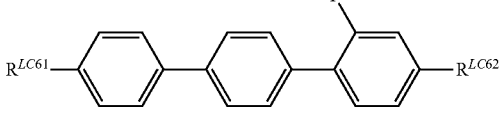
(LC6-g2) 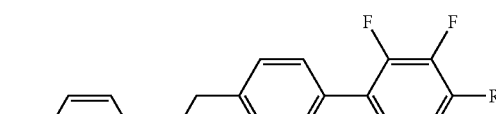
(LC6-g3) 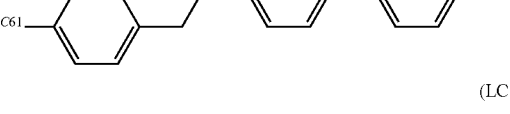
(LC6-h1) 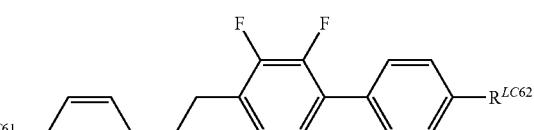
(LC6-h2) 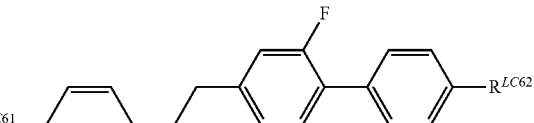
(LC6-h3) 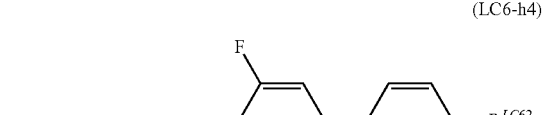
(LC6-h4) 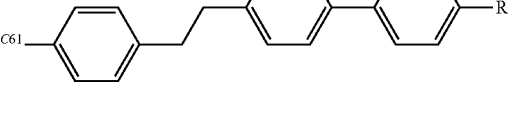

(LC6-h5)
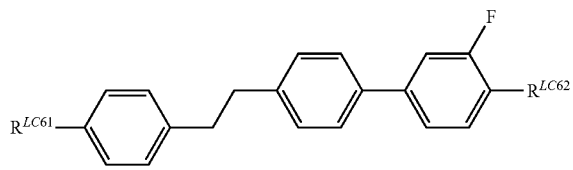
(LC6-h6)
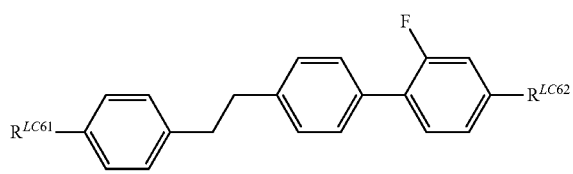
(LC6-i1)
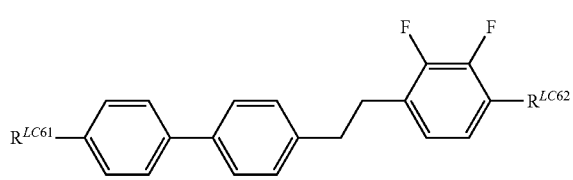
(LC6-i2)
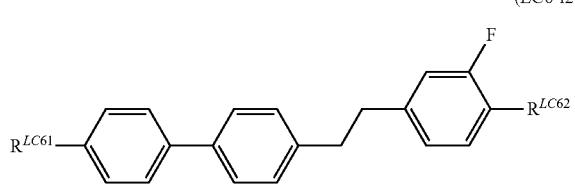
(LC6-i3)
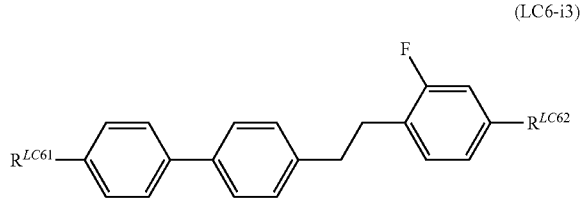
[Chem. 59]
(LC6-j1)
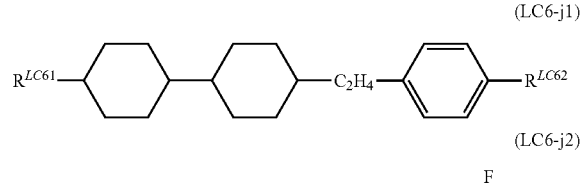
(LC6-j2)
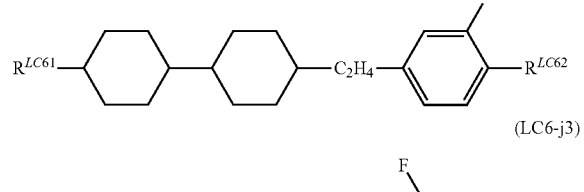
(LC6-j3)
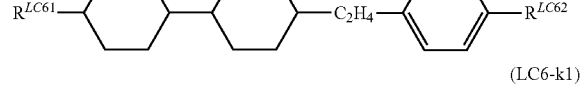
(LC6-k1)
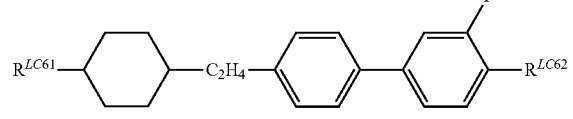
(LC6-k2)
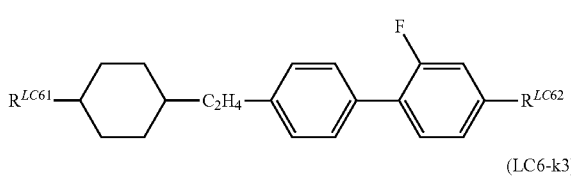
(LC6-k3)
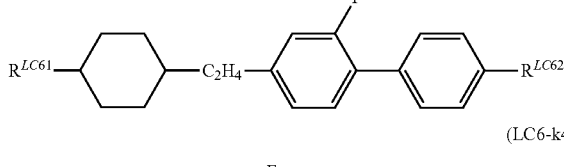
(LC6-k4)
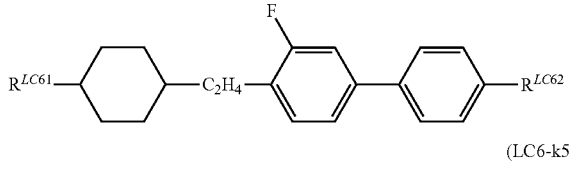
(LC6-k5)
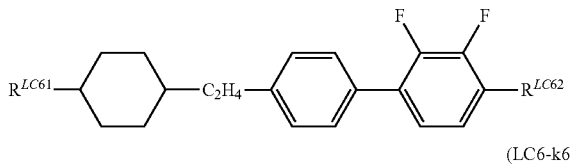
(LC6-k6)
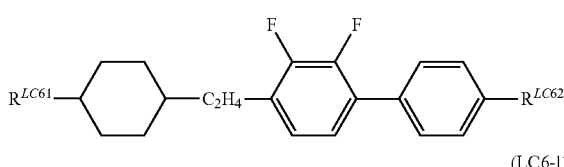
(LC6-l1)
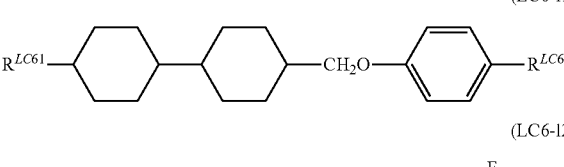
(LC6-l2)
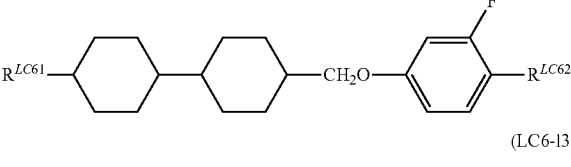
(LC6-l3)
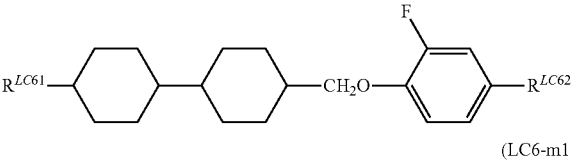
(LC6-m1)
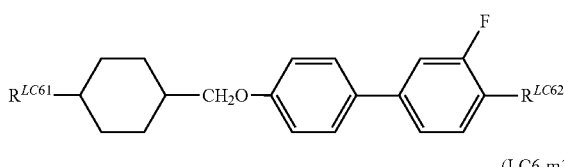
(LC6-m2)
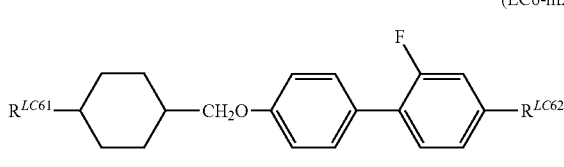

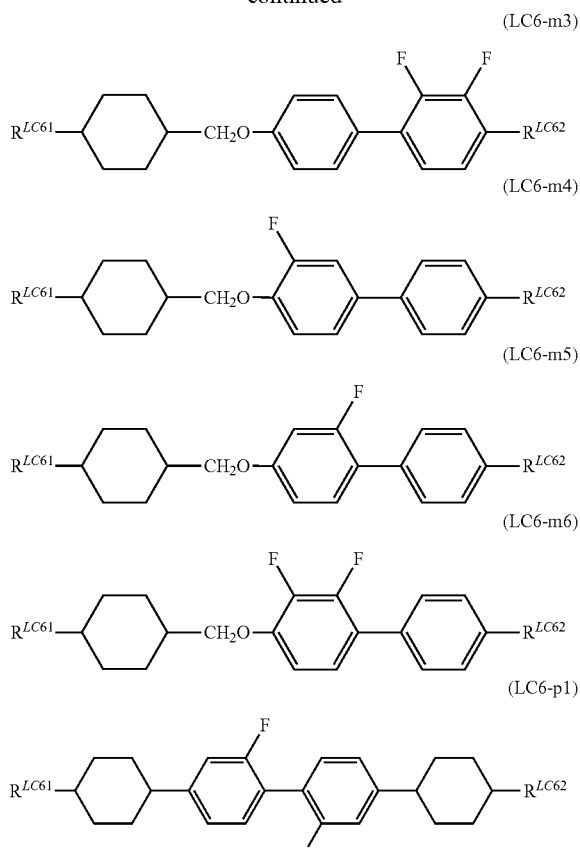

(LC6-m3)
(LC6-m4)
(LC6-m5)
(LC6-m6)
(LC6-p1)

[Polymerizable Compound]

Examples of the polymerizable compound according to the present invention include a monofunctional polymerizable compound having one reactive group and a polyfunctional polymerizable compound having two or more reactive groups such as a difunctional compound or a trifunctional compound. The polymerizable compound having a reactive group may include or may not include a mesogenic site.

In the polymerizable compound having a reactive group, the reactive group is preferably a substituent having polymerizability by light. In particular, when the vertically aligned film is produced by thermal polymerization, since the reaction of the polymerizable compound having a reactive group can be prevented at the time of thermal polymerization of the vertically aligned film material, the reactive group is particularly preferably a substituent having polymerizability by light.

The polymerizable compound according to the present invention is preferably a compound represented by the following Formula (P).

[Chem. 60]

$(R^{p1}-Sp^{p1})_{mp1}-(M^{p1})_{mp2}-(L^{p1}-M^{p2})_{mp3}-(L^{p2}-M^{p3})_{mp4}-(Z^{p1})_{mp5}$ (P)

In the Formula (P), $Z^{p1}$ represents a fluorine atom, a cyano group, a hydrogen atom, an alkyl group having 1 to 15 carbon atoms in which a hydrogen atom may be substituted with a halogen atom, an alkoxy group having 1 to 15 carbon atoms in which a hydrogen atom may be substituted with a halogen atom, an alkenyl group having 1 to 15 carbon atoms in which a hydrogen atom may be substituted with a halogen atom, an alkenyloxy group having 1 to 15 carbon atoms in which a hydrogen atom may be substituted with a halogen atom or -$Sp^{p2}$-$R^{p2}$, $R^{p1}$ and $R^{p2}$ each independently represent any one of the following Formulas (R-I) to (R-IX).

[Chem. 61]

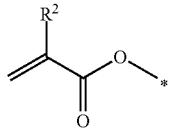

(R-I)

(R-II)

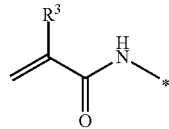

(R-III)

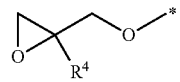

(R-IV)

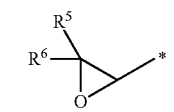

(R-V)

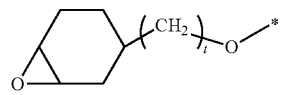

(R-VI)

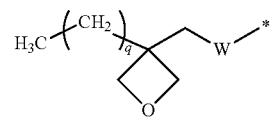

(R-VII)

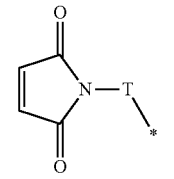

(R-VIII)

HS—*  (R-IX)

In Formulas (R-I) to (R-IX), $R^2$ to $R^6$ are each independently a hydrogen atom, an alkyl group having 1 to 5 carbon atoms, or a halogenated alkyl group having 1 to 5 carbon atoms, W is a single bond, —O—, or a methylene group, T is a single bond or —COO—, and p, t, and q are each independently 0, 1, or 2, $Sp^{p1}$ and $Sp^{p2}$ each represent a spacer group, $Sp^{p1}$ and $Sp^{p2}$ each independently represent a single bond, an alkylene group having 1 to 12 carbon atoms, or —O—(CH$_2$)$_s$— (in the formula, s represents an integer of 1 to 11, and an oxygen atom is bonded to an aromatic ring.), $L^{p1}$ and $L^{p2}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —(CH$_2$)$_z$—C(=O)—O—, —(CH$_2$)z-O—(C=O)—, —O—(C=O)—(CH$_2$)z-, —(C=O)—O—(CH$_2$)z-, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formula, R$^a$'s each independently represent a hydrogen atom or an alkyl group having 1 to 4 carbon atoms, and in the formula, z represents an integer of 1 to 4), M$^{p2}$ represents a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and M$^{p2}$ may be unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —R$^{p1}$, M$^{p1}$ represents any one of the following Formula (i-11) to (ix-11).

In the formulas, Sp$^{p1}$ is bonded at *, L$^{p1}$ or L$^{p2}$ is bonded at **.), M$^{p3}$ represents any one of the following Formula (i-13) to (ix-13).

[Chem. 62]

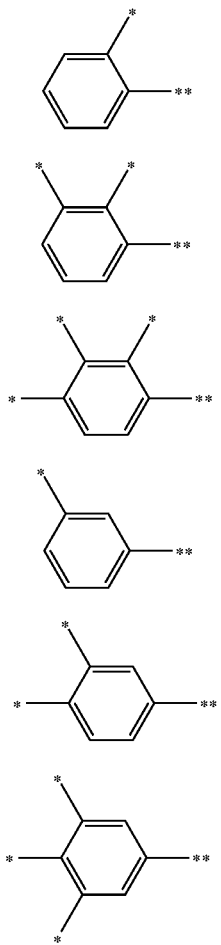

[Chem. 63]

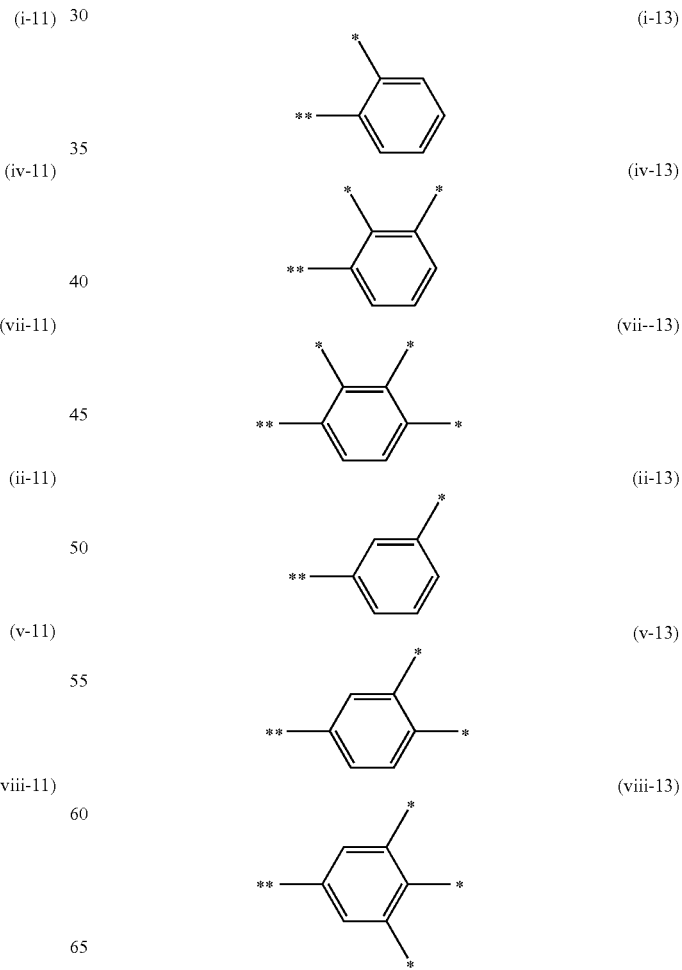

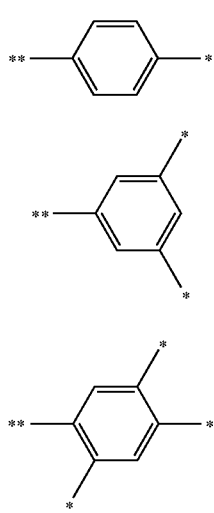

(iii-13)

(vi-13)

(ix-13)

In the formulas, $Z^{p1}$ is bonded at *, $L^{p2}$ is bonded at **.

$m^{p2}$ to $m^{p4}$ each independently represent 0, 1, 2, or 3, $m^{p1}$ to $m^{p5}$ each independently represent 1, 2, or 3, in a case where a plurality of $Z^{p1}$'s are present, these may be the same as or different from each other, in a case where a plurality of $R^{p1}$'s are present, these may be the same as or different from each other, in a case where a plurality of $R^{p2}$'s are present, these may be the same as or different from each other, in a case where a plurality of $Sp^{p1}$'s are present, these may be the same as or different from each other, in a case where a plurality of $Sp^{p2}$'s are present, these may be the same as or different from each other, in a case where a plurality of $L^{p1}$'s are present, these may be the same as or different from each other, and in a case where a plurality of $M^{p2}$'s are present, these may be the same as or different from each other.) In addition, one type or two or more types of polymerizable compounds are preferably contained.

In Formula (P) according to the present invention, $Z^{p1}$ is preferably -$Sp^{p2}$-$R^{p2}$, and $R^{11}$ and $R^{12}$ are each independently preferably any one of Formulas (R-1) to (R-3). In addition, in Formula (P), $m^{p1}+m^{p5}$ is preferably 2 or greater.

In addition, in Formula (P), $L^{p1}$ is a single bond, —OCH$_2$—, —CH$_2$O—, —CO—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CH=CH—, —CF$_2$—, —CF$_2$O—, —(CH$_2$)$_z$—C(=O)—O—, —(CH$_2$)z-O—(C=O)—, —O—(C=O)—(CH$_2$)z-, —CH=CH—COO—, —COO—CH=CH—, —OCOCH=CH—, —(C=O)—O—(CH$_2$)z-, —OCF$_2$—, or —C≡C—, and $L^{p2}$ is —OCH$_2$CH$_2$O—, —COOC$_2$H$_4$—, —OCOC$_2$H$_4$—, —(CH$_2$)z-C(=O)—O—, —(CH$_2$)z-(C=O)—, —O—(C=O)—(CH$_2$)z-, —(C=O)—O—(CH$_2$)z-, —CH=CH—COO—, —COO—CH=CH—, —OCOCH=CH—, —C$_2$H$_4$OCO—, or —C$_2$H$_4$COO—, and z in the formula is preferably an integer of 1 to 4.

At least any one of $L^{p1}$ and $L^{p2}$ in Formula (P) is preferably at least one type selected from the group consisting of —(CH$_2$)$_z$—C(=O)—O—, —(CH$_2$)z-O—(C=O)—, —O—(C=O)—(CH$_2$)z-, and —(C=O)—O—(CH$_2$)z-. In addition, in Formula (P), $R^{p1}$ and $R^{p2}$ each independently more preferably represent any one of the following Formulas (R-1) to (R-15).

[Chem. 64]

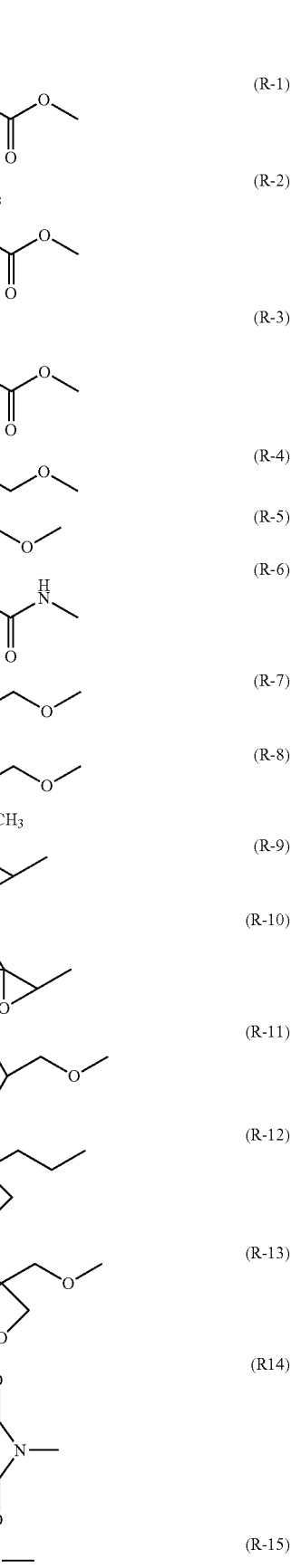

$m^{p3}$ in Formula (P) represents 0, 1, 2, or 3, in a case where $m^{p2}$ is 1, $L^{p1}$ is a single bond, and in a case where $m^{p2}$ is 2 or 3, at least one of a plurality of $L^{p1}$'s is preferably a single bond.

$m^{p3}$ in Formula (P) represents 0, 1, 2, or 3, in a case where $m^{p3}$ is 1, $M^{p2}$ is a 1,4-phenylene group, and in a case where $m^{p3}$ is 2 or 3, $M^{p2}$ adjacent to $M^{p1}$ through at least $L^{p1}$ of a plurality of $M^{p2}$'s is preferably a 1,4-phenylene group.

$m^{p3}$ in Formula (P) represents 0, 1, 2, or 3, and at least one of $M^{p2}$'s is preferably a 1,4-phenylene group which has been substituted with one or two or more fluorine atoms.

$m^{p4}$ in Formula (P) represents 0, 1, 2, or 3, and at least one of $M^{p3}$'s is preferably a 1,4-phenylene group which has been substituted with one or two or more fluorine atoms.

In addition, the spacer group ($Sp^{p1}$, $Sp^{p2}$, and $Sp^{p4}$) in Formula (P) is preferably a single bond, —OCH$_2$—, —(CH$_2$)$_2$O—, —CO—, —C$_2$H$_4$—, —COO—, —OCO—, —COOC$_2$H$_4$—, —OCOC$_2$H$_4$—, —(CH$_2$)$_z$—, —C$_2$H$_4$OCO—, —C$_2$H$_4$COO—, —CH=CH—, —CF$_2$—, —CF$_2$O—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —O—(CH$_2$)$_z$—O—, —OCF$_2$—, —CH=CH—COO—, —COO—CH=CH—, ≥OCOCH=CH—, or —C≡C—, and Z is preferably an integer of 1 to 10.

The polymerizable compound of Formula (P) according to the present invention is preferably at least one type of compound selected from the group consisting of the compounds represented by each of Formulas (P-a), (P-b), (P-c), and (P-d).

[Chem. 65]

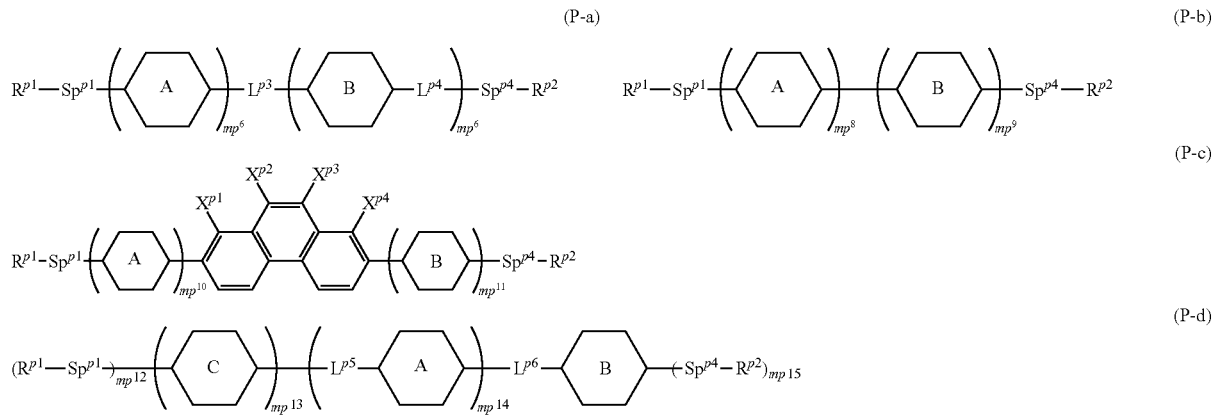

In Formulas (P-a) to (P-d), $R^{p1}$ and $R^{p2}$ each independently represent any one of the following Formulas (R-I) to (R-IX).

[Chem. 66]

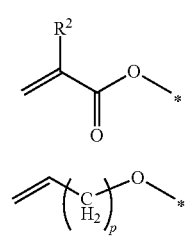

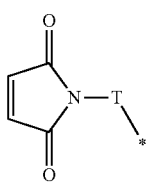

In Formulas (R-I) to (R-IX), $R^2$ to $R^6$ are each independently a hydrogen atom, an alkyl group having 1 to 5 carbon atoms, or a halogenated alkyl group having 1 to 5 carbon atoms, W is a single bond, —O—, or a methylene group, T is a single bond or —COO—, and p, t, and q are each independently 0, 1, or 2, Rings A and B each independently represent a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and are preferably unsubstituted or preferably substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —$R^{p1}$, Ring C represents any one of the following Formulas (c-i) to (c-ix).

[Chem. 67]

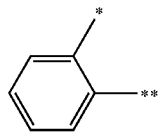
(c-i)

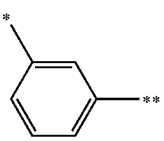
(c-ii)

(c-iii)

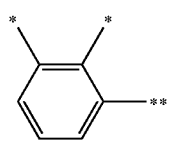
(c-iv)

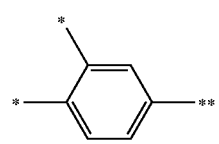
(c-v)

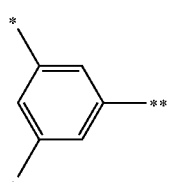
(c-vi)

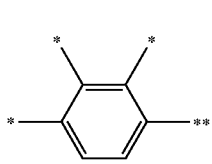
(c-vii)

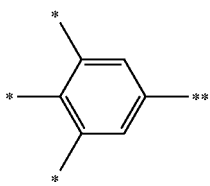
(c-viii)

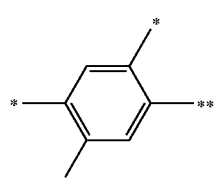
(c-ix)

In the formulas, $Sp^{p1}$ is bonded at *, $L^{p5}$ or $L^{p6}$ is bonded at **.

$Sp^{p1}$ and $Sp^{p4}$ each represent a spacer group, and $X^{p1}$ to $X^{p4}$ each independently preferably represent a hydrogen atom or a halogen atom, $L^{p4}$, $L^{p5}$, and $L^{p6}$ each independently preferably represent a single bond, —OCH$_2$—, —CH$_2$O—, —CO—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CH=CH—, —CF$_2$—, —CF$_2$O—, —(CH$_2$)$_2$—C(=O)—O—, —(CH$_2$)$_z$—O—(C=O)—, —O—(C=O)—(CH$_2$)$_z$—, —(C=O)—O—(CH$_2$)$_z$—, —O—(CH$_2$)$_z$—O—, —OCF$_2$—, —CH=CHCOO—, —COOCH=CH—, —OCOCH=CH—, or —C≡C—, and z in the formula preferably represents an integer of 1 to 4.

$L^{p3}$ is preferably —CH=CHCOO—, —COOCH=CH—, or —OCOCH=CH—.

In the compound represented by Formula (P-a), $m^{p6}$ and $m^{p7}$ each independently preferably represent 0, 1, 2, or 3. In addition, $m^{p6}+m^{p7}$ is more preferably 2 to 5.

In the compound represented by Formula (P-d), $m^{p12}$ and $m^{p15}$ each independently represent 1, 2, or 3, $m^{p13}$ preferably represents 0, 1, 2, or 3, and $m^{p14}$ preferably represents 0 or 1. In addition, $m^{p12}+m^{p15}$ is more preferably 2 to 5. In a case where a plurality of $R^{p1}$'s are present, these may be the same as or different from each other, in a case where a plurality of $R^{p1}$'s are present, these may be the same as or different from each other, in a case where a plurality of $R^{p2}$'s are present, these may be the same as or different from each other, in a case where a plurality of $Sp^{p1}$'s are present, these may be the same as or different from each other, in a case where a plurality of $Sp^{p4}$'s are present, these may be the same as or different from each other, in a case where a plurality of $L^{p4}$'s and $L^{p5}$'s are present, these may be the same as or different from each other, and in a case where a plurality of rings A to C are present, these may be the same as or different from each other.

Preferable structures of the compounds represented by Formulas (P-a) to (P-d) according to the present invention will be described below.

Preferable examples of the compound represented by Formulas (P-a) according to the present invention include polymerizable compounds represented by each of the following Formulas (P-a-1) to (P-a-31).

[Chem. 68]
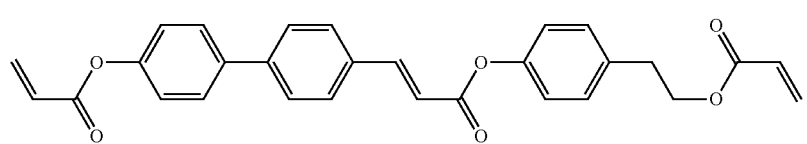
(P-a-1)
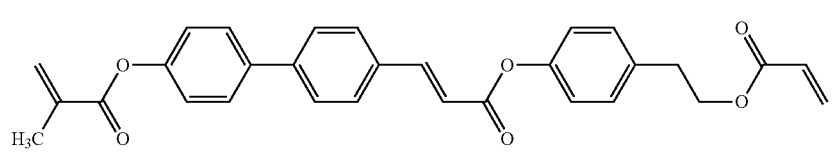
(P-a-2)
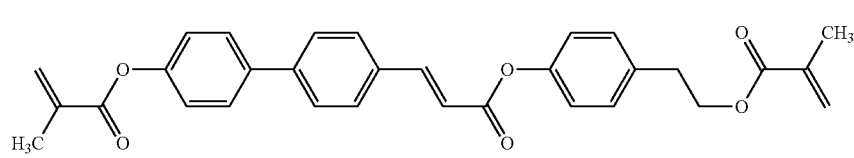
(P-a-3)
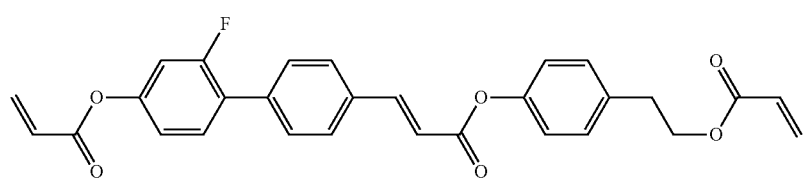
(P-a-4)
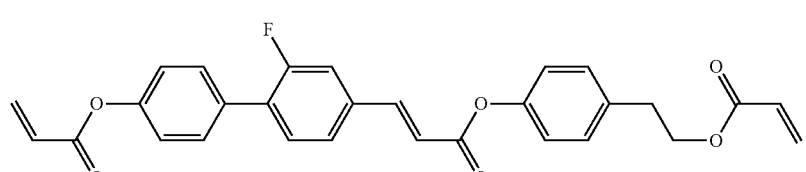
(P-a-5)
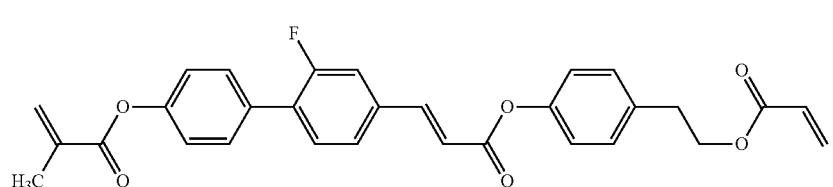
(P-a-6)
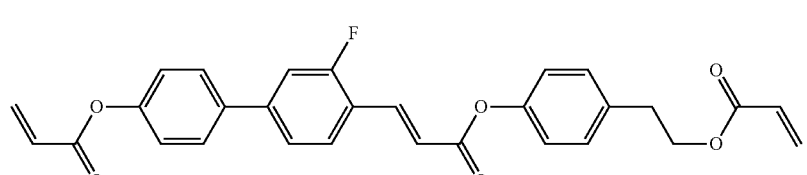
(P-a-7)
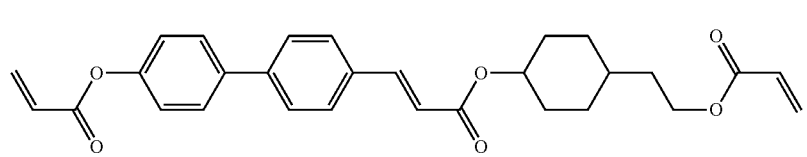
(P-a-8)
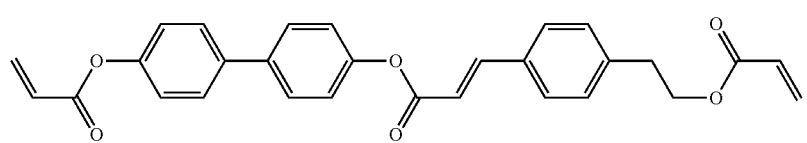
(P-a-9)

-continued
(P-a-10)
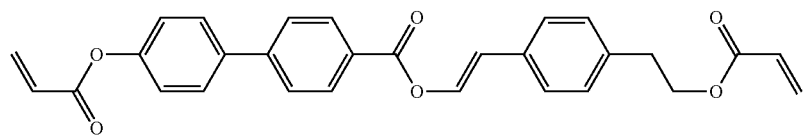
(P-a-11)
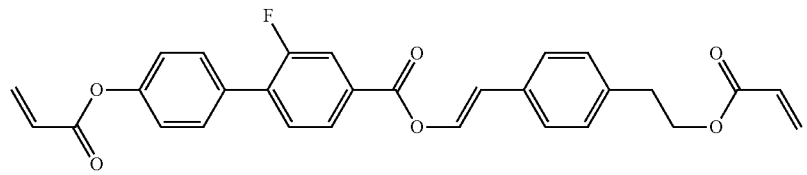
(P-a-12)
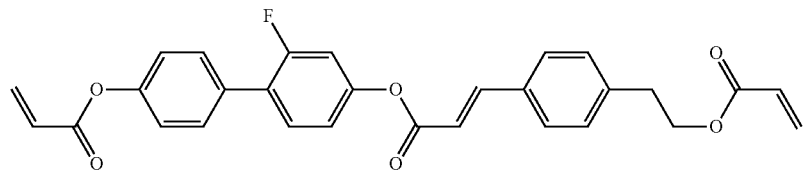
(P-a-13)
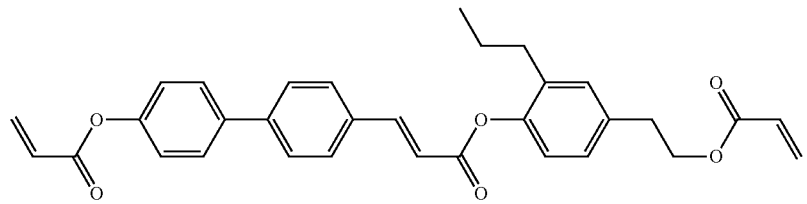
[Chem. 69]
(P-a-14)
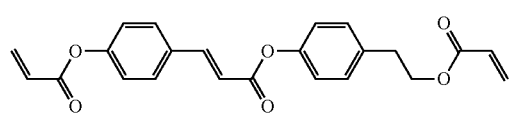
(P-a-15)
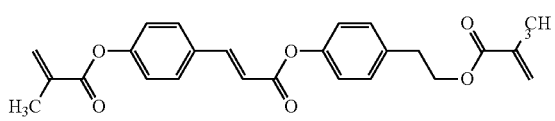
(P-a-16)
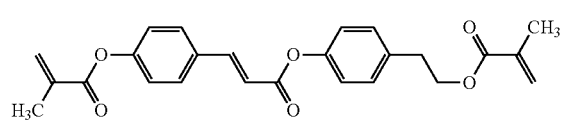
(P-a-17)
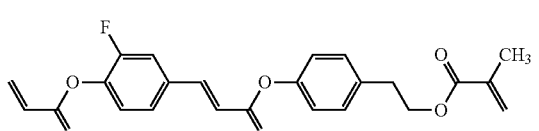
(P-a-18)
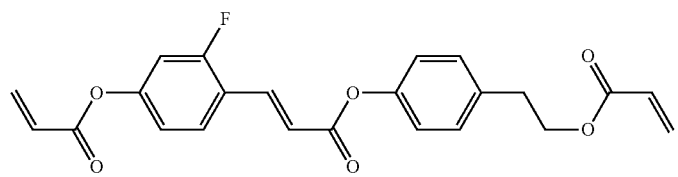
[Chem. 70]
(P-a-19)
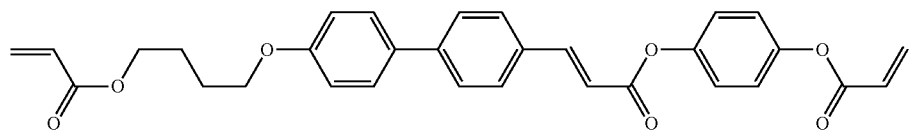
(P-a-20)
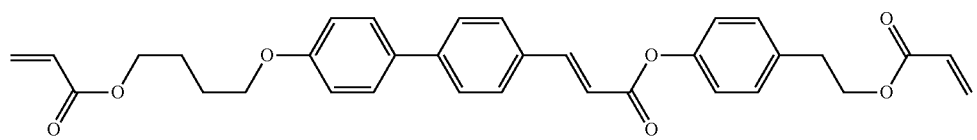

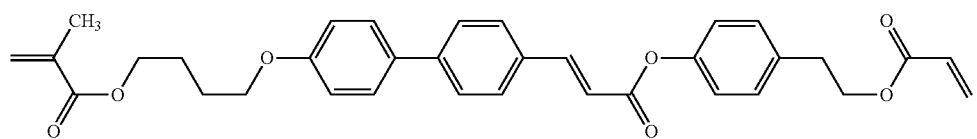
(P-a-21)
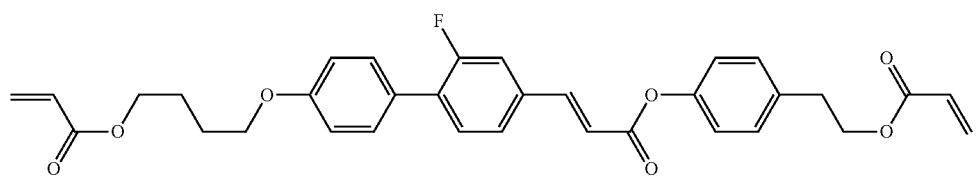
(P-a-22)
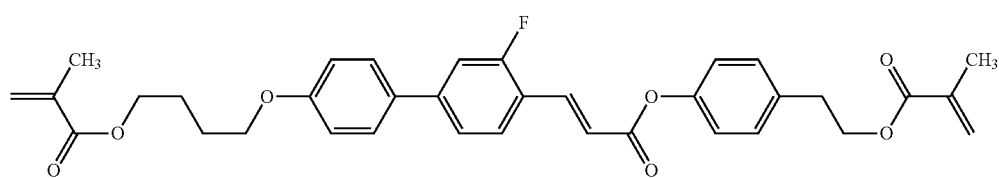
(P-a-23)
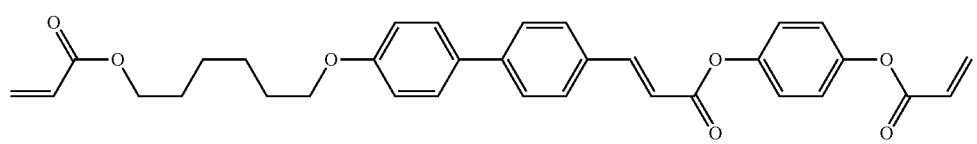
(P-a-24)
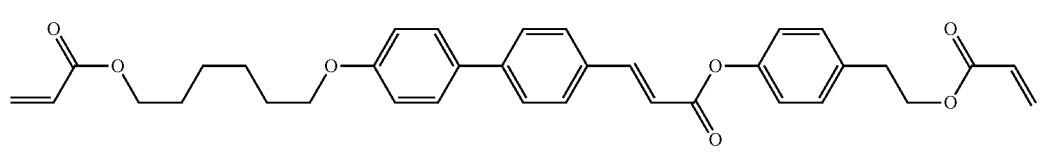
(P-a-25)
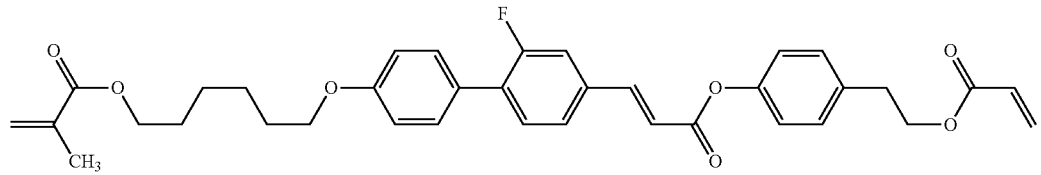
(P-a-26)
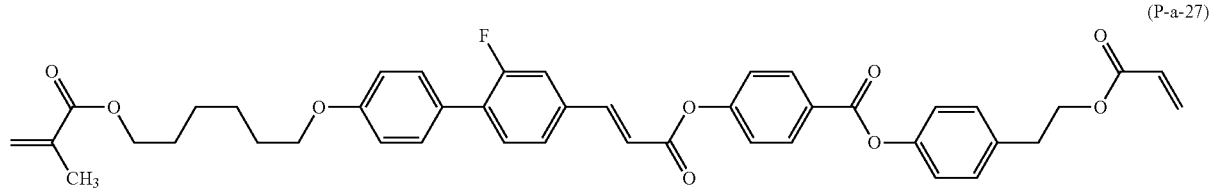
(P-a-27)
[Chem. 71]
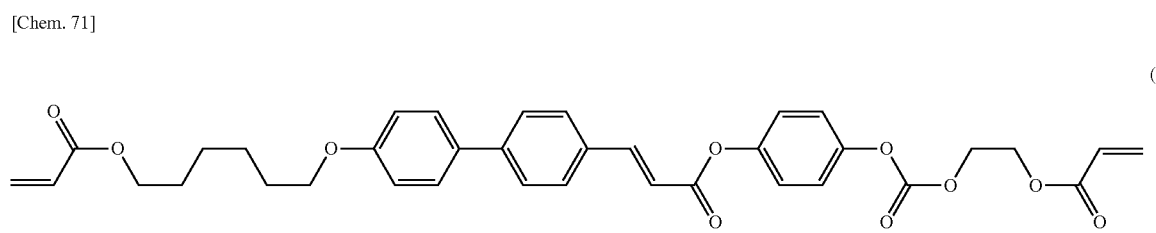
(P-a-28)
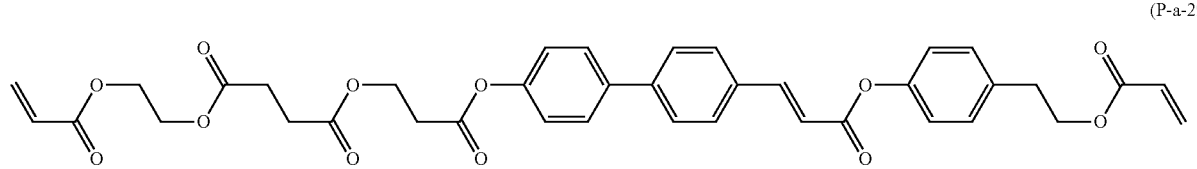
(P-a-29)
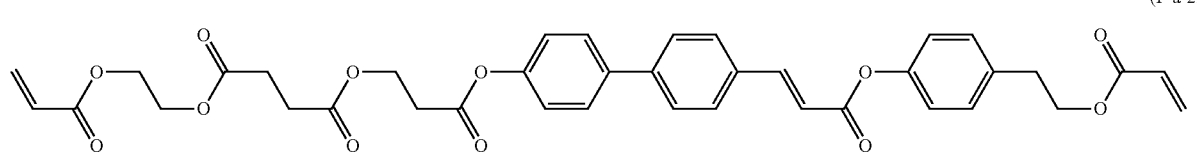

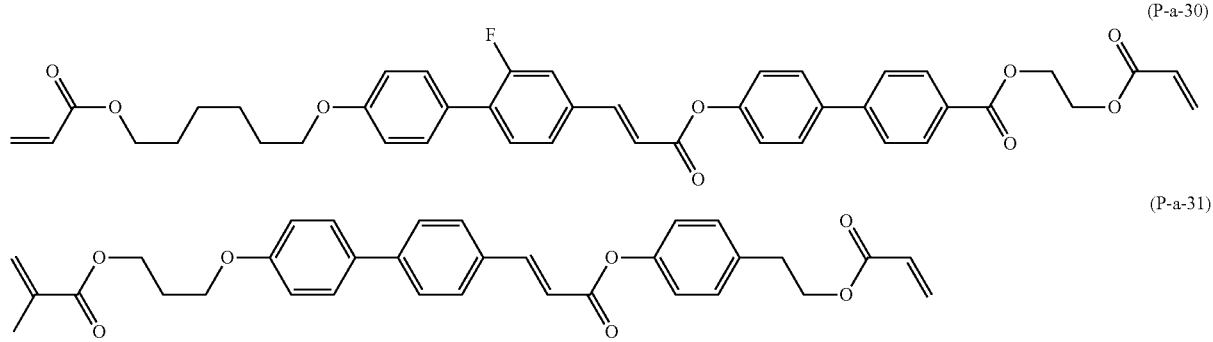
Preferable examples of the compound represented by Formulas (P-b) according to the present invention include polymerizable compounds represented by each of the following Formulas (P-b-1) to (F-b-34),
[Chem. 72]
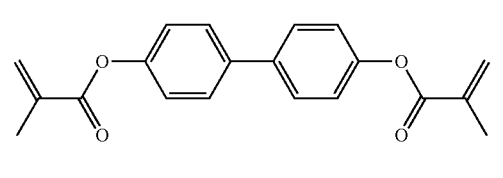
(P-b-1)
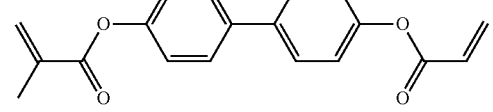
(P-b-2)
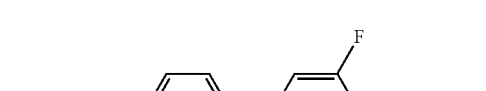
(P-b-3)
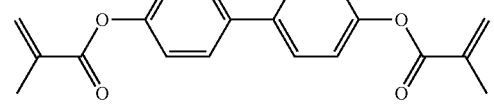
(P-b-4)
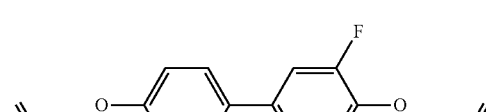
(P-b-5)
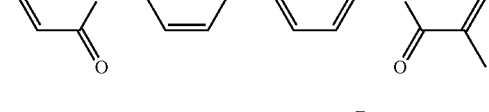
(P-b-6)
-continued
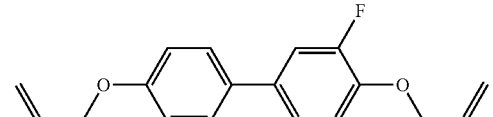
(P-b-7)
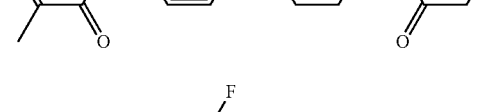
(P-b-8)
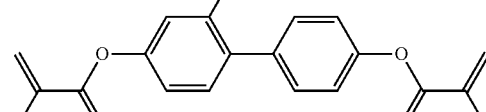
(P-b-9)
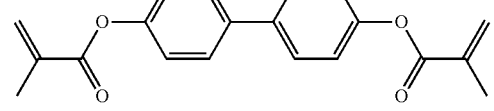
(P-b-10)
(P-b-11)
(P-b-12)
(P-b-13)

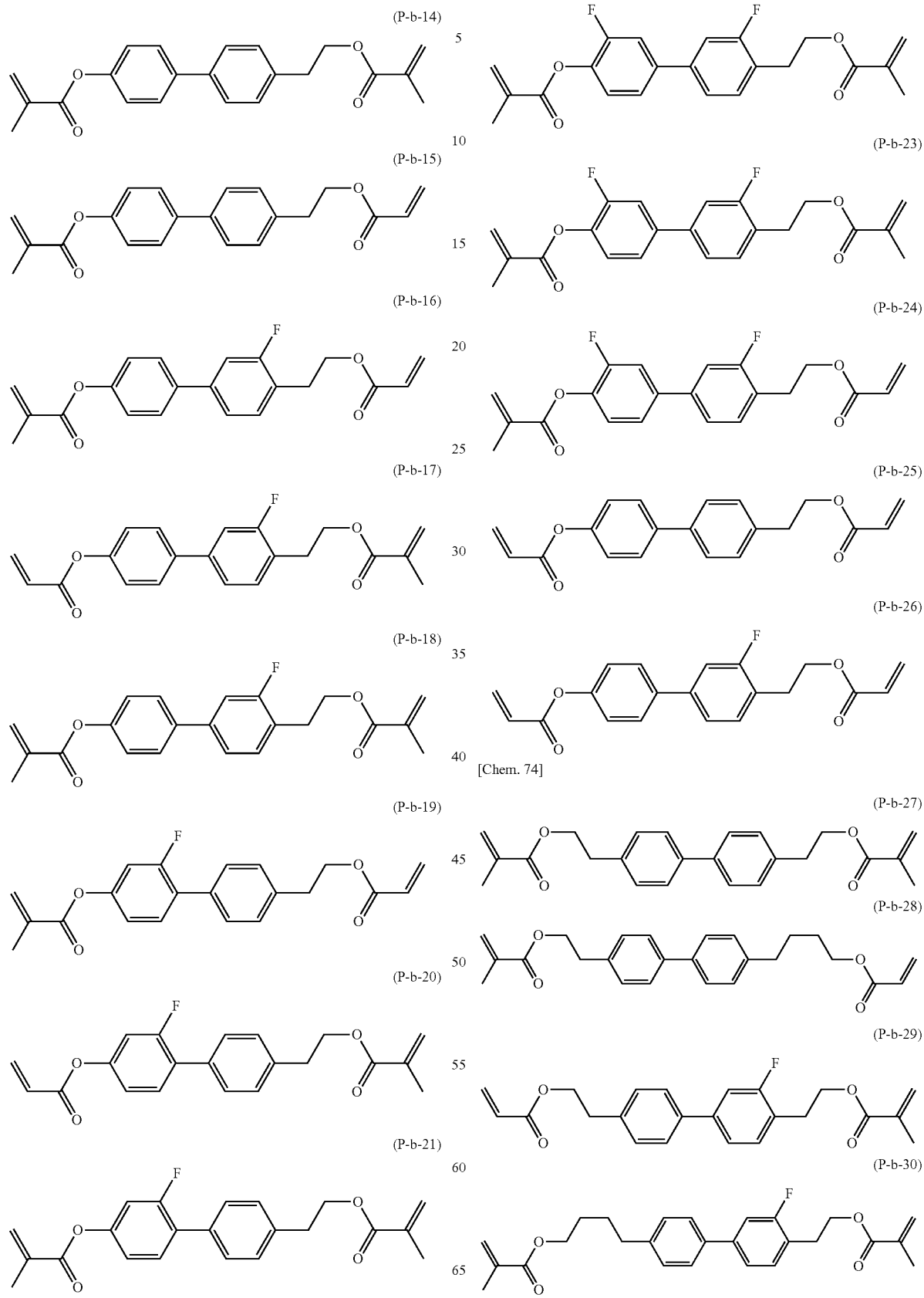

(P-b-31)
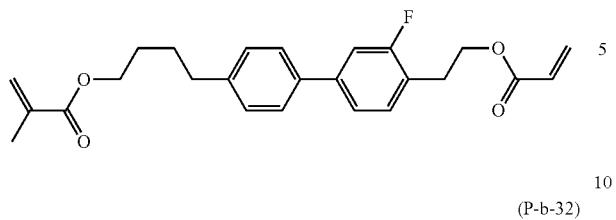
(P-b-32)
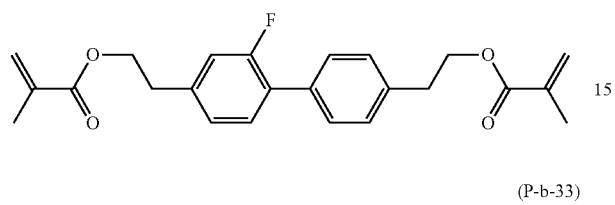
(P-b-33)
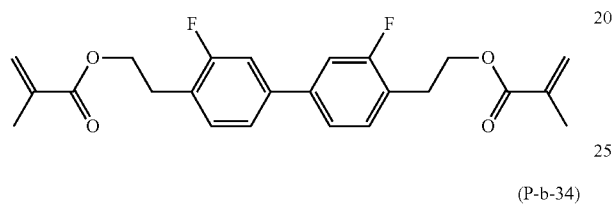
(P-b-34)
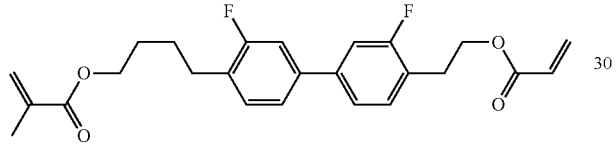
Preferable examples of the compound represented by Formulas (P-c) according to the present invention include polymerizable compounds represented by each of the following Formulas (P-c-1) to (P-c-52).
[Chem. 75]
(P-c-1)
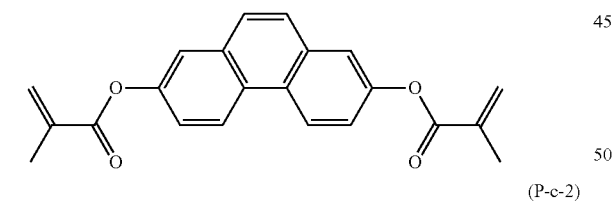
(P-c-2)
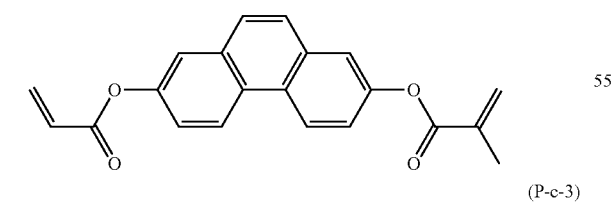
(P-c-3)
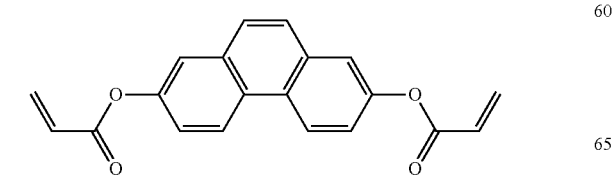
(P-c-4)
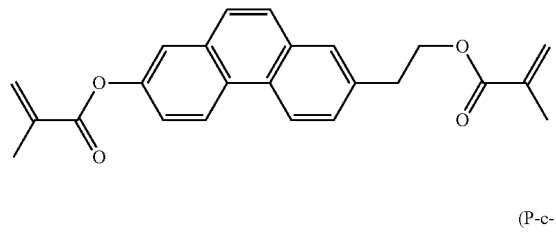
(P-c-5)
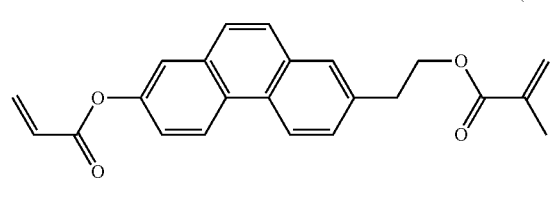
(P-c-6)
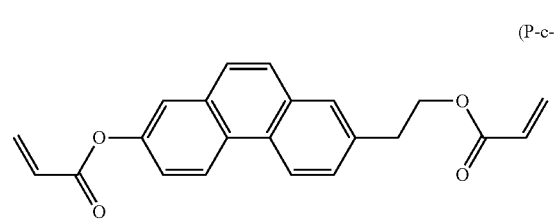
(P-c-7)
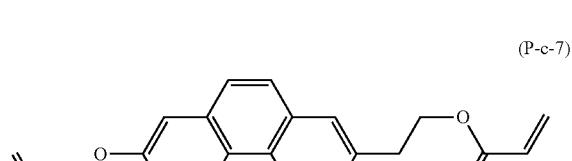
(P-c-8)
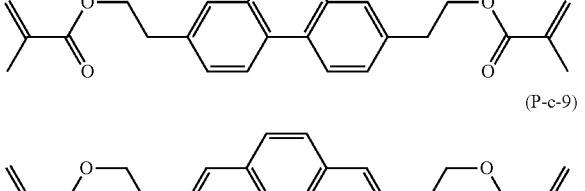
(P-c-9)
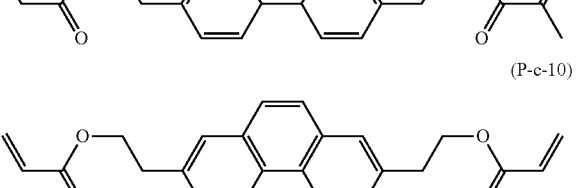
(P-c-10)
(P-c-11)
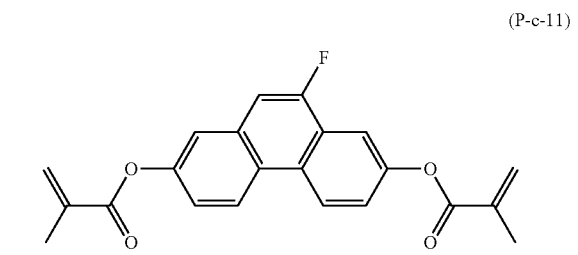

(P-c-12)
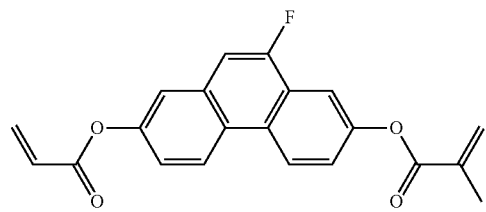
(P-c-13)
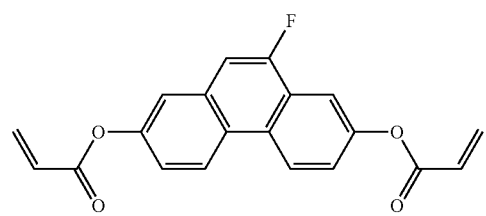
(P-c-14)
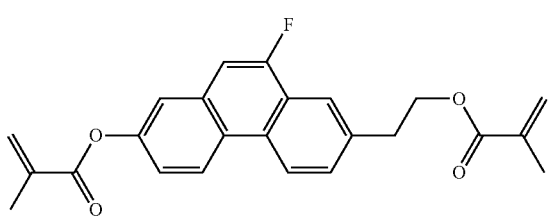
(P-c-15)
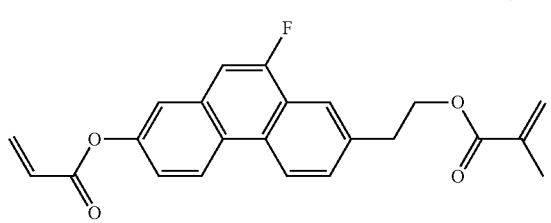
(P-c-16)
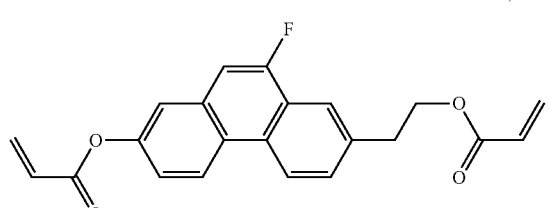
(P-c-17)
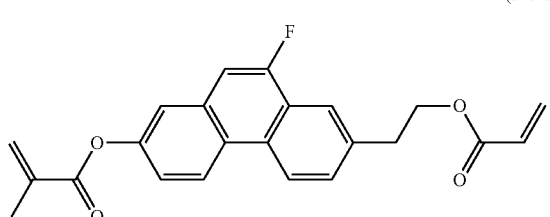
(P-c-18)
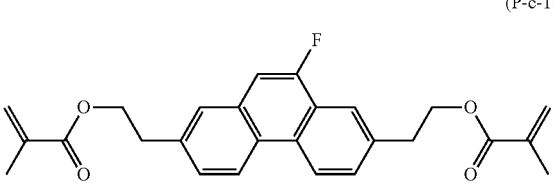
(P-c-19)
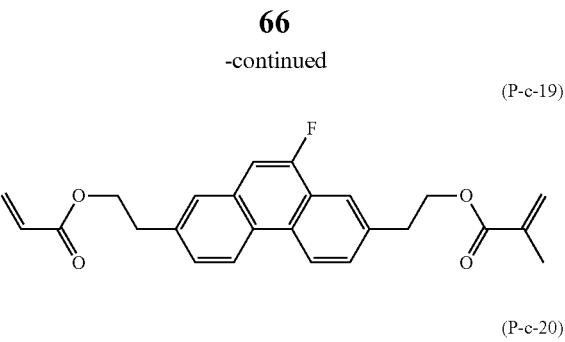
(P-c-20)
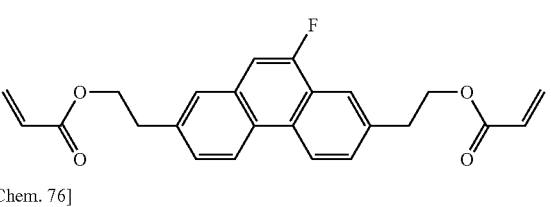
[Chem. 76]
(P-c-21)
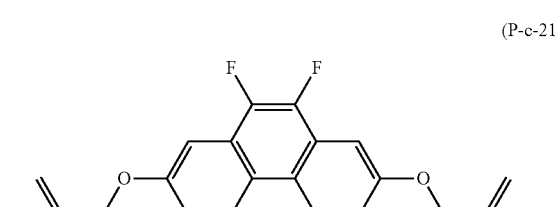
(P-c-22)
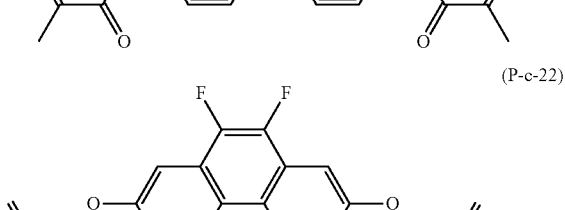
(P-c-23)
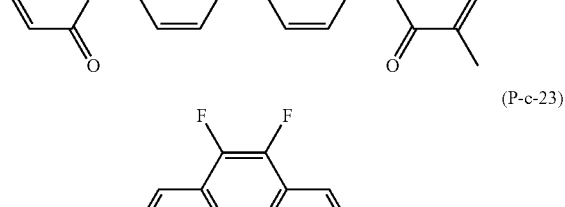
(P-c-24)
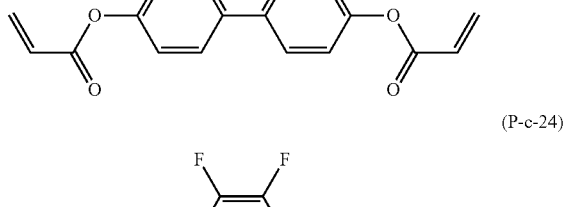
(P-c-25)
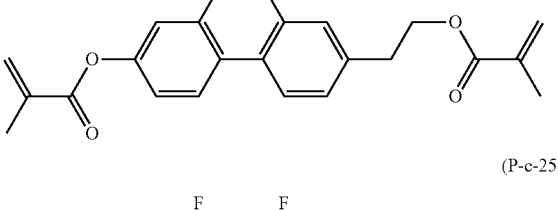
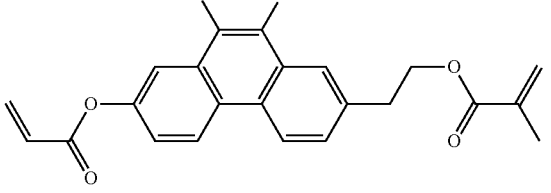

-continued (P-c-26)
(P-c-27)
(P-c-28)
(P-c-29)
(P-c-30)
(P-c-31)
(P-c-32)

-continued (P-c-33)
(P-c-34)
(P-c-35)
(P-c-36)
(P-c-37)
(P-c-38)
(P-c-39)

(P-c-40)
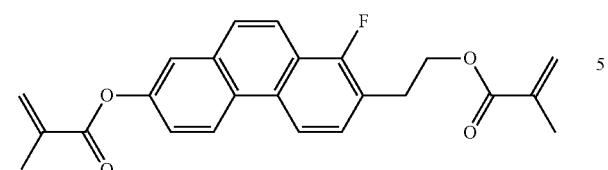
[Chem. 77]
(P-c-41)
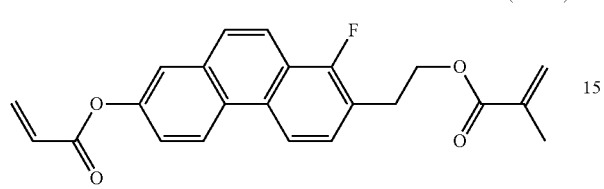
(P-c-42)
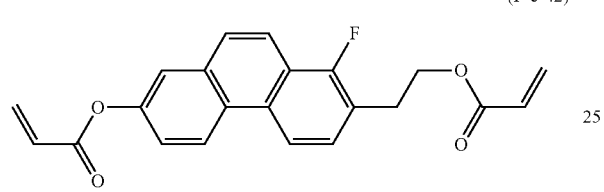
(P-c-43)
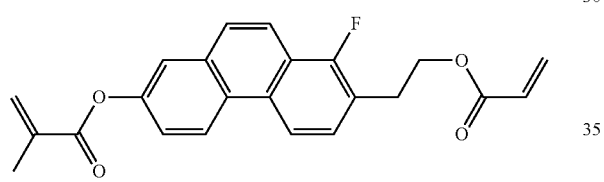
(P-c-44)
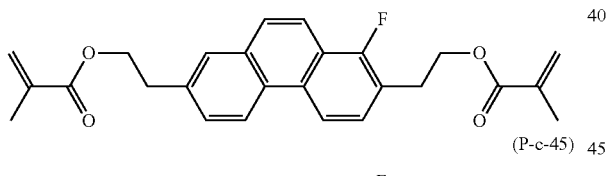
(P-c-45)
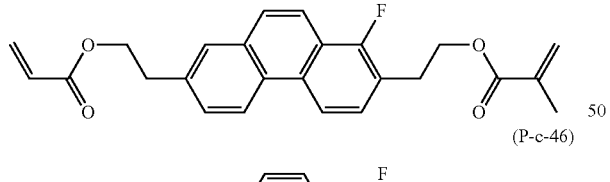
(P-c-46)
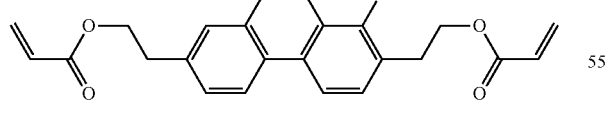
(P-c-47)
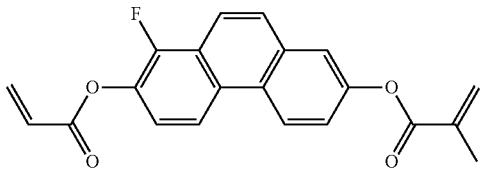
(P-c-48)
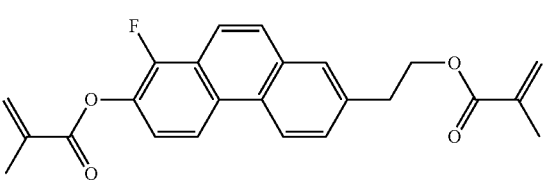
(P-c-49)
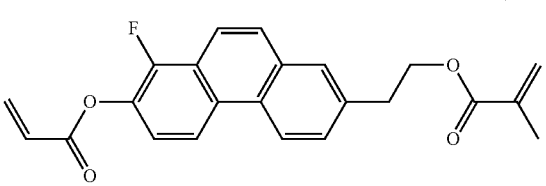
(P-c-50)
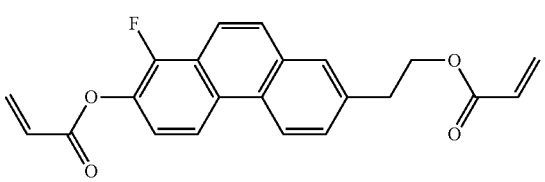
(P-c-51)
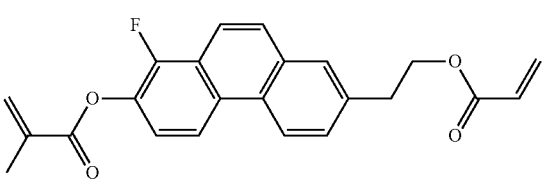
(P-c-52)
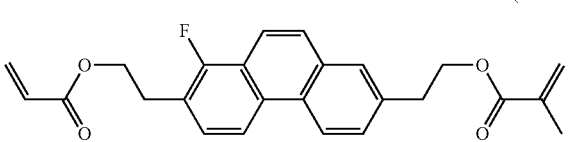
The compound represented by Formula (P-d) according to the present invention is preferably a compound represented by the following Formula (P-d').
[Chem. 78]
(P-d')
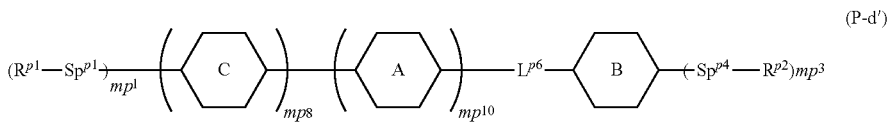

In the compound represented by Formula (P-d'), $m^{p10}$ more preferably represents 2 or 3. Other symbols will be omitted since the symbols are the same as those in Formula (p-d).
Preferable examples of the compound represented by Formulas (P-d) according to the present invention include polymerizable compounds represented by each of the following Formulas (P-d-1) to (P-d-31).
[Chem. 79]
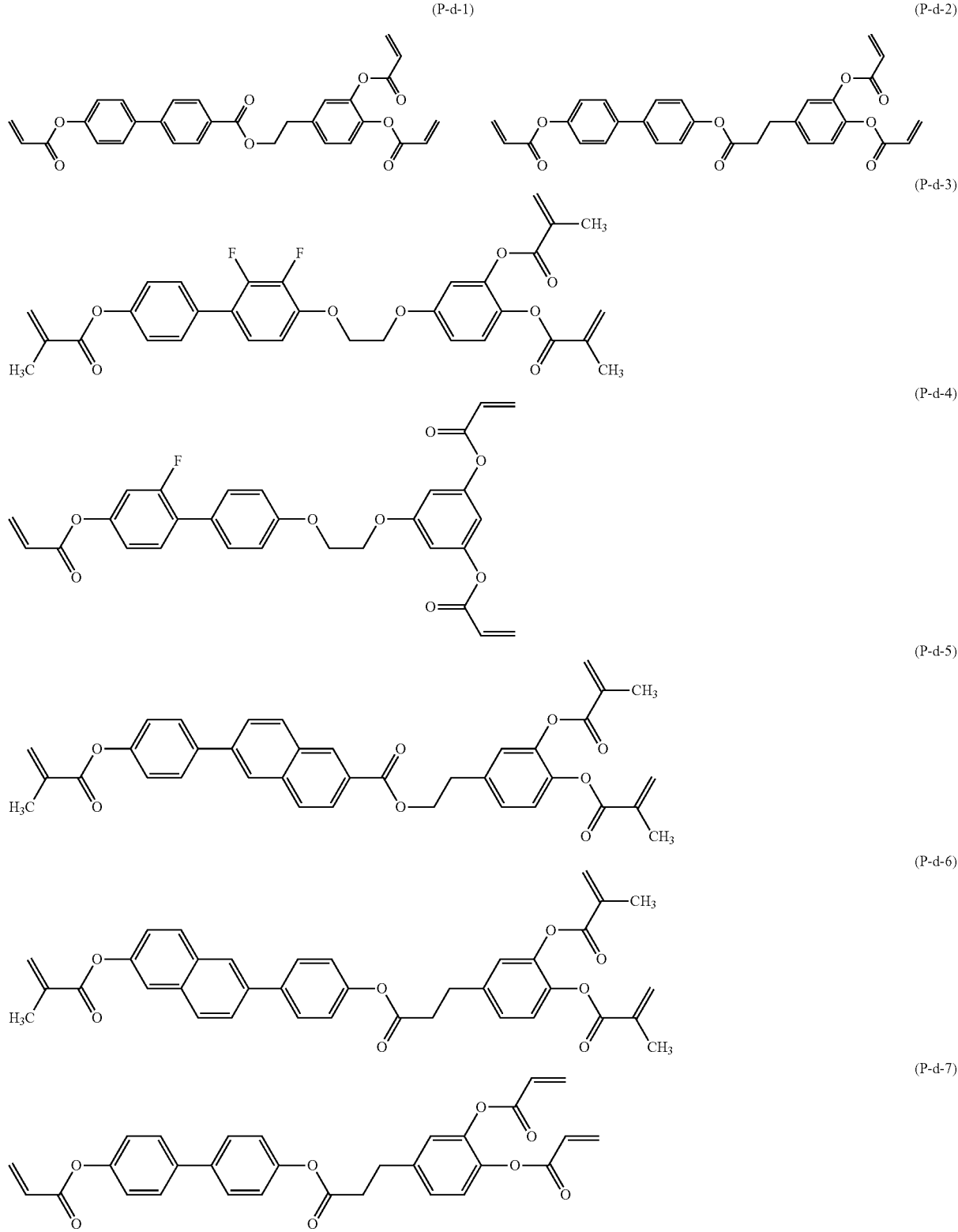

-continued
[Chem. 80]
(P-d-8)
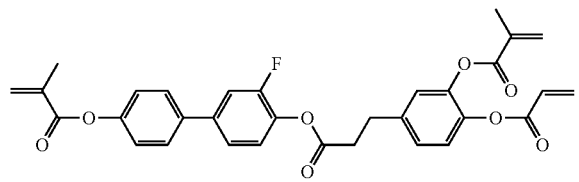
(P-d-9)
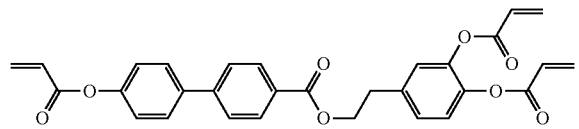
(P-d-10)
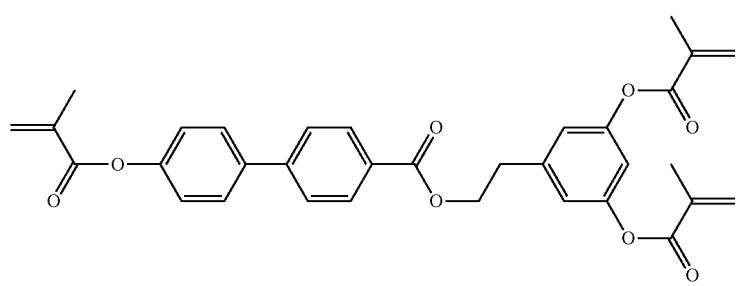
(P-d-11)
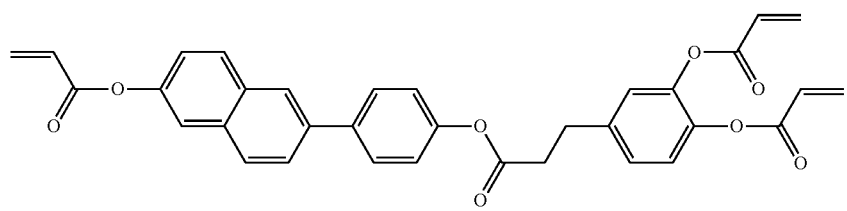
(P-d-12)
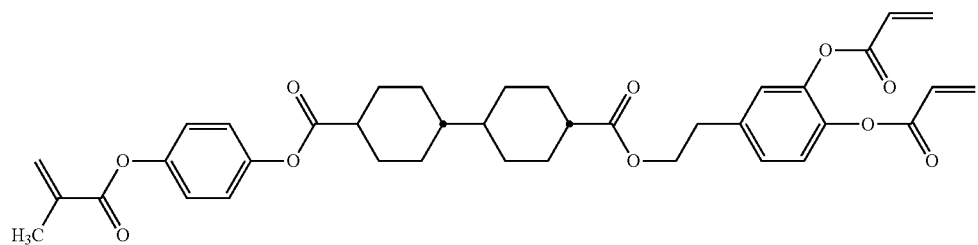
(P-d-13)
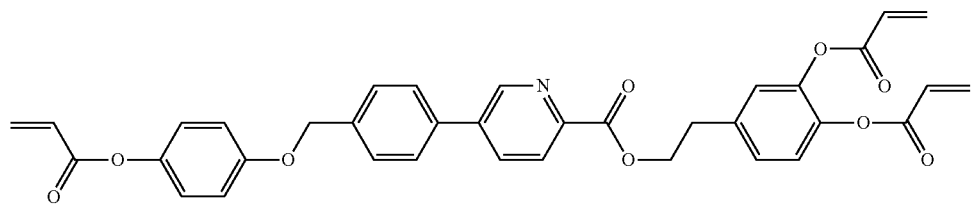
(P-d-14)
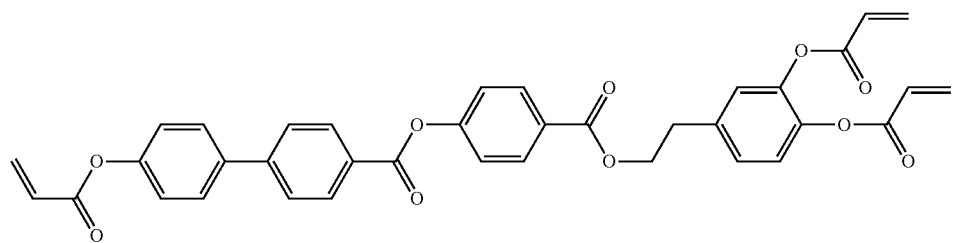

-continued
[Chem. 81]
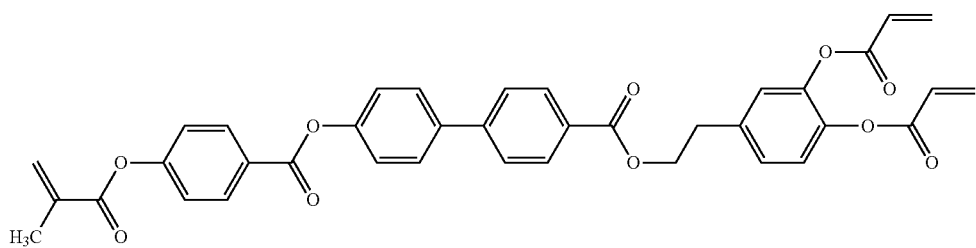
(P-d-15)
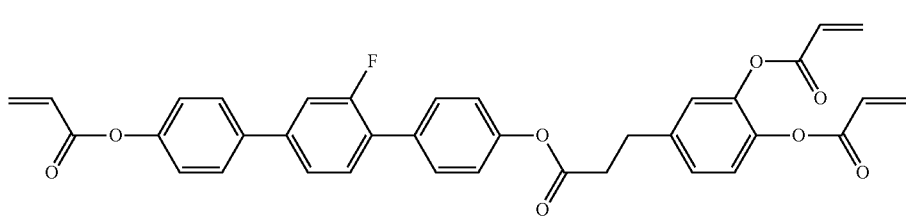
(P-d-16)
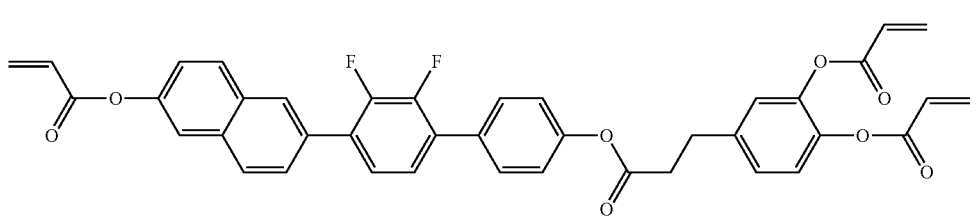
(P-d-17)
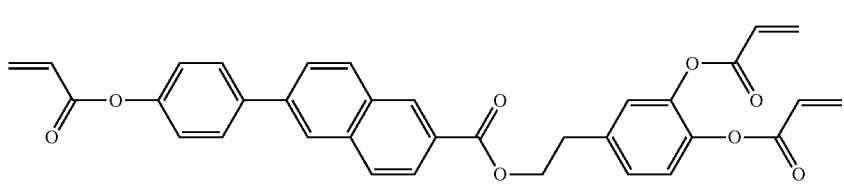
(P-d-18)
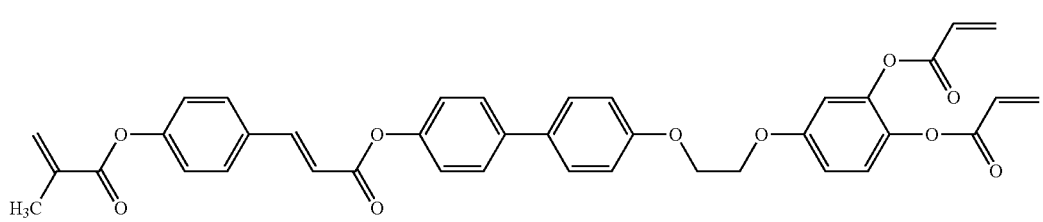
(P-d-19)
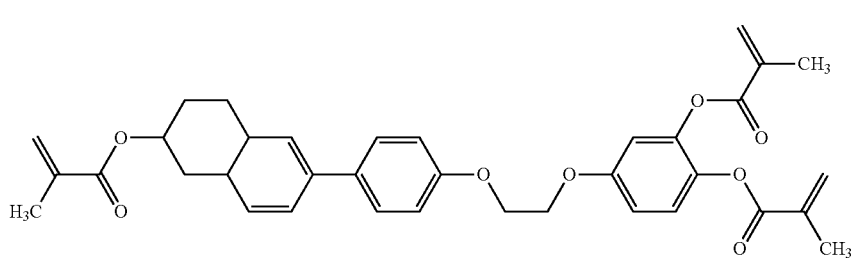
(P-d-20)
[Chem. 82]
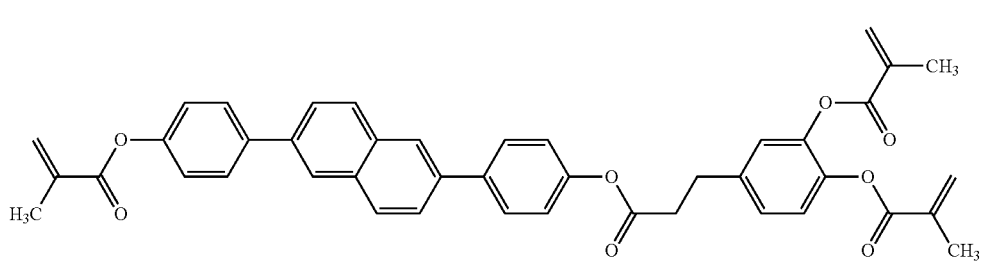
(P-d-21)

-continued
(P-d-22)
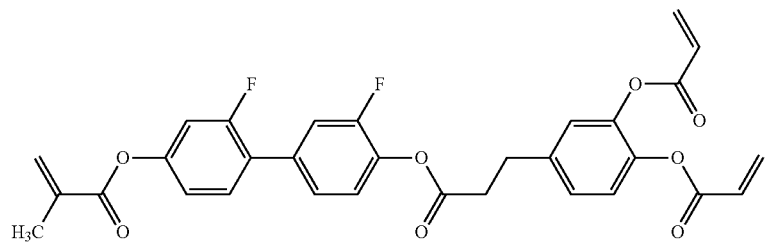
(P-d-23)
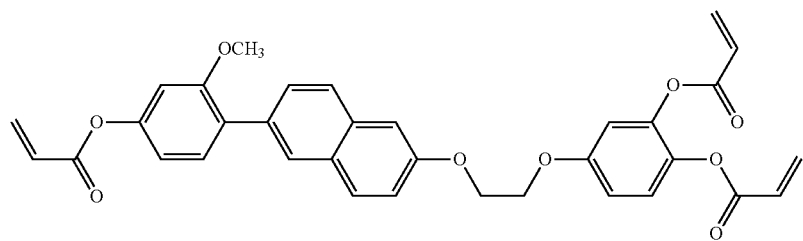
[Chem. 83]
(P-d-24) (P-d-25)
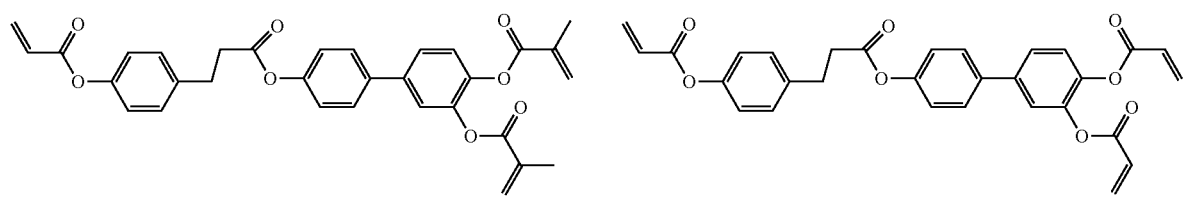
(P-d-26) (P-d-27)
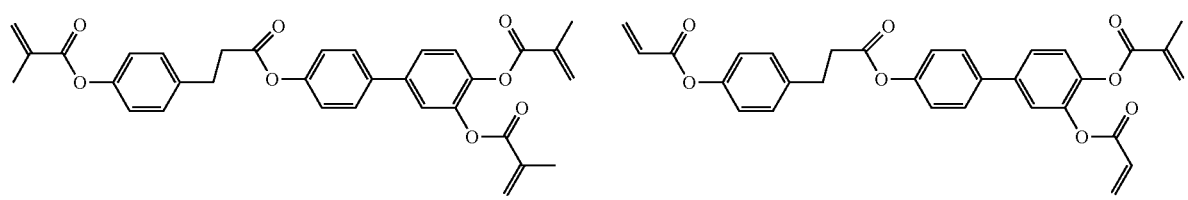
(P-d-28)
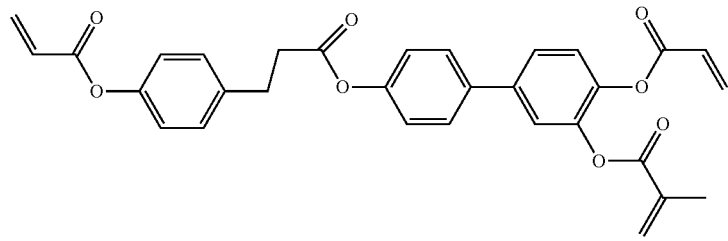
[Chem. 84]
(P-d-29) (P-d-30)
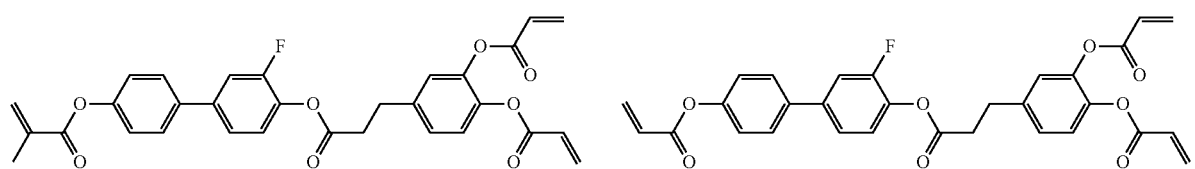

-continued (P-d-31) 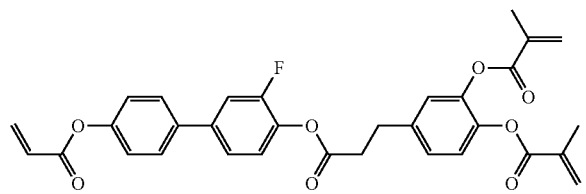

(P-d-32) 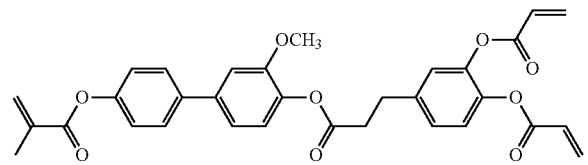

(P-d-33) 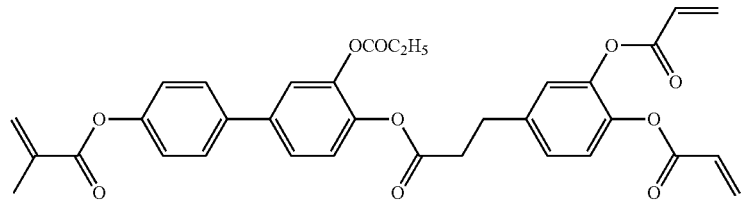

[Chem. 85]

(P-d-34) 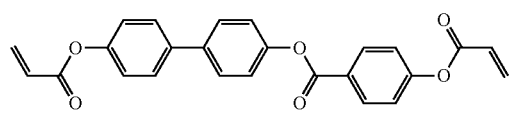

(P-d-35) 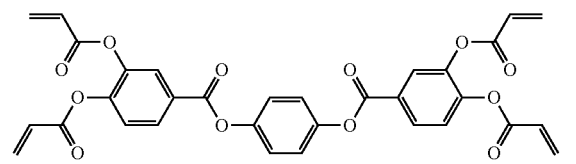

(P-d-36) 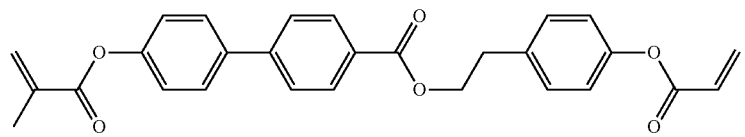

The "alkyl group having 1 to 15 carbon atoms" according to the present invention is preferably a linear or branched alkyl group, and more preferably a linear alkyl group. In addition, in Formula (1), $R^1$ and $R^2$ are each independently an alkyl group having 1 to 15 carbon atoms, and $R^1$ and $R^2$ are each independently an alkyl group having 1 to 8 carbon atoms, and more preferably an alkyl group having 1 to 6 carbon atoms.

Examples of the "alkyl group having 1 to 15 carbon atoms" according to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, and a pentadecyl group. Moreover, in the specification, the examples of alkyl groups are common, and an alkyl group is suitably selected from the alkyl groups exemplified above depending on the number of carbon atoms of each alkyl group.

An example of the "alkoxy group having 1 to 15 carbon atoms" according to the present invention is preferably a group in which at least one oxygen atom in the substituent is present at a position directly bonded to the ring structure, and more preferably a methoxy group, an ethoxy group, a propoxy group (an n-propoxy group or an i-propoxy group), a butoxy group, a pentyloxy group, an octyloxy group, or a decyloxy group. Moreover, in the specification, the examples of alkoxy groups are common, and an alkoxy group is suitably selected from the alkoxy groups exemplified above depending on the number of carbon atoms of each alkoxy group.

Examples of the "alkenyl group having 2 to 15 carbon atoms" according to the present invention include a vinyl group, an allyl group, a 1-propenyl group, an isopropenyl group, a 2-butenyl group, a 3-butenyl group, a 1,3-butadienyl group, a 2-pentenyl group, a 3-pentenyl group, and a 2-hexenyl group. In addition, more preferable alkenyl groups according to the present invention are represented by the following Formula (i) (vinyl group), (ii) (1-propenyl group), (iii) (3-butenyl group), or (iv) (3-pentenyl group),

[Chem. 86]

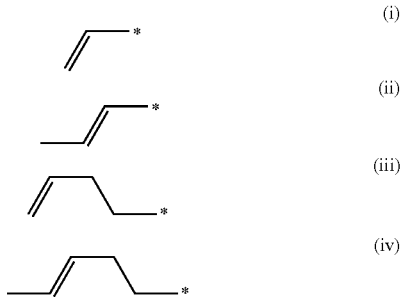

In Formulas (i) to (iv), * indicates a bonding site to a ring structure.

In a case where the liquid crystal composition of the present invention contains a polymerizable monomer, the structures represented by Formula (ii) or (iv) are preferable, and the structures represented by Formula (ii) are more preferable. Moreover, in the specification, the examples of alkenyl groups are common, and an alkenyl group is suitably selected from the alkenyl groups exemplified above depending on the number of carbon atoms of each alkenyl group.

In addition, among the polymerizable compound in the present invention, as the polymerizable compound having a monofunctional reactive group preferable to prevent crystallisation by increasing the solubility in a low molecular weight liquid crystal, a polymerizable compound represented by the following Formula (VI) is preferable.

[Chem. 87]

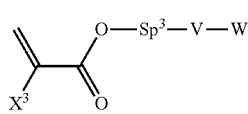

(VI)

In the formula, $X^3$ represents a hydrogen atom or a methyl group, $Sp^3$ represents a single bond, an alkylene group having 1 to 12 carbon atoms, or —O—$(CH_2)_t$— (in the formula, t represents an integer of 2 to 11, and an oxygen atom is bonded to an aromatic ring), V represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom and may be substituted with an alkyl group having 5 to 20 carbon atoms (the alkylene group in the group may be substituted with an oxygen atom as long as an oxygen atom is not adjacent to another oxygen atom) or a cyclic substituent, and W represents a hydrogen atom, a halogen atom, or an alkyl group having 1 to 15 carbon atoms. An arbitrary hydrogen atom in all 1,4-phenylene groups in the formula may be substituted with —$CH_3$, —$OCH_3$, a fluorine atom, or a cyano group.

In Formula (VI), $X^3$ represents a hydrogen atom or a methyl group, and in the case of regarding a reaction rate as important, $X^3$ is preferably a hydrogen atom, and in the case of regarding reduction of reaction residues as important, $X^3$ is preferably a methyl group.

In Formula (VI), $S^{p3}$ represents a single bond, an alkylene group having 1 to 12 carbon atoms, or —O—$(CH_2)_t$— (in the formula, t represents an integer of 2 to 11, and an oxygen atom is bonded to an aromatic ring), and since the length of a carbon chain affects Tg, in a case where the content of the polymerizable compound is less than 10% by weight, the carbon chain is preferably not too long, and a single bond or an alkylene group having 1 to 5 carbon atoms is preferable, and in a case where the content of the polymerizable compound is less than 6% by weight, a single bond or an alkylene group having 1 to 3 carbon atoms is more preferable. In a case where the content of the polymerizable compound is equal to or greater than 10% by weight, an alkylene group having 5 to 10 carbon atoms is preferable. Even in a case where $Sp^3$ represents —O—$(CH_2)$ t is preferably 1 to 5, and more preferably 1 to 3. Furthermore, since the number of carbon atoms affects the pretilt angle, as necessary, it is preferable to use a plurality of polymerizable compounds having different numbers of carbon atoms of $S^{p3}$ in combination such that a desired pretilt angle is obtained.

In Formula (VI), V represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms (the alkylene group in the group may be substituted with an oxygen atom as long as an oxygen atom is not adjacent to another oxygen atom), or may be substituted with a cyclic substituent, and is preferably substituted with two or more cyclic substituents.

As the polymerizable compound represented by Formula (VI), more specifically, a compound represented by Formula (X1a) is exemplified.

[Chem. 88]

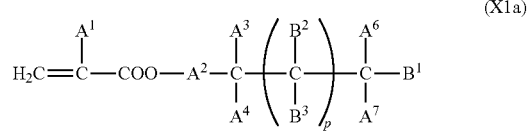

(X1a)

In the formula, $A^1$ represents a hydrogen atom or a methyl group, $A^2$ represents a single bond or an alkylene group having 1 to 8 carbon atoms (one or two or more methylene groups in the alkylene group each may be independently substituted with an oxygen atom, —CO—, —COO—, or —OCO— as long as an oxygen atom is not directly bonded to another oxygen atom, and one or two or more hydrogen atoms in the alkylene group each may be independently substituted with a fluorine atom, a methyl group, or an ethyl group), $A^3$ and $A^6$ each independently represent a hydrogen atom, a halogen atom, or an alkyl group having 1 to 10 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or an alkyl group having 1 to 17 carbon atoms), $A^4$ and $A^7$ each independently represent a hydrogen atom, a halogen atom, or an alkyl group having 1 to 10 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or an alkyl group having 1 to 9 carbon atoms), p represents 0 to 10, $B^1$, $B^2$, and $B^3$ each independently represent a hydrogen atom or a linear or branched alkyl group having 1 to 10 carbon atoms (one or two or more methylene groups in the alkyl group each may be independently substituted with an oxygen atom, —CO—, —COO—, or —OCO— as long as an oxygen atom is not directly bonded to another oxygen atom, and one or two or more hydrogen atoms in the alkyl group each may be independently substituted with a halogen atom or a trialkoxysilyl group having 3 to 6 carbon atoms.

Formula (X1a) is preferably a compound represented by Formula (II-b).

[Chem. 89]
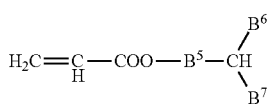
(II-b)
The compound represented by Formula (II-b) is preferably a compound by represented by each of Formulas (II-q) to (II-z) and (II-aa) to (II-a1).
[Chem. 90]
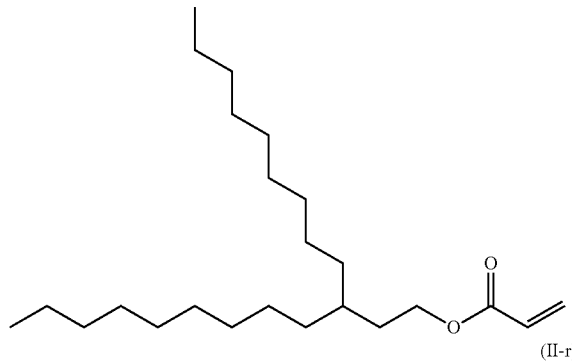
(II-q)
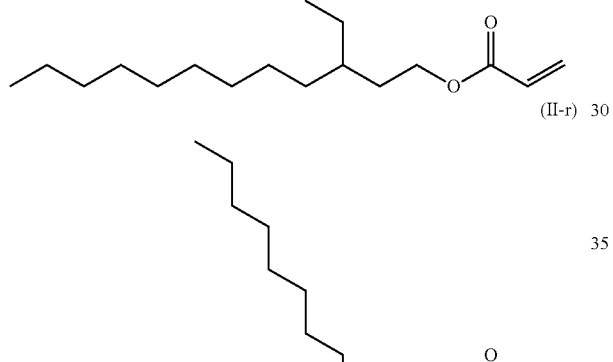
(II-r)
(II-s)
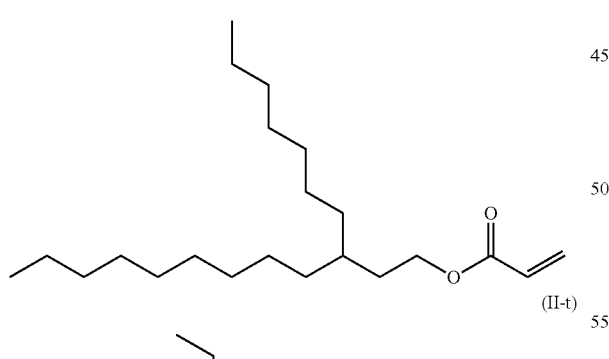
(II-t)
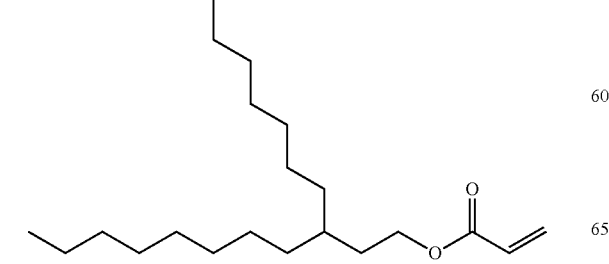
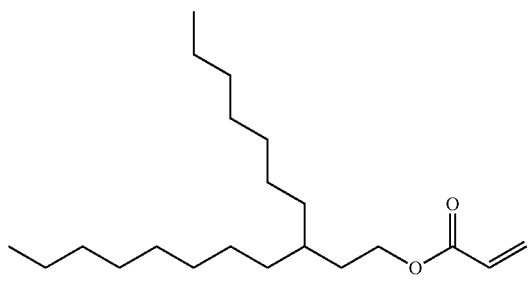
(II-u)
(II-v)
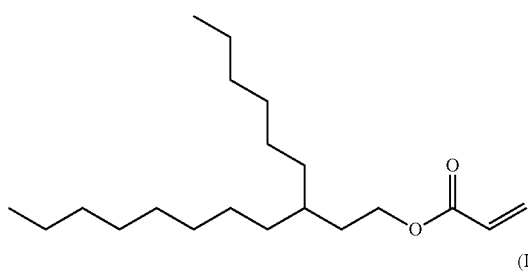
(II-x)
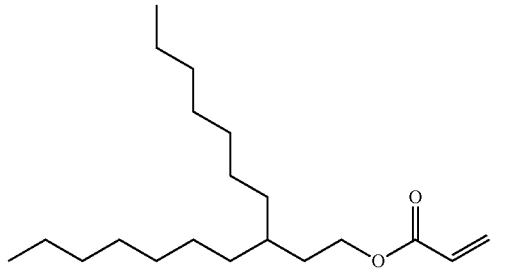
(II-y)
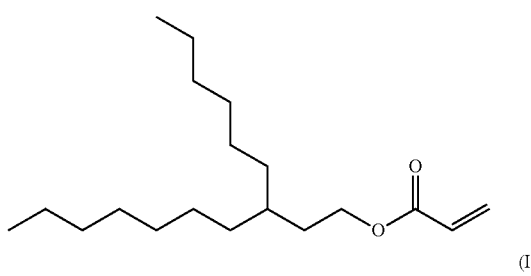
(II-z)
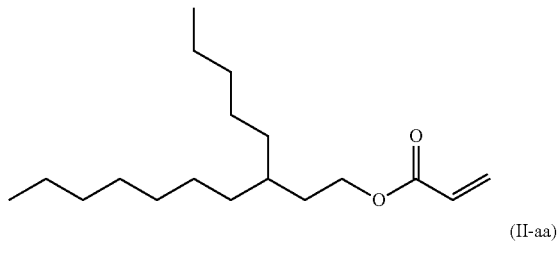
(II-aa)

[Chem. 91]
(II-ab)
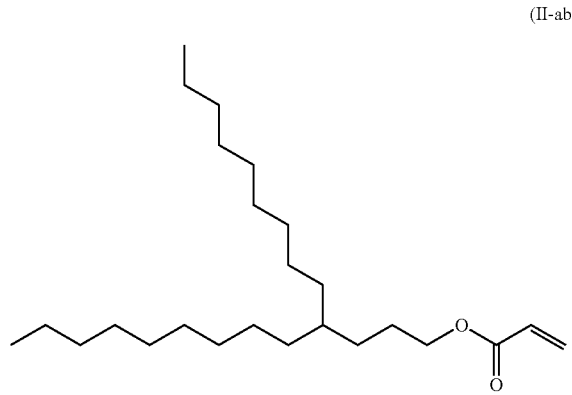
(II-ac)
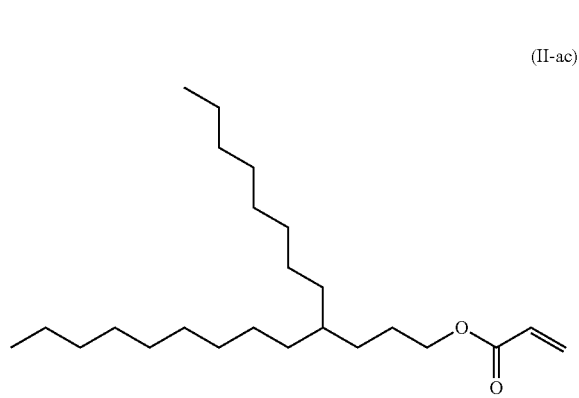
(II-ad)
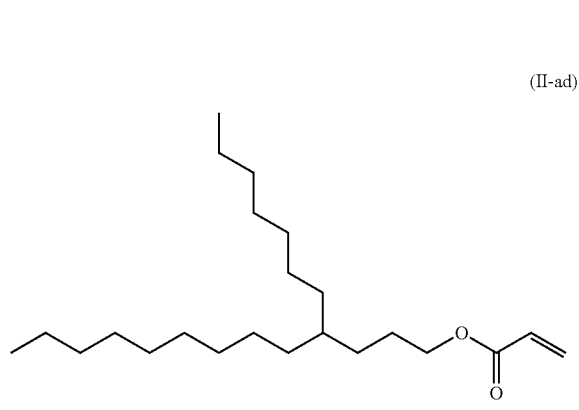
(II-ae)
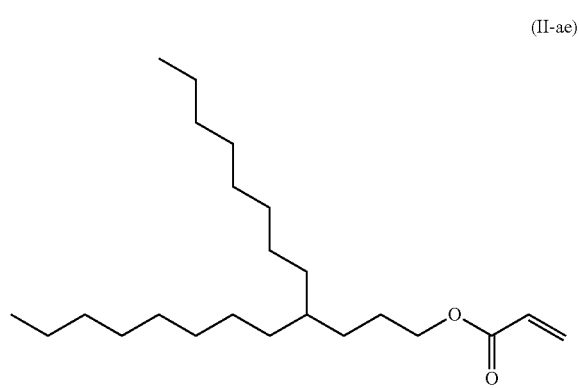
[Chem. 92]
(II-af)
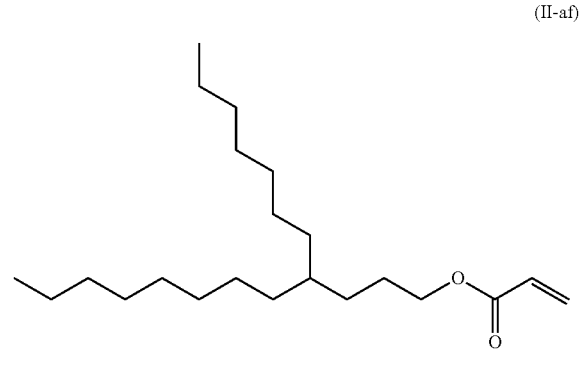
(II-ag)
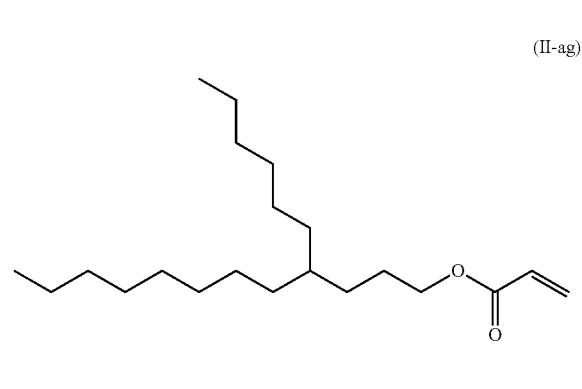
(II-ah)
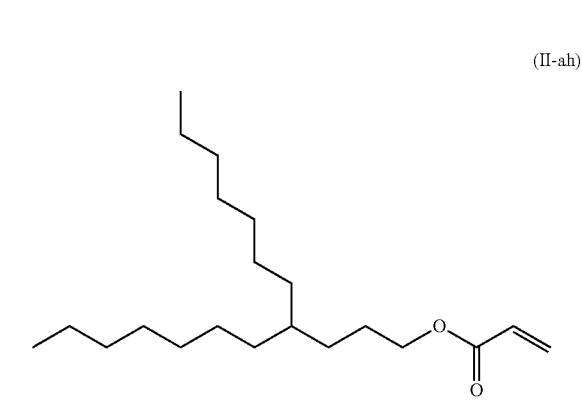
(II-ai)
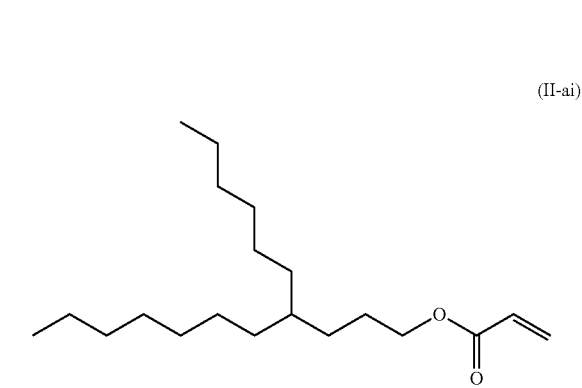

(II-aj)
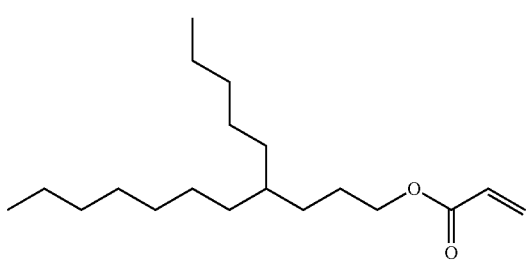

(II-ak)
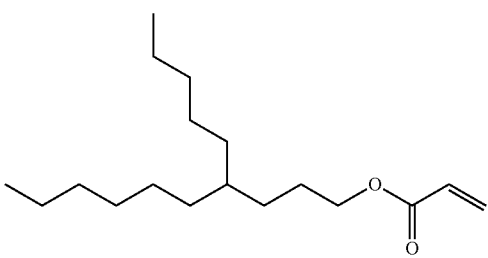

(II-al)
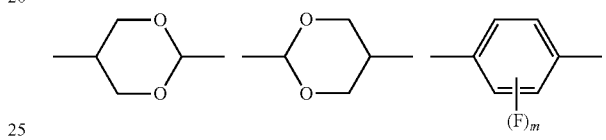

The compounds represented by Formula (VI), (XaI), or (II-b) may foe only one type, or may be two or more types.

In addition, as the polymerizable compound represented by Formula (VI), a compound represented by Formula (X1b) is exemplified.

[Chem. 93]

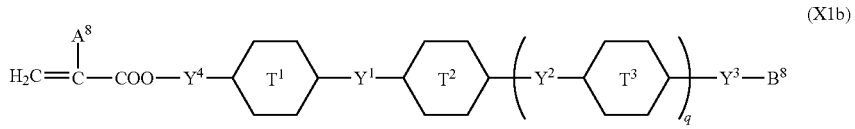
(X1b)

In the formula, $A^8$ represents a hydrogen atom or a methyl group, six-membered rings $T^1$, $T^2$, and $T^3$ each independently represent any one of the following formulas (here, q represents an integer of 1 to 4),

[Chem. 94]

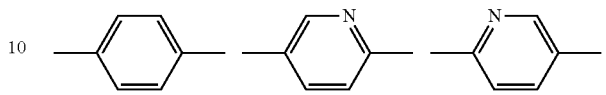

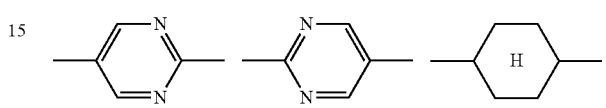

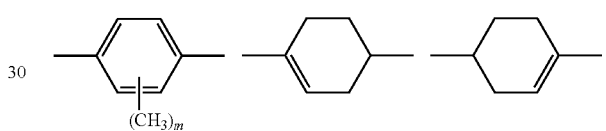

q represents 0 or 1, $Y^1$ and $Y^2$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—, $Y^3$ and $Y^4$ each independently represent a single bond or an alkylene group having 1 to 12 carbon atoms (one or two or more methylene groups in the alkylene group each may be independently substituted with an oxygen atom, —CO—, —COO—, or —OCO— as long as an oxygen atom is not directly bonded to another oxygen atom, and one or two or more hydrogen atoms in the alkylene group each may be independently substituted with a fluorine atom, a methyl group, or an ethyl group), $B^8$ represents a hydrogen atom, a cyano group, a halogen atom, an alkyl group having 1 to 8 carbon atoms, or an alkylene group in which the terminal has an acryloyl group or a methacryloyl group.

Exemplary compounds are shown below, but the present invention is not limited thereto.

[Chem. 95]
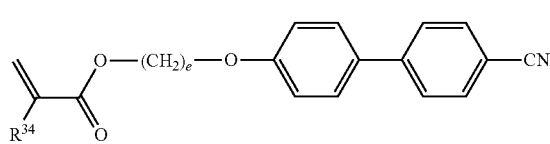
(X1b-1)
[Chem. 96]
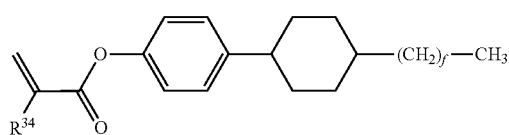
(X1b-2)
[Chem. 97]
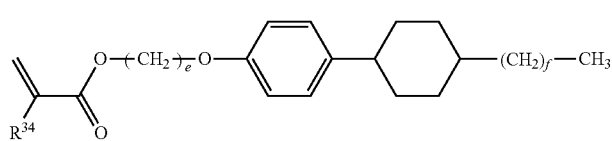
(X1b-3)
[Chem. 98]
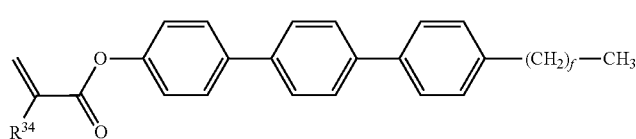
(X1b-4)
[Chem. 99]
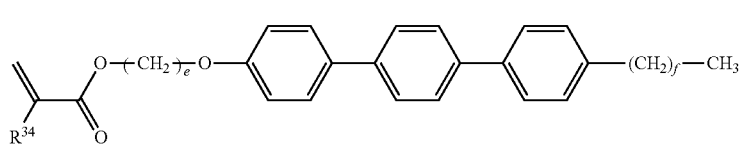
(X1b-5)
[Chem. 100]
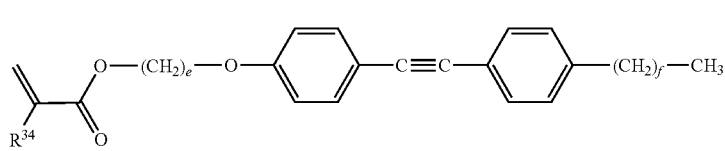
(X1b-6)
[Chem. 101]
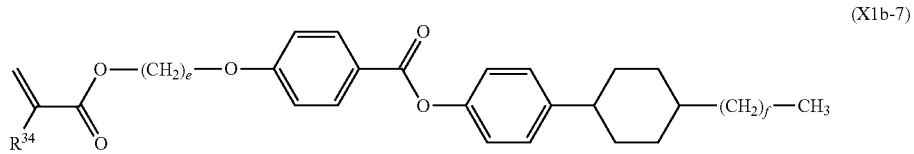
(X1b-7)

Furthermore, as the polymerizable compound represented by Formula (VI), specifically, a compound represented by Formula (X1c) is also exemplified.

[Chem. 102]

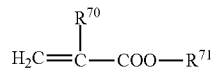

(X1c)

In the formula, $R^{70}$ represents a hydrogen atom or a methyl group, and $R^{71}$ represents a hydrocarbon group having a condensed ring.

Exemplary compounds are shown below, but the present invention is not limited thereto.

[Chem. 103]

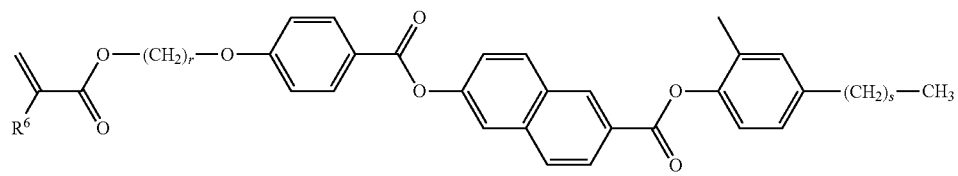

(X1c-1)

[Chem. 104]

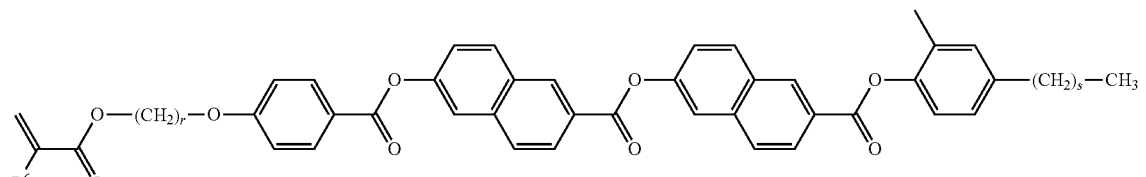

(X1c-2)

[Chem. 105]

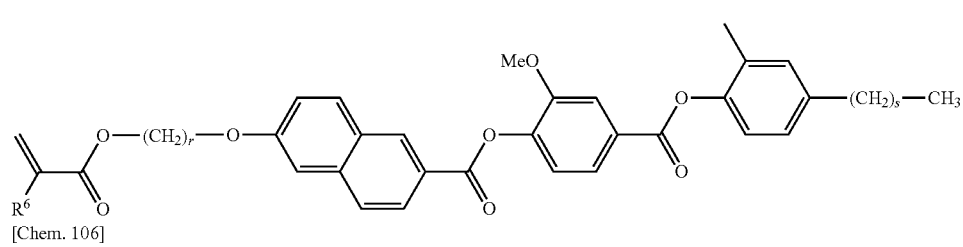

(X1c-3)

[Chem. 106]

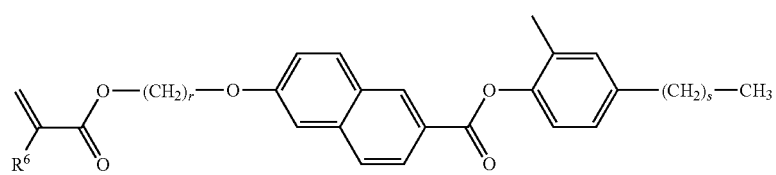

(X1c-4)

In addition, among the polymerizable compound in the present invention, as the polymerizable compound having a polyfunctional reactive group preferable to prevent crystallization by increasing the solubility in a low molecular weight liquid crystal, a polymerizable compound represented by the following Formula (V) is preferable.

[Chem. 107]

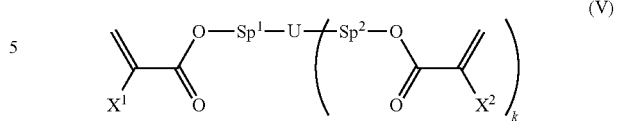

(V)

In the formula, $X^1$ and $X^2$ each independently represent a hydrogen atom or a methyl group, $Sp^1$ and $Sp^2$ each independently a single bond, an alkylene group having 1 to 12 carbon atoms, or —O—$(CH_2)_s$— (in the formula, s represents an integer of 1 to 11, and an oxygen atom is bonded to an aromatic ring), U represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom and may be substituted with an alkyl group having 5 to 20 carbon atoms (the alkylene group in the group may be substituted with an oxygen atom as long as an oxygen atom is not adjacent to another oxygen atom) or a cyclic substituent, and k represents an integer of 1 to 5. An arbitrary hydrogen atom in all 1,4-phenylene groups in the formula may be substituted with —CH$_3$, —OCH$_3$, a fluorine atom, or a cyano group.

In Formula (Y), X$^1$ and X$^2$ each independently represent a hydrogen atom or a methyl group, and in the case of regarding a reaction rate as important, a hydrogen atom is preferable, and in the case of regarding reduction of reaction residues as important, a methyl group is preferable.

In Formula (V), S$^{p1}$ and S$^{p2}$ each independently represent a single bond, an alkylene group having 1 to 12 carbon atoms, or —O—(CH$_2$)$_s$— (in the formula, s represents an integer of 2 to 11, and an oxygen atom is bonded to an aromatic ring), and the pretilt angle in the LCD device of the present invention is affected by the number of carbon atoms, the content of liquid crystal, the type of alignment film used, and alignment treatment conditions. Accordingly, although it is not necessarily limited, for example, in the case of setting the pretilt angle to about 5 degrees, the carbon chain is preferably not too long, a single bond or an alkylene group having 1 to 5 carbon atoms is more preferable, and a single bond or an alkylene group having 1 to 3 carbon atoms is more preferable. To set the pretilt angle within about 2 degrees, a polymerizable compound having 6 to 12 carbon atoms is preferably used, and a polymerizable compound having 8 to 10 carbon atoms is more preferably used. In addition, even in a case where S$^{p1}$ and S$^{p2}$ each represent —O—(CH$_2$)$_s$—, the pretilt angle is affected, and thus, the length of S$^{p1}$ or S$^{p2}$ is preferably adjusted suitably as necessary and used, and for the purpose of increasing the pretilt angle, s is preferably 1 to 5, and more preferably 1 to 3. For the purpose of decreasing the pretilt angle, s is preferably 6 to 10. In addition, by at least one of S$^{p1}$ and S$^{p2}$ being a single bond, the asymmetry of a molecule is expressed, pretilt is induced, and thus, this is preferable.

In Formula (V), a compound in which S$^{p1}$ and Sp$^2$ are the same is also preferable, and two or more types of compounds in which S$^{p1}$ and S$^{p2}$ are the same are preferably used. In this case, two or more types of compounds in which S$^{p1}$ and S$^{p2}$ are different from each other are more preferably used.

In Formula (V), U represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms (the alkylene group in the group may be substituted with an oxygen atom as long as an oxygen atom is not adjacent to another oxygen atom), or may be substituted with a cyclic substituent, and is preferably substituted with two or more cyclic substituents.

In Formula (V), specifically, U preferably represents any one of the following Formulas (Va-1) to (Va-13). To increase an anchoring force, U is preferably biphenyl having high linearity, and preferably represents any one of Formulas (Va-1) to (Va-6). The structures represented by Formulas (Va-6) to (Va-11) are preferable from the viewpoint of high solubility in the liquid crystal, and Formulas (Va-1) to (Va-6) are preferably used in combination.

[Chem. 108]

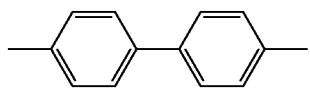
(Va-1)

-continued

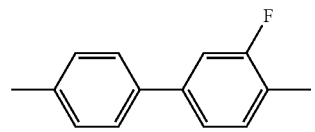
(Va-2)

[Chem. 109]

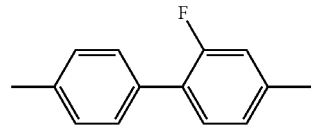
(Va-3)

[Chem. 110]

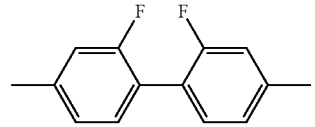
(Va-4)

[Chem. 111]

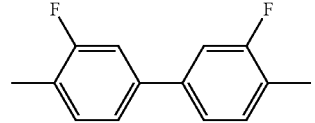
(Va-5)

[Chem. 112]

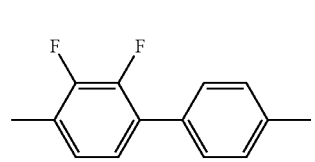
(Va-6)

[Chem. 113]

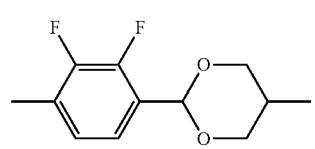
(Va-7)

[Chem. 114]

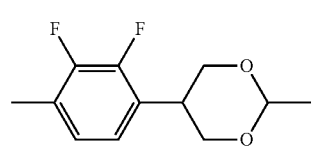
(Va-8)

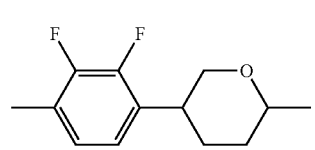
(Va-9)

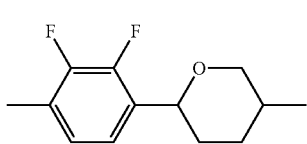
(Va-10)

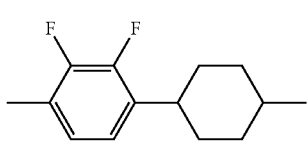
(Va-11)

[Chem. 115]

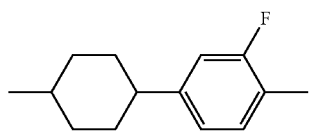
(Va-12)

[Chem. 116]

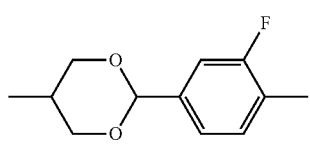
(Va-13)

[Chem. 117]

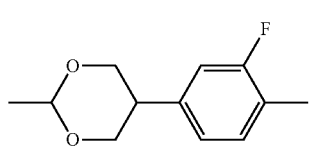
(Va-14)

[Chem. 118]

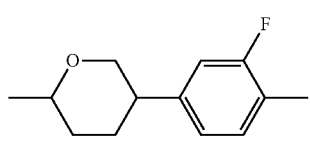
(Va-15)

[Chem. 119]

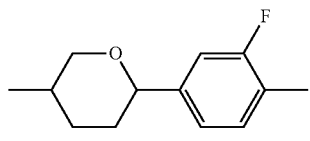
(Va-16)

[Chem. 120]

[Chem. 121]

(Va-20)

[figure]

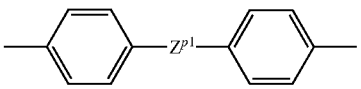
(Va-21)

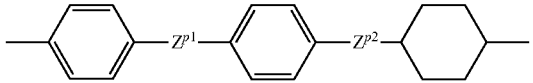
(Va-22)

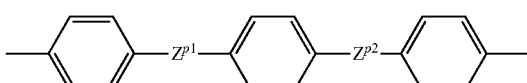
(Va-23)

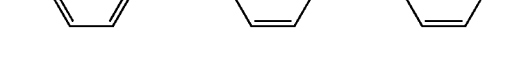

In the formula, both the terminals are bonded to $Sp^1$ or $Sp^2$, $Z^{p1}$ and $Z^{p2}$ each independently represent —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$COO—, —CH$_2$CH$_2$—OCO—, —COO—CH$_2$—, —OCO—CH$_2$—, —CH$_2$COO—, —CH$_2$OCO—, —CY$^1$=CY$^2$—, —C≡C—, or a single bond. An arbitrary hydrogen atom in all 1,4-phenylene groups in the formula may be substituted with —CH$_3$, —OCH$_3$, a fluorine atom, or a cyano group. One or two or more CH$_2$CH$_2$ groups in a cyclohexylene group may be substituted with —CH=CH—, —CF$_2$O—, or —OCF$_2$—.

In a case where U has a ring structure, at least any one of $Sp^1$ and $Sp^2$ preferably represents —O—(CH$_2$)$_s$— (in the formula, s represents an integer of 1 to 7, and an oxygen atom is bonded to an aromatic ring), and both preferably represent —O—(CH$_2$)$_s$—.

In Formula (V), k represents an integer of 1 to 5, preferably a difunctional compound in which k is 1, or preferably a trifunctional compound in which k is 2, and more preferably a difunctional compound.

The compound represented by Formula (V), specifically, is preferably a compound represented by the following Formula (Vb).

[Chem. 122]

(Vb)

[figure]

In the formula, $X^1$ and $X^2$ each independently represent a hydrogen atom or a methyl group, $Sp^1$ and $Sp^2$ each independently represent a single bond, an alkylene group having 1 to 12 carbon atoms, or —O—(CH$_2$)$_s$— (in the formula, s represents an integer of 1 to 7, and an oxygen atom is bonded to an aromatic ring), $Z^1$ represents —OCH$_2$—, —CH$_2$O—, —COO—, —OCO—, —CF$_2$—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$COO—, —CH$_2$CH$_2$—OCO—, —COO—CH$_2$—, —OCO—CH$_2$—, —CH$_2$COO—, —CH$_2$OCO—, —CY$^1$=CY$^2$— (Y$^1$ and Y$^2$ each independently represent a hydrogen atom or a fluorine atom), —C≡C—, or a single bond, C represents a 1,4-phenylene group, a trans- 1,4-cyclohexylene group, or a single bond, and an arbitrary hydrogen atom in all 1,4-phenylene groups in the formula may be substituted with fluorine atoms.

In Formula (Vb), $X^1$ and $X^2$ each independently represent a hydrogen atom or a methyl group, and a diacrylate derivative in which both $X^1$ and $X^2$ represent hydrogen atoms or a dimethacrylate derivative in which both $X^1$ and $X^2$ represent methyl groups is preferable, and a compound in which one represents a hydrogen atom and the other represents a methyl group is also preferable. In the polymerization rate of these compounds, diacrylate derivatives are the fastest, diacrylate derivatives are slow, and asymmetric compounds are therebetween. It is possible to use a more preferable aspect according to the application thereof.

In Formula (Vb), $S^{p1}$ and $S^{p2}$ each independently represent a single bond, an alkylene group having 1 to 12 carbon atoms, or —O—(CH$_2$) at least one thereof is preferably —O—(CH$_2$)$_s$—, and an aspect in which both represent —O—(CH$_2$)$_s$—'s is more preferable. In this case, s is preferably 1 to 6.

In Formula (Vb), $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$COO—, —CH$_2$CH$_2$—OCO—, —COO—CH$_2$—, —OCO—CH$_2$—, —CH$_2$—COO—, —CH$_2$—OCO—, —CY$^1$=CY$^2$— (Y$^1$ and Y$^2$ each independently represent a hydrogen atom or a fluorine atom), —C≡C—, or a single bond, preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond. In Formula (Vb), C represents a 1,4-phenylene group in which any hydrogen atom may be substituted with a fluorine atom, a trans-1,4-cyclohexylene group, or a single bond, and preferably a 1,4-phenylene group or a single bond. In the case where C represents a ring structure other than a single bond, $Z^1$ is also preferably a linking group other than a single bond, and in the case where C is a single bond, Z1 is preferably a single bond.

From the above, in Formula (Vb), C represents a single bond, and a case where the ring structure is formed by two rings is preferred, and as the polymerizable compound having a ring structure, specifically, a compound represented by any one of the following Formulas (V-1) to (V-6) is preferable, a compound represented by any one of Formulas (V-1) to (V-4) is particularly preferable, and a compound represented by Formula (V-2) is most preferable.

[Chem. 123]

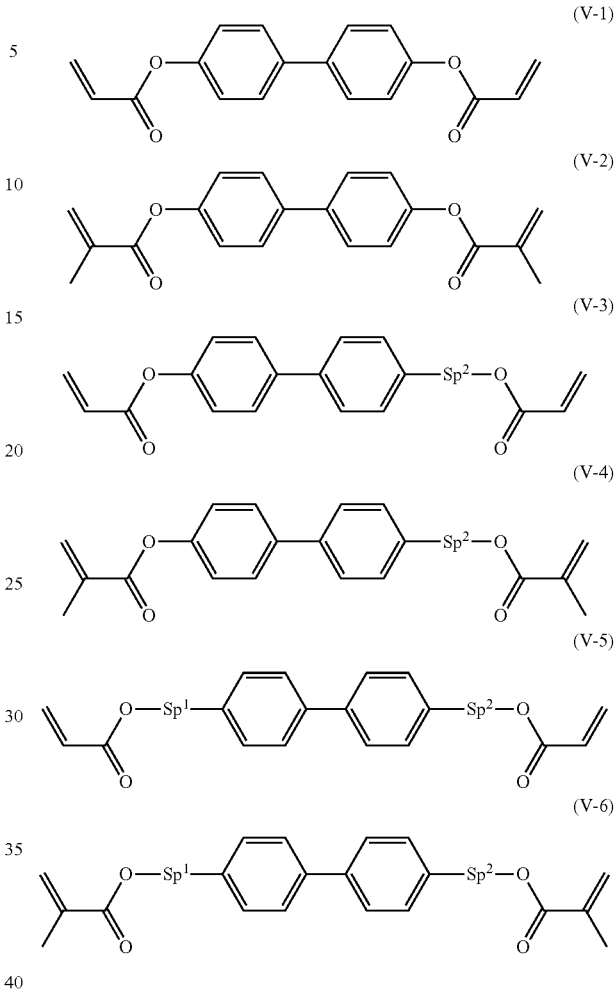

In Formula (Vb), compounds represented by the following each of Formulas (V1-1) to (V1-5) are preferable from the viewpoint of increasing the solubility in the liquid crystal composition, and a compound represented by Formula (V1-1) is particularly preferable.

A compound represented by Formula (Vb) having a three ring structure is preferably used, and compounds represented by each of Formulas (V1-6) to (V1-13) are preferable from the viewpoint of increasing the solubility in the liquid crystal composition. Furthermore, the compound represented by any one of Formulas (V-1) to (V-6) having a strong anchoring force to a liquid crystal is also preferably used in combination with the compound represented by any one of Formulas (V1-1) to (V1-5) having good compatibility with a liquid crystal composition having a weak anchoring force.

[Chem. 124]

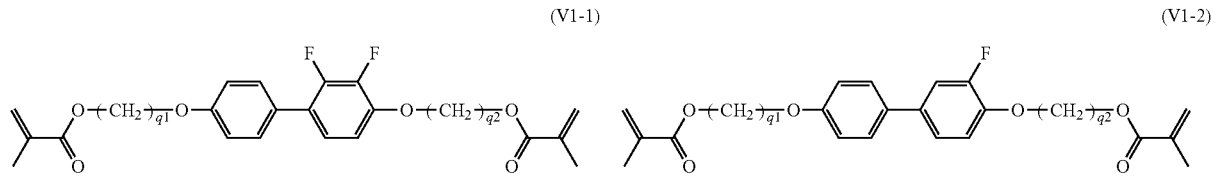

-continued
(V1-3)
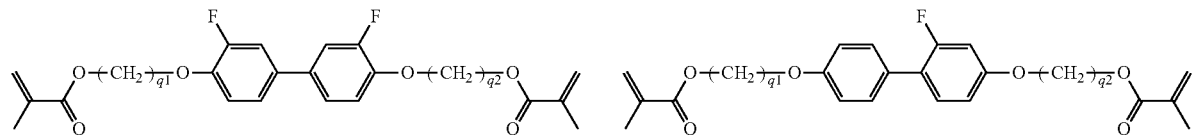
(V1-4)
(V1-5)
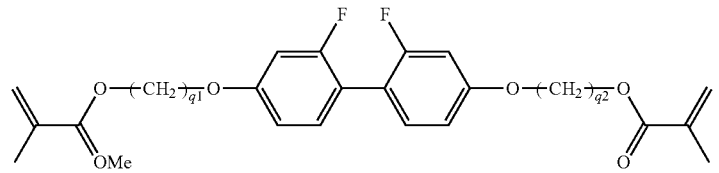
[Chem. 125]
(V1-6)
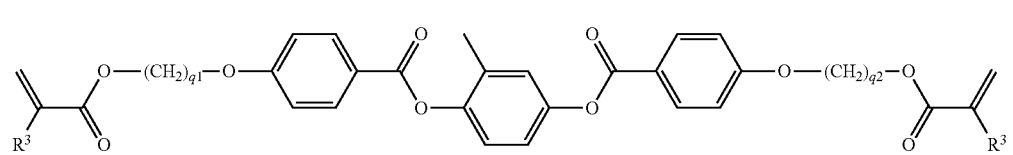
[Chem. 126]
(V1-7)
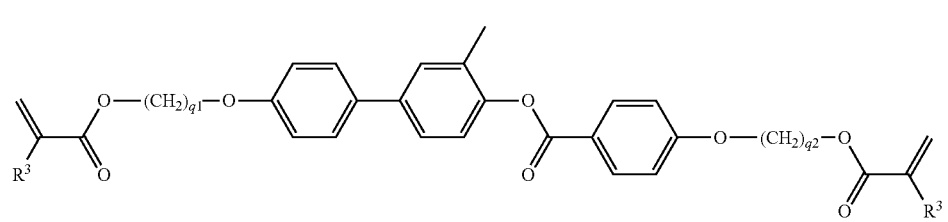
[Chem. 127]
(V1-8)
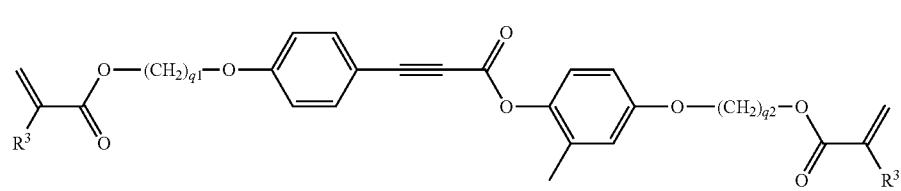
[Chem. 128]
(V1-9)
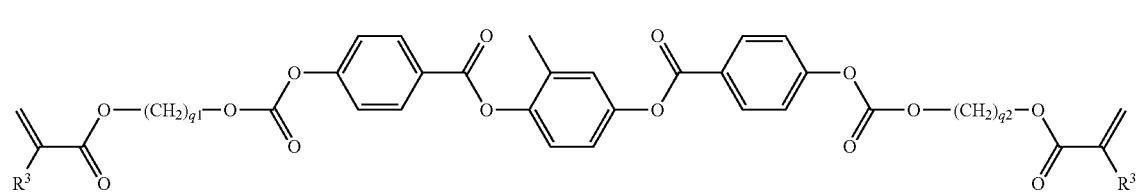
[Chem. 129]
(V1-10)
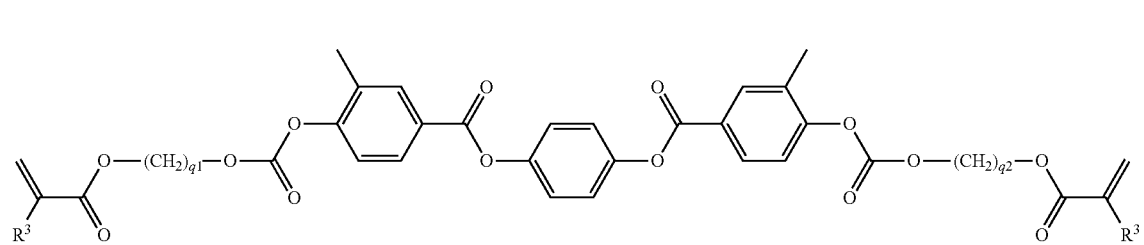

[Chem. 130]

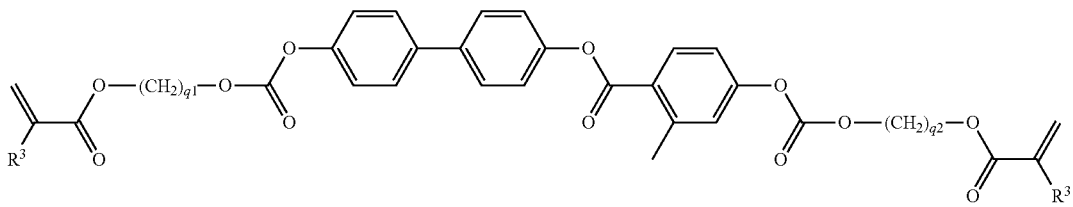

(V1-11)

[Chem. 131]

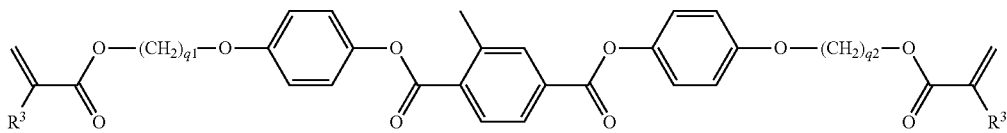

(V1-12)

[Chem. 132]

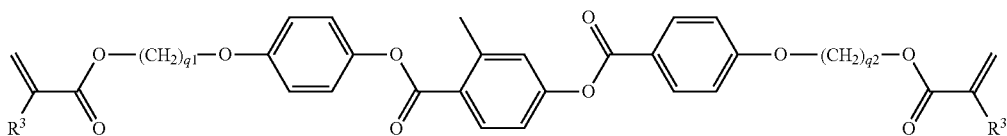

(V1-13)

In the formulas, $q_1$ and $q_2$ each independently represent an integer of 1 to 12, and $R^3$ represents a hydrogen atom or a methyl group.

As the compound represented by Formula (V), specifically, a compound represented by the following Formula (Vc) is preferable from the view-point of increasing the reaction rate, and is preferable since the pretilt angle is thermally stabilized. Furthermore, as necessary, by adjusting the number of carbon atoms of $S^{p1}$, $S^{p2}$, or $S^{p3}$, it is also possible to obtain a desired pretilt angle. The relationship between the pretilt and the number of carbon atoms shows the same tendency as a case where two functional groups are present.

[Chem. 133]

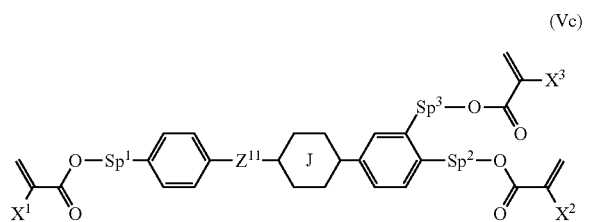

(Vc)

In the formula, $X^1$, $X^2$, and $X^3$ each independently represent a hydrogen atom or a methyl group, $Sp^1$, $Sp^2$, and $Sp^3$ each independently represent a single bond, an alkylene group having 1 to 12 carbon atoms, or —O—$(CH_2)_s$— (in the formula, s represents an integer of 2 to 7, and an oxygen atom is bonded to an aromatic ring), $Z^{11}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$COO—, —CH$_2$CH$_2$—OCO—, —COO—CH$_2$—, —OCO—CH$_2$—, —CH$_2$COO—, —CH$_2$—OCO—, —CY$^1$=CY$^2$—, —C≡C—, or a single bond, J represents a 1,4-phenylene group, a trans-1,4-cyclohexylene group, or a single bond, and an arbitrary hydrogen atom in all 1,4-phenylene groups in the formula may be substituted with a fluorine atom.

As the polymerizable compound, a compound having a photo-alignment function is also preferably used. Among these, a compound exhibiting photoisomerization is preferably used.

As the polymerizable compound having a photo-alignment function, specifically, in Formula (Vb), A compound in which $X^1$ and $X^2$ each independently represent a hydrogen atom or a methyl group, $S^{p1}$ and $S^{p2}$ each independently represent a single bond, an alkylene group having 1 to 8 carbon atoms, or —O—$(CH_2)_s$— (in the formula, s represents an integer of 1 to 7, and an oxygen atom is bonded to an aromatic ring), $Z^1$ represents —N=N—, and C represents a 1,4-phenylene group, a trans-1,4-cyclohexylene group (an arbitrary hydrogen atom may be substituted with a fluorine atom), or a single bond is preferable.

Among these, a compound represented by the following Formula (Vn) is preferable.

[Chem. 134]

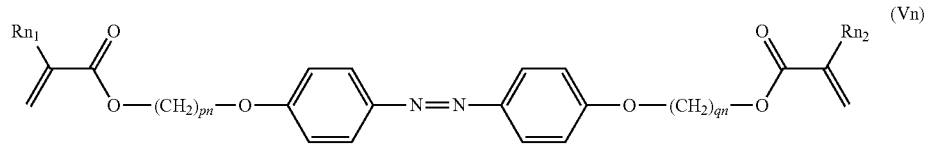

(Vn)

In the formula, Rn1 and Rn2 each independently represent a hydrogen atom or a methyl group, and in the formula, pn and qn each independently represent, an integer of 1 to 12.

[Polymerization Initiator]

As the polymerization method of the polymerizable compound used in the present invention, radical polymerization, anionic polymerization, or cationic polymerization can be used, and it is preferable to polymerize by radical polymerization, and it is more preferable to polymerize by radical polymerization by light Fries rearrangement or radical polymerization by a photopolymerization initiator.

As the radical polymerization initiator, a thermal polymerization initiator or a photopolymerization initiator can be used, and a photopolymerization initiator is preferable. Specifically, the following compounds are preferable.

Acetophenone-based compounds such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propan-1-one, 2-benzyl-2-dimethylamino-1-(4-morpholinophenyl)-butanone, 4'-phenoxyacetophenone, and 4'-ethoxyacetophenone;

benzoin-based compounds such as benzoin, benzoin isopropyl ether, benzoin isobutyl ether, benzoin methyl ether, and benzoin ethyl ether;

acylphosphine oxide-based compounds such as 2,4,6-trimethylbenzoyl diphenylphosphine oxide;

benzyl, and methylphenyl glyoxy ester-based compounds;

benzophenone-based compounds such as benzophenone, methyl o-benzoylbenzoate, 4-phenyl benzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl) benzophenone, 3,3'-dimethyl-4-methoxybenzophenone, 2,5-dimethyl benzophenone, and 3,4-dimethyl benzophenone;

thioxanthone-based compounds such as 2-isopropyl thioxanthone, 2,4-dimethyl thioxanthone, 2,4-diethyl thioxanthone, and 2,4-dichlorothioxanthone;

aminobenzophenone-based compounds such as Michler's ketone and 4,4'-diethylaminobenzophenone;

10-butyl-2-chloroacridone, 2-ethylanthraquinone, 9,10-phenanthrenequinone, and camphorquinone are preferable. Among these, benzyl dimethyl ketal is most preferable.

In addition, in consideration of the lifetime of radicals or reactivity, a plurality of polymerization initiators is also preferable used.

Furthermore, it is also possible to polymerize by including a polymerizable liquid crystal compound having a conjugated structure which absorbs ultraviolet rays as radical polymerization by light Fries rearrangement, without using the above-described polymerization initiator. For example, by using a polymerizable liquid crystal compound having a conjugated structure represented by any one of Formulas (X1c-1) to (X1c-4) instead of a polymerization initiator, the voltage holding ratio of the LCD device is not reduced, and thus, this is preferable. In addition, for the purpose of accelerating polymerization, these are also preferably used in combination with a polymerization initiator.

[Chem. 135]

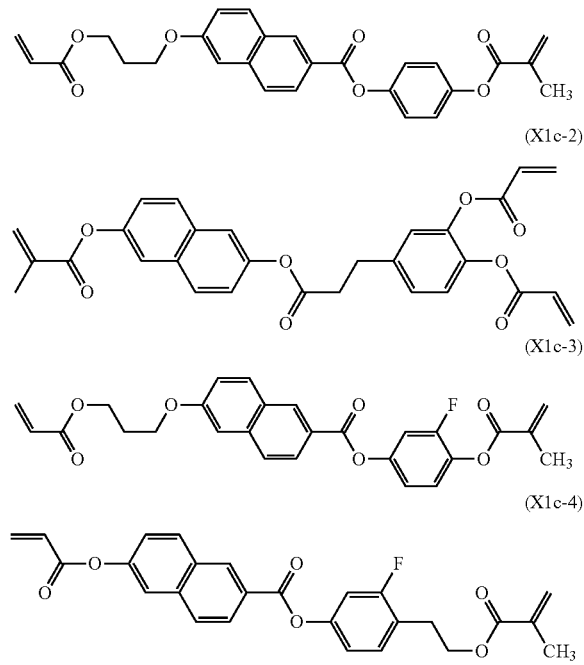

Polymerizable Liquid Crystal Composition

The polymerizable liquid crystal composition used in the present invention preferably contains a liquid crystal composition exemplified above and a polymerizable compound of 1% by mass to 10% by mass exemplified above, the lower limit value of the content of the polymerizable compound is preferably 2% by mass or greater, and the upper limit value is preferably less than 9% by mass, more preferably less than 7% by mass, more preferably less than 5% by mass, and more preferably less than 4% by mass. In addition, the polymerizable liquid crystal composition used in the present invention preferably contains a liquid crystal composition exemplified above and a polymerizable compound of 10% by mass or greater and less than 40% by mass exemplified above, the lower limit value of the content of the polymerizable compound in this case is preferably 9% by mass or greater and more preferably 10% by mass or greater, and the upper limit value is preferably less than 30% by mass, more preferably less than 25% by mass, more preferably less than 20% by mass, and more preferably less than 15% by mass. Furthermore, the polymerizable liquid crystal composition used in the present invention preferably contains a liquid crystal composition exemplified above and a polymerizable compound of 5% by mass or greater and less than 15% by mass exemplified above, and more preferably contains a polymerizable compound of 7% by mass or greater and less than 12% by mass. By containing a polymerizable compound of 1% by mass or greater and less than 40% by mass in the polymerizable liquid crystal composition used in the present invention, a polymer network having uniaxial optical anisotropy, uniaxial refractive index anisotropy, or an easy alignment axial direction is preferably formed, and the optical axis or the easy alignment axial direction of the polymer network and the easy alignment axial direction of a low molecular weight liquid crystal are more preferably formed so as to substantially coincide.

A polymer binder which forms a polymer thin film, by assembling of a plurality of polymer networks is also included in the polymer network. The polymer binder has refractive index anisotropy exhibiting uniaxial alignment properties, a low molecular weight, liquid crystal is dispersed in the thin film, and the uniaxial optical axis of the thin film and the optical axis of the low molecular weight liquid crystal are aligned substantially in the same direction. Thus, unlike the polymer dispersing type liquid crystal or the polymer network type liquid crystal which is a light, scattering type liquid crystal, light, scattering does not occur, high contrast display is obtained in the LCD device using a polarization, and the responsiveness of the LCD device is improved by shortening the fall time. Furthermore, the polymerizable liquid crystal composition used in the present invention is a compound with which a polymer network layer is formed on the entire LCD devices, and is different from PSA (Polymer Sustained Alignment) type liquid crystal composition which induces pretilt by forming a polymer thin film layer on an LCD device substrate.

It is preferable to adjust Tg, as necessary, by including at least two or more types of polymerizable compounds having different Tg's in any concentration. The polymerizable compound which is a precursor of a polymer having a high Tg is a polymerizable compound having a molecular structure having a high crosslink density, and is preferably a polymerizable compound having two or more functional groups. The precursor of a polymer having a low Tg has one functional group or two or more functional groups, and preferably has a structure in which the molecular length is made longer by having an alkylene group or the like as a spacer between the functional groups. In the case of adjusting Tg of the polymer network for the purpose of improving the thermal stability or the impact resistance of the polymer network, the ratio of the polyfunctional monomer and the monofunctional monomer is preferably suitably adjusted. Tg is associated with thermal mobility at a molecular level in the main chain and the side chains of the polymer network, and also affects electrooptical characteristics. For example, if the crosslink density is increased, the molecular mobility of the main chain is decreased, and the anchoring force to a low molecular weight liquid crystal is increased, and if the drive voltage is increased, the fall time is also shortened. On the other hand, if the crosslink density is decreased such that Tg is lowered, the thermal motion of the main chain of a polymer is increased, the anchoring force to a low molecular weight liquid crystal is decreased, the drive voltage is decreased, and the fall time tends to be longer. The anchoring force in the polymer network interface is also affected by the molecular mobility of the polymer side chains in addition to the above-described Tg, and by using a polymerizable compound having a polyvalent branched alkylene group or a polyvalent alkyl group, the anchoring force in the polymer interface is decreased. In addition, the polymerizable compound having a polyvalent branched alkylene group or a polyvalent, alkyl group is effective for inducing a pretilt angle, and acts in the direction of reducing the anchoring force of the polar angle direction.

By polymerizing a polymerizable compound in a polymerizable liquid crystal composition in a state in which the polymerizable liquid crystal composition exhibits a liquid crystal phase, the molecular weight of the polymerizable compound is increased, and thus, the liquid crystal composition and the polymerizable compound are phase-separated. The form to be separated into two phases varies highly depending on the type of liquid crystal compound contained or the type of polymerizable compound. A phase separation structure may be formed by binodal decomposition in which a polymerizable compound phase in the liquid crystal phase occurs as countless island-shaped nuclei and grows, and a phase separation structure may be formed by spinodal decomposition in which phase separation occurs from fluctuation in the concentration of a liquid crystal phase and a polymerizable compound phase. To form a polymer network by binodal decomposition, the content of a low molecular weight liquid crystal is preferably at least 85% by mass or greater, and it is preferable that countless nuclei of a polymerizable compound having a size shorter than the wavelength of visible light occur by using a compound having a high reaction rate of a polymerizable compound, and as a result, a nanometer size phase separation structure is formed. As a result, if polymerization in the polymerizable compound phase advances, a polymer network having a shorter void gap than the wavelength of visible light depending on the phase separation structure is formed, and if the size of the voids of the polymer network which is due to phase separation of the low molecular weight liquid crystal phase is smaller than the wavelength of visible light, there is no light scattering, the contrast is high, the influence of the anchoring force of the polymer network becomes strong, the fall time is shortened, and an LCD device having a high speed response is obtained, and thus this is particularly preferable. Nucleation of the polymerizable compound phase in binodal decomposition is affected by changes in compatibility due to the type of compounds or the combination thereof and by parameters such as a reaction rate and temperature, and thus, the nucleation is preferably adjusted suitably as necessary. In the case of ultraviolet ray polymerization, the reaction rate may be adjusted by suitably adjusting ultraviolet ray exposure conditions so as to accelerate reactivity by the functional group of the polymerizable compound, the type and the content of the photoinitiator, or an ultraviolet ray exposure intensity, and an ultraviolet ray exposure intensity of at least 20 $mW/cm^2$ or greater is preferable.

In a case where the low molecular weight liquid crystal is 85% by mass or greater, a polymer network in a phase separation structure by spinodal decomposition is preferably formed, and since in the spinodal decomposition, a phase separation microstructure due to fluctuation in the concentration of two phases having periodicity can be obtained, a uniform void gap smaller than visible light wavelength is easily formed, and thus this is preferable. It is preferable to form a polymer network. In a case where the ratio of the polymerizable compound is less than 15% by mass, it is preferable to form a phase separation structure by binodal decomposition, and in a case where the ratio of the polymerizable compound is 15% by mass or greater, it is preferable to form a phase separation structure by spinodal decomposition. If the content of the polymerizable compound increases, a phase transition temperature at which two-phase separation of a low molecular weight liquid crystal phase and a polymerizable compound phase occurs is present due to the influence of temperature. At a temperature higher than the two-phase separation transition temperature, isotropic phase is exhibited, and at a temperature lower than the two-phase separation transition temperature, separation occurs, and a uniform phase separation structure is not obtained, and thus this is not preferable. In a case where two-phase separation occurs due to temperature, it is preferable to form a phase separation structure at a temperature higher than two-phase separation temperature. In either case described above, a polymer network is formed while retaining the same alignment state as the alignment state of the low molecular weight liquid crystal. The formed polymer network exhibits optical anisotropy so as to follow the alignment of the low molecular weight liquid crystal.

As a form of the liquid crystal layer in the polymer network, a structure in which the liquid crystal composition forms a continuous layer in the three-dimensional network structure of the polymer, a structure in which droplets of the liquid crystal composition are dispersed in the polymer, a structure in which the above-described structures are mixed, and a structure in which a polymer network layer is present from both the substrate surfaces and only the liquid crystal layer is present in the vicinity of the center of the counter substrate are exemplified. In either structure, it is preferable that the pretilt angle of 0° to 90° is induced to the LCD device substrate interface due to the action of the polymer network. The polymer network to be formed preferably has a function of aligning a coexisting low molecular weight liquid crystal to the alignment direction shown by the alignment film, of the liquid crystal cell, and also preferably has a function of pretilting a low molecular weight liquid crystal to the polymer interface direction. Introducing a polymerizable compound pretilting a low molecular weight, liquid crystal to the polymer interface is useful for lowering the drive voltage of the LCD device, and thus, this is preferable. In addition, a polymerizable compound may have refractive index anisotropy, and for a function of aligning a liquid crystal in the alignment direction, a polymerizable compound having a mesogenic group is preferably used.

A polymerizable compound having a polyvalent alkyl group not having a mesogen group inducing vertical alignment with respect, to a vertical alignment cell of a VA mode or a polyvalent, branched alkylene group may be used, and the polymerizable compound may be preferably used in combination with a polymerizable compound having a mesogen group. In a case where a polymer network is formed in a vertical alignment cell by phase separation polymerization using the above-described polymerizable liquid crystal composition, the fibrous or columnar polymer network is preferably formed in substantially the same direction as the vertical direction of the low molecular weight liquid crystal with respect to the liquid crystal cell substrate. In a case where a vertical alignment film in which a pretilt angle is induced by performing a rubbing treatment such that the liquid crystal induces a tilt alignment in a vertical alignment film on the cell substrate surface is used, the fibrous or columnar polymer network is preferably formed to be tiled in the same direction as the low molecular weight liquid crystal which is aligned with pretilt.

Furthermore, in the method of inducing a pretilt angle while applying a voltage, if polymerization is performed while applying a voltage within a voltage range of from about 0.9 V lower to about 2 V higher than the threshold voltage of the polymerizable liquid crystal composition, the fibrous or columnar polymer network is formed to be tiled so as to induce a desired pretilt angle, preferably, a pretilt angle of 0.1° to 30°, and thus, this is more preferable. The fibrous or columnar polymer network formed by any method is characterized by connecting two cell substrates. Thus, the thermal stability of the pretilt angle is improved, and as a result, the reliability of the LCD device is enhanced.

In addition, as a method of inducing a pretilt angle of a low molecular weight liquid crystal by forming a fibrous or columnar polymer network by aligning with a tilt, a method of using a difunctional acrylate in which the number of carbon atoms of the alkylene group between a functional group and a mesogen group is 6 or more and an induced angle of the pretilt angle is small, and a difunctional acrylate in which the number of carbon atoms of the alkylene group between a functional group and a mesogen group is 5 or more and an induced angle of the pretilt angle is large in combination is exemplified. It is possible to induce a desired pretilt angle by adjusting the blending ratio of these compounds.

A method of forming a fibrous or columnar polymer network by adding a polymerizable compound having a reversible photo-alignment function in an amount of at least 0.01% to 1% is exemplified. In this case, the same rod-shaped form as a low molecular liquid crystal in a trans-isomer is formed and this affects the alignment state of the low molecular weight liquid crystal. The trans-isomer contained in the polymerizable liquid crystal composition of the present invention, if exposure is performed using ultraviolet rays as parallel light from the cell top surface, the moving direction of ultraviolet rays and the molecular long axis direction of the rod-shaped molecule are set so as to be parallel, and the low molecular weight liquid crystal is also aligned to be set in the molecular long axis direction of the trans-isomer at the same time. If exposure is performed with a tilt with respect to the cell using ultraviolet rays, the molecular long axis of the trans-isomer faces toward the oblique direction, and the liquid crystal is aligned in the oblique direction of ultraviolet rays. That is, a photo-alignment function inducing a pretilt angle is exhibited. If the polymerizable compound is crosslinked at this stage, the induced pretilt angle is fixed by a fibrous or columnar polymer network formed by polymerization phase separation.

Accordingly, as a method of inducing a pretilt angle important in the VA mode, by using a method of performing polymerization phase separation while applying a voltage, a method of performing polymerization phase separation by multiple addition of polymerizable compounds having different induced pretilt angles, or a method of performing polymerization phase separation by aligning a low molecular weight liquid crystal and a polymerizable liquid crystal compound in the moving direction of ultraviolet rays using a photo-alignment function exhibited by the polymerizable compound having a reversible photo-alignment function, as necessary, it is possible to produce a liquid crystal device of the present invention.

A polymerizable compound having a photo-alignment function is preferably a photoisomerisable compound to be a trans-isomer by absorbing ultraviolet rays, and the reaction rate of a polymerizable compound having a photo-alignment function is preferably slower than the reaction rate of a polymerizable compound other than the polymerizable compound having a photo-alignment function. If exposure is performed using UV, the polymerizable compound having a photo-alignment function immediately become a trans-isomer, and if being aligned in the moving direction of light, the liquid crystal compound of the circumference including polymerizability is also aligned in the same direction. At this time, by progress of polymerization phase separation, the low molecular weight liquid crystal long axis direction and the easy alignment axial direction of a polymer network are set in the same direction as the easy alignment axis of the polymerizable compound having a photo-alignment function, and a pretilt angle is induced in the moving direction of UV light.

Furthermore, in the parallel alignment cell such as an IPS mode or an FFS mode, by phase separation polymerization using a polymerizable liquid crystal composition, the low molecular weight liquid crystal is parallel-aligned with respect to the alignment direction of the alignment film which the fibrous or columnar polymer network has on the liquid crystal cell substrate surface, but the refractive index anisotropy of the formed fibrous or columnar polymer network or the easy alignment axial direction and the alignment direction of the low molecular weight liquid crystal are preferably formed in substantially the same direction. Furthermore, the fibrous or columnar polymer network is more preferably present in substantially the entire cells except for voids in which low molecular liquid crystals are dispersed.

For the purpose of inducing a pretilt angle with respect to the polymer interface direction, a polymerizable compound having a polyvalent alkyl group not having a mesogen group or a polyvalent alkylene group and a polymerizable compound having a mesogen group are preferably used.

Furthermore, the electrooptical characteristics are affected by the surface area of the polymer network interface and the void gap of the polymer network, but it is important not to cause light scattering, and it is preferable that the average void gap is made to be smaller than the wavelength of visible light. For example, to reduce the void gap by expanding the surface area of the interface, a method of increasing the monomer composition content is used. Thus, by the void gap becoming fine by changes in polymerization phase separation structure, a polymer network is formed such that the surface area of the interface is increased, and the drive voltage becomes lower and the fall time becomes shorter. The polymerization phase separation structure is also influenced by the polymerization temperature.

In the present invention, it is preferable that a phase separation structure having fine voids is obtained by performing polymerization at an increased phase separation speed. The phase separation speed is significantly affected by the compatibility and the polymerization rate between a low molecular weight liquid crystal and a polymerizable compound. Since the phase separation speed significantly depends on the molecular structure or the content of the compound, it is preferable to use the compound after suitably adjusting the composition. In a case where the compatibility is high, a polymerizable compound having a high polymerization rate is preferably used, and in the case of ultraviolet ray polymerization, the intensity of ultraviolet rays is preferably high. It is also preferable to increase the content of the polymerizable compound in the polymerizable liquid crystal composition.

In a case where the compatibility is low, the phase separation speed is sufficiently fast, and thus, it is preferable in production of an LCD device of the present invention. As a method of reducing compatibility, a method of polymerizing at low temperature is exemplified. If the temperature is lowered, the degree of alignment order of a liquid crystal is increased, and the compatibility between a liquid crystal and a monomer is lowered, and thus, it is possible to increase the polymerization phase separation speed. As another method, a method of polymerizing a polymerizable liquid crystal composition at a temperature at which the supercooled state is exhibited is also exemplified. In this case, since the temperature may be slightly lower than the melting point of the polymerizable liquid crystal composition, if is possible to perform fast phase separation by only lowering a few degrees of the temperature. Thus, a polymerization phase separation structure corresponding to the case where several tens of percent of a monomer composition is added to the liquid crystal, that is, a polymer network structure in which the surface area of the polymer network interface is large and the void gap is fine, which is a structure that acts on the fall time to be shortened is formed. Accordingly, the polymerizable liquid crystal composition of the present invention is preferably suitably adjusted in consideration of an alignment function, a crosslinking density, an anchoring force, and a void gap, such that the fall time is shortened.

In the liquid crystal device using the polymerizable liquid crystal composition of the present invention, to obtain a display having high contrast, it is necessary that light scattering does not occur, but in consideration of the above-described method, it is important to form a suitable polymer network layer structure by controlling the phase separation structure such that desired voltage-transmittance characteristics and switching characteristics are obtained. The polymer network layer structure will be specifically described below.

<Polymer Network Layer Continuous Structure>

The polymer network layer continuous structure is a structure in which a polymer network layer is formed on the entire surface of an LCD device in a liquid crystal phase, and the liquid crystal phase is continuously present, it is preferable that the easy alignment axis or the uniaxial optical axis of the polymer network is in substantially the same direction as the easy alignment axis of a low molecular weight liquid crystal, it is preferable that a polymer network is formed so as to induce a pretilt angle of the low molecular weight liquid crystal, and by reducing the average void gap of the polymer network to be smaller than a wavelength of visible light, that is, at least 450 nm, light scattering does not occur, and thus, this is preferable. Furthermore, to make the fall time of the response shorter than the response time of the low molecular weight liquid crystal alone by the interaction effect (anchoring force) between the polymer network and the low molecular weight liquid crystal, it is preferably within a range of 50 nm to 450 nm. For providing a fall time comparable to that of a general one having a thin thickness in a case where the cell thickness is large while reducing the influence of the cell thickness of a liquid crystal, it is preferable that at least, the lower limit of the average void gap is within a range in the vicinity of 200 nm and the upper limit is within a range in the vicinity of 450 nm. If reducing the average void gap, a problem in which the drive voltage increases occurs, and to shorten the fall response time by preventing an increase in the drive voltage to 25 V or less, a range of the vicinity of 250 nm to 450 nm is preferable, and the fall response time can be improved to be within a range of about 5 msec to about 1 msec, and thus, this is preferable.

In addition, to control the drive voltage to be increased within about 5 V, it is preferable that the average void gap is within a range of the vicinity of 300 nm to 450 nm. Furthermore, by controlling the average void gap of the polymer network, it is possible to make the fall response time be high speed response of 1 msec or less. In some cases, the drive voltage increases by 30 V or greater, and the average void gap may be between the vicinity of 50 nm to the vicinity of 250 nm, and to make the response time be 0.5 msec or less, the average void gap is preferably between the vicinity of 50 nm to the vicinity of 200 nm. The average diameter of the polymer network is contrary to the average void gap, and is preferably from 20 nm to 700 nm. As the content of the polymerizable compound is increased, the average diameter tends to be increased. If increasing the polymerisation phase separation speed by increasing the reactivity, the density of the polymer network is increased, and as a result, the average diameter of the polymer network is reduced, and thus, the phase separation conditions may be adjusted as necessary. In a case where the content of the polymerizable compound is 10% or less, the average diameter is preferably 20 nm to 160 nm, and in a case where the average void gap is from 200 nm to 450 nm, the average diameter is preferably from 40 to 160 nm. In a case where the content of the polymerizable compound is greater than 10%, the average diameter is preferably from 50 nm to 700 nm, and more preferably from 50 nm to 400 nm.

<Polymer Network Layer Discontinuous Structure>

In contrast to the structure in which a polymer network layer is formed on the entire surface of an LCD device, and the liquid crystal phase is continuously present, if the amount required to cover the entire cell with the polymer network layer is insufficient by reduction of the polymerizable compound content, a polymer network layer is discontinuously formed. If increasing the polarity of the substrate surface such as a polyimide alignment, film, the polymerizable compound is likely to gather in the vicinity of the liquid crystal cell substrate interface, a polymer network layer is formed so as to be attached to the substrate interface by growth of the polymer network from the substrate surface, and a polymer network layer, a liquid crystal layer, a polymer network layer, a counter substrate from the cell substrate surface are laminated in this order. A laminated structure of polymer network layer/liquid crystal layer/polymer network layer is shown, and if a polymer layer of at least a cell thickness of 0.5% or greater, preferably 1% or greater, more preferably 5% or greater with respect to the cell sectional direction is formed, by the action of the anchoring force of the polymer network and the low molecular weight liquid crystal, an effect in which the fall time is shortened is expressed, which is a preferable tendency. Here, in a case where, if increasing the cell thickness, the fall time becomes longer since the influence of the cell thickness increases, the thickness of the polymer network layer may be increased as necessary. In the structure of the polymer network in the polymer network layer, the low molecular weight liquid crystal and the easy alignment axis or the uniaxial optical axis may be aligned in substantially the same direction, and a low molecular weight liquid crystal may be formed so as to induce a pretilt angle. The average void gap is preferably from 90 nm to 450 nm.

For example, in a case where the polymerizable compound content is 1% by mass to 6% by mass, a difunctional monomer having a mesogen group having high anchoring force is preferably used, a difunctional monomer having a structure in which the distance between functional groups is short and having a fast polymerization rate is preferably used, and a polymerization phase separation structure is preferably formed at a low temperature of 0° C. or lower. In a case where the polymerizable compound content is 6% by mass to less than 10% by mass, the difunctional monomer and the monofunctional monomer having low anchoring force are preferably combined, and a polymerization phase separation structure is preferably formed within a range of 25° C. to −20° C., as necessary. Furthermore, if the melting point is room temperature or higher and the temperature is about 5° C. lower than the melting point, the same effect as in low temperature polymerization is obtained, and thus, this is preferable. In a case where the polymerizable compound content is 10% by mass to 40% by mass, the influence of a polymer binder or a polymer network significantly affects the alignment of the low molecular weight liquid crystal or the drive voltage and increases the drive voltage, and thus, a polymerizable compound having an alignment, function of the low molecular weight liquid crystal and having a mesogen group having relatively weak anchoring force is preferably used. For example, in a polymerizable compound having a mesogen group having weak anchoring force, increasing the number of carbon atoms of the alkylene group between a functional group and a mesogen group is effective, and the number of carbon atoms is preferably 5 to 10. If the polymerizable compound is greater than 30% by mass, a state in which liquid crystal droplets are dispersed in a polymer binder is formed in some cases, and even in this case, the polymer binder has refractive index anisotropy, and the alignment direction of the alignment film of the substrate surface and the optical axis direction of the polymer binder are preferably aligned.

As the concentration of the polymerizable compound in the polymerizable liquid crystal composition is increased, the anchoring force between the liquid crystal composition and the polymer interface is increased, and τd becomes faster. On the other hand, as the anchoring force between the liquid crystal composition and the polymer interface is increased, τr becomes slower. To make the sum of τd and τr be less than 1.5 ms, the concentration of the polymerizable compound in the polymerizable liquid crystal composition is 1% by mass or greater and less than 40% by mass, preferably 2% by mass to 15% by mass, and more preferably 3% by mass to 8% by mass.

In a case where a TFT drive LCD device is used, it is necessary to improve the reliability of prevention of flicker, an afterimage due to baking, or the like, and the voltage holding ratio becomes an important characteristic. The cause of reducing the voltage holding ratio is considered to be ionic impurities contained in the polymerizable liquid crystal composition. In particular, mobile ions strongly affect the voltage holding ratio. Therefore, the mobile ions are preferably removed by performing a purification treatment such that a specific resistance of at least $10^{14}$ Ω·cm or greater is obtained. If forming a polymer network by radical polymerization, the voltage holding ratio is decreased by the ionic impurities generated from the photopolymerization initiator or the like in some cases, and thus, if is preferable to select a polymerization initiator from which the generation amount of organic acids or low molecular weight by-products is small.

[LCD Device]

This LCD device of the present invention contains a polymer or a copolymer in a liquid crystal composition, and has the same structure as the LCD device in the related art, except that the content of the polymer or the copolymer is 1% by mass or greater and less than 40% by mass of the total mass of the liquid crystal composition and the polymer or copolymer. That is, the LCD device according to the present invention has a structure in which a liquid crystal layer is sandwiched between two transparent substrates, at least one of which has an electrode. The LCD device of the present invention preferably has an alignment layer for aligning the liquid crystal composition on at least one transparent substrate. By applying a voltage to the alignment layer provided on the substrate and the electrode provided on the substrate, the alignment of the liquid crystal molecules is controlled. The polymer network, or the polymer binder has uniaxial refractive index anisotropy or the easy alignment axial direction, and the optical axis direction or the easy alignment axial direction of the polymer network or the polymer binder and the easy alignment axial direction of a low molecular weight liquid crystal are preferably the same direction.

In this respect, the liquid crystal of the present invention is different from the light scattering type polymer network liquid crystal or the polymer dispersing type liquid crystal not having uniaxial refractive index anisotropy or the easy alignment axial direction. Furthermore, the easy alignment axial direction of the alignment layer and the easy alignment axial direction of the polymer network or the polymer binder are preferably the same. By providing a polarizing plate and a phase difference film, display is performed by using this alignment state. The LCD device can be applied to various operation modes such as TN, STN, ECB, VA, VA-TN, IPS, FFS, a π cell, OCB, and cholesteric liquid crystals. Among these, VA, IPS, FFS, VA-TN, TN, or ECB is particularly preferable. Moreover, the LCD device of the present invention is different from a PSA (Polymer Sustained Alignment) type LCD device having a polymer or a copolymer on the alignment film, from the viewpoint of containing a polymer or a copolymer in the liquid crystal composition.

The distance d between substrates of the LCD device of the present invention is preferably within a range of 2 to 5 µm, and more preferably 3.5 µm or less. In general, the birefringence is adjusted such that the product of the birefringence of the liquid crystal composition and the cell thickness is in the vicinity of 0.275, but since in the polymerizable liquid crystal composition of the present invention, the polymer network is formed after polymerization phase separation, the birefringence of the LCD device when an electric field is applied is reduced by the action of the anchoring force of the polymer network and the optical properties of the polymer network, and thus, the product of the birefringence (Δn) of contained in the liquid crystal composition, the polymerizable composition, or the polymerizable liquid crystal composition and the distance (d) between the substrates is particularly preferably from 0.3 to 0.4 µm in a case where the drive voltage is increased within about 5 V by the polymer network formation, more preferably from 0.30 to 0.35 µm in a case where the drive voltage is increased within about 3 V, and particularly preferably within the range of 0.29 to 0.33 urn in a case where the drive voltage is increased within 1 V. By the distance (d) between the substrates of the LCD device, and the product of the birefringence (Δn) of the liquid crystal composition and the distance (d) between the substrate being within the above range, respectively, the transmittance is as high as that in a low molecular liquid crystal, and display having preferable color reproduction in high speed response can be obtained. The birefringence of the liquid crystal composition used in the polymerizable liquid crystal composition is preferably made to be 1 to 1.9 times with respect to the product of the cell thickness (d) and the birefringence (Δn) of 0.275.

The drive voltage of the LCD device of the present invention is not determined by only the dielectric anisotropy or the elastic constant of the liquid crystal composition, and significantly influenced by the anchoring force acting between the liquid crystal composition and the polymer interface.

For example, as description regarding the drive voltage of a polymer dispersing type LCD device, the following relationship is shown in JP-A-6-222320.

$$Vth \propto \frac{d}{\langle r \rangle + {}^1Kii/A} \left( \frac{{}^2Kii}{\Delta\varepsilon} \right)^{\frac{1}{2}} \quad \text{[Expression 1]}$$

Vth represents a threshold voltage, 1Kii and 2Kii each represent an elastic constant, i represents 1, 2, or 3, Δε represents dielectric anisotropy, <r> represents an average void gap of a transparent polymer material interface, A represents an anchoring force of a transparent polymer material with respect to the liquid crystal composition, and a represents a distance between substrates having a transparent electrode.

According to this, the drive voltage of a light scattering type LCD device is determined by the average void gap of a transparent polymer material interface, the distance between substrates, the elastic constant and the dielectric anisotropy of a liquid crystal composition, and anchoring energy between a liquid crystal composition and a transparent polymer material.

Among these, parameters that can be controlled in the LCD device of the present invention are liquid crystal properties and the anchoring force between polymers. Since the anchoring force significantly depends on the molecular structure of a polymer and the molecular structure of a low molecular weight liquid crystal, if selecting a polymerizable compound having a strong anchoring force, it is possible to increase the response time to be 1.5 ms or less, but at the same time, the drive voltage is increased to 30 V or greater, and thus, it is preferable to adjust the composition by selecting an suitable liquid crystal compound and a suitable polymerizable compound such that the drive voltage becomes 30 V or less and the response speed becomes 1.5 ms or less.

It is preferable to adjust the composition such that the balance of the drive voltage and the response speed can be taken by suitably blending a polymer precursor having a strong anchoring force and a polymer precursor having a weak anchoring force. On the other hand, as the physical properties of the liquid crystal composition required for lowering the drive voltage, the dielectric anisotropy is particularly preferably 6 or greater in a P-type liquid crystal, and −3 or less in a N-type liquid crystal. The birefringence is preferably 0.09 or greater. Furthermore, it is more preferable that light scattering is eliminated by making the birefringence of a liquid crystal composition and the refractive index of a fibrous or columnar polymer network be as similar as possible. Here, since the retardation of the liquid crystal device is affected by the concentration of a polymer precursor, the liquid crystal composition is preferably used after increasing or decreasing the birefringence of the liquid crystal composition such that necessary retardation is obtained suitably.

The LCD device of the present invention is preferably obtained by forming a polymer network having refractive index anisotropy or an easy alignment axial direction in the liquid crystal composition by polymerizing a polymerizable compound by irradiation with energy rays while maintaining the temperature of the liquid crystal composition at −50° C. to 30° C. The upper limit of the polymerization temperature is 30° C., and preferably 20° C. to −10° C. As described below in examples, the present inventor found that τd becomes faster by low temperature polymerization and room temperature polymerization depending on the polymerizable compound composition. It is thought that the reason for this is that 1) polymerization is performed in a state in which the degree of alignment of the liquid crystal molecules is increased by low temperature, 2) phase separation becomes easy by decrease of the compatibility between a polymer polymerized by low temperature polymerization and a liquid crystal composition, and the polymerization phase separation speed becomes faster, and thus, the void gaps of the polymer network become fine, and 3) a refractive index anisotropy polymer network as, even in the case of using a polymerizable compound having a relatively low anchoring force, the influence of anchoring force becomes stronger since the void gaps are fine is formed.

Furthermore, the LCD device of the present invention is preferably formed such that polymer network with uniaxial refractive index anisotropy or an easy alignment axial direction or the optical axis direction or the easy alignment axial direction of a polymer binder forms a pretilt angle with respect to the transparent substrate, and is preferably a configuration in which by tilting with respect to the substrate surface by controlling the alignment of a low molecular weight liquid crystal by adjusting the intensity of the electric field, and by irradiation with energy rays while applying a voltage to the liquid crystal layer described above, the polymerizable compound is polymerized, and as a result, a polymer having refractive index anisotropy or an easy alignment axial direction in the liquid crystal composition is obtained. In the VA mode of vertical alignment, by polymerizing by applying a voltage such that the pretilt angle is within 20 degrees with respect to the substrate normal direction, not only effects corresponding to protrusions used in a current VA mode cell or fine polymer projection of a PSA liquid crystal but also a high speed response that can not be achieved in PSA are shown, and thus, this is particularly preferable. In addition, by polymerizing by applying an electric field direction from a plurality of directions, it is possible to form a multi-domain, and viewing angle improvement is possible, and thus, this is more preferable.

In the substrate interface vertical alignment film interface, by performing a photo-alignment treatment or a rubbing alignment treatment on the alignment, film such that, a low molecular weight liquid crystal induces a pre tilt angle, an inclined direction of the low molecular liquid crystal alignment is defined, and alignment defect occurrence at the time of switching is prevented, and thus, this is preferable, and an alignment, treatment, is preferably performed to be inclined in a plurality of directions. For the liquid crystal layer, by applying an alternating electric field to a liquid crystal composition containing a polymerizable compound in a temperature range of suitably −50° C. to 30° C., and performing irradiation with ultraviolet, rays or an electron beam, an optical axis of a polymer network having a refractive index anisotropy is formed in the liquid crystal so as to form a pretilt angle with respect to the substrate surface. If this pre tilt, angle was subjected to polymerization phase separation in an alignment state induced by applying an electric field by the dielectric anisotropy of a low molecular weight liquid crystal, it is possible to obtain a liquid crystal device in which the optical axis of the polymer network after the polymerization is tilted with respect to the substrate surface, and a configuration in which the polymerizable compound is polymerized is more preferable.

As two substrates used in the LCD device of the present invention, a transparent material having flexibility such as glass or plastic can be used. For example, a transparent substrate having a transparent electrode layer can be obtained by sputtering indium tin oxide (ITO) onto a transparent substrate such as a glass plate.

For example, a color filter can be produced by a pigment dispersion method, a printing method, an electrodeposition method, or a staining method. To describe a method for producing the color filter by the pigment dispersion method as an example, a curable coloring composition for a color filter is coated onto the transparent substrate, a patterning process is performed, and heating or light irradiation is performed for curing. By performing the step on each of red, green, and blue, it is possible to produce a pixel portion for the color filter. In addition, a pixel electrode in which an active device such as a TFT or a thin-film diode is provided may be installed on the substrate.

The above-described substrate is disposed such that the transparent electrode layer becomes the inner side. At that time, the gap between substrates may be adjusted through a spacer. At this time, the thickness of the obtained light adjusting layer is preferably adjusted to be from 1 to 100 µm. The thickness is still more preferably from 1.5 to 10 µm, and in a case where a polarizing plate is used, by adjusting the product of the refractive index anisotropy Δn of the liquid crystal and the cell thickness d such that the contrast is maximum, the thickness is preferably set to be ½ or ¼ of 550 nm according to the display mode. Moreover, in a case where there are two polarizing plates, a polarization axis of each polarizing plate can be adjusted such that a viewing angle and a contrast are good. In addition, a phase difference film for widening the viewing angle can also be used. For example, as the spacer, a post spacer consisting of glass particles, plastic particles, alumina particles, photoresist material, and the like is exemplified. Thereafter, a sealing agent such as an epoxy-based thermosetting composition is screen-printed onto the substrate in the form provided with the liquid crystal injection port, and the substrates are bonded to each other and are heated, whereby the sealing agent is thermally cured.

As a method of sandwiching the polymerizable liquid crystal composition between two substrates, a general vacuum injection method or an ODF method can be used. In the LCD device manufacturing step by the ODF method, a sealing agent of an epoxy-based photo-heat combination curable type is drawn in a closed loop bank shape on any substrate between a back plane or a front plane using a dispenser, and after dropping a predetermined amount of the polymerizable liquid crystal composition in a degassed state therein, the front plane and the back plane are joined, whereby an LCD device can be manufactured. Since dropping of the liquid crystal-monomer composite material in the ODF step can be stably performed, the polymerizable liquid crystal composition used in the present invention can be suitably used.

As a method for polymerizing compounds, since in order to obtain a good alignment capability of liquid crystal, an appropriate polymerization rate is desirable, and a method in which polymerization is performed by radiating with ultraviolet rays or electron beams which are active energy rays singly, in combination thereof, or sequentially is preferable. In the case where ultraviolet rays are used, a polarized light source may be used, and a non-polarized light source may be used. In addition, in a case where polymerisation is performed in a state in which, the polymerizable liquid crystal composition is sandwiched between two substrates, appropriate transparency with respect to active energy rays is necessarily applied to at least the substrate of the irradiation surface side. In addition, it is preferable that an alternating electric field is applied to a liquid crystal composition containing a polymerizable compound, that is, a polymerizable liquid crystal composition in a temperature range of −50° C. to 20° C. and irradiation with ultraviolet rays or an electron beam is performed thereon. The AC electric field to be applied is preferably an alternating current having a frequency within a range of 10 Hz to 10 kHz, more preferably within a range of 100 Hz to 5 kHz, and voltage is selected according to a desired pretilt angle of the LCD device. In other words, the pretilt angle of the LCD device can be controlled by an applied voltage. In the LCD device of a horizontal electric field type MVA mode, the pretilt angle is preferably controlled to be within a range of 80° to 89.9° from the viewpoint of alignment, stability and contrast.

As the temperature at the time of irradiation, it is preferable that the polymerizable liquid crystal composition is within a temperature range of −50° C. to 30° C. As the lamp for generating ultraviolet rays, a metal halide lamp, a high pressure mercury lamp, an ultrahigh pressure mercury lamp can be used. In addition, as the wavelength of ultraviolet rays with which are irradiated, ultraviolet rays in a wavelength range which is not an absorption wavelength range of the liquid crystal composition are preferably irradiated, and if necessary, ultraviolet rays having a wavelength of 365 nm or less are preferably cut to use. The intensity of ultraviolet rays with which are irradiated is preferably 0.1 mW/cm$^2$ to 100 W/cm$^2$, and more preferably 2 mW/cm$^2$ to 50 W/cm$^2$. The amount of energy of ultraviolet rays with which are irradiated can be suitably adjusted, and is preferably 10 mJ/cm$^2$ to 500 J/cm$^2$, and more preferably 100 mJ/cm$^2$ to 200 J/cm$^2$. When ultraviolet rays are applied, the intensity may be changed. The application time of ultraviolet rays is suitably selected according to the intensity of ultraviolet rays applied, and is preferably from 10 seconds to 3, 600 seconds, and more preferably from 10 seconds to 600 seconds.

(Horizontal Electric Field Type)

Hereinafter, the LCD device of one embodiment of the invention will be described with reference to the drawings. FIG. 1 is a schematic sectional view showing one example of the LCD device of the present invention. The LCD device 10 of one embodiment of the present invention is provided with the first substrate 2 in which the alignment layer 4 has been formed on the surface, the second substrate 7 provided apart from the first substrate, in which the photo-alignment layer has been formed on the surface, and the liquid crystal layer 5 with which the gap between the first substrate 2 and the second substrate 7 are filled and which is in contact with the pair of alignment layers, and has the electrode layer 3 provided with a thin film transistor, the common electrode 22, and a pixel electrode between the alignment layer 4 (4a, 4b) and the first substrate 2 as active devices.

Figure 3:
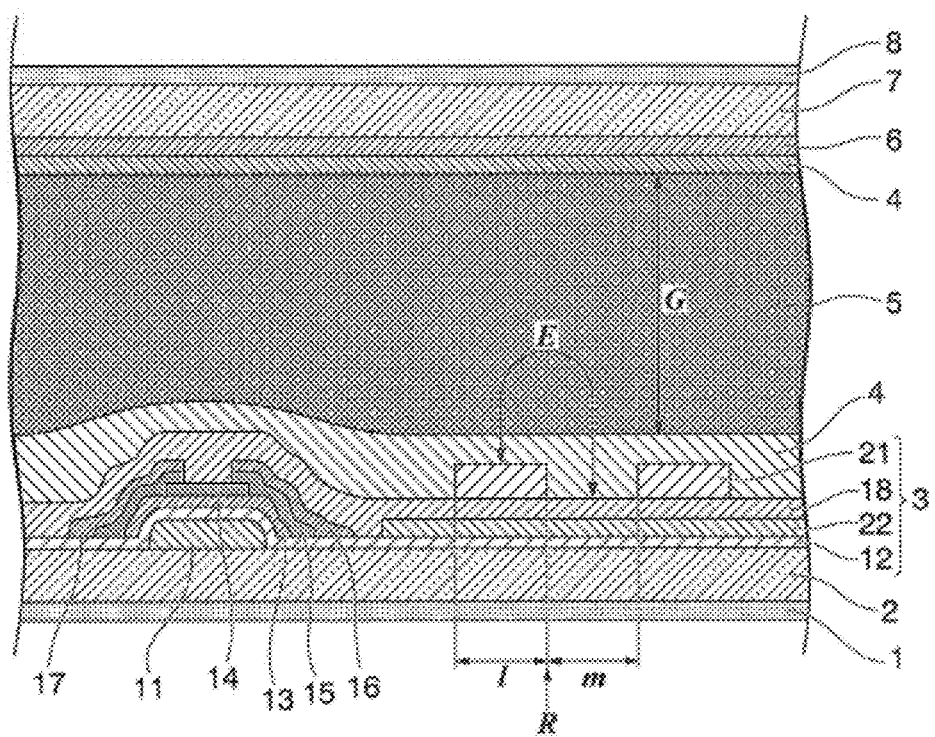
FIG. 3 is a sectional view of the LCD device of the present invention.

FIG. 1 is a view schematically showing a configuration of an LCD device. In FIG. 1, for explanation, respective configuration elements are described in separated state for convenience. As described in FIG. 1, the configuration of the LCD device 10 of one embodiment of the present invention is a horizontal electric field type (in the figure, as one example, FFS mode as one form of IPS) LCD device having a polymerizable liquid crystal composition (or a liquid crystal layer 5) sandwiched between a first transparent insulating substrate 2 and a second transparent insulating substrate 7 which are disposed to face each other. In the first transparent insulating substrate 2, an electrode layer 3 is formed on the surface of the liquid crystal layer 5 side. In addition, the LCD device 10 has a pair of alignment films 4 (4a, 4b) inducing homogeneous alignment in direct contact with the polymerizable liquid crystal composition configuring the liquid crystal layer 5 between the liquid crystal layer 5 and the first transparent insulating substrate 2 and between the liquid crystal layer 5 and the second transparent insulating substrate 7, respectively, and the liquid crystal molecules in the polymerizable liquid crystal composition are aligned so as to be substantially parallel to the substrates 2 and 7 when no voltage is applied. As shown in FIGS. 1 and 3, the second substrate 7 and the first substrate 2 may be sandwiched between a pair of polarizing plates 1 and 8. In FIG. 1, a color filter 6 is provided between the second substrate 7 and the alignment film 4. Moreover, the form of the LCD device according to the present invention may be a so-called color filter-on-array (COA), and a color filter may be provided between the electrode layer including a thin film transistor and the liquid crystal layer, or a color filter may be provided between the electrode layer including the thin film transistor and the second substrate.

That is, the LCD device 10 of one embodiment of the present invention has a configuration in which the first polarizing plate 1, the first, substrate 2, the electrode layer 3 including a thin film transistor, the alignment film 4, the liquid crystal layer 5 including a polymerizable liquid crystal composition, the alignment film 4, the color filter 6, the second substrate 7, and the second polarizing plate 8 are sequentially stacked.

As the first substrate 2 and the second substrate 7, a transparent material having flexibility such as glass or plastic can be used, and the other substrate may be an opaque material such as silicon. The two substrates 2 and 7 are attached by a sealant or a sealing material such as an epoxy-based thermosetting composition disposed in the peripheral region, and to hold the distance between the substrates, for example, particle shaped spacers such as glass particles, plastic particles, or alumina particles or spacer posts formed of a resin formed by photolithography may be disposed therebetween.

Figure 2:
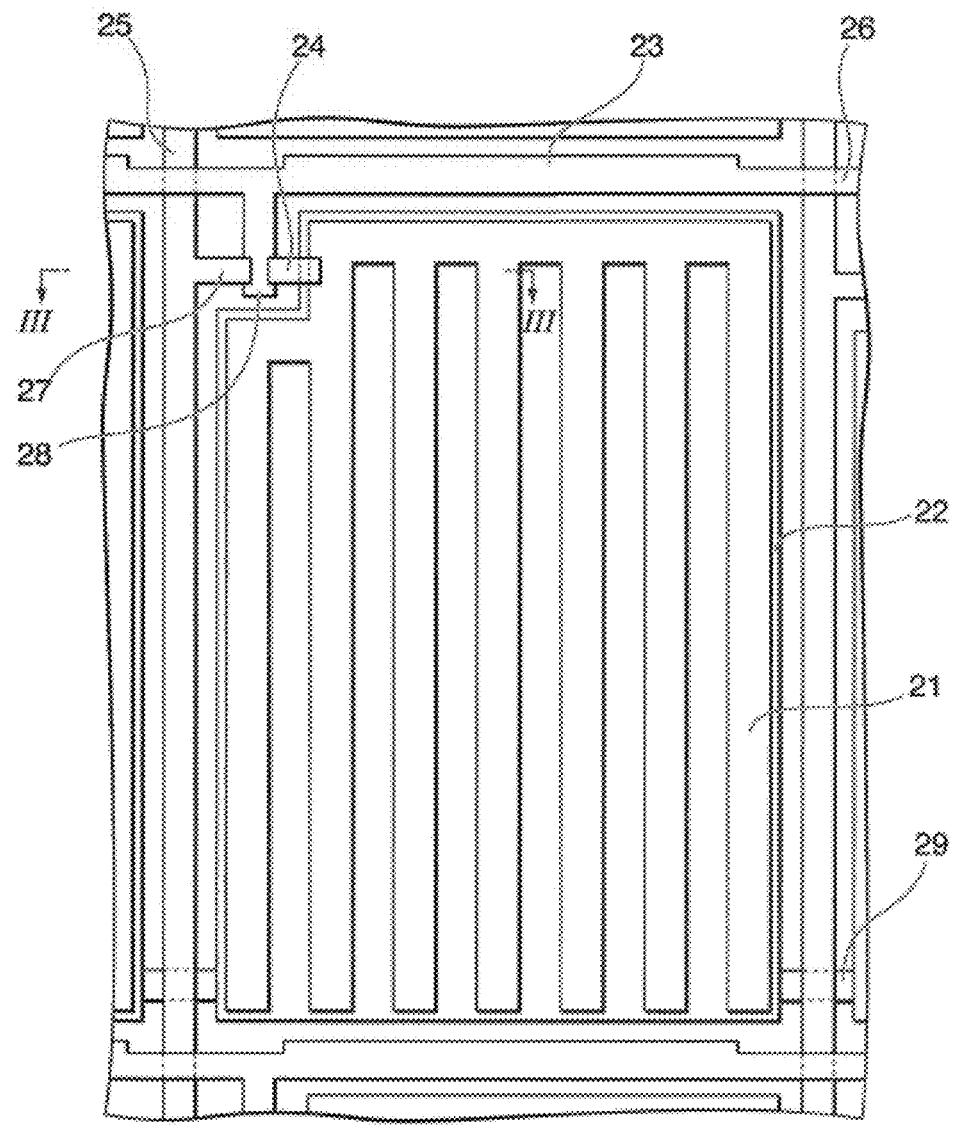
FIG. 2 is a partially enlarged view of FIG. 1.

FIG. 2 is an enlarged plan view of a region surrounded by a II line of the electrode layer 3 formed on the substrate 2 in FIG. 1. FIG. 3 is a sectional view obtained by cutting the LCD device shown in FIG. 1 in the line III-III direction in FIG. 2. As shown in FIG. 2, in the electrode layer 3 including a thin film transistor formed on the surface of the first substrate 2, a plurality of gate wires 24 for supplying a scanning signal and a plurality of data wires 25 for supplying a display signal are disposed in a matrix shape to intersect, each other. Moreover, in FIG. 2, only a pair of gate wires 24 and a pair of data wires 25 are shown.

By the region surrounded by the plurality of gate wires 24 and the plurality of data wires 25, a unit pixel of the liquid crystal display apparatus is formed, and in the unit pixel, a pixel electrode 21 and a common electrode 22 are formed. In the vicinity of the intersection at which the gate wires 24 and the data wires 25 intersect each other, a thin film, transistor including a source electrode 27, a drain electrode 26, and a gate electrode 28 is provided. The thin film transistor is connected to the pixel electrode 21 as a switching device for supplying a display signal to the pixel electrode 21. In addition, a common line (not shown) is provided in parallel with the gate wires 24. The common line is connected to the common electrode 22 for supplying a common signal to the common electrode 22.

As shown in FIG. 3, one suitable aspect of the structure of the thin film transistor has, for example, a gate electrode 11 formed on the surface of the substrate 2, a gate insulating layer 12 provided so as to cover the gate electrode 11 and substantially cover the entire surface of the substrate 2, a semiconductor layer 13 formed on the surface of the gate insulating layer 12 so as to face the gate electrode 11, a protective layer 14 provided so as to cover a part of the surface of the semiconductor layer 13, a drain electrode 16 provided so as to cover the end portion of one side of each of the protective layer 14 and the semiconductor layer 13 and come into contact with the gate insulating layer 12 formed on the surface of the substrate 2, a source electrode 17 provided so as to cover the end portion of the other side of each of the protective layer 14 and the semiconductor layer 13 and come into contact with the gate insulating layer 12 formed on the surface of the substrate 2, and an insulation protecting layer 18 provided so as to cover the drain electrode 16 and the source electrode 17. An anodic oxide film (not shown) may be formed on the surface of the gate electrode 11 to eliminate steps with the gate electrode.

In the semiconductor layer 13, amorphous silicon, polycrystalline silicon, or the like can be used, and it is also preferable to use a transparent semiconductor film such as a film of ZnO, IGZO (In—Ga—Zn—O), or ITO from the viewpoint of being capable of preventing the adverse effect of the photocarrier due to light absorption and increasing the opening ratio of the device.

Furthermore, for the purpose of reducing the width or the height of the Schottky barrier, an ohmic contact layer 15 may be provided between the semiconductor layer 13 and the drain electrode 16 or the source electrode 17. In the ohmic contact-layer, a material such as n-type amorphous silicon and n-type polycrystalline polysilicon, obtained by adding impurities such as phosphorus at a high concentration, can be used.

Each of the gate wires 26, the data wires 25, and the common line 29 is preferably a metal film, and more preferably Al, Cu, Au, Ag, Cr, Ta, Ti, Mo, W, Ni, or alloys thereof, and a case of using a wire of Al or an alloy thereof is particularly preferable. In addition, the insulation protecting layer 18 is a layer having an insulation function and formed of silicon nitride, silicon dioxide, a silicon oxynitride film, or the like.

In the embodiment shown in FIGS. 2 and 3, the common electrode 22 is a flat plate shaped electrode formed on substantially the entire surface of the gate insulating layer 12, and on the other hand, the pixel electrode 21 is a comb shaped electrode formed on the insulation protecting layer 18 covering the common electrode 22. That is, the common electrode 22 is disposed at a position closer to the first substrate 2 than the pixel electrode 21, and these electrodes are disposed to overlap each other through the insulation protecting layer 18. Each of the pixel electrode 21 and the common electrode 22 is formed of, for example, a transparent conductive material such as ITO (Indium Tin Oxide), IZO (Indium Zinc Oxide), or IZTO (Indium Zinc Tin Oxide). Since the pixel electrode 21 and the common electrode 22 are formed of transparent conductive materials, the area opened in a unit pixel area becomes large, and both the opening ratio and the transmittance are increased.

In addition, the pixel electrode 21 and the common electrode 22 are formed such that the distance (also referred to as the minimum distance) R between the pixel electrode 21 and the common electrode 22 becomes smaller than the distance G between the first substrate 2 and the second substrate 7 to form a fringe electric field between these electrodes. Here, the distance R between electrodes represents a distance in the horizontal direction on the substrate between the electrodes. In FIG. 3, since the flat plate shaped common electrode 22 and the comb shaped pixel electrode 21 are overlapped, an example in which the distance between electrodes R becomes 0 is shown, and since the minimum distance R becomes smaller than the distance (that, is, a cell gap) G between the first substrate 2 and the second substrate 7, a fringe electric field E is formed. Therefore, in an FFS type LCD device, it is possible to use a horizontal electric field formed in the vertical direction with respect to the line forming a comb shape of the pixel electrode 21 and a parabolic electric field. It is preferable that the electrode width 1 of the comb shaped portion of the pixel electrode 21 and the gap width m of the comb shaped portion of the pixel electrode 21 are formed in a width of an extent that all the liquid crystal molecules in the liquid crystal layer 5 can be driven by the electric field generated. In addition, the minimum distance R between the pixel electrode and the common electrode can be adjusted as the (average) film thickness of the gate insulating layer 12. In addition, unlike FIG. 3, the LCD device according to the present invention may be formed such that the distance (also referred to as the minimum distance) R between the pixel electrode 21 and the common electrode 22 becomes greater than the distance G between the first substrate 2 and the second substrate 7 (IPS mode). In this case, for example, a configuration in which a comb shaped pixel electrode and a comb shaped common electrode are provided to be alternated in substantially the same plane is exemplified.

One preferable form of the LCD device according to the present invention is preferably an LCD device of the FFS mode using a fringe electric field, and if the shortest distance d between the common electrode 22 and the pixel electrode 21 which are adjacent is shorter than the shortest distance D between the alignment films 4 (the distance between substrates), a fringe electric field is formed between the common electrode and the pixel electrode, and it is possible to efficiently use the alignment of the horizontal direction and the vertical direction of the liquid crystal molecules. In the case of an FFS mode LCD device of the present invention, if a voltage is applied to the liquid crystal molecules of which the long axis direction is disposed so as to be parallel to the alignment, direction of the alignment layer, an equipotential line of the parabolic electric field between the pixel electrode 21 and the common electrode 22 is formed to the upper portion of the pixel electrode 21 and the common electrode 22, and the long axis of the liquid crystal molecules in the liquid crystal layer 5 is arranged along the formed electric field. Therefore, even in the case of low dielectric anisotropy, the liquid crystal molecules can be driven.

From the viewpoint of preventing light leakage, for the color filter 6 according to the present invention, black matrices (not shown) are preferably formed at the portions corresponding to the thin film transistor and the storage capacitor 23. In addition, the color filter 6 is formed of one dot of a video or an image formed of three filter pixels of typically R (red) G (green) B (blue), and for example, these three filters are arranged in the extending direction of the gate wire. For example, the color filter 6 can be produced by a pigment dispersion method, a printing method, an electrodeposition method, or a staining method. To describe a method for producing the color filter by the pigment dispersion method as an example, a curable coloring composition for a color filter is coated onto the transparent substrate, a patterning process is performed, and heating or light irradiation is performed for curing. By performing the step on each of red, green, and blue, it is possible to produce a pixel portion for the color filter. In addition, the LCD device may be a so-called color filter-on-array in which a pixel electrode in which an active device such as a TFT or a thin film diode is provided on the substrate is provided.

A pair of photo-alignment films 4 inducing homogeneous alignment in direct contact with the polymerizable liquid crystal composition configuring the liquid crystal layer 5 are provided on the electrode layer 3 and the color filter 6.

In addition, the polarizing plate 1 and the polarizing plate 8 can be adjusted such that the viewing angle or the contrast is improved by adjusting the polarization axis of each polarizing plate, and the polarizing plate 1 and the polarizing plate 8 preferably have transmission axes orthogonal to each other such that these transmission axes are operated in a normally black mode. In particular, any one of the polarizing plate 1 and the polarizing plate 8 is preferably disposed so as to have a transmission axis parallel to the alignment direction of the liquid crystal molecule. In addition, the product of the refractive index anisotropy Δn of the liquid crystal and the cell thickness d is preferably adjusted such that the contrast becomes maximum. In addition, a phase difference film for widening the viewing angle can also be used.

Also, as another embodiment of the LCD device, in the case of the IPS mode, there is a condition in which the shortest distance d between a common electrode and a pixel electrode which are adjacent is longer than the shortest distance G between the liquid crystal alignment films, and for example, as a case where a common electrode and a pixel electrode are formed on the same substrate, and the common electrode and the pixel electrode are alternately disposed, a structure in which the shortest distance d between a common electrode and a pixel electrode which are adjacent is longer than the shortest distance G between the liquid crystal alignment films is exemplified.

In the manufacture method of the LCD device according to the present invention, it is preferable that after a coating film is formed on the substrate and/or the substrate surface having an electrode layer, a pair of substrates are disposed to oppose each other with a gap such that the coating films become the inner side, and then, the gap between the substrates is filled with the liquid crystal composition. At that time, the gap between substrates may be adjusted through a spacer.

The distance (which is the average thickness of the obtained liquid crystal layer, and also referred to as a distance between the coating films) between the substrates is preferably adjusted to be in 1 to 100 μm. The average distance between the coating films is more preferably 1.5 to 10 μm.

In the present invention, as the spacer used for adjusting the distance between substrates, for example, a post spacer formed of glass particles, plastic particles, alumina particles, or a photoresist material is exemplified.

The FFS type LCD device described with reference to FIGS. 1 to 3 is simply an example, and the invention can be performed in other various forms within the scope of the technical idea of the present invention.

Another example of the LCD device according to the present invention will be described below with reference to FIGS. 4 and 5.

Figure 4:
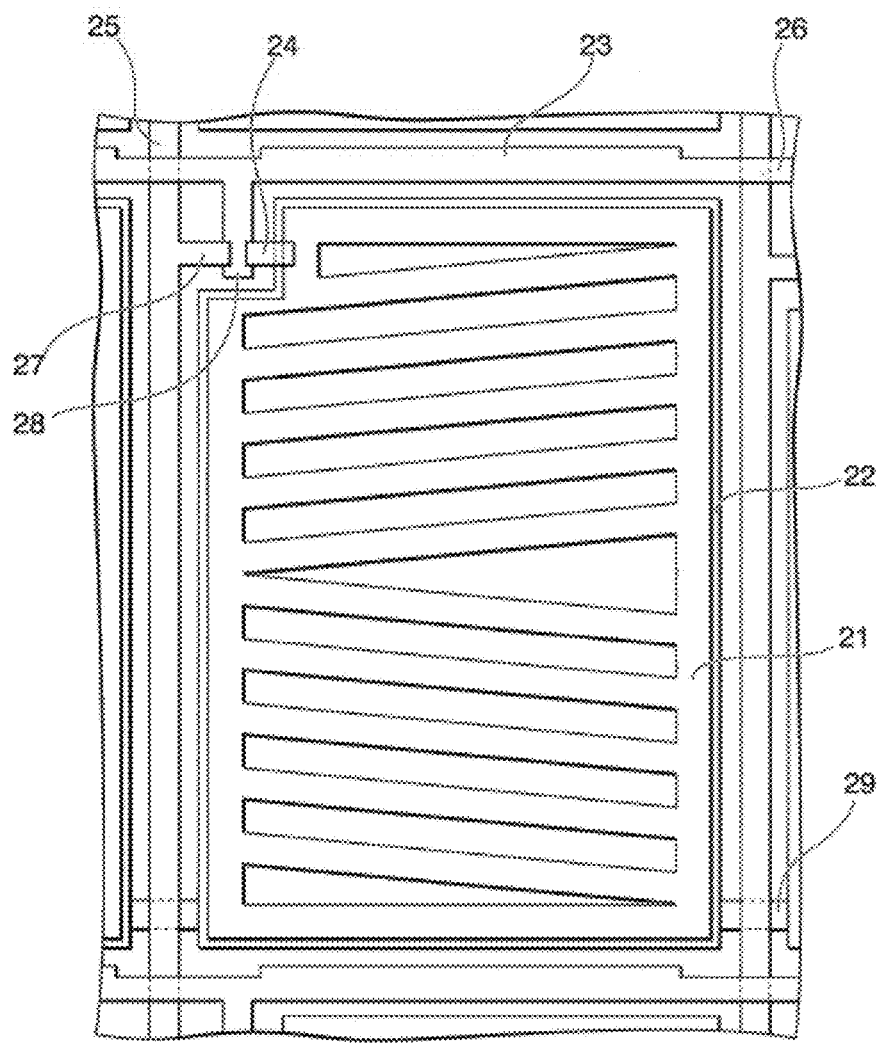
FIG. 4 is a partially enlarged view of FIG. 1.

For example, FIG. 4 is another embodiment, of an enlarged plan view of the region surrounded by the II line of the electrode layer 3 formed on the substrate 2 in FIG. 1. As shown in FIG. 4, the pixel electrode 21 may be configured to have a slit. In addition, the pattern of the slit, may be formed so as to have a tilt angle with respect to the gate wires 24 or the data wires 25.

The pixel electrode 21 shown in FIG. 4 has a shape in which a substantially rectangular plate electrode is hollowed out in a substantially rectangular frame shaped notch portion. In addition, the comb tooth shaped common electrode 22 is formed on one surface through the insulation protecting layer 18 (not shown) on the back surface of the pixel electrode 21. In a case where the shortest distance R between the common electrode and the pixel electrode which are adjacent is shorter than the shortest distance G between the alignment layers, the LCD device becomes an FFS mode, and in a case where the shortest distance R between the common electrode and the pixel electrode which are adjacent is longer, the LCD device becomes an IPS mode. In addition, the surface of the pixel electrode is preferably covered with a protective insulation film and an alignment film layer. In the same manner as described above, in the region surrounded by the plurality of gate wires 24 and the plurality of data wires 25, a storage capacitor 23 for storing a display signal supplied through the data wire 25 may be provided. Moreover, the shape of the notch portion is not particularly limited, and in addition to the substantially rectangular shape shown in FIG. 4, notch portions having a known shape such as an oval shape, a circular shape, a rectangular shape, a diamond shape, a triangular shape, or a parallelogram shape can be used. In addition, the shortest distance R between the common electrode and the pixel electrode which are adjacent is longer than the shortest distance G between the alignment layers, the LCD device becomes an IPS mode display device.

Figure 5:
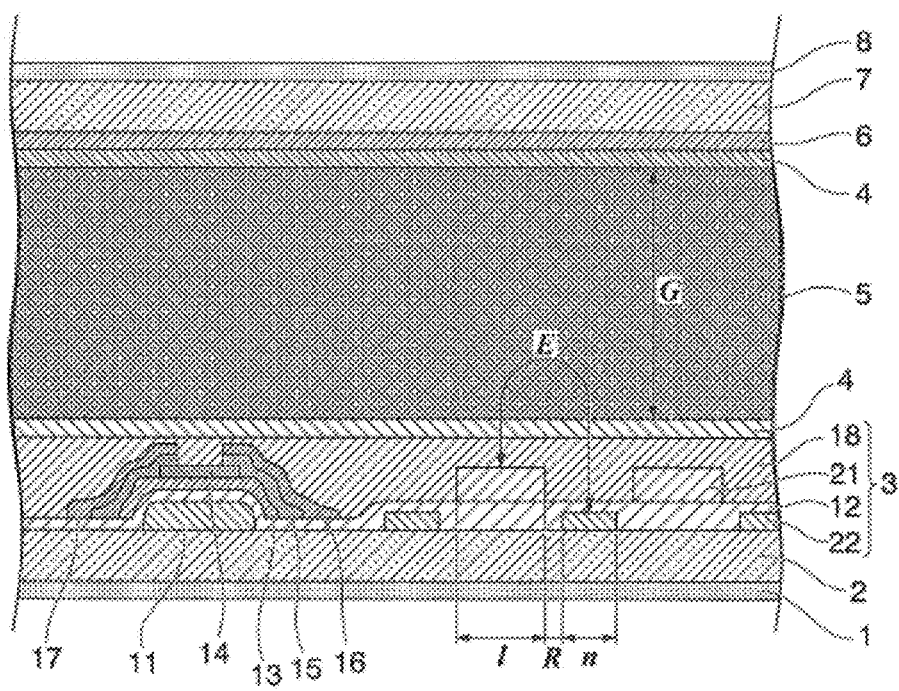
FIG. 5 is a sectional view of the LCD device of the present invention.

FIG. 5 is an embodiment different from FIG. 3, and another example of a sectional view obtained by cutting the LCD device shown in FIG. 1 in the III-III line direction in FIG. 2. The first substrate 2 in which an alignment layer 4 and the electrode layer 3 including the thin film transistor 20 are formed on the surface and the second substrate 8 in which the alignment layer 4 is formed on the surface are disposed such that the alignment layers face each other with a predetermined gap D, and the liquid crystal layer 5 including a liquid crystal composition is filled in this space. The gate insulating layer 12, the common electrode 22, the insulation protecting layer 18, the pixel electrode 21, and the alignment layer 4 are stacked on a part of the surface of the first substrate 2 in this order. In addition, as also shown in FIG. 4, the pixel electrode 21 has a shape in which the central portion and both ends of a flat plate body are hollowed out in a triangular notch portion and the remaining region is hollowed out in a rectangular notch portion, and the common electrode 22 has a structure in which the comb tooth shaped common electrode 22 is disposed on the first substrate side rather than the pixel electrode in substantially parallel to the substantially oval shaped notch portion of the pixel electrode 21.

In the example shown in FIG. 5, the common electrode 22 having a comb shape or a slit is used, and the distance R between the pixel electrode 21 and the common electrode 22 becomes α (in FIG. 5, the horizontal component of the distance between electrodes is described as R for convenience). Furthermore, in FIG. 3, an example in which the common electrode 22 is formed on the gate insulating layer 12 is shown, but, as shown in FIG. 5, the common electrode 22 is formed on the first substrate 2, and the pixel electrode 21 may be provided through the gate insulating layer 12. It is preferable that the electrode width l of the pixel electrode 21, the electrode width n of the common electrode 22, and the distance R between electrodes are suitably adjusted in a width of an extent that all the liquid crystal molecules in the liquid crystal layer 5 can be driven by the electric field generated. In a case where the shortest distance R between the common electrode and the pixel electrode which are adjacent is shorter than the shortest distance G between the alignment layers, the LCD device becomes an FFS mode, and in a case where the shortest distance R between the common electrode and the pixel electrode which are adjacent, is longer, the LCD device becomes an IPS mode. Furthermore, although the position in the thickness direction of the pixel electrode 21 and the common electrode 22 in FIG. 5 are different, the positions in the thickness direction of both the electrodes may be the same or the common electrode may be provided on the liquid crystal layer 5 side.

(Vertical Electric Field Type)

Figure 6:
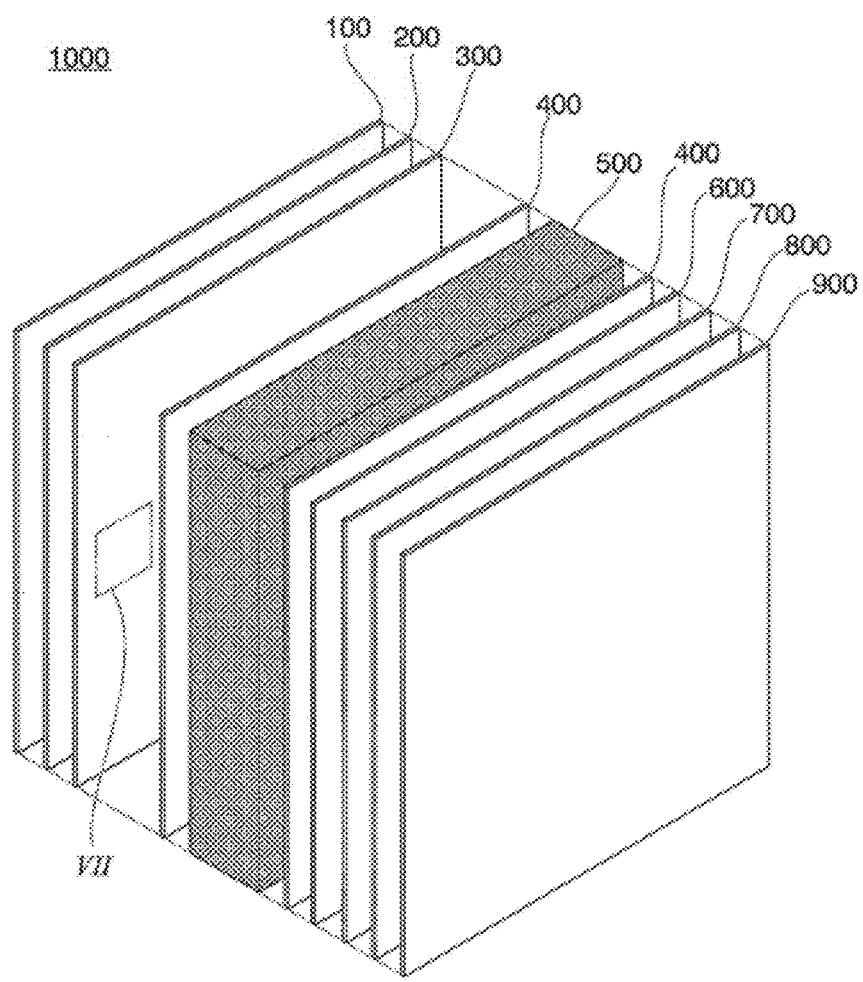
FIG. 6 is a schematic diagram of the LCD device of the present invention.
Figure 7:
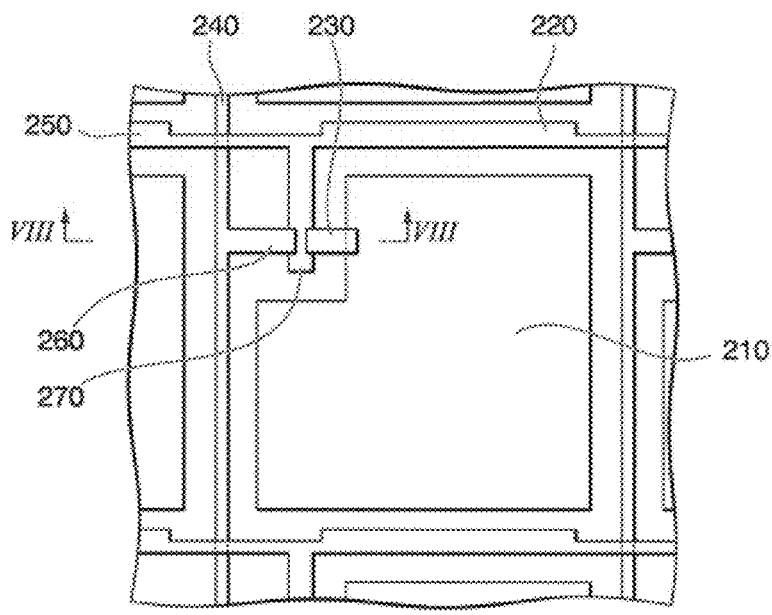
FIG. 7 is a partially enlarged view of FIG. 6.
Figure 8:
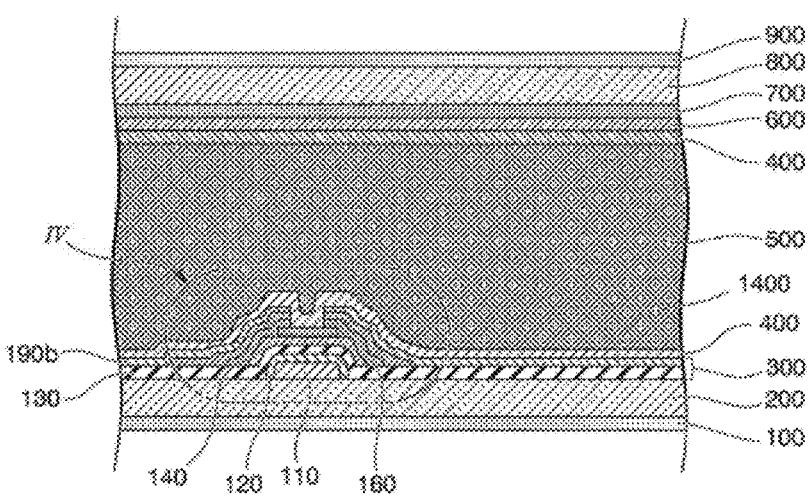
FIG. 8 is a sectional view of the LCD device of the present invention.

Another preferable embodiment of the present invention is a vertical electric field type LCD device using a liquid crystal composition. FIG. 6 is a view schematically showing a configuration of a vertical electric field type LCD device. In addition, in FIG. 7, for explanation, respective configuration elements are described in separated state for convenience. FIG. 7 is an enlarged plan view of a region surrounded by the line VII of the electrode layer 300 (or also referred to as the thin film transistor layer 300) including the thin film transistor formed on the substrate in FIG. 6. FIG. 8 is a sectional view obtained by cutting the LCD device shown in FIG. 6 in the line VIII-VIII direction in FIG. 7. Hereinafter, the vertical electric field type LCD device according to the present invention will be described with reference to FIGS. 6 to 9.

The LCD device 1000 according to the present invention is configured to have a second substrate 800 provided with a transparent electrode (layer) 600 (or also referred to as a common electrode 600) formed of a transparent conductive material as described in FIG. 6, a first substrate 200 including a thin film transistor layer 300 in which a thin film transistor which controls the pixel electrode formed of a transparent conductive material and the pixel, electrode provided in each pixel, has been formed, and a polymerizable liquid crystal composition (or liquid crystal layer 500) sandwiched between the first substrate 200 and the second substrate 800, and in the LCD device, the alignment of the liquid crystal molecules in the polymerizable liquid crystal composition at the time when a voltage is not applied is substantially vertical to the substrates 200 and 800. In addition, as shown in FIGS. 6 and 8, the second substrate 800 and the first substrate 200 may be sandwiched between a pair of polarizing plates 100 and 900. In FIG. 6, a color filter 700 is provided between the first substrate 200 and the common electrode 600. Furthermore, a pair of alignment films 400 which are adjacent to the liquid crystal layer 500 according to the present invention and come into direct contact with the polymerizable liquid crystal composition configuring the liquid crystal layer 500 are formed on the surfaces of the transparent electrodes (layer) 600 and 1400.

That is, the LCD device 1000 according to the present invention preferably has a configuration in which a first polarizing plate 100, a first substrate 200, an electrode layer (or also referred to as a thin film transistor layer) 300 including a thin film transistor, an photo-alignment film 400, a layer 500 including a liquid crystal composition, the alignment film 400, a common electrode 600, a color filter 700, a second substrate 800, and a second polarizing plate 900 are sequentially stacked. Moreover, the alignment film 400 is preferably a photo-alignment film.

Figure 17:
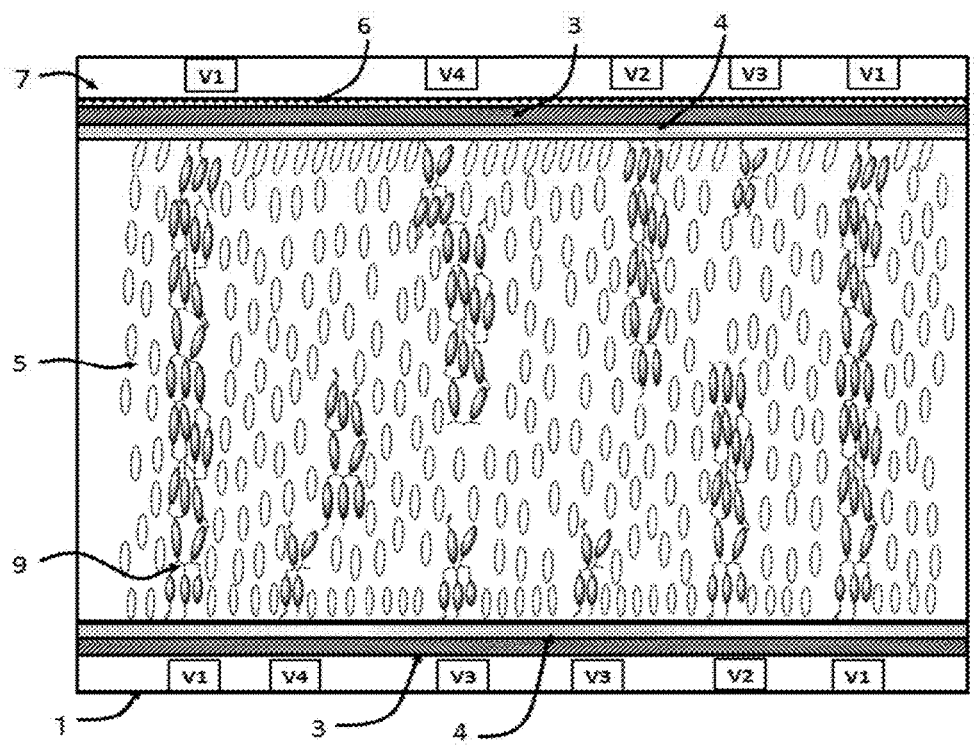
FIG. 17 is a schematic view showing alignment of the liquid crystal molecules in a VA type liquid crystal display apparatus of the present invention and a polymer network structure.

FIG. 17 is a schematic sectional view showing an aspect of a VA mode liquid crystal display apparatus of the present invention, and a polymer network structure and a liquid crystal molecular alignment structure formed in the liquid crystal layer of a liquid crystal cell manufactured by performing an alignment treatment (mask rubbing or photo-alignment) on an alignment film are shown. In the inside (liquid crystal layer side) of the transparent electrode of the liquid crystal cell, a vertical alignment film slightly tilted (0.1° to 5.0°) from the normal direction of the glass substrate is formed, and the vertical alignment film and the liquid crystal molecules have a structure twisted by about 90° between the upper and lower substrates.

The polymerizable monomer is aligned in the vertical direction by the alignment restricting force of the vertical alignment film, and by polymerizing and fixing the polymerizable monomer by irradiation with UV rays, a polymer network is formed. The polymer network formed in this manner is estimated to have about four types of structures, that is, (V1) a polymer network across the upper and the lower substrates is formed, (V2) a polymer network toward the liquid crystal direction from the upper (lower) substrate is formed to the middle, (V3) a polymer network is formed only in the vicinity of the surface of the alignment film, (mainly the case of a monofunctional monomer), and (V4) polymer networks are bonded (floating does not occur) with each other in the liquid crystal layer.

The polymer network having anisotropy formed in this manner is almost completely separated from the liquid crystal layer, and the liquid crystal molecules between these polymer networks are thought to be aligned and arranged. The liquid crystal molecules and the polymer network are present in a mixed state, and the polymer network is clearly different from a so-called polymer network type liquid crystal molecular alignment structure causing light scattering at the time when a voltage is not applied, and has a structure completely different form the structure of an alignment maintenance layer which is unevenly present in the vicinity of an alignment film used in PSA.

As an example, the polymer network and the liquid crystal molecular alignment structure by a method using an alignment film have been shown, but even in a so-called MVA mode having a structure such as a rib or a slit, the polymer network in the vicinity of the substrate interface or the pretilt of the liquid crystal molecules varies slightly only by the oblique electric field intensity applied through a structure and a slit, and essentially, it is estimated to have a structure as shown in above figure.

In a VA liquid crystal display apparatus having such a polymer network and a liquid crystal molecular alignment by liquid crystal molecules, the anchoring force to the liquid crystal molecules at the time when a voltage is not applied acts more strongly due to the synergistic action of the liquid crystal alignment film and the anchoring force of the polymer network, and as s result, it is possible to increase the response speed at the time of the voltage OFF.

(Horizontal/Oblique Electric Field Type)

As a new display technology in which the liquid crystal display region can be alignment-divided by a simple method by only devising the electrode structure, without performing a complicated step such as mask rubbing or mask exposure with respect to the alignment film, a method of acting an oblique electric field and a horizontal electric field to the liquid crystal layer has been proposed.

Figure 18:
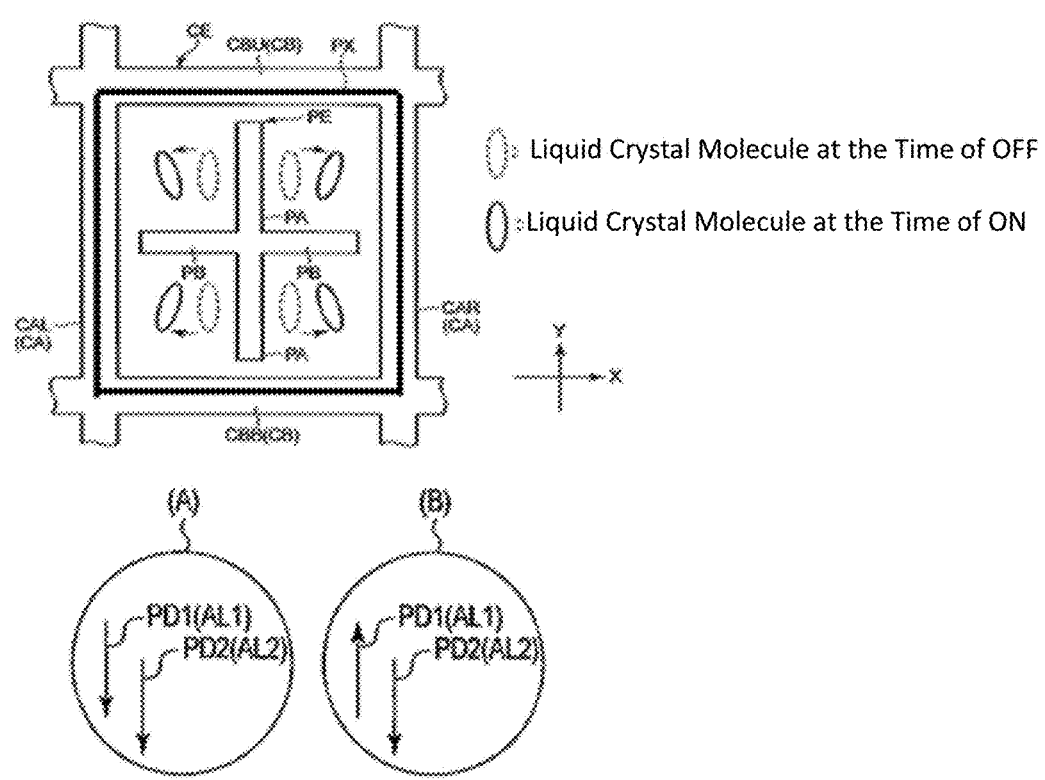
FIG. 18 is a schematic view showing an electrode structure of an oblique electric field type liquid crystal display apparatus of the present invention and a liquid crystal molecule alignment.

FIG. 18 is a plan view schematically showing a minimum unit configuration of one pixel PX of the TFT LCD device using the above technique. Hereinafter, the structure and operation of a horizontal/oblique electric field mode liquid crystal display apparatus will be described simply.

The pixel electrode PE has the main pixel electrode PA and the subpixel electrode PB. The main pixel electrode PA and the subpixel electrode PB are electrically connected together, and both the main pixel electrode PA and the subpixel electrode PB are provided on the array substrate AR. The main pixel electrode PA is extended along the second direction Y, and the subpixel electrode PB is extended along the first direction X different from the second direction Y. In the illustrated example, the pixel electrode PE is formed in a substantially cross-shape. The subpixel electrode PB is bonded to the substantially central portion of the main pixel electrode PA, and is extended towards both sides from the main pixel electrode PA, that is, the left side and the right side of the pixel PX. The main pixel electrode PA and the subpixel electrode PB are substantially orthogonal to each other. The pixel electrode PE is electrically connected to a switching device which is not shown in the pixel electrode PB.

The common electrode CE has the main common electrode CA and the subcommon electrode CB, and the main common electrode CA and the subcommon electrode CB are electrically connected together. The common electrode CE is electrically insulated from the pixel electrode PE. In the common electrode CE, at least a part of the main common electrode CA and the subcommon electrode CB is provided on the counter substrate CT. The main common electrode CA is extended along the second direction Y. The main common electrode CA is disposed on both sides sandwiching the main pixel electrode PA. At this time, in the X-Y plane, none of the main common electrodes CA does overlap with the main pixel electrode PA, and a substantially equal gap is formed between each of main common electrodes CA and the main pixel electrode PA. That is, the main pixel electrode PA is positioned substantially in the middle of the adjacent main common electrode CA. The subcommon electrode CB is extended along the first direction X. The subcommon electrode CB is disposed on both sides sandwiching the subpixel electrode PB. At this time, in the X-Y plane, none of the subcommon electrodes CB does overlap with the subpixel electrode PB, and a substantially equal gap is formed between each of the subcommon electrodes CB and the subpixel electrode PB. That is, the subpixel electrode PB is positioned substantially in the middle of the adjacent subcommon electrodes CB.

In the illustrated example, the main common electrode CA is formed in a band shape of linearly extending along the second direction Y. The subcommon electrode CB is formed in a band shape of linearly extending along the first direction X. Two main common electrodes CA are disposed in parallel in the gap along the first direction X, and hereinafter, to distinguish these, the main common electrode on the left side in the figure is referred to as CAL, and the main common electrode on the right side in the figure is referred to as CAR. In addition, two subcommon electrodes CB are disposed in parallel in the gap along the second direction Y, and hereinafter, to distinguish these, the main common electrode on the upper side in the figure is referred to as CBU, and the main common electrode on the lower side in the figure is referred to as CBB. The main common electrode CAL and the main common electrode CAR have the same potential as that of the sub-common electrode CBU and the subcommon electrode CBB. In the illustrated example, the main common electrode CAL and the main common electrode CAR are connected to the subcommon electrode CBU and the subcommon electrode CBB, respectively.

The main common electrode CAL and the main common electrode CAR are disposed between pixels adjacent, to the pixel PX on the right side and the left side, respectively. That is, the main common electrode CAL is disposed across the boundary between the pixel PX illustrated and the pixel on the left side thereof (not shown), and the main common electrode CAR is disposed across the boundary between the pixel PX illustrated and the pixel on the right side thereof (not shown). The subcommon electrode CBU and the main common electrode CBB are disposed between pixels adjacent to the pixel RX on the upper side and the lower side, respectively. That is, the suncommon electrode CBU is disposed across the boundary between the pixel PX illustrated and the pixel on the upper side thereof (not shown), and the subcommon electrode CBB is disposed across the boundary between the pixel PX illustrated and the pixel on the lower side thereof (not shown).

In the illustrated example, in one pixel PX, four regions partitioned by the pixel electrode PE and the common electrode CE are formed as an opening portion and a transmission portion which mainly contribute to display. In this example, the initial alignment direction of the liquid crystal molecules LM is substantially parallel to the second direction Y. The first alignment layer AL1 is disposed on the surface opposite to the counter substrate CT of the array substrate AR, and extended over substantially the entire active area ACT. The first alignment film AL1 covers the pixel electrode PE, and is disposed on the second interlayer insulating film 13. The first alignment film AL1 is formed of a material exhibiting a horizontal alignment. Moreover, the array substrate AR is further provided with a first main common electrode and a first subcommon electrode as a part of the common electrode in some cases.

Figure 19:
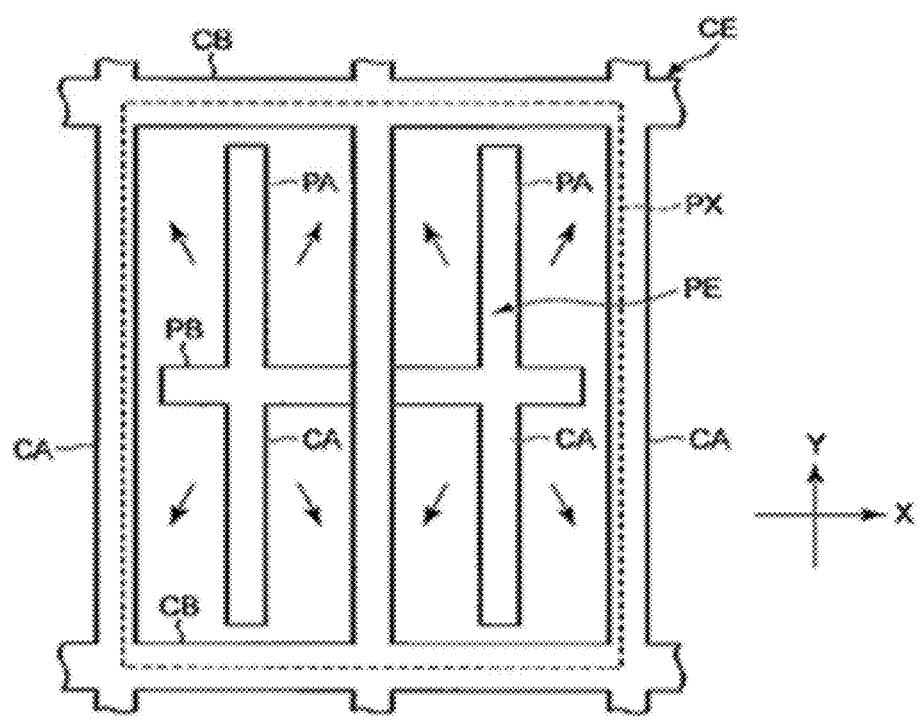
FIG. 19 is a schematic view showing an electrode structure of an 8 division oblique electric field type liquid crystal display apparatus of the present invention.

FIG. 19 is a schematic view showing the electrode structure of the 8 division oblique electric field mode liquid crystal cell. By dividing one pixel into eight parts in this manner, it is possible to achieve a wider viewing angle.

Next, the operation of the liquid crystal display panel having the above configuration will be described. In a state in which a voltage is not applied to the liquid crystal layer, that is, at the time (at the time of OFF) when an electric field is not formed between the pixel electrode PE and the common electrode CE, the liquid crystal molecule LM of the liquid crystal layer LQ, as indicated by a broken line in FIG. 18 is aligned such that the long axis of the molecule faces the first alignment treatment direction PD1 of the first alignment film AL1 and the second alignment treatment direction PD2 of the second alignment film AL2. Such a time of OFF corresponds to the initial alignment state, and the alignment direction of the liquid crystal molecule LM at the time of OFF corresponds to the initial alignment direction. Strictly speaking, the liquid crystal molecule LM is not always aligned in parallel to the X-Y plane, and is pretilted in many cases. Thus, the exact initial alignment direction of the liquid crystal molecule LM is a direction in which the alignment direction of the liquid crystal molecule LM at the time of OFF is orthographically projected to the X-Y plane.

Both the first alignment treatment direction PD1 and the second alignment treatment direction PD2 are directions substantially parallel to the second direction Y. At the time of OFF, as indicated by a broken line in FIG. 18, the liquid crystal molecule LM is initially aligned such that the long axis thereof faces the direction substantially parallel to the second direction Y. That is, the initial alignment direction of the liquid crystal molecules LM is parallel to the second direction Y (or, 0° to the second direction Y).

As in the illustrated example, in a case where the first alignment treatment direction PD1 and the second alignment treatment direction PD2 are parallel and the same direction, the liquid crystal molecule LM in the cross section of the liquid crystal layer LQ is aligned in substantially horizontally (pretilt angle is substantially zero) in the vicinity of the middle portion of the liquid crystal layer LQ, and using here as a boundary, is aligned with a pretilt angle to be symmetric in the vicinity of the first alignment film AL1 and in the vicinity of the second alignment film AL2 (splay alignment). In a state in which the liquid crystal molecule LM is splay-aligned in this manner, even in a direction inclined from the normal direction of the substrate, optical compensation is performed by the liquid crystal molecules LM in the vicinity of the first alignment film AL1 and the liquid crystal molecules LM in the vicinity of the second alignment film AL2. Therefore, in a case where the first alignment treatment direction PD1 and the second alignment treatment direction PD2 are parallel to each other and the same direction, light leakage is small in the case of black display, it is possible to realise a high contrast ratio, and it is possible to improve display quality. Moreover, in a case where the first alignment treatment direction PD1 and the second alignment treatment direction PD2 are parallel to each other and opposite, in the cross section of the liquid crystal layer LQ, the liquid crystal molecule LM is aligned with a substantially uniform pretilt angle in the vicinity of the first alignment film AL1, in the vicinity of the second alignment film AL2, and in the middle portion of the liquid crystal layer LQ (homogeneous alignment). A part, of the backlight light from the backlight 4 is transmitted through the first polarizing plate PL1, and is incident to the liquid crystal display panel LPN. The light incident to the liquid crystal display panel LPN is linearly polarized light orthogonal to the first, polarizing axis AX1 of the first polarizing plate PL1. The polarization state of such linearly polarized light hardly changes when passing through the liquid crystal display panel LPN at the time of OFF. Thus, the linearly polarized light transmitted through the liquid crystal display panel LPN is absorbed by the second polarizing plate PL2 which is in a positional relationship of cross Nicol with respect to the first polarizing plate PL1 (black display).

On the other hand, in a state in which a voltage is applied to the liquid crystal layer LQ, that is, in a state (at the time of ON) in which a potential difference is formed between the pixel electrode PE and the common electrode CE, a horizontal electric field (or an oblique electric field) substantially parallel to the substrate is formed between the pixel electrode PE and the common electrode CE. The liquid crystal molecule LM is influenced by the electric field, and the long axis thereof rotates in the plane substantially parallel to the X-Y plane as shown by a solid line in the figure.

In the example shown in FIG. 18, in the region between the pixel electrodes PE and the main common electrode CAL, the liquid crystal molecule LM in the region of the lower half is rotated in a clockwise direction with respect to the second direction Y and aligned so as to face the lower left in the figure, and the liquid crystal molecule LM in the region of the upper half is rotated in a counterclockwise direction with respect to the second direction Y and aligned so as to face the upper left in the figure. In the region between the pixel electrodes PE and the main common electrode CAR, the liquid crystal molecule LM in the region of the lower half is rotated in a counterclockwise direction with respect to the second direction Y and aligned so as to face the lower right, in the figure, and the liquid crystal molecule LM in the region of the upper half is rotated in a clockwise direction with respect to the second direction Y and aligned so as to face the upper right in the figure. Thus, in each pixel PX, in a state in which an electric field is formed between the pixel electrode PE and the common electrode CE, the alignment direction of the liquid crystal molecule LM is divided into a plurality of directions using the position overlapping the pixel electrode PE as a boundary, and forms domains in each alignment direction. That is, in the one pixel PX, a plurality of domains are formed.

At the time of such ON, linearly polarized light orthogonal to the first polarizing axis AX1 of the first polarizing plate PL1 is incident to the liquid crystal display panel LPN, and the polarization state thereof changes depending on the alignment state of the liquid crystal molecule LM when passing through the liquid crystal layer LQ. At the time of such ON, at least a part of the light passed through the liquid crystal layer LQ is transmitted through the second polarizing plate PL2 (white display). According to such a structure, since it is possible to form four domains in one pixel, it is possible to optically compensate the viewing angle in the four directions, and it is possible to achieve a wider viewing angle. Therefore, it is possible to provide a liquid crystal display apparatus which does not have gradation inversion, can realize display of high transmittance, and has good display quality. In addition, in one pixel, by setting the area of the opening portion to be substantially the same for each of the four regions partitioned by the pixel electrode PE and the common electrode CE, the transmittance of each region becomes substantially equal, the light transmitted through each opening portion optically compensates to each other, and it is possible to realize a uniform display over a wide viewing angle range.

EXAMPLES

Hereinafter, the present invention will be described in more detail with examples, and the present invention is not limited to the examples. In addition, "%" in the compositions of the following examples and comparative examples means "% by mass".

Example 1

As a P-type liquid crystal composition, a composition ($\Delta n$ of 0.103, viscosity $\eta$ of 20 mPa·s, Vth of 1.72 Vrms) represented by the following (LCP-1) was prepared. As a polymerizable compound, a compound represented by the following Formula (V1-1-1) was used.

A polymerizable liquid crystal composition (LCM-1) containing the P-type liquid crystal composition (LCP-1) of 100% to 97%, the polymerizable compound (V1-1-1) of 1.96% to 2.94%, and a photopolymerization initiator Irgacure651 of 2% with respect to the polymerizable compound (V1-1-1) was prepared. After the solid polymerizable compound (V1-1-1) was heated to 60° C. to be dissolved in the liquid crystal (LCP-1), the polymerizable compound (V1-1-1) was uniformly dissolved at room temperature, and then, it was confirmed using a polarization microscope that the polymerizable compound (V1-1-1) exhibited a nematic liquid crystal phase.

A cell having ITO-attached parallel rubbing alignment coated with a polyimide alignment film having a cell gap of 3 μm was used such that a uniaxial alignment (homogeneous alignment) of the liquid crystal was obtained. The polymerizable liquid crystal composition (LCM-1) was injected into a glass cell by a vacuum injection method.

After the injection, the glass cell was taken out, and the injection port was sealed with a sealing agent 3026E (manufactured by ThreeBond Co., Ltd.). The glass cell was irradiated with ultraviolet rays having an irradiation intensity of 15 mW/cm$^2$ at 25° C. for 300 seconds through a ultraviolet rays cut filter L-37 (HOYA CANDEO OPTRONICS CORPORATION). Thus, the polymerizable compound in the polymerizable liquid crystal composition was polymerized, whereby an ECB mode LCD device was obtained. It was confirmed that, if the produced cell was disposed between two polarizing plates which were orthogonal such that the rubbing treatment direction and the polarization axis direction matched, the cell became a dark field, and a uniaxial alignment was obtained.

Figure 9:
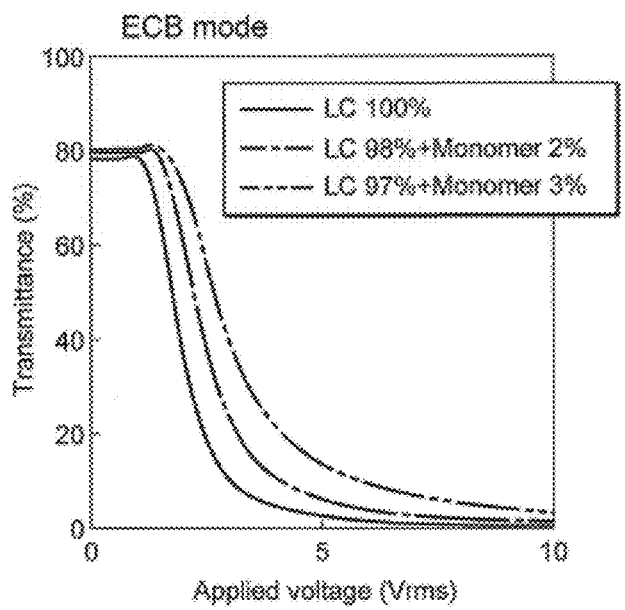
FIG. 9 is a result showing voltage-transmittance characteristics in examples.

A rectangular wave of 60 Hz was applied, and the voltage-transmittance characteristics were measured. The voltage-transmittance characteristics are shown in FIG. 9 As shown in FIG. 9, as the concentration, of the polymerizable compound in the polymerizable liquid crystal composition was increased, the drive voltage was increased, and from this, the alignment stabilizing action by the anchoring force of the liquid crystalline polymer obtained by polymerization was confirmed.

[Chem. 136]

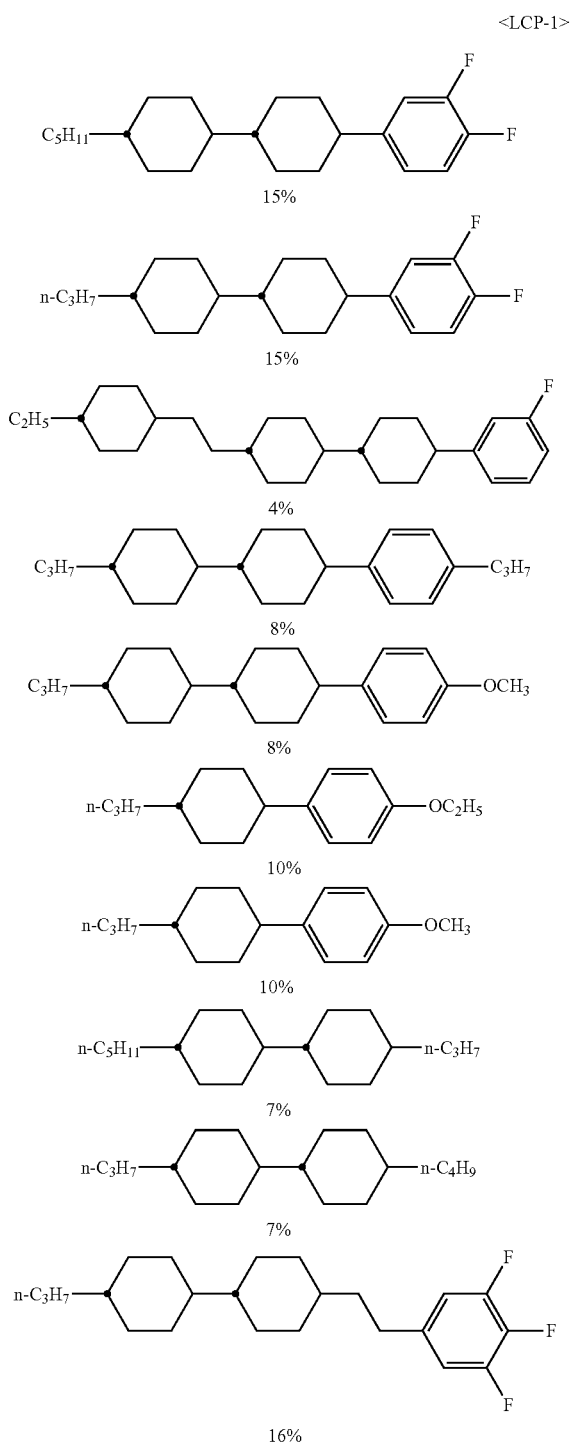

[Chem. 137]

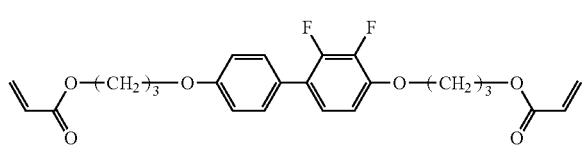

Figure 10:
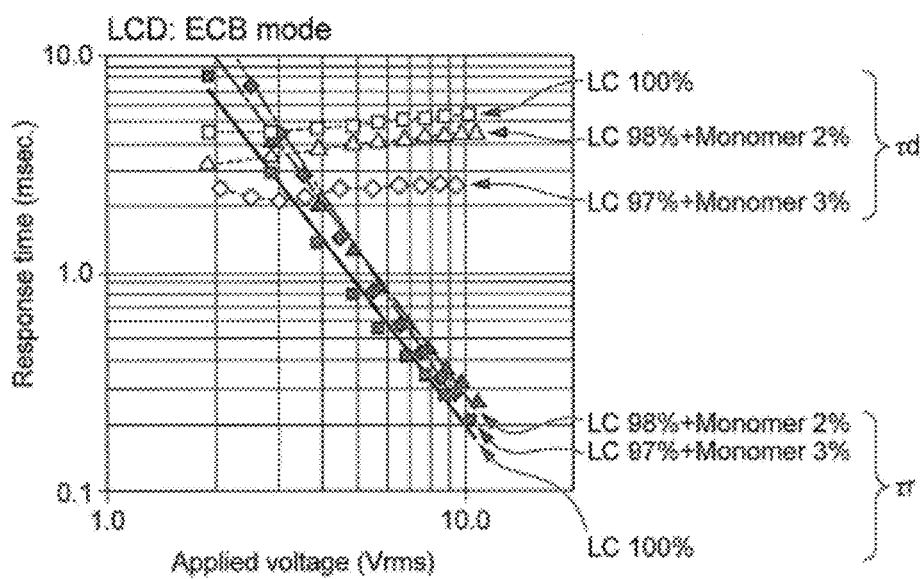
FIG. 10 is a measurement result of response times in examples.

Next, the response time in an ECB mode was examined. The results are shown in FIG. 10. As shown in FIG. 10, as the concentration of the polymerizable compound in the polymerizable liquid crystal composition was increased, speeding up of τd from 5 ms to 2 ms was confirmed. On the other hand, as the concentration of the polymerizable compound in the polymerizable liquid crystal composition was increased, a tendency that, τr in the same drive voltage became slightly slow was observed, but it was confirmed that, the overall response of τr+τd became faster.

If comparing τd and τr, it was confirmed that, while τd was influenced by the anchoring force, τr was influenced by the difference between the electric field and the anchoring force.

It was confirmed that there was no crystallization by the polymerizable compound by allowing the polymerizable liquid crystal composition used in the cell production to stand at 20° C. for 1 week.

Example 2

A polymerizable liquid crystal composition (LCM-1) containing the P-type liquid crystal composition (LCP-1; Δn of 0.103, viscosity η of 20 mPa·s) of 95%, the polymerizable compound (V1-1-1) of 5%, and a photopolymerization initiator Irgacure651 of 2% with respect to the polymerizable compound (V1-1-1) was prepared.

A cell having ITO-attached parallel rubbing alignment coated with a polyimide alignment film having a cell gap of 3.5 μm was used such that a uniaxial alignment (homogeneous alignment) of the liquid crystal was obtained. The polymerizable liquid crystal composition (LCM-1) was heated to 60° C. to be dissolved in LCP-1, and injected into a glass cell by a vacuum injection method.

After the injection, the glass cell was taken out, and the injection port was sealed with a sealing agent 3026E (manufactured by ThreeBond Co., Ltd.). The glass cell was irradiated with ultraviolet rays having an irradiation intensity of 15 mW/cm² at 25° C. or −10° C. for 300 seconds through a ultraviolet rays cut filter L-37 (HOYA CANDEO OPTRONICS CORPORATION). Thus, the polymerizable compound in the polymerizable liquid crystal composition was polymerized, whereby an ECB mode LCD device was obtained.

Figure 11:
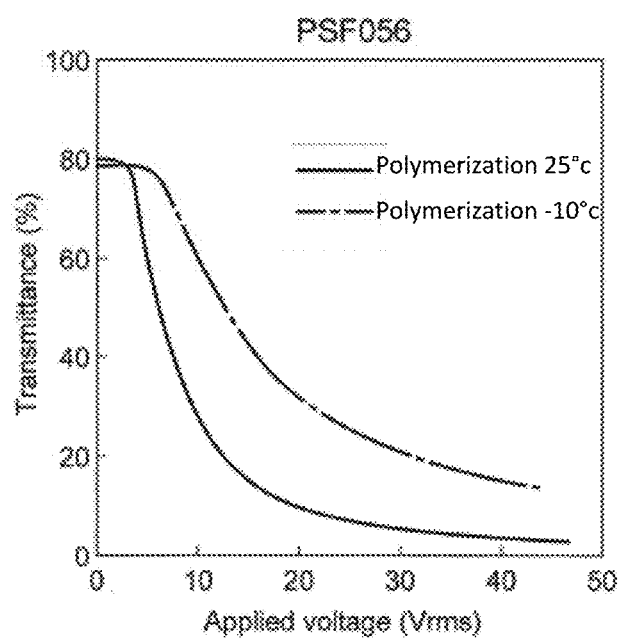
FIG. 11 is a result showing voltage-transmittance characteristics in examples.

A rectangular wave of 60 Hz was applied to the LCD device obtained by polymerization at 25° C. or −10° C., and the voltage-transmittance characteristics were measured. The voltage-transmittance characteristics are shown in FIG. 11. As shown in FIG. 11, it was confirmed that the drive voltage was increased by low temperature polymerization.

Figure 12:
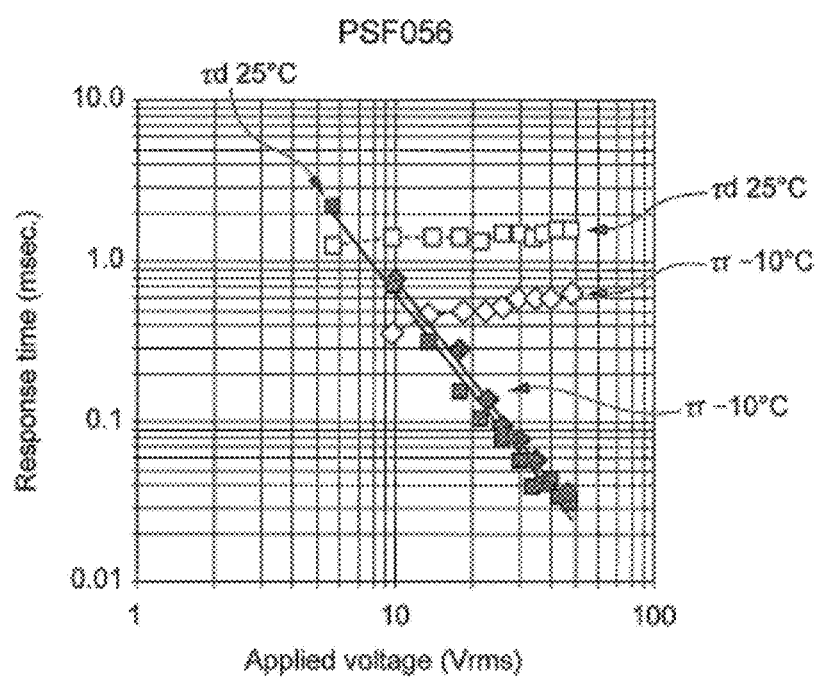
FIG. 12 is a measurement result of response times in examples.

Next, the response time in an ECB mode was examined. The results are shown in FIG. 12. As shown in FIG. 12, speeding up of τd by low temperature polymerization was confirmed. On the other hand, in τr in the same drive voltage, the difference due to the polymerisation temperature was small. It was confirmed that the response speed of the LCD device obtained by polymerization at −10° C. was an order of magnitude faster compared with a case where polymerization was performed at 25° C.

Example 3

As an N-type liquid crystal composition, a composition (Δn of 0.102, viscosity η of 16.8, Δε of −3.8) represented by the following (LCN-1) was prepared. As a polymerizable compound, a compound represented by Formula (V1-1-2) was used.

A polymerizable liquid crystal composition (LCM-2) containing the N-type liquid crystal composition (LCN-1; Δn of 0.102, viscosity η of 16.8, Δε of −3.8) of 96%, the polymerizable compound (V1-1-2) of 4%, and a photopolymerization initiator Irgacure651 of 2% with respect to the polymerizable compound (V1-1-2) was prepared.

After coating with a polyimide alignment film having a cell gap of 3 μm such that a vertical alignment (homeotropic alignment) of the liquid crystal was obtained, a cell having ITO-attached parallel rubbing alignment subjected to a rubbing alignment treatment such that the pretilt angle with respect to the normal direction of the substrate surface became 1° to 2° was used. After the solid polymerizable compound (V1-1-2) was heated to 60° C. to be dissolved in the liquid crystal (LCN-1), the polymerizable compound (V1-1-2) was uniformly dissolved at room temperature, and then, it was confirmed using a polarization microscope that the polymerizable compound (V1-1-2) exhibited a nematic liquid crystal phase. The polymerizable liquid crystal composition (LCM-2) was heated to 60° C., and injected into a glass cell by a vacuum injection method.

After the injection, the glass cell was taken out, and the injection port was sealed with a sealing agent 3026E (manufactured by ThreeBond Co., Ltd.). The glass cell was irradiated with ultraviolet rays having an irradiation intensity of 15 mW/cm² at 25° C. or −10° C. for 300 seconds through a ultraviolet rays cut filter L-37 (HOYA CANDEO OPTRONICS CORPORATION). Thus, the polymerizable compound in the polymerizable liquid crystal composition was polymerized, whereby a VA mode LCD device was obtained. It was confirmed that, if the produced cell was disposed between two polarizing plates which were orthogonal, the cell turned black, the dark field did not change even in a case where the cell was rotated in an azimuth angle direction, and the optical axis direction of the polymer network and the easy alignment axial direction of liquid crystal were the same direction.

Figure 13:
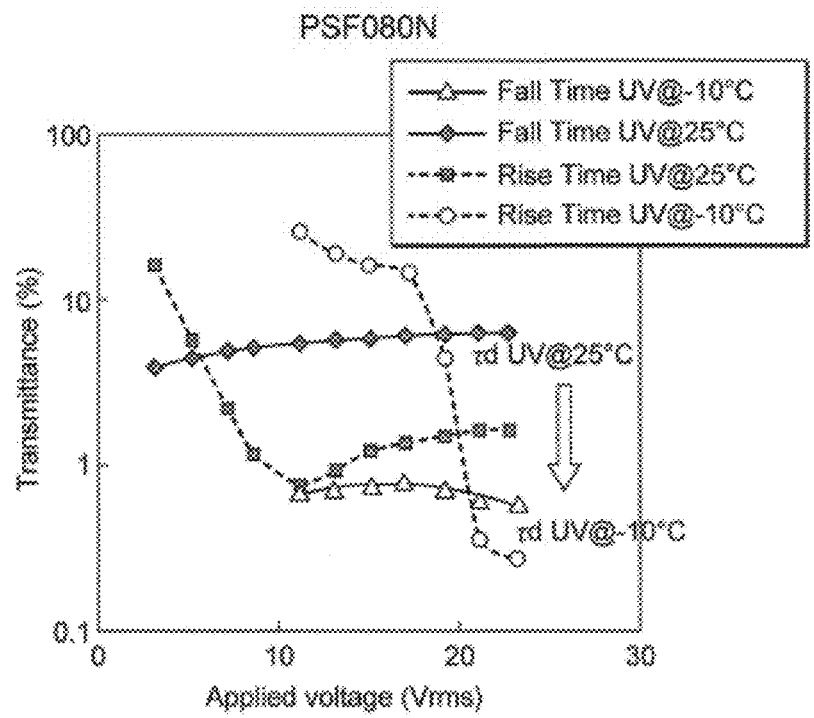
FIG. 13 is a measurement result of response times in examples.

A rectangular wave of 60 Hz was applied, and the voltage-transmittance characteristics and the response time were measured. The results are shown in FIG. 13. As shown in FIG. 13, speeding up of τd by low temperature polymerization was confirmed.

A liquid crystal cell was produced in the same manner until a step of vacuum injection, and while applying a rectangular wave of 100 Hz and 2.5 V, irradiation with UV was performed in the manner described above. It was confirmed from retardation measurement that the liquid crystal was aligned in a state in which the pretilt angle with respect to the normal direction of the substrate surface was 3°. Similarly, in the response speed, τd was 0.9 msec, and from this, speeding up of τd was confirmed.

It was confirmed that there was no crystallization by the polymerizable compound by allowing the polymerizable liquid crystal composition used in the cell production to stand at 20° C. for 1 week.

[Chem. 138]

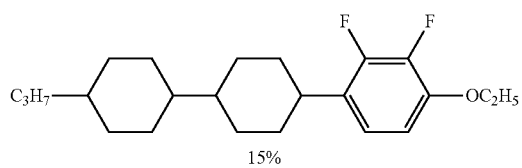

<LCN-1>

15%

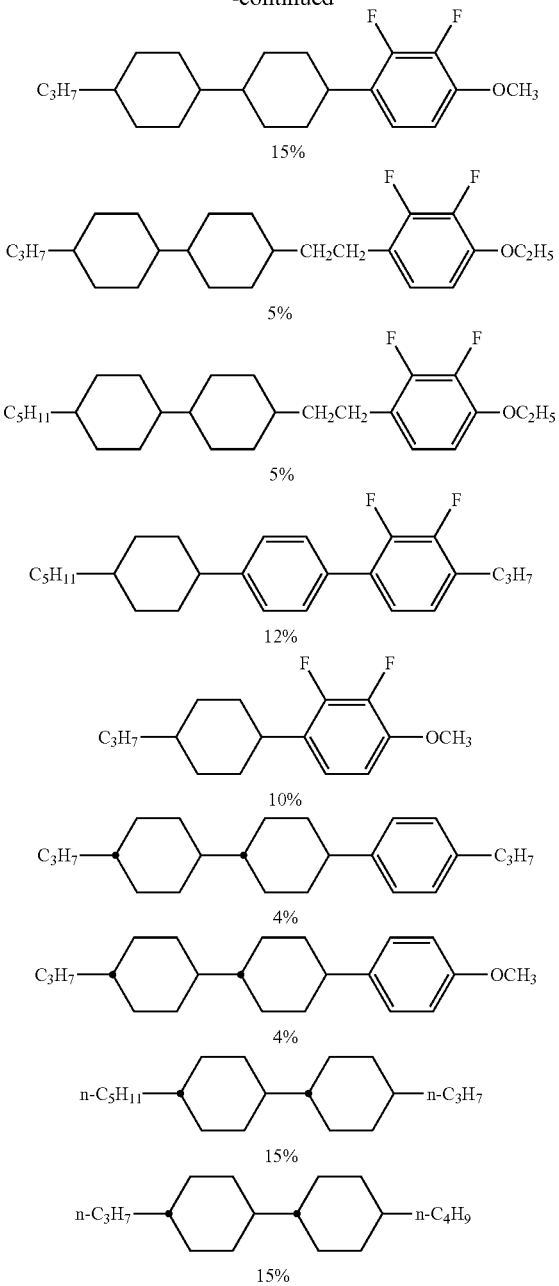

[Chem. 139]

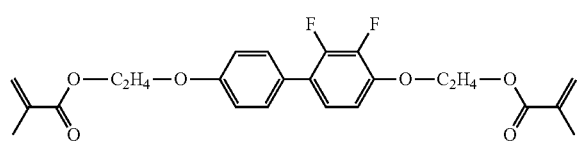

(V1-1-2)

Example 4

A VA mode LCD device was produced in the same manner as in Example 3 except that polymerisation was performed at a temperature of −10° C., 0° C., 10° C., or 25° C.

Figure 14:
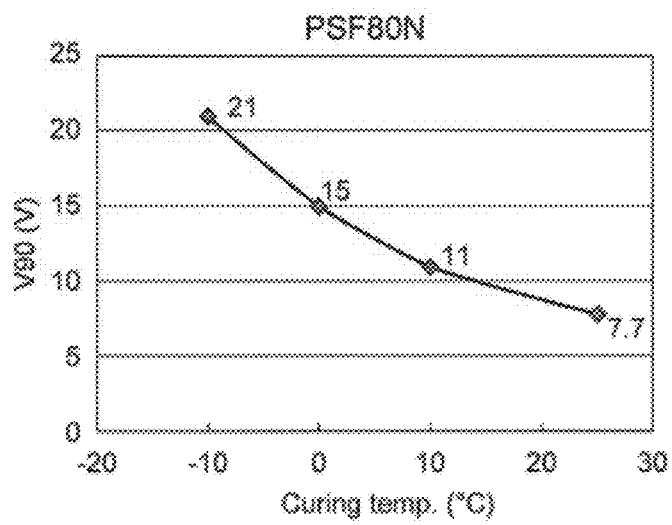
FIG. 14 is a result showing voltage-transmittance characteristics in examples.

A rectangular wave of 60 Hz was applied, and the voltage-transmittance characteristics were measured. The drive voltage V90 (v) is shown in FIG. 14. As shown in FIG. 14, it was confirmed that as the polymerisation temperature was lowered, the drive voltage was increased.

It was confirmed that there was no crystallization by the polymerizable compound by allowing the polymerizable liquid crystal composition used in the cell production to stand at 20° C. for 1 week.

Figure 15:
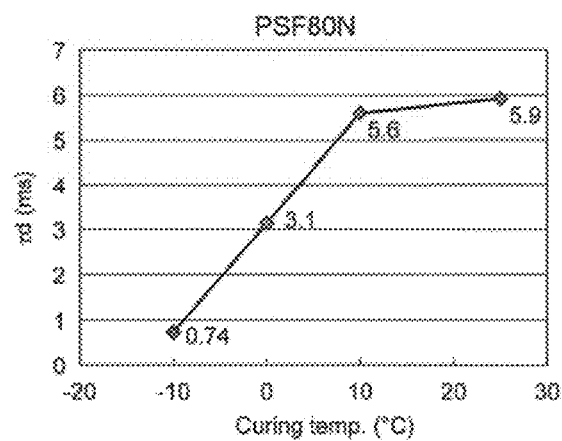
FIG. 15 is a measurement result of response times in examples.

Furthermore, the response time in a VA mode was examined. The results are shown in FIG. 15. As shown in FIG. 15, speeding up of τd by low temperature polymerization was confirmed. The gate was turned in an ON state at intervals of a frequency 60 Hz, a voltage of 1 V was applied for 16.6 milliseconds in the cell, the gate was turned OFF, and by measuring the voltage held by the cell, the voltage holding ratio was determined. The voltage holding ratio at 25° C. was 99.5%, and the voltage holding ratio at 70° C. was 93%.

Examples 5 to 16 and Comparative Examples 1 to 12

The cases where the concentration of a polymerizable compound according to functions, the temperature, and the combination were changed will be shown. It was confirmed by the difference in the temperature, the concentration, or the combination that a high speed response of the fall time of 1 msec or less was exhibited. A rectangular wave of 60 Hz was applied, and the voltage-transmittance characteristics and the response speed were measured.

It was confirmed that there was no crystallization by the polymerizable compound by allowing the polymerizable liquid crystal composition used in the cell production to stand at 20° C. for 1 week.

TABLE 1

| | Liquid crystal | Alignment function difunctional % monomer | Functional group/ mesogen group spacer | % | Other functional monomer | Type of function | % | UV intensity (mW/cm$^2$) | Polymerization temperature (° C.) | V90 | Fall time (msec) | Rise time (msec) |
|---|---|---|---|---|---|---|---|---|---|---|---|---|
| Example 5 | LCN-1 | 96 V1-1-1 | 3 | 4 | | | 0 | 15 | −10 | 38.87 | 0.61 | 0.11 |
| Example 6 | LCN-1 | 93 V1-1-2 | 6 | 5.6 | Lauryl Acrylate | Low Tg, interface pretilt | 1.4 | 15 | −10 | 25.72 | 0.51 | 1.10 |
| Example 7 | LCN-1 | 96 V1-1-2 | 6 | 2 | Va-1 Sp1 = 3 Sp2 = 3 | Anchoring enhancement | 2 | 15 | −10 | 33.43 | 0.49 | 0.71 |
| Example 8 | LCN-1 | 90 V1-1-2 | 6 | 8 | Isostearyl Acrylate | Low Tg, interface pretilt | 2 | 15 | −10 | 37.87 | 0.36 | 0.99 |
| Example 9 | LCN-1 | 90 V1-1-2 | 6 | 9.5 | Lauryl Acrylate | Low Tg, interface pretilt | 0.5 | 15 | 25 | 26.51 | 0.80 | 0.36 |
| Example 10 | LCN-1 | 90 V1-1-2 | 6 | 8.5 | Isostearyl Acrylate | Low Tg, interface pretilt | 1.5 | 15 | 25 | 22.86 | 0.90 | 0.65 |
| Example 11 | LCN-1 | 95 V1-1-1 | 3 | 5 | | | 0 | 15 | −10 | 31.06 | 0.35 | 0.52 |
| Example 12 | LCN-1 | 98 V1-1-1 | 3 | 2 | | | 0 | 15 | −10 | 22.56 | 1.00 | 0.40 |
| Example 14 | LCN-1 | 96 V1-1-1 | 3 | 4 | | | 0 | 15 | −10 | 26.41 | 1.02 | 0.54 |
| Example 15 | LCN-1 | 95 V1-1-1 | 3 | 5 | | | 0 | 15 | −10 | 22.73 | 1.03 | 0.50 |
| Example 16 | LCN-1 | 85 V1-1-2 | 6 | 14.3 | Isostearyl Acrylate | Low Tg, interface pretilt | 0.7 | 15 | 0 | 35.27 | 0.52 | 1.00 |

TABLE 2

| | Liquid crystal | Alignment function difunctional % monomer | Functional group/ mesogen group spacer | % | Other functional monomer | Type of function | % | UV intensity (mW/cm$^2$) | Polymerization temperature (° C.) | V90 | Fall time (msec) | Rise time (msec) |
|---|---|---|---|---|---|---|---|---|---|---|---|---|
| Comparative Example 1 | LCN-1 | 96 V1-1-1 | 3 | 4 | | | 0 | 15 | 25 | 14.90 | 2.85 | 1.15 |
| Comparative Example 2 | LCN-1 | 96 V1-1-2 | 6 | 4 | | | 0 | 15 | 25 | 7.71 | 4.79 | 2.19 |
| Comparative Example 3 | LCN-1 | 93 V1-1-2 | 6 | 5.6 | Lauryl Acrylate | Low Tg, interface pretilt | 1.4 | 15 | 25 | 9.89 | 2.38 | 2.18 |
| Comparative Example 4 | LCN-1 | 96 V1-1-2 | 6 | 2 | Va-1 Sp1 = 3 Sp2 = 3 | Anchoring enhancement | 2 | 15 | 25 | 16.01 | 1.29 | 0.59 |
| Comparative Example 5 | LCN-1 | 90 V1-1-2 | 6 | 8 | Isostearyl Acrylate | Low Tg, interface pretilt | 2 | 15 | 25 | 19.40 | 1.20 | 2.06 |
| Comparative Example 6 | LCN-1 | 90 V1-1-2 | 6 | 9 | Isostearyl Acrylate | Low Tg, interface pretilt | 1 | 15 | 25 | 19.51 | 1.54 | 0.63 |

TABLE 2-continued

| | Liquid crystal | Alignment function difunctional % monomer | Functional group/mesogen group spacer | Other functional % monomer | Type of function | % | UV intensity (mW/cm$^2$) | Polymerization temperature (° C.) | V90 | Fall time (msec) | Rise time (msec) |
|---|---|---|---|---|---|---|---|---|---|---|---|
| Comparative Example 7 | LCN-1 | 95 V1-1-1 | 3 | 5 | | 0 | 15 | 25 | 17.97 | 1.46 | 0.47 |
| Comparative Example 8 | LCN-1 | 95 V1-1-2 | 6 | 5 | | 0 | 15 | 25 | 13.40 | 3.77 | 2.34 |
| Comparative Example 9 | LCN-1 | 98 V1-1-1 | 3 | 2 | | 0 | 15 | 25 | 14.91 | 2.18 | 3.77 |
| Comparative Example 10 | LCN-1 | 97 V1-1-1 | 3 | 3 | | 0 | 15 | 25 | 17.78 | 1.57 | 1.36 |
| Comparative Example 11 | LCN-1 | 96 V1-1-1 | 3 | 4 | | 0 | 15 | 25 | 18.10 | 1.42 | 1.12 |
| Comparative Example 12 | LCN-1 | 95 V1-1-1 | 3 | 5 | | 0 | 15 | 25 | 15.89 | 2.02 | 1.86 |

Examples 17 to 22 and Comparative Examples 13 and 14

A polymerizable liquid crystal composition was adjusted by using (LCN-1) as an N-type liquid crystal composition, adding a compound represented by (V1-1-3) as the following Table 3 as a polymerizable compound, and adding a photopolymerization initiator Irgacure651 so as to be 2% with respect to the polymerizable compound (V1-1-3). A VA mode liquid crystal cell was produced in the same manner as in Example 3.

Thus, a phase separation structure was formed in the entire cell by polymerizing the polymerizable compound in the polymerizable liquid crystal composition, whereby a VA mode LCD device was obtained. Using a polarization microscope, it was confirmed that, if the produced cell was disposed between two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were formed so as to be orthogonal to the cell surface.

It was confirmed that there was no crystallization by the polymerizable compound by allowing the polymerizable liquid crystal composition used in the cell production to stand at 20° C. for 1 week.

A rectangular wave of 60 Hz was applied to the VA mode of the produced cell, and the voltage-transmittance characteristics and the response time were measured. The results are shown in Table 3. Comparative Example 13 in Table 3 shows the drive voltage V90, the fall time, and the rise time in the case of the liquid crystal composition (LCN-1) of 100%. In a case where the polymerizable compound (V1-1-3) of Example 14 was added in an amount of 0.5%, the fall time was longer compared with Comparative Example 13, and improvement of the response time was observed, but in a case where the polymerizable compound (V1-1-3) was added to Comparative Example 13 in a small amount of 1% to 3%, the fall time and the rise time were shortened, and the responsiveness was improved. It was confirmed that the fall time was shortened by the effects of an anchoring force of the polymer network formed such that the optical axis direction of the polymer network and the easy alignment axis of liquid crystal matched.

Furthermore, with increase of the drive voltage, the rise time was shortened, and the responsiveness is improved. The fall time is significantly affected by the rotational viscosity and the elastic constant of the liquid crystal, but if a polymer network having optical anisotropy is formed in the liquid crystal, the fall time is improved by the anchoring force from the polymer network, and the liquid crystal is useful as a display material of a display having good responsiveness. In a case where the concentration of the polymerizable compound is less than 1%, the polymer network is formed in the vicinity of the substrate interface and nearly does not contribute to the fall time, but in a case where the concentration of the polymerizable compound is 1% or greater, the polymer network having optical anisotropy is formed between two substrates, and the effects on the fall time are increased in proportion to the concentration of the polymerizable compound.

[Chem. 140]

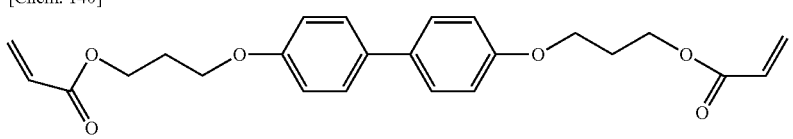

(V1-1-3)

TABLE 3

| | Liquid crystal | % | Alignment function difunctional monomer | % | UV intensity (mW/cm²) | Polymerization temperature (° C.) | V90 | Fall time (msec) | Rise time (msec) |
|---|---|---|---|---|---|---|---|---|---|
| Comparative Example 13 | LCN-1 | 100 | V1-1-3 | 0 | 0 | — | 7.5 | 4.2 | 2.9 |
| Comparative Example 14 | LCN-1 | 99.5 | V1-1-3 | 0.5 | 20 | 25 | 7.6 | 4.6 | 5.4 |
| Example 17 | LCN-1 | 99 | V1-1-3 | 1 | 20 | 25 | 7.7 | 3.9 | 3.9 |
| Example 18 | LCN-1 | 98.5 | V1-1-3 | 1.5 | 20 | 25 | 7.8 | 3.7 | 3.8 |
| Example 19 | LCN-1 | 98.3 | V1-1-3 | 1.7 | 20 | 25 | 8.6 | 3.3 | 3.1 |
| Example 20 | LCN-1 | 98 | V1-1-3 | 2 | 20 | 25 | 9.7 | 2.4 | 1.4 |
| Example 21 | LCN-1 | 97.5 | V1-1-3 | 2.5 | 20 | 25 | 12.2 | 2.3 | 1.2 |
| Example 22 | LCN-1 | 97 | V1-1-3 | 3 | 20 | 25 | 15.7 | 2.0 | 0.9 |

Examples 23 to 25

In Examples 23 and 24, a polymerizable liquid crystal composition was adjusted by using (LCN-1) as an N-type liquid crystal composition, adding a compound of 1.5% or 10%, represented by the following Formula (V1-1-4) as a polymerizable compound, and adding a photopolymerization initiator Irgacure651 so as to be 2% with respect to the polymerizable compound (V1-1-4). In addition, in Example 25, a polymerizable liquid crystal composition was adjusted by adding a compound of 20%, represented by the following Formula (V1-1-5) to (LCN-1) as a polymerizable compound, and adding a photopolymerization initiator Irgacure651 so as to be 2% with respect to the polymerizable compound (V1-1-5). A VA mode liquid crystal cell was produced in the same manner as in Example 3.

[Chem. 141]

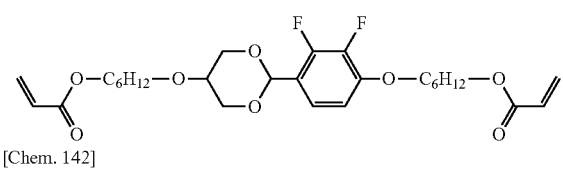

(V1-1-4)

[Chem. 142]

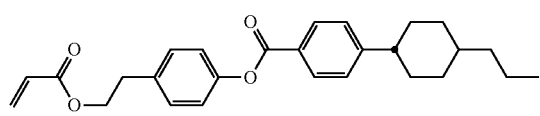

(V1-1-5)

in an azimuth angle direction was formed, and the optical axis direction of the polymer network and the easy alignment axial direction of liquid crystal were formed so as to be orthogonal to the cell surface.

A rectangular wave of 60 Hz was applied to the VA mode of the produced cell, and the voltage-transmittance characteristics and the response time were measured. The results are shown in the above table. It was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved. It was confirmed that there was no crystallization by the polymerizable compound by allowing the polymerizable liquid crystal composition used in the cell production to stand at 20° C. for 1 week.

Example 26

A polymerizable liquid crystal composition was adjusted by using (LCN-1) as an N-type liquid crystal composition, adding a compound of 8%, represented by the following Formula (V1-1-6) and the compound of 2%, represented by Formula (V1-1-1) to (LCN-1) as a polymerizable compound, and adding a photopolymerization initiator Irgacure651 so as to be 2% with respect to the total amount, of polymerizable compound. A VA mode liquid crystal cell was produced in the same manner as in Example 3.

A rectangular wave of 60 Hz was applied to the VA mode of the produced cell, and the response time was measured. V90 was 26.4V, the fall time was 0.9 msec, and the rise time was 0.9 msec. Using a polarization microscope, it was confirmed that, if the produced cell was disposed between

TABLE 4

| | Liquid crystal | % | Alignment function difunctional monomer | % | UV intensity (mW/cm²) | Polymerization temperature (° C.) | V90 | Fall time (msec) | Rise time (msec) |
|---|---|---|---|---|---|---|---|---|---|
| Example 23 | LCN-1 | 98.5 | V1-1-4 | 1.5 | 20 | 25 | 7.8 | 3.6 | 3.9 |
| Example 24 | LCN-1 | 90 | V1-1-4 | 10 | 20 | 25 | 23.5 | 0.7 | 0.3 |
| Example 25 | LCN-1 | 80 | V1-1-5 | 20 | 20 | 25 | 30.6 | 0.7 | 0.6 |

As the results of Examples 17 to 25, it was confirmed that, if the produced cell was disposed between two polarizing plates which were orthogonal, the cell became a dark field, a homeotropic alignment in which the dark level of the dark field did not change even in a case where the cell was rotated two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were formed so as to be orthogonal to the cell surface.

It was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved.

It was confirmed that there was no crystallization by the polymerizable compound by allowing the polymerizable liquid crystal composition used in the cell production to stand at 20° C. for 1 week.

It was confirmed that there was no crystallization by the polymerizable compound by allowing the polymerizable liquid crystal composition used in the cell production to stand at 20° C. for 1 week.

Example 28

A polymerizable liquid crystal composition was adjusted by using (LCN-1) as an N-type liquid crystal composition, adding a compound of 5%, represented by the following Formula (V1-1-4) and the compound of 5%, represented by Formula (V1-1-3) to (LCN-1) as a polymerizable compound

[Chem. 143]

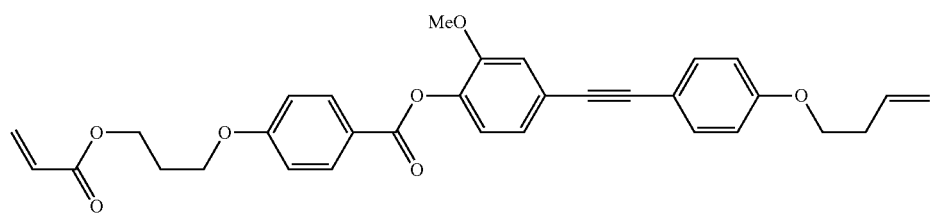

(V1-1-6)

Example 27

A polymerizable liquid crystal composition was adjusted by using (LCN-1) as an N-type liquid crystal composition, adding a compound of 4%, represented by the following Formula (V1-1-7) and the compound of 6%, represented by Formula (V1-1-1) to (LCN-1) as a polymerizable compound, and adding photopolymerization initiator Irgacure651 so as to be 2% with respect to the total amount of polymerizable compound. A VA mode liquid crystal cell was produced in the same manner as in Example 3.

[Chem. 144]

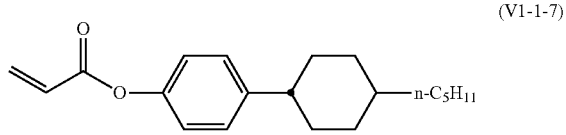

(V1-1-7)

A rectangular wave of 60 Hz was applied to the VA mode of the produced cell, and the voltage-transmittance characteristics and the response time were measured. V90 was 36.6V, the fall time was 0.8 msec, and the rise time was 0.2 msec. Using a polarization microscope, it was confirmed that, if the produced cell was disposed between two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were formed so as to be orthogonal to the cell surface. It was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved.

which was an alignment function difunctional monomer, and adding a photopolymerization initiator Irgacure651 so as to be 2% with respect to the total amount of polymerizable compound. A VA mode liquid crystal cell was produced in the same manner as in Example 3.

A rectangular wave of 60 Hz was applied to the VA mode of the produced cell, and the voltage-transmittance characteristics and the response time were measured. V90 was 23.6 V, the fall time was 0.8 msec, and the rise time was 0.9 msec. It was confirmed that, if the produced cell was disposed between two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were formed so as to be orthogonal to the cell surface.

Furthermore, a liquid crystal cell was produced in the same manner as in Example 3 except that exposure to UV was performed while applying a voltage of 15V. If the liquid crystal alignment state was observed using a polarization microscope in a state in which a voltage was not applied, it was found that a bright field appeared in a case where the cell was rotated in an azimuth angle direction, a dark field appeared in a case where the polarization direction and the rubbing direction were rotated to match, and the liquid crystal was in homogeneous alignment. It was confirmed that the optical axis direction of the polymer network and the easy alignment axial direction of liquid crystal were formed so as to be horizontal to the cell surface. If the temperature was raised to 85° C. at which the liquid crystal became an isotropic phase in a state of bright field, the liquid crystal portion became a dark state, and a form of a polymer network showing optical anisotropy was observed.

Figure 16:
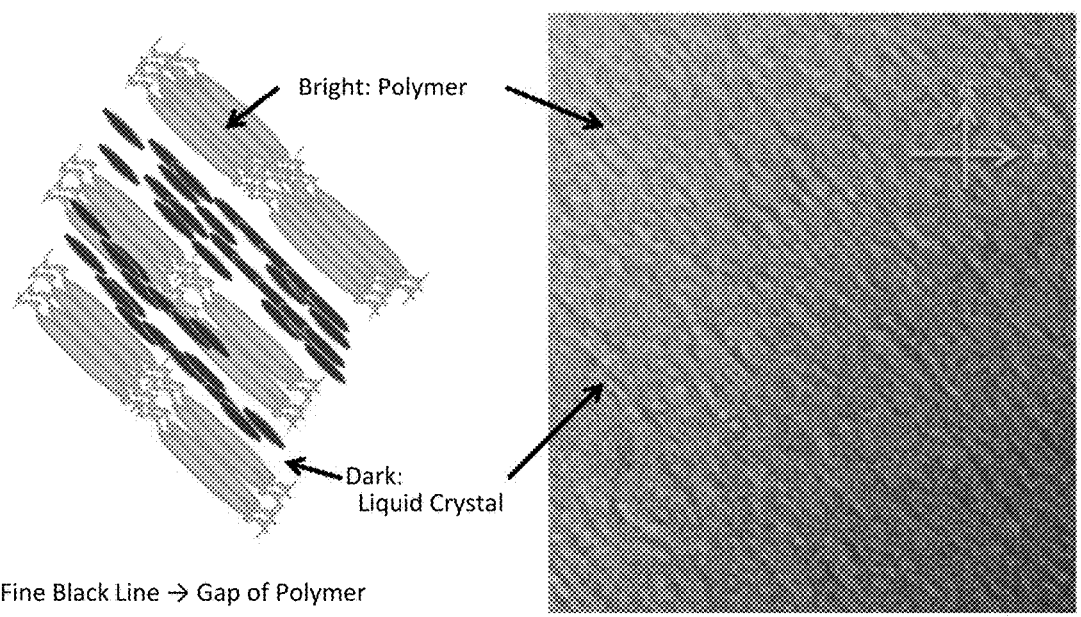
FIG. 16 is a photograph of an alignment polymerization phase separation structure in an example observed using a polarization microscope and an explanatory view.

A photography of an alignment polymerization phase separation structure in a case where a voltage was applied to the vertical alignment cell to form a homogeneous alignment state and UV exposure (3 mW/cm², 60 seconds) was performed, observed using a polarization microscope and an explanatory view are shown in FIG. 16. Since the polymer network exhibits optical anisotropy, bright and dark contrast is obtained between the liquid crystal portions of the isotropic phase, and a polymerization phase separation structure is observed. If was found that, if the optical axis of the polymer network matched the polarization direction, a dark field was formed, and the polymer network exhibited optical anisotropy. In the polarization microscope photograph of FIG. 16, a homogeneous alignment is shown, if observing the cell subjected to UV exposure without applying a voltage and observing the polymerization phase separation structure even in a vertical alignment cell in the same manner, it is shown that a dark field in which there is no difference in refractive index with the polymer network is formed, and a polymer network is formed in a direction vertical to two cell substrate surfaces which are parallel.

Examples 29 to 32

A polymerizable liquid crystal composition was adjusted by using (LCN-1) as an N-type liquid crystal composition, using compounds represented by each of Formulas (V1-1-1) and the following Formula (V1-1-9) as a polymerizable compound which was an alignment function difunctional monomer, and adding a photopolymerization initiator Irgacure651 so as to be 2% with respect to the total amount of polymerizable compound. A VA mode liquid crystal cell was produced in the same manner as in Example 3 except that a rubbing treatment was performed such that the pretilt angle became 7°. It was confirmed that, if the produced cell was disposed between two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were formed so as to be orthogonal to the cell surface.

A rectangular wave of 60 Hz was applied to the VA mode of the produced cell, and the voltage-transmittance characteristics and the response time were measured. The results are shown in Tables below. It was confirmed that the fall time was shortened by the effects of an anchoring force of the polymer network formed such that the optical axis direction of the polymer network and the easy alignment axis of liquid crystal matched.

It was confirmed from the measurement of the angle dependence of retardation by a rotating analyzer method that the pretilt angle varied if the blending ratio of the polymerizable compounds (V1-1-1) and (V1-1-9) was changed. Furthermore, by adjusting the blending ratio of the polymerizable compounds (V1-1-1) and (V1-1-9), an LCD device in which the fail time was shorter than the liquid crystal itself and the increase in the drive voltage V90 was prevented was obtained. It was confirmed that there was no crystallization by the polymerizable compound by allowing the polymerizable liquid crystal composition used in the cell production to stand at 20° C. for 1 week.

[Chem. 145]

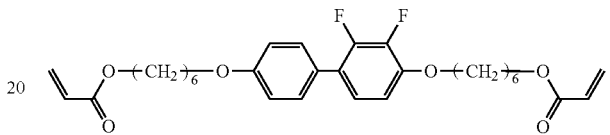

(V1-1-9)

TABLE 5

| | Liquid crystal | % | Alignment function difunctional monomer 1 | % | Alignment function difunctional monomer 2 | % | UV intensity (mW/cm²) | Polymerization temperature (° C.) | V90 | Pretilt angle | Fall time (msec) | Rise time (msec) |
|---|---|---|---|---|---|---|---|---|---|---|---|---|
| Comparative Example 15 | LCN-1 | 100 | V1-1-1 | 0 | V1-1-9 | 0 | — | — | 4.2 | 8 | 8.6 | 3.8 |
| Example 29 | LCN-1 | 98 | V1-1-1 | 0.2 | V1-1-9 | 1.8 | 20 | 25 | 5.2 | 8 | 8 | 4.1 |
| Example 30 | LCN-1 | 98 | V1-1-1 | 0.8 | V1-1-9 | 1.2 | 20 | 25 | 5.4 | 10 | 7.9 | 4.2 |
| Example 31 | LCN-1 | 98 | V1-1-1 | 1 | V1-1-9 | 1 | 20 | 25 | 5.6 | 11 | 7.8 | 4.3 |
| Example 32 | LCN-2 | 98 | V1-1-1 | 1.6 | V1-1-9 | 0.4 | 20 | 25 | 6.3 | 13 | 6.8 | 5 |

Examples 33 to 35

A polymerizable liquid crystal composition was adjusted by using (LCN-1) as an N-type liquid crystal composition, using a compound represented by the following Formula (Vn-1-1), a polymerizable compound represented by Formula (V1-1-10) which was an alignment function difunctional monomer, or a polymerizable compound represented by Formula (V1-1-9) as a polymerizable compound which was an alignment function difunctional monomer, and adding a photopolymerization initiator Irgacure651 so as to be 2% with respect to the total amount of polymerizable compound. A VA mode liquid crystal cell was produced in the same manner as in Example 3 except that a rubbing treatment was performed on the N-type composition (LCN-1) such that the pretilt angle became 8° under UV exposure conditions. For the UV exposure conditions, in Example 33, irradiation with UV light was performed from the cell normal direction, and in Examples 34 and 35, irradiation with UV parallel light which was 30°-tilted in the rubbing direction with respect to the cell normal direction was performed.

A rectangular wave of 60 Hz was applied to the VA mode of the produced cell, and the voltage-transmittance characteristics and the response time were measured. The results are shown in Tables below. It was confirmed that the fall time was shortened by the effects of an anchoring force of the polymer network formed such that the optical axis direction of the polymer network and the easy alignment axis of liquid crystal matched.

In Example 33 in which exposure to UV light was performed from the cell normal direction, the pretilt angle was the same as that in the case of the liquid crystal itself (Comparative Example 19). In Example 34 in which exposure to UV which was 30°-tilted was performed, the pretilt angle was changed to 10°, It was confirmed that the photo-alignment function of (Vn-1-1) inducing a pretilt angle in the UV exposure direction acted. In Example 35, a case where the content of the polymerizable compound was increased to 10% was shown, and in this case, the pretilt angle induced in the UV exposure direction was increased, and T100 (maximum transmittance) was greatly improved compared with a case where a difunctional monomer having a photo-alignment function of Comparative Example 20 was not contained. By the action of a difunctional monomer having a photo-alignment function, the alignment properties of the polymer network were enhanced, and T100 could be improved.

It was confirmed that there was no crystallization by the polymerizable compound by allowing the polymerizable liquid crystal composition used in the cell production to stand at 20° C. for 1 week.

(homeotropic alignment) of the liquid crystal was obtained, the resulting product was baked, whereby a vertical alignment film was formed. The drive mode was a normally black mode in which a polarizer disposed outside the upper and the lower glass substrates were in cross Nicol.

A polymerizable liquid crystal composition was adjusted by using (LCN-1) as an N-type liquid crystal composition and adding a compound represented by any one of Formulas (V1-1-1), (1-1-2), (1-1-3) as a polymerizable compound. After the polymerizable liquid crystal composition was heated to 60° C. and injected into a glass cell by a vacuum injection method, the liquid crystal cell was taken out, and the injection port was sealed with a sealing agent 3026E (manufactured by ThreeBond Co., Ltd.). Next, by irradiation with ultraviolet rays having an irradiation ultraviolet (UV) intensity of 20 mW/cm$^2$ at 25° C. for 60 seconds through a ultraviolet rays cut filter L-37 (HOYA CANDEO OPTRONICS CORPORATION) in a state in which an AC rectangular wave voltage of 64 Hz below a threshold voltage (1V) was applied to the liquid crystal layer, to polymerize a photopolymerizable monomer, liquid crystal panels of Examples 36 to 45 as shown in the following table having a polymer

[Chem. 146]

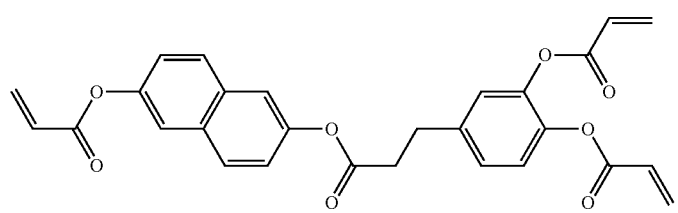

(V1-1-10)

[Chem. 147]

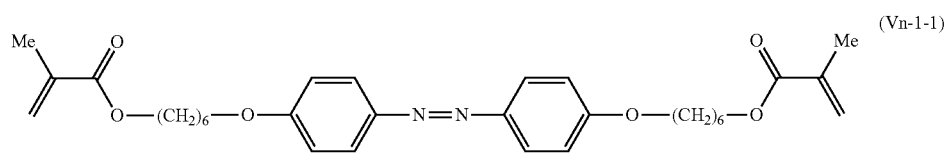

(Vn-1-1)

TABLE 6

|  | Liquid crystal | % | Alignment function difunctional monomer | % | Photo-alignment function difunctional monomer | % | UV exposure tilted angle | Pretilt angle | T100 | V90 | Rise time (msec) | Fall time (msec) |
|---|---|---|---|---|---|---|---|---|---|---|---|---|
| Comparative Example 19 | LCN-1 | 100 | — | — | — | — | — | 8 | 84 | 4.9 | 4 | 7.2 |
| Example 33 | LCN-1 | 98 | V1-1-10 | 1.98 | Vn-1-1 | 0.02 | 0 | 8 | 83 | 6.3 | 6 | 2.8 |
| Example 34 | LCN-1 | 98 | V1-1-10 | 1.98 | Vn-1-1 | 0.02 | 30 | 10 | 80 | 9.8 | 4.8 | 1.6 |
| Example 35 | LCN-1 | 90 | V1-1-9 | 9.95 | Vn-1-1 | 0.05 | 30 | 12 | 78 | 22.6 | 0.88 | 0.95 |

Examples 36 to 45 and Comparative Examples 20 and 21

An MVA mode liquid crystal panel having a cell gap of 3.5 μm was produced by providing banks (projections) having a height of 1.5 μm and a width of 10 μm alternately such that the gap became 37.5 μm by a resist LC-200 manufactured by Shipley Company on the side in contact with the liquid crystal on a pair of glass substrates on which an ITO electrode had been formed. After coating with a polyimide alignment film such that a vertical alignment network type MVA structure were produced. A rectangular wave of 60 Hz was applied to the produced panel, and the voltage-transmittance characteristics and the response time were measured. A rectangular wave voltage of 60 Hz giving V90 was applied, and the fall time τd and the rise time τr were measured.

In addition, for a liquid crystal panel of only (LCN-1) not including a difunctional monomer of Comparative Example 20, the voltage-transmittance characteristics and the response time were measured in the same manner as described above. Furthermore, a liquid crystal panel of Comparative Example 21 was produced by injecting a liquid crystal composition in which only 0.5% of the difunctional monomer (V1-1-1) was included in (LCM-1) into a liquid crystal cell by a vacuum injection method and irradiating the liquid crystal composition with ultraviolet rays of 20 mW/cm² for 60 seconds while applying a rectangular wave voltage of 100 Hz and 2.5 V, and the voltage-transmittance characteristics and the response time were measured in the same manner as in Example 36.

perature in these examples was 25° C., but in Example 40 in which polymerization was performed at −10° C., τr and τd were 1 ms and 0.4 ms, respectively, compared with Example 39, and in Example 43, τr and τd were 0.3 ms and 0.5 ms, respectively, and from this, it could be confirmed that the response speed became very high, and the polymerization reaction at low temperature contributed greatly to the improvement of response speed. In addition, if was also confirmed that in the polymerizable liquid crystal composi-

TABLE 7

|  | Liquid crystal | % | Alignment function difunctional monomer | % | UV intensity (mW/cm²) | Polymerization temperature (° C.) | V90 | Fall time (msec) | Rise time (msec) |
|---|---|---|---|---|---|---|---|---|---|
| Example 36 | LCN-1 | 99 | V1-1-1 | 1 | 20 | 25 | 7.7 | 3.9 | 3.9 |
| Example 37 | LCN-1 | 98.5 | V1-1-1 | 1.5 | 20 | 25 | 7.8 | 3.7 | 3.8 |
| Example 38 | LCN-1 | 98.3 | V1-1-1 | 1.7 | 20 | 25 | 8.6 | 3.3 | 3.1 |
| Example 39 | LCN-1 | 98 | V1-1-1 | 2 | 20 | 25 | 9.7 | 2.4 | 1.4 |
| Example 40 | LCN-1 | 98 | V1-1-1 | 2 | 20 | −10 | 22.6 | 1 | 0.4 |
| Example 41 | LCN-1 | 97 | V1-1-1 | 3 | 20 | 25 | 15.7 | 2.0 | 0.9 |
| Example 42 | LCN-1 | 95 | V1-1-1 | 5 | 20 | 25 | 18.0 | 1.5 | 0.5 |
| Example 43 | LCN-1 | 95 | V1-1-1 | 5 | 20 | −10 | 31.1 | 0.3 | 0.5 |
| Example 44 | LCN-1 | 90 | V1-1-2 | 10 | 20 | 25 | 23.5 | 0.7 | 0.3 |
| Example 45 | LCN-1 | 80 | V1-1-3 | 20 | 20 | 25 | 30.6 | 0.7 | 0.6 |
| Comparative Example 20 | LCN-1 | 100 |  | 0 | 0 | N.A. | 7.5 | 4.2 | 2.9 |
| Comparative Example 21 | LCN-1 | 99.5 | V1-1-1 | 0.5 | 20 | 25 | 7.6 | 4.6 | 5.4 |

The results are shown in the above table. Comparative Example 20 in above table shows the drive voltage V90, the fall time, and the rise time in the case of the liquid crystal composition (LCN-1) of 100%. In a case where the compound represented by Formula (V1-1-1) of Comparative Example 21 was added in an amount of 0.5%, the fall time was longer compared with Comparative Example 20, and improvement of the response time was not observed, but in a case where the compound represented by Formula (V1-1-1) was added to Comparative Example 20 in a small amount of 1% to 3%, the fall time was shortened, and the responsiveness was improved. It was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved. The fall time is significantly affected by the rotational viscosity and the elastic constant of the liquid crystal, but if a polymer network having optical anisotropy is formed in the liquid crystal, the fall time is improved by the anchoring force from the polymer network, and the liquid crystal is useful as a display material of a display having good responsiveness.

In a case where the concentration of the polymerizable compound is less than 1%, the polymer network is formed in the vicinity of the substrate interface and nearly does not contribute to the fall time, but in a case where the concentration of the polymerizable compound is 1% or greater, the polymer network having optical anisotropy is formed between two substrates, and the effects on the fall time are increased in proportion to the concentration of the polymerizable compound. In Example 39 in which 2% of the compound represented by Formula (V1-1-1) was added, τd was 2.4 ms and τr was 1.4 ms, and in Example 42 in which 3% was added, τr was 1.5 ms and τd was 0.5 ms, and from this, it was found that the response time became faster with the increase of the added amount. The polymerization temtion using the compound represented by Formula (V1-1-2) as shown in Example 44, from the fact that by the monomer addition amount of 10%, τr became 0.7 ms and τd became 0.3 ms, and also in the polymerization of at 25° C., a polymerizable liquid crystal composition was obtained by the polymerization reaction at −10° C. of the monomer using Formula (V1-1-1), almost the same characteristics were shown.

Although Example 45 obtained by polymerizing the polymerizable liquid crystal composition in which 20% of the monomer of Formula (V1-1-3) was added, at room temperature, also in Example 45, almost the same characteristics as in Example 44 were obtained.

It was confirmed that, if a liquid crystal panel having a polymer network type MVA structure produced in this manner was disposed between polarization microscopes in which two polarizing plates were orthogonal, dark(black) display was observed, the black did not change even in a case where the cell was rotated in an azimuth angle direction, and the optical axis direction of the polymer network and the easy alignment axial direction of liquid crystal were the same direction.

If observing by a polarization microscope between cross Nicol in the same manner as described above while applying a voltage higher than a threshold voltage to the liquid crystal panel, it was observed that four disclination lines appeared in the boundary region of the alignment considered to be alignment-divided. Since the disclination line is generated due to the disorder of the liquid crystal molecular arrangement, from this, it could be confirmed that 1 pixel was divided into four parts.

It was confirmed that the optical axis direction and the easy alignment axial direction of liquid crystal were formed so as to be orthogonal to the cell surface. It was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved. The same evaluation was performed on a cell in which a rib structure had been provided on one substrate and a slit structure of ITO had been provided on the counter substrate side, but a large difference in display characteristics was not observed.

Examples 46 to 53 and Comparative Example 22

Figure 20:
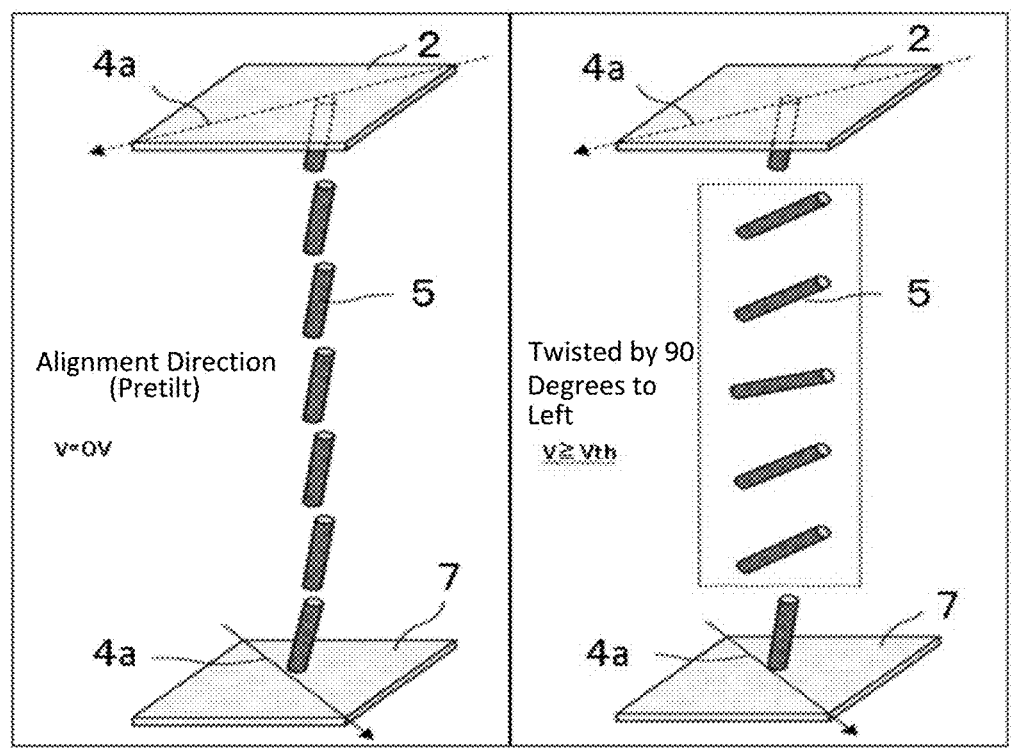
FIG. 20 is a schematic view of molecular alignment of liquid crystal molecules in a VA-TN liquid crystal cell of the present invention.

After a photo-alignment film coating solution having a 4-chalcone group was applied to the first, substrate and the second substrate by a spin casting method, the resulting product was baked at 180° C. for 60 minutes, whereby an alignment film was formed. Subsequently, an alignment treatment by light irradiation was performed by irradiating the alignment film with P-polarized light having a wavelength of 365 nm at an incident angle of 40 degrees, at an intensity of 3 mW/cm$^2$ for 400 seconds, along the alignment direction shown in FIG. 20.

The pretilt angle was measured, and the pretilt angle of the liquid crystal molecules in the vicinity of the first alignment film and in the vicinity of the second alignment film was 88.5°. Although the configuration molecules of the alignment film had a 4-chalcone photo functional group (photosensitive group) on the side chain of the polymer chain, by this photo-alignment treatment, the photofunctional group formed dimers by a dimerization reaction, and as a result, a cross linked structure was formed. In this example, the inside of each pixel of the first substrate was divided into two alignment treatment regions, and light irradiation was performed from the opposite direction to each other. In addition, in the same manner, the inside of each pixel of the second substrate was divided into two alignment, treatment regions, and light irradiation was performed from the opposite direction to each other. After seal formation and spacer spraying were performed. In the substrate bonding step, the first substrate and the second substrate were bonded such that the alignment treatment directions became orthogonal. Thus, four domain regions having different twist directions of the liquid crystal molecules in each pixel were formed.

In the same manner as in Examples 36 to 45, polymerizable liquid crystal compositions shown in the following table were adjusted by adding a compound represented by Formula (V1-1-1), (1-1-2), or (1-1-3) to an N-type liquid crystal composition (LCN-1). Next, the polymerizable liquid crystal composition was injected into a liquid crystal panel and sealed in the same manner as in Examples 36 to 45 and irradiated with UV, and by the photo-alignment treatment in Examples 46 to 53, a VATN type polymer network liquid crystal display panel was produced. The cell gap was 3.5 µm. In addition, a VATN type liquid crystal panel in which only the liquid crystal composition (LCN-1) not including a difunctional monomer had been enclosed was used as Comparative Example 22. The voltage-transmittance characteristics and the response speed of the obtained liquid crystal panel were measured in the same manner as in Examples 36 to 45. These measurement results are described in the following table.

TABLE 8

|  | Liquid crystal | % | Alignment function difunctional monomer | % | UV intensity (mW/cm$^2$) | Polymerization temperature (° C.) | V90 | Fall time (msec) | Rise time (msec) |
| --- | --- | --- | --- | --- | --- | --- | --- | --- | --- |
| Example 46 | LCN-1 | 99 | V1-1-1 | 1 | 20 | 25 | 7.9 | 3.9 | 4.1 |
| Example 47 | LCN-1 | 98.5 | V1-1-1 | 1.5 | 20 | 25 | 8.0 | 3.6 | 3.8 |
| Example 48 | LCN-1 | 98.3 | V1-1-1 | 1.7 | 20 | 25 | 8.8 | 3.1 | 3.2 |
| Example 49 | LCN-1 | 98 | V1-1-1 | 2 | 20 | 25 | 10.0 | 2.2 | 1.5 |
| Example 50 | LCN-1 | 97.5 | V1-1-1 | 2.5 | 20 | 25 | 12.4 | 2.0 | 1.3 |
| Example 51 | LCN-1 | 97 | V1-1-1 | 3 | 20 | 25 | 16.1 | 1.8 | 1.0 |
| Example 52 | LCN-1 | 90 | V1-1-2 | 10 | 20 | 25 | 24.2 | 0.7 | 0.4 |
| Example 53 | LCN-1 | 80 | V1-1-3 | 20 | 20 | 25 | 31.5 | 0.7 | 0.7 |
| Comparative Example 22 | LCN-1 | 100 |  |  | 0 | 0 | N.A. | 7.5 | 4.2 | 3.0 |

In all Examples 46 to 53, the fall time became faster. In the region In which the addition amount of the polymerizable monomer was 1% to 3%, whereas the fall time was faster with the increase of the addition amount of the monomer, the rise time was affected by the rise of the V90 voltage (saturation voltage) and tended to become slightly slower, but in a case where the addition amount was 2% or greater, the liquid crystal molecules array structure is aligned properly, and as s result, the rising response speed also became faster. Furthermore, if the addition amount, was increased to be about 10%, the influence of the alignment restricting force of the polymer network significantly appeared, and in Example 52, the fall speed was 0.7 ms which was about ⅙ of 4.2 ms at the time of not adding the polymerizable monomer, and an extremely fast, fall response time was obtained.

Regarding the rise time, it was confirmed that, although there was the influence of a high drive voltage, as 0.7 ms, four or more times speeding up could be achieved compared with that at the time of not adding the polymerizable monomer, and as the sum (τr+τd) of the rise time and the fall time of 1.4 ms, a high speed response was performed at five or more times speed of 7.2 ms at the time of not adding the polymerizable monomer.

It was confirmed that, if the produced cell was disposed between two polarizing plates which were orthogonal, black display was observed, the black did not change even in a case where the cell was rotated in an azimuth angle direction, and the optical axis direction of the polymer network and the easy alignment axial direction of liquid crystal were the same direction. If one sheet of λ/4 wavelength plate was inserted between cross Nicol and rotated in the same manner as described above while applying a voltage higher than a threshold voltage to the liquid crystal panel, it was observed that the state of dark-light appeared four times in one turn of dark-light-dark-light in this order, and it was confirmed that 1 pixel was neatly divided into four parts.

Examples 54 to 56 and Comparative Example 23

A VA type liquid crystal cell having a PVA electrode structure alternately having a slit structure in the ITO transparent electrodes of the upper and the lower substrates was produced. An electrode structure in which the gap of the slit was 5 μm and the electrode width was 5 μm was formed. Vertical alignment films (polyimide material) were formed on these substrates by a printing method, and subjected to a heat treatment at 180° C. for 60 minutes. An empty cell was produced by bonding this two glass substrates through a spacer having a diameter of 3.5 μm. A polymerizable liquid crystal composition as shown in the following table was adjusted by using (LCN-1) as an N-type liquid crystal composition and adding a compound represented by Formula (V1-1-1) or (V1-1-2) as a polymerizable compound, and PVA liquid crystal panels of Examples 54 to 56 having a polymer network structure were produced in the same manner as in Examples 36 to 45. In addition, a VATN liquid crystal panel in which Formula (LCN-1) to which a polymerizable monomer had not been added was injected was produced, and used as Comparative Example 23. The voltage-transmittance characteristics and the response time of the obtained liquid crystal panel were measured in the same manner as in Examples 36 to 45. These measurement results are described in the following table.

Example 57 and Comparative Example 24

Figure 21:
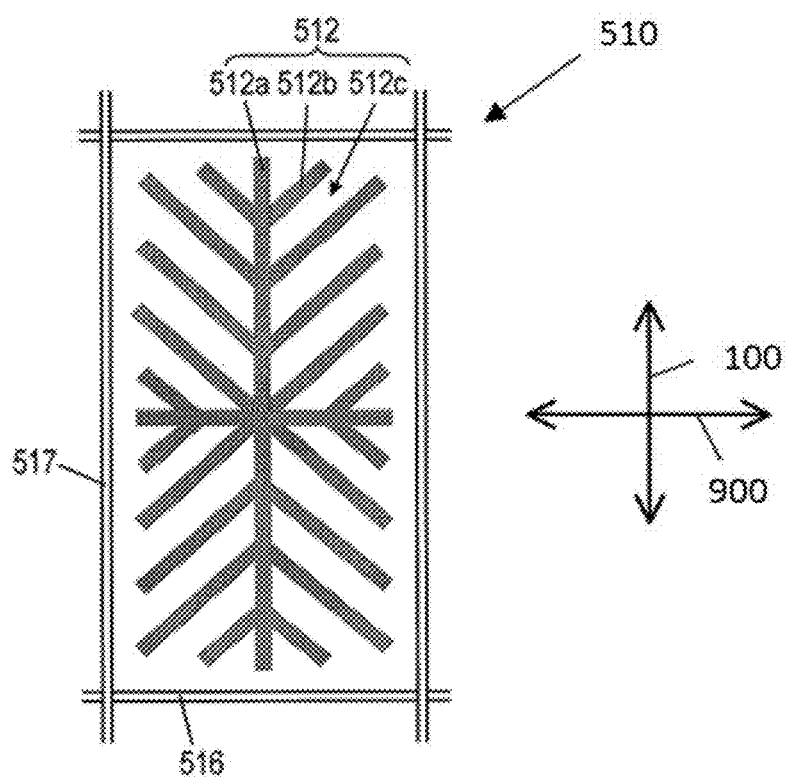
FIG. 21 is a schematic view of an electrode structure of a fishbone type VA liquid crystal cell in an example.

A test, cell having a fishbone-type electrode structure described in FIG. 21 was produced.

In FIG. 21, a liquid crystal layer was sealed between two glass substrates oppositely bonded together with a predetermined cell gap. A transparent, electrode formed of ITO was respectively formed on the opposing surfaces of the opposing two substrates. A common electrode was formed on the counter substrate using a glass substrate having a thickness of 0.7 mm. A slit portions 512c in which a part of the electrode material (ITO) had been removed was provided in the transparent electrode. The slit portion 512c having a width of 5 μm in a cross-shape connecting the midpoints of respective opposite sides of a rectangular cell function as a structure of alignment control, a plurality of slit portion 512c having a width of 5 μm extending in the slope 45° direction from the slit portion 512c were formed at a pitch of 8 μm, and these functions as an auxiliary alignment control factor for preventing disturbance in the azimuth angle direction at the time of inclination. The width of the pixel electrode for

TABLE 9

| | Liquid crystal | % | Alignment function difunctional monomer | % | UV intensity (mW/cm$^2$) | Polymerization temperature (° C.) | V90 | Fall time (msec) | Rise time (msec) |
|---|---|---|---|---|---|---|---|---|---|
| Example 54 | LCN-1 | 98.0 | V1-1-2 | 2.0 | 20 | 25 | 7.8 | 3.6 | 3.9 |
| Example 55 | LCN-1 | 90.0 | V1-1-2 | 10.0 | 20 | 25 | 23.5 | 0.7 | 0.3 |
| Example 56 | LCN-1 | 90.0 | V1-1-1 | 5.0 | 20 | 25 | 23.8 | 0.8 | 0.6 |
| | | | V1-1-2 | 5.0 | | | | | |
| Comparative Example 23 | LCN-1 | 100 | | | 0 | 0 | N.A. | 7.6 | 4.4 | 3.2 |

In all Examples 54 to 56, it was found that the fall time became faster. In addition, in Example 55 in which 10% of the polymerizable monomer was added, the increase in the drive voltage was observed, but not only the fall speed but also rise speed became faster, and extremely fast response speed of τr+τd=1.0 ms was confirmed. It was confirmed that, if the produced panel was disposed between two polarizing plates which were orthogonal, black display was observed, the black did not change even in a case where the panel was rotated in an azimuth angle direction, and the optical axis direction of the polymer network and the easy alignment axial direction of liquid crystal were the same direction.

If observing by a polarization microscope between cross Nicol in the same manner as described above while applying a voltage higher than a threshold voltage to the liquid crystal panel, it was observed that four disclination lines appeared in the boundary region of the alignment considered to be alignment-divided. Since the disclination line is generated due to the disorder (boundary) of the liquid crystal molecular arrangement, from this, it could be confirmed that 1 pixel was divided into four parts.

display was 3 μm. A pixel main portion electrode 512a and a pixel branch portion electrode 512b have a structure in which the branch electrode was extended in four directions which were different by 90 degrees using the pixel center as the center of symmetry while having an angle of 45 degrees. Vertical alignment films (polyimide material) were formed on these substrates by a printing method, and subjected to a heat treatment at 180° C. for 60 minutes. An empty cell in a state in which a liquid crystal was not injected was produced by bonding this two glass substrates through a spacer having a diameter of 3.5 μm.

A polymerizable liquid crystal composition was adjusted by using Formula (LCN-1) as an N-type liquid crystal composition and adding 20% of a compound represented by Formula (V1-1-2), and a fishbone type VA liquid crystal panel of Example 57 having a polymer network structure was produced in the same manner as in Examples 36 to 45. In addition, a fishbone type VA liquid crystal panel in which Formula (LCN-1) to which a polymerizable monomer had not been added was injected was used as Comparative Example 4. The voltage-transmittance characteristics and the response speed of the obtained liquid crystal panel were measured. These measurement results are described in the following table.

TABLE 10

| | Liquid crystal | % | Alignment function difunctional monomer | % | UV intensity (mW/cm$^2$) | Polymerization temperature (° C.) | V90 | Fall time (msec) | Rise time (msec) |
|---|---|---|---|---|---|---|---|---|---|
| Example 57 | LCN-1 | 80 | V1-1-2 | 20 | 20 | 25 | 30.6 | 0.7 | 0.6 |
| Comparative Example 24 | LCN-1 | 100 | | 0 | 0 | N.A. | 7.6 | 4.4 | 3.2 |

In Example 57, it was possible to obtain a liquid crystal display apparatus having a short fall time and a short rise time, and very high responsiveness of τr+τd=1.3 ms. It was confirmed that, if the produced cell was disposed between two polarizing plates which were orthogonal, black display was observed, the black did not change even in a case where the cell was rotated in an azimuth angle direction, and the optical axis direction of the polymer network and the easy alignment axial direction of liquid crystal were the same direction.

If observing by a polarization microscope between cross Nicol in the same manner as described above while applying a voltage higher than a threshold voltage to the liquid crystal panel, it was observed that four disclination lines appeared in the boundary region of the alignment considered to be alignment-divided. Since the disclination line is generated due to the disorder of the liquid crystal molecular arrangement, if could be confirmed that 1 pixel was alignment-divided into four domains.

Examples 58 and 59 and Comparative Example 25

Figure 22:
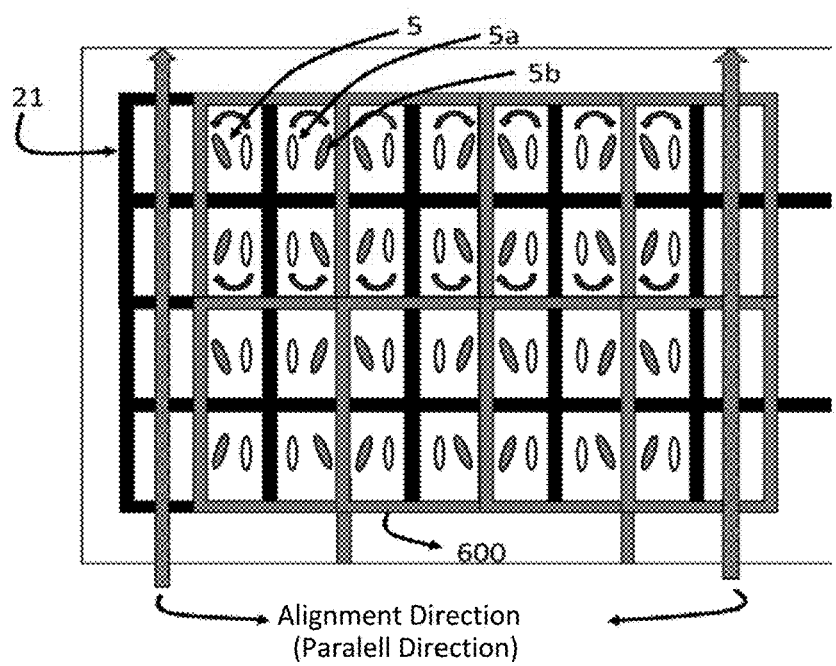
FIG. 22 is a plan view of an oblique electric field test cell electrode structure and a schematic view showing liquid crystal molecular movement in an example.

A liquid crystal cell for test capable of horizontal/oblique electric field mode operation shown in FIG. 22 was produced, and various electrooptical characteristics thereof were evaluated.

Using a transparent glass substrate on which an ITO transparent electrode layer having a thickness of 0.7 mm had been formed by a sputtering method, a window frame-shaped transparent electrode substrate having an electrode width of 10 μm was produced by a photoetching method. After coating glass substrates of a lower first glass substrate and an upper second glass substrate on which a window frame-shaped ITO electrode had been formed with a polyimide alignment film and baking the resulting product, a nibbing alignment treatment was performed.

By performing rubbing of the first glass substrate from bottom to top in the figure and performing rubbing the second glass substrate disposed to oppose each other in the same direction (from bottom to top in the figure), parallel alignment was obtained. By such an alignment, treatment method, liquid crystal molecules took a splay alignment state.

Next, the ITO transparent electrode of the black lattice portion of the lower first glass substrate and the ITO transparent electrode of the slanted line portion of the upper second glass substrate side were disposed to oppose each other such that the pitch became 25 μm in a state in which just a half pitch was deviated, and bonded together through a spherical spacer of 3.5 μm using a thermosetting adhesive.

By such combination of electrodes, a main pixel electrode and a subpixel electrode dividing the central portion of the electrode of the slanted line portion into four parts in the shape of a cross and the slanted line portion functioned as a main common electrode and a secondary common electrode corresponding to the main pixel electrode and the subpixel electrode, respectively, and the black lattice electrode was divided into four display regions having a display region of 15 μm×15 μm.

2.0% by weight of the compound represented by Formula (V1-1-1) was added to 98% by weight of a P-type liquid crystal composition (Δn=0.103, viscosity η=20 mPa·s, Δε=7.5) represented by Formula (LCP-1), then, 2.0% by weight of a photopolymerization initiator Irgacure651 with respect to the compound represented by Formula (V1-1-1) was added thereto, and the resulting product was heated to 60° C. to be dissolved in the liquid crystal composition, whereby a polymerizable liquid crystal composition was adjusted. The obtained polymerizable liquid crystal composition was injected into a liquid crystal cell by a vacuum injection method. After injecting the liquid crystal, the liquid crystal cell was taken out, and the injection port was sealed with a sealing agent 3026E (manufactured by ThreeBond Co., Ltd.). The liquid crystal cell was irradiated with ultraviolet rays having an irradiation intensity of 15 mW/cm$^2$ at 25° C. for 300 seconds through a ultraviolet rays cut filter L-37 (HOYA CANDEO OPTRONICS CORPORATION) to polymerize the polymerizable compound in the polymerizable liquid crystal composition, whereby an oblique electric field mode LCD device of Example 58 was obtained. In addition, an oblique electric field mode LCD device of Example 59 was obtained in the same manner except that the amount of the compound represented by Formula (V1-1-1) added was 3.0% by weight. An LCD device in which the liquid crystal composition not containing a polymerizable monomer had been injected was used as Comparative Example 25.

Using a polarization microscope provided with a photomultiplier tube (PMT), the changes in transmitted light intensity from the liquid crystal cell, and the response characteristics and the voltage-transmittance characteristics were evaluated. For the transmittance, the transmittance in the case of parallel Nicol in which the polarization directions of the two sheets of polarizer were parallel was defined as 100%, and the transmittance in the case of cross Nicol in which the polarization directions of the two sheets of polarizer were orthogonal was defined as 0%. In a case where the maximum transmittance of the optical switching response waveform was made to be 100% by applying a burst wave of 100 Hz to the liquid crystal cell, the change in transmittance from 10% to 90% was defined as the rise time (τr), the change in transmittance from 90% to 10% was defined as the fall time (τd), and the response time was evaluated.

It was confirmed that, if the liquid crystal cells of Examples 58 and 59 and Comparative Example 25 were disposed on the stage of a polarization microscope in a cross Nicol state in the state in which voltage was not applied in the direction in which the rubbing treatment direction and the polarizing axis direction matched, the cells became a dark field (normal black), and uniaxial alignment properties were obtained.

Figure 23:
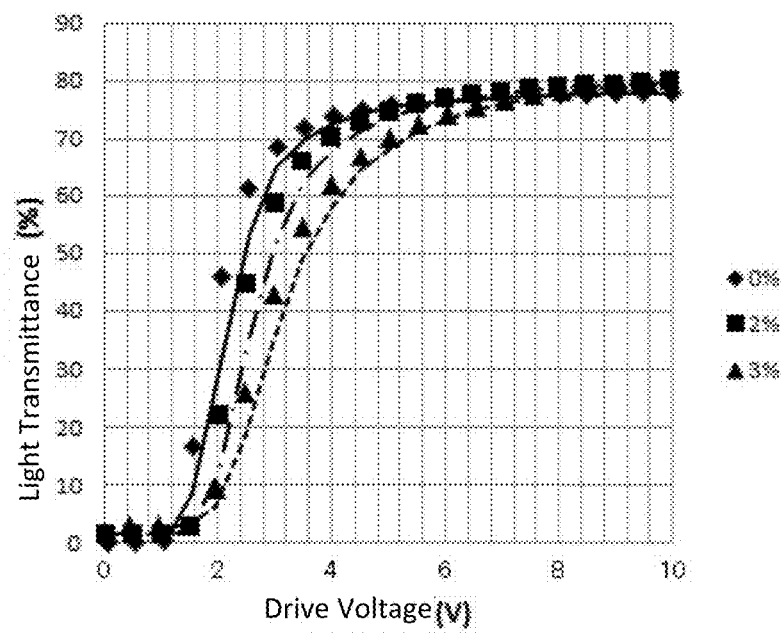
FIG. 23 is a measurement result of voltage-transmittance characteristics of examples and comparative examples.

The measurement results of voltage-transmittance characteristics of Examples 58 and 59 and Comparative Example 25 are shown in FIG. 23. These threshold voltages and saturation voltages are shown in the following table.

TABLE 11

|  | Example 58 | Example 59 | Comparative Example 25 |
|---|---|---|---|
| Threshold voltage | 1.29 | 1.67 | 1.91 |
| Saturation voltage | 3.29 | 4.37 | 5.47 |

If the amount of the photopolymerizable monomer added was increased, the threshold voltage and the saturation voltage also rose, and, in particular, the rise of the saturation voltage became large, and the rise of the voltage-transmittance characteristics became gentle. It was confirmed that the saturation voltage of the liquid crystal cell obtained by adding 3% of a photopolymerizable monomer was shifted to high voltage side of 2 V or greater, that is, from 3.29 V to 5.47 V, at the time of not adding. However, actually, for example, the maximum drive voltage in the case of a liquid crystal TV was around 15 V, and if the saturation voltage of the LCD device was less than this, there was no particular problem. It was found from the following table that, with the increase of the amount of the polymerizable monomer added, τr and τd also became fast, and a high speed response display suitable for videos, action movies, or sports programs such as animation of a fast movement was obtained. If the saturation voltage of the LCD device was 15 V or less, even in a case where the amount of the polymerization functional groups added was slightly much, a variety of benefits could be enjoyed from the viewpoint of displaying at a high speed.

Figure 24:
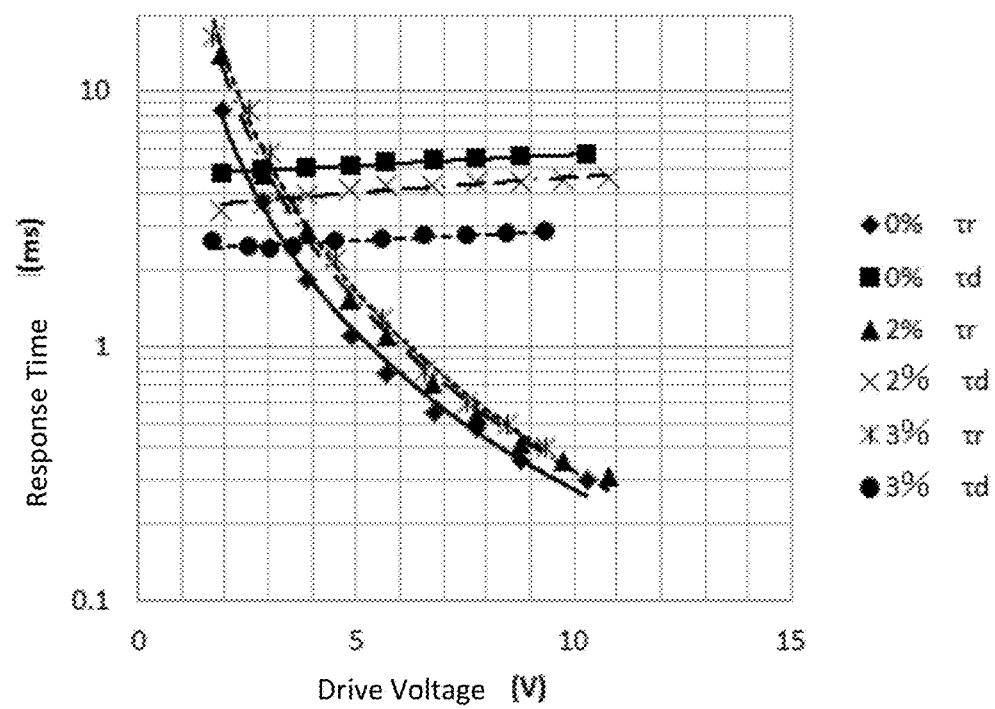
FIG. 24 is a measurement result of a response speed of examples and comparative examples.

Next, the measurement results of response speed are shown in FIG. 24. A tendency in which the rising response speed τr became slightly slower if the amount of the photopolymerizable monomer added was increased was observed, and it was thought that this was at a level at which no problem did occur in display characteristics. On the other hand, it was confirmed that the fall speed τd became high with the increase of the addition amount of the photopolymerizable monomer, and in a case where the monomer was not added, the fall speed was 5 to 6 ms, in a case where 2% by weight of the monomer was added, the fall speed was 3 to 4 ms, and in a case where 3% by weight of the monomer was added, the fail speed was 2 to 3 ms which was shortened to about ½ times, and by the action of the anchoring force of the polymer network formed in the initial alignment film and the substantially the same direction by light irradiation, the response speed became high.

The liquid crystal cells used in Examples 58 and 59 and Comparative Example 25 were disposed in the direction in which the polarization treatment direction and the polarizing axis direction in a cross Nicol state matched in the state in which voltage was not applied, and after confirming that the cells became normally black, a saturation voltage was applied, and the liquid crystal cell was observed. A polarization microscope was provided with an X-Y stage, and respective display regions alignment-divided into four parts were observed, but these were optically equivalent and were not distinguishable at all. Even in a case where an intermediate voltage between the threshold value and the saturation voltage was applied, an optically equivalent state was maintained. Next, one region among four display regions was selected, and after searching the darkest position while rotating the stage of the polarization microscope while applying the intermediate voltage, the angle was fixed. In such a state, while moving the X-Y stage in the X direction and the Y direction, other three different regions were observed. The region which was 180° different from the initially set region was observed to be in a substantially the same dark state, and the region which was 90° different from the initially set region was observed to be in a gray state. Thus, in the region which was at least 90 degrees or 270 degrees different from the fixed region, it could be confirmed that the alignment directions of the liquid crystal molecules were different, and it could be confirmed that an alignment division was properly performed.

The liquid crystal cell used in this example was a liquid crystal cell subjected to a parallel alignment treatment, and the liquid crystal molecules were in a spray alignment state. It was confirmed that since the molecules at the center of the liquid crystal layer were substantially parallel-aligned on the liquid crystal substrate by applying a voltage, and took the liquid crystal molecular alignment spread in the vertical direction on the basis of the central portion while being rotated by an oblique electric field, a phase difference was completely compensated as a double STN panel, and the viewing angle dependency was eliminated.

In these examples, using a liquid crystal composition having positive dielectric anisotropy, the operation and the electrooptical characteristics of the liquid crystal cell shown in FIG. 22 were evaluated and confirmed, but in the case of an actual TFT liquid crystal display panel, the pixel electrode and a part of or whole common electrode are formed on the TFT substrate side through one layer insulating film, a part of or whole common electrode are formed on the counter substrate side, and the oblique electric field effects and the horizontal electric field effects act on the liquid crystal molecules at the same time, and thus, even in the case of using a liquid crystal composition having a negative dielectric anisotropy, the effects as in the example can be obtained. The alignment treatment, direction in this case may be any one of anti-parallel alignment and parallel alignment.

In addition, in these examples, a rubbing method is used as an alignment treatment method, but since the electrode structure and the wiring structure on the TFT substrate side are very complex and have many steps, it is difficult to obtain uniform surface alignment properties over the entire alignment, film surface by a rubbing method, and since dirts and fluffs are generated by rubbing and destruction of the TFT by charging at the time of rubbing occurs, a photo-alignment treatment is particularly preferable. As the photo-alignment treatment method, it is preferable that polyimide photodecomposable by UV rays in the vicinity of 254 nm is used, a photo-alignment treatment by a polymer causing photodimerization having a photofunctional group such as cinnamic acid or coumarin by light in the vicinity of 313 nm is used, or an azo-based photo-alignment polymer causing photoisomerization by light in the vicinity of 365 nm is used.

As described above, it could be confirmed that even in a liquid crystal display apparatus of a horizontal electric field mode (IPS mode, FFS mode) by adding a difunctional monomer to a liquid crystal composition having positive or negative dielectric anisotropy and inducing a nanophase separation reaction by irradiation with UV rays, a polymer network is formed in substantially the same direction as the parallel alignment direction by the initial alignment by a liquid crystal alignment film, and by the synergic action of the anchoring force of the polymer network and the anchoring force of the initial vertical alignment, the response speed of a horizontal electric field mode liquid crystal display apparatus, in particular, the response speed at the time of falling of the liquid crystal becomes high.

Examples 60 and 61 and Comparative Example 26

Figure 25:
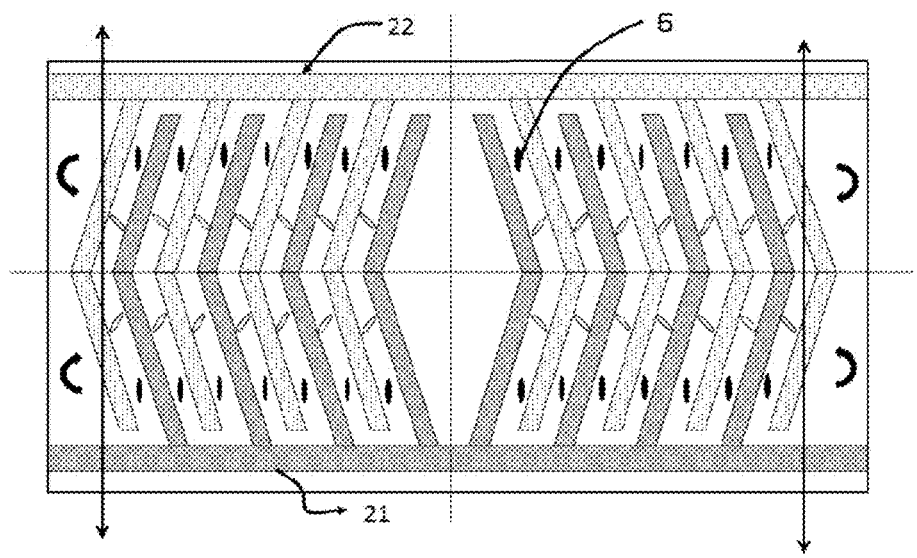
FIG. 25 is a plan view of an electrode structure of a test cell for an IPS mode alignment-divided used in the present invention and a schematic view showing behavior of liquid crystal molecules.

FIG. 25 is a plan view showing the electrode structure of a test cell for an IPS mode evaluation used for confirming the effects of the present invention and a schematic plan view showing the molecular arrangement, of the liquid crystal. After forming an ITO film on a glass substrate having a thickness of 0.7 mm, a strip shaped electrode having a width of 10 μm, which was < shaped symmetrically in a left and right opposite direction in the central portion by etching, was formed in the vertical direction of the substrate with a gap of 10 μm. The common electrode and the pixel electrode were formed on the same substrate plane, the common electrode portion was indicated by white, and the pixel electrode portion was indicated by an oblique line. The common electrode and the pixel electrode take a comb electrode structure in which both the electrodes are disposed to alternate with each other, the comb electrodes respectively have a tilt of 15 degrees in the horizontal direction with respect, to the vertical direction of the paper, and have a comb electrode structure alignment-divided into four regions of the first quadrant, to the fourth quadrant, and this was used as the first substrate.

(L/s=10 μmm/10 μm)

After coating the first substrate and the second substrate (not shown) formed of glass having a thickness of 0.7 mm disposed to oppose through a spherical spacer of 3.5 μm, which did not have a transparent electrode, with a polyimide alignment film and baking the resulting product, a rubbing alignment treatment was performed. By performing rubbing of the first substrate from bottom to top in the figure and performing rubbing the second substrate disposed to oppose each other in the reverse direction (from top to bottom in the figure), anti-parallel alignment was obtained. The angle between two comb electrode groups and the rubbing alignment direction was set to 15°. The polarizer and the analyzer were disposed on the outside of the test cell in a cross Nicol state, and the transmission axis or the polarizing axis of the polarizer is disposed to be parallel or at a right angle to the initial alignment direction of the liquid crystal molecules. As a result, in this test cell, at the time of when voltage was not applied, the state of normally black was taken.

From the above, in the test cell for confirming the effects of the present invention, at the time when a voltage is not applied, four display regions become normally black display, and at the time when the threshold voltage or a higher voltage is applied, four display regions become white (gray) display which has a different viewing angle direction and is alignment-divided. In a case where the liquid crystal molecule takes the initial alignment state as described above, a polarizer and an analyzer are in a cross-Nicol state, and the initial alignment direction and the transmission axis or the polarizing axis of the polarizer are parallel or orthogonal, not only at the time when a voltage is not applied but also at the time when a voltage is applied, an optically equivalent state is maintained, and thus, it is difficult to determine the distinction. However, by holding the cross Nicol state and matching the transmission axis or the polarizing axis of the polarizer, with respect, to the liquid crystal display region rotated by any comb electrode group of four display regions, the liquid crystal display region corresponding to the comb electrode group takes a nearly black state, and the liquid crystal display region corresponding to the comb electrode group in the opposite direction takes a gray state, and thus, it is possible to determine whether the alignment division is exactly performed or not. By using this test cell, if was possible to observe not only electrooptical effects of a general display device but also viewing angle improvement effects by an alignment division.

The liquid crystal molecules shown in black show the initial alignment direction or voltage or the liquid crystal molecule alignment direction at the time when a voltage is not applied, and these are alignment-controlled by being aligned in the initial alignment direction from the first quadrant to the fourth quadrant in exactly the same manner. If applying the threshold voltage or a higher voltage to the four comb electrode groups, as the liquid crystal molecules shown by white, a rotational movement is caused in each direction.

As seen in FIG. 25, the liquid crystal molecules of the first quadrant region are rotated to the left, the liquid crystal molecules of the second quadrant are rotated to the right, the liquid crystal molecules of the third quadrant are rotated to the left, the liquid crystal molecules of the fourth quadrant are rotated to the right, to be arranged at a predetermined position. It is easily understood that in a state in which a polarizer and an analyzer are disposed in a cross Nicol state and the transmission axis or the polarizing axis of the polarizer is parallel or orthogonal to the initial alignment direction, the optical characteristics of the rotated liquid crystal molecules are entirely equivalent, but the liquid crystal molecules in four quadrants as clearly seen from the figure are arranged in different directions, respectively, and alignment division is performed in a complete form.

Figure 26:
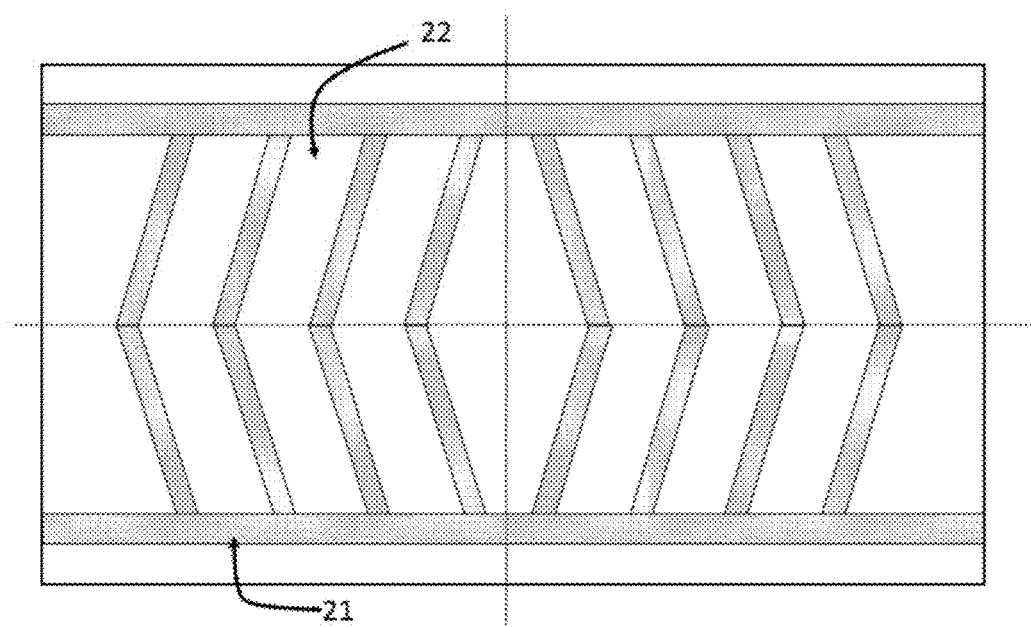
FIG. 26 is a plan view of an electrode structure of an FFS mode test cell alignment-divided used in the present invention.

FIG. 26 is a plan view showing the electrode structure of a test cell for an FFS mode having a < shaped pixel electrode. After the plane electrode of ITO was disposed on a glass substrate of 0.7 mm, a transparent insulating layer such as SiN was provided thereon, then, by sputtering, an ITO transparent electrode layer was formed thereon, and by etching, a pixel electrode was formed. A pixel electrode was formed in a strip type shaped having a width of 10 μm with a gap of 20 μm, and a plane electrode formed on the lower part of the insulating film was used as a common electrode, and this was used as a first substrate. After coating the first substrate and the second substrate (not shown) formed of glass having a thickness of 0.7 mm disposed to oppose through a spherical spacer of 3.5 μm with a polyimide alignment film and baking the resulting product, a rubbing alignment treatment was performed. By performing rubbing of the first substrate from bottom to top in the figure and performing rubbing the second substrate disposed to oppose each other in the reverse direction (from top to bottom in the figure), anti-parallel alignment was obtained. The angle between two comb electrode groups and the rubbing alignment direction was set to 15°.

It is found that, in this case also, in exactly the same as the case described using FIG. 25, the liquid crystal display region is alignment-divided into four regions from the first quadrant to the fourth quadrant, and these take the liquid crystal molecular alignment having a different rotation direction, respectively. Furthermore, in the IPS mode, a voltage is not applied to the liquid crystal molecules on the pixel electrode and the common electrode of IPS, and the opening ratio was lower, but in the FFS mode, a voltage is applied to the liquid crystal molecules of the common electrode portion region, and due to this, the liquid crystal molecules cause a rotational motion, and thus, the opening ratio of the liquid crystal panel is improved by about 30%.

In the description of FIGS. 25 and 26, a rubbing method is described as an alignment treatment, method, but since the electrode structure and the wiring structure on the TFT substrate side by a horizontal electric field method as described above are very complex and have many steps, it is difficult to obtain uniform surface alignment properties over the entire alignment film surface by a rubbing method, and since dirts and fluffs are generated by rubbing and destruction of the TFT by charging at the time of rubbing occurs, a photo-alignment treatment, is particularly preferable. In addition, in the case of a photo-alignment treatment method, the pretilt angle is nearly 0°, and this is better than the rubbing method from the viewpoint of viewing angle dependence (the pretilt angle in the rubbing method is about 0.5° to 2°). As the photo-alignment treatment method, it is preferable that, polyimide photodecomposable by UV rays in the vicinity of 254 nm is used, a photo-alignment treatment by a polymer causing photodimerization having a photofunctional group such as cinnamic acid or coumarin by light in the vicinity of 313 nm is used, or an azo-based photo-alignment polymer causing photoisomerization by light in the vicinity of 365 nm is used. Although the photo-alignment film material or the photo-alignment direction obtained by the light irradiation direction is different, in the case of using a liquid crystal composition having a positive dielectric anisotropy, like the time of rubbing, it is necessary to set such that the initial alignment direction is in the vertical direction of the paper. In the case of using a liquid crystal composition having a negative dielectric anisotropy, if the electrode structure is in the same direction as FIGS. 25 and 26, it is preferable to initially align in the 90° different direction from the above (horizontal alignment in the horizontal direction of the paper).

After the first, substrate having an electrode structure as shown in FIG. 25 and the second substrate not having an electrode were coated with a polyimide solution and baked, the resulting products were subjected to a rubbing treatment, disposed to oppose to each other using a spherical silica spacer of 3.5 μm, and bonded, whereby a test cell for an IPS mode by anti-parallel alignment was produced. Moreover, the rubbing direction was set to the right and left direction (horizontal direction) of the paper. Each of a mixture obtained by mixing 98.0% by weight of the liquid crystal composition represented by Formula (LCN-1) and 2.0% by weight of the compound represented by Formula (V1-1-1) and a mixture obtained by mixing 96.0% by weight of the liquid crystal composition represented by Formula (LCN-1) and 4.0% by weight of the compound represented by Formula (V1-1-1) was heated to 60° C. to be dissolved in the liquid crystal composition, and injected into a liquid crystal cell by a vacuum injection method. 2.0% by weight of a photopolymerization initiator IRGACURE651 with respect to the polymerizable compound (V1-1-1) was contained.

After injecting the liquid crystal, the injection port was sealed with a sealing agent 3026E (manufactured by Three-Bond Co., Ltd.). The liquid crystal cell was irradiated with ultraviolet rays having an irradiation intensity of 15 mW/cm² at 25° C. for 300 seconds through a ultraviolet rays cut filter L-37 (HOYA CANDEO OPTRONICS CORPORATION) to polymerize the polymerizable compound in the polymerizable liquid crystal composition, whereby an FFS mode LCD device was obtained. The liquid crystal cell produced by mixing 2.0% by weight of Formula (V1-1-1) was used in Example 60, and the liquid crystal cell obtained by mixing 4.0% by weight was used in Example 61. Light irradiation was not performed on a liquid crystal cell in which the liquid crystal composition not including a photopolymerizable composition had been vacuum-injected, and this was used in Comparative Example 26.

It was confirmed that, if the liquid crystal cells of Examples 60 and 61 and Comparative Example 26 were disposed on the stage of a polarization microscope in a cross Nicol state in the state in which voltage was not applied in the direction in which the rubbing treatment direction and the polarizing axis direction matched, the cells became a dark field (normal black), and uniaxial alignment properties were obtained.

Figure 27:
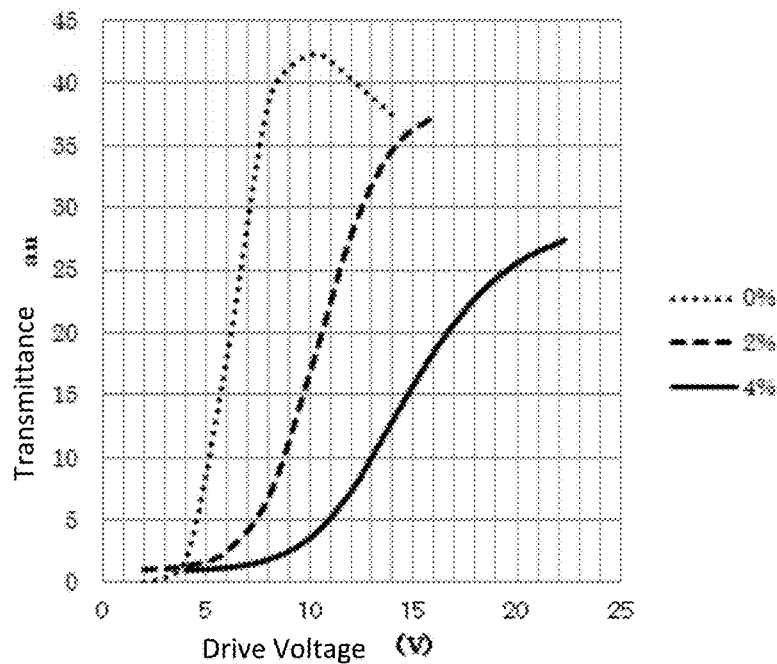
FIG. 27 is a measurement result of a monomer concentration dependence of V-T characteristics by the present invention.
Figure 28:
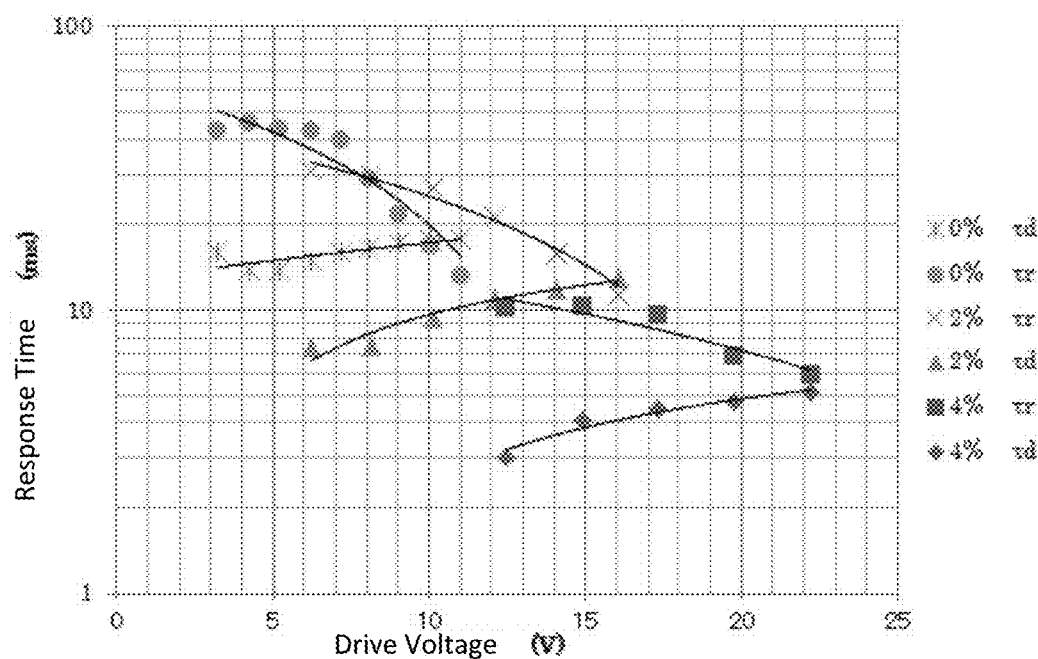
FIG. 28 is a measurement result of a monomer concentration dependence of a response time by the present, invention.

Using a polarization microscope provided with a photomultiplier tube (PMT), the changes in transmitted light intensity from the obtained liquid crystal cell were measured, and the response characteristics and the voltage-transmittance characteristics were evaluated. For the transmittance, the transmittance in the case of parallel Nicol in which the polarization directions of the two sheets of polarizer were parallel was defined as 100%, and the transmittance in the case of cross Nicol in which the polarization directions of the two sheets of polarizer were orthogonal was defined as 0%. In a case where the maximum transmittance of the optical switching response waveform was made to be 100% by applying a burst wave of 100 Hz to the liquid crystal cell, the change in transmittance from 10% to 90% was defined as the rise time (τr), the change in transmittance from 90% to 10% was defined as the fall time (τd), and the response time was evaluated. The results of voltage-transmittance characteristics evaluation are shown in FIG. 27, and the results of response characteristics evaluation are shown in FIG. 28. From FIG. 28, with the increase of the content of the polymerizable monomer, the drive voltage shifts to 50% to 100% higher voltage with respect to Comparative Example 1, but it is easily read that both τr and τd are significantly decreased.

To exactly compare the difference in the speed of the response time in order to legitimate comparison, to the liquid crystal cells of Examples 60 and 61 and Comparative Example 26, the saturation voltage of each liquid crystal cell was applied, and τr and τd were measured. The results are shown in the following table.

TABLE 12

| Electrooptical | Monomer concentration | | |
| --- | --- | --- | --- |
| characteristic | 0% | 2% | 4% |
| Vth (Vrms) | 4.3 | 7.0 | 10.0 |
| Vsat (Vrms) | 8.0 | 13.9 | 20.0 |
| τr (ms)/(Vsat) | 29.5 | 16.3 | 7.0 |
| τd (ms)/(Vsat) | 17.1 | 11.1 | 4.6 |

For τr, in Comparative Example 26, τr was 29.5 ms, but in Example 60, τr was 16.3 ms, which was an about 55% response speed, and in Example 61, τr was improved to be 7.0 ms, which was a ⅓ or less response speed. Similarly, for τd, the response speed becomes higher, and in Comparative Example 26, τd was 17.1 ms, but in Example 60, τd was 11.1 ms, which was about 65% of that in Comparative Example 26, and in Example 61, τd was 4.6 ms, and it was confirmed that the response speed is increased to about 27% of that in Comparative Example 26. Even in other drive voltage regions, that is, at the time of halftone display, it could be confirmed that τr and τd exhibit a high speed responsiveness than Comparative Example 26.

In the system of the liquid crystal composition having a small negative dielectric anisotropy, there is a tendency that, by formation of a polymer network structure by a photopolymerizable monomer, the threshold voltage and the saturation voltage are greatly increased, and the optimum drive voltage is increased, but by applying a highly shifted saturation voltage, the rotational movement of the liquid crystal molecules is rapidly performed, and τr becomes shortened. On the other hand, for τd, a force works that make to strongly return to the initial alignment direction by the anchoring force of the initial alignment by an alignment film released from a high voltage all at once and the anchoring force of the polymer network formed by a photopolymerization reaction, and operation at a high speed becomes possible.

The liquid crystal cells used in Examples 60 and 61 were disposed in the direction in which the alignment treatment direction and the polarizing axis direction between polarizing plates in a cross Nicol state matched in the state in which voltage was not applied, and after confirming that the cells became normally black, a saturation voltage was applied, and the liquid crystal cell was observed. A polarization microscope was provided with an X-Y stage, and respective display regions alignment-divided into four parts were observed, but these were optically equivalent and were not distinguishable at all. Even in a case where an intermediate voltage between the threshold value and the saturation voltage was applied, an optically equivalent state was maintained.

Next, one region among four display regions was selected, and after searching the darkest position while rotating the stage of the polarization microscope while applying the intermediate voltage, the angle was fixed. In such a state, while moving the X-Y stage in the X direction and the Y direction, other three different regions were observed. The region which was 180° different from the initially set region was observed to be in a substantially the same dark state, and the region which was 90° different from the initially set region was observed to be in a gray state. Thus, in the region which was at least 90 degrees or 270 degrees different from the fixed region, it could be confirmed that the alignment directions of the liquid crystal molecules were different, and it could be confirmed that an alignment division was properly performed.

Example 62 and Comparative Example 27

After the first substrate having an electrode structure as shown in FIG. 26 and the second substrate not having an electrode were coated with a polyimide solution and baked, the resulting products were subjected to a rubbing treatment, disposed to oppose to each other using a spherical silica spacer of 3.5 μm, and bonded, whereby a test cell for an FFS mode by anti-parallel alignment was produced. (L/s=10 μm/30 μm)

98% by weight of a P-type liquid crystal composition represented by Formula (LCP-1) and 2.0% by weight of the compound represented by Formula (V1-1-1) were mixed, then, the mixture was heated to 60° C. to be dissolved in the liquid crystal composition, and injected into a liquid crystal cell by a vacuum injection method. 2.0% of a photopolymerization initiator Irgacure651 with respect to the compound represented by Formula (V1-1-1) was contained. After injecting the liquid crystal, the injection port was sealed with a sealing agent 3026E (manufactured by Three-Bond Co., Ltd.). The liquid crystal cell was irradiated with ultraviolet rays having an irradiation intensity of 15 mW/cm$^2$ at 25° C. for 300 seconds through a ultraviolet rays cut filter L-37 (HOYA CANDEO OPTRONICS CORPORATION) to polymerize the polymerizable compound in the polymerizable liquid crystal composition, and as a result, an FFS mode LCD device was obtained, and this was used as Example 62. A liquid crystal cell in which the liquid crystal composition not containing a polymerizable monomer had been injected was used as Comparative Example 27.

It was confirmed that, if the produced liquid cell was disposed between polarizing plates in a cross Nicol state in the direction in which the rubbing treatment direction and the polarizing axis direction matched, the cell became a dark field (normally black), and a uniaxial alignment was obtained. Using the obtained liquid crystal cell, the voltage-response characteristics were measured. The results are shown in the following table.

TABLE 13

| | Item | | | |
|---|---|---|---|---|
| | Response speed (ms) | | | |
| | Comparative Example 27 | | Example 62 | |
| Drive voltage (V) | τr (0%) | τd (0%) | τr (2%) | τd (2%) |
| 2.5 | 90.2 | 10.0 | 15.0 | 3.5 |
| 3.0 | 7.0 | 10.8 | 12.6 | 3.6 |
| 3.5 | 2.8 | 11.0 | 11.3 | 3.7 |
| 4.0 | 1.4 | 11.2 | | |
| 4.5 | 1.0 | 11.4 | 6.3 | 3.9 |
| 5.0 | | | | |
| 5.5 | | | 1.9 | 4.8 |
| 6.0 | | | | |
| 6.5 | | | 0.9 | 5.4 |

In Comparative Example 27, the threshold voltage was 2.5 V, and the saturation voltage was 4.5 V. The light transmittance in a case where a saturation voltage was applied was 70%, On the other hand, the threshold voltage of Example 62 was 2.5 V, which was almost the same as that in Comparative Example 27, and the saturation voltage was 6.5 V, which was an about 2 V increased value compared with that in Comparative Example 27.

In these examples, regardless of the presence or absence of a polymer network structure formed by photopolymerization, the threshold voltages of Comparative Example 27 and Example 62 showed substantially the same values. As one cause of this, it is thought that since, in the case of the material composition system such as this example, the rotation angle of the low molecular weight liquid crystal in the voltage drive region in the vicinity of the threshold value is not so large, the failure of rotational motion by the polymer network structure or the influence by the anchoring force is less likely to occur. In addition, it is thought that since the dielectric anisotropy of the P-type liquid crystal composition used is large as 7.5 and the display mode is also FFS, the gap between the common electrode and the pixel electrode is narrower than an IPS mode, and thus, the horizontal electric field is effectively applied. Here, it is confirmed that, in general, with the increase of the addition amount of the photopolymerizable monomer, the threshold voltage tends to also increase.

On the other hand, at the time when a high voltage is applied, the rotation angle of the liquid crystal molecules is increased, and the rotational motion is obstructed by the polymer network structure or the anchoring force, and as a result, the saturation voltage rises, and the rise width becomes larger than that of the threshold voltage, and thus, voltage-transmittance characteristics have a slow gradient than in a liquid crystal in which a polymer network has not been formed.

Figure 29:
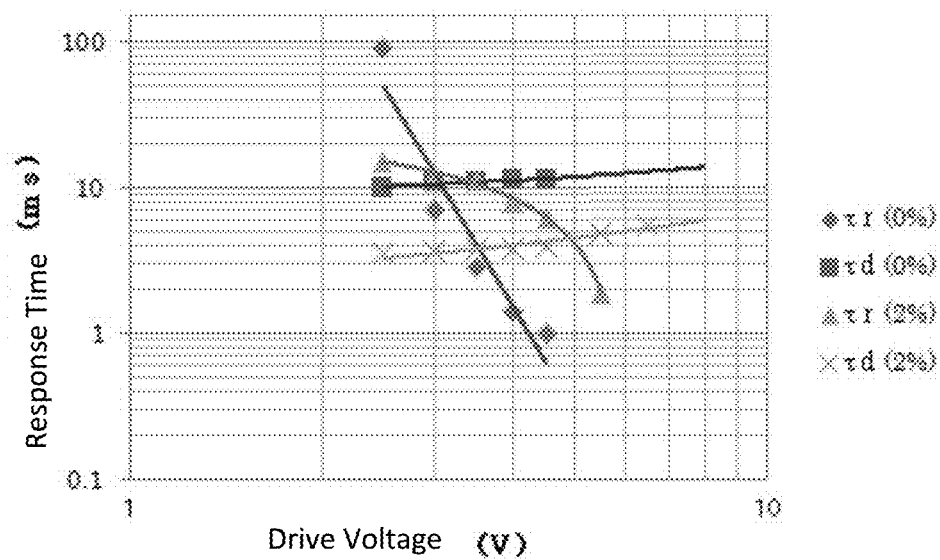
FIG. 29 is a measurement result, of a voltage dependence of a response speed of an FFS mode using a P-type liquid crystal composition by the present invention.

Next, using the obtained liquid crystal cell, voltage dependency of the rise response time τr and the fall time τd was measured. The measurement results are shown in FIG. 29. τr (0%) and τd (0%) in FIG. 29 show the response time with respect to the applying voltage of the liquid crystal cell by a liquid crystal composition not including the photopolymerizable monomer (V1-1-1), and τr (2%) and τd (2%) show the response time with respect to the applying voltage of the liquid crystal cell by a liquid crystal composition containing 2% by weight of the photopolymerizable monomer (V1-1-1).

τr when a saturation voltage of 4.5 V was applied to the liquid crystal cell of Comparative Example 27 was 1.0 ms and τd was 11.4 ms, but in Example 62 of the present invention, the saturation voltage was high as 6.5 V, and τr and τd when a saturation voltage of 6.5 V was applied were 0.9 ms and 5.4 ms, respectively. It could be confirmed that, for τr, almost the same response time regardless of the presence or absence of the formation of the polymer network was shown, and τd was significantly improved in a half or less of the time by the polymer network formation.

It is expected that even in a case where a polymer network is formed by light polymerization reaction, and due to this, the rotational motion of the liquid crystal molecules is inhibited by application of a horizontal electric field mode voltage, and the saturation voltage becomes higher, the change in the physical properties (dielectric anisotropy, elastic constant, viscosity coefficient, and the like of the liquid crystal composition) of the low molecular weight liquid crystal composition occupying 98% of the liquid crystal composition is very small, and the rise response time of the liquid crystal molecules in a case where a voltage in the vicinity of the saturation voltage is applied shows almost the same value regardless of the presence or absence of the polymer network formation. Even in the examples and the comparative examples, if comparing the rise response time τr in the vicinity of the saturation voltage of the voltage-transmittance characteristics, in the liquid crystal composition alone, the rise response time was 1.0 ms (4.5 V), but the rise response time was 0.8 ms (6.5V) by formation of the polymer network structure. It could be confirmed that, there was no significant difference in the rise response time τr in the vicinity of the saturation voltage even in a case where a polymer network structure was formed.

If comparing the rise response time τr in the vicinity of the threshold voltage, in the case of the liquid crystal composition alone, the rise response time was 90 ms (2.5 V), but in a case where a polymer network structure was formed, the rise response time was 15 ms (2.5 V) and became shortened. As one cause of this, it is thought that by formation of the polymer network structure, the pretilt angle and the pretilt direction in the vicinity of the liquid crystal interface are stably immobilized, and due to this, the rotational motion of the liquid crystal is likely to be uniformly performed. In the case of the liquid crystal composition alone, the fall response speed τd was 10.0 ms (2.5 V), but in a case where a polymer network structure was formed, the fall response speed τd was 3.5 ms, which was a value reduced to ⅓ or less of the time, and thus, the effects of the anchoring force of the polymer network structure are estimated to be significantly exhibited.

From the above experiments, it was confirmed that, by forming a polymer network structure by polymerizing the photopolymerizable monomer contained in the liquid crystal composition in substantially the same direction as the alignment treatment direction giving an initial alignment state to the liquid crystal molecules, τr and τd are improved not only in a high gradation region giving high brightness by applying a voltage in the vicinity of the saturation voltage but also at the time of intermediate gradation display. In particular, it is thought that τd is reduced to ½ or less of the time when the polymer network is not formed, and synergistic effects of the polymer network formed by photopolymerization and the initial alignment restricting force are very effectively acted.

The liquid crystal cells used in Example 62 were disposed in the direction in which, the alignment treatment direction and the polarizing axis direction between polarizing plates in a cross Nicol state matched in the state in which voltage was not applied, and after confirming that the cells became normally black, a saturation voltage was applied, and the liquid crystal cell was observed. A polarization microscope was provided with an X-Y stage, and respective display regions alignment-divided into four parts were observed, but these were optically equivalent and were not distinguishable at all. Even in a case where an intermediate voltage between the threshold value and the saturation voltage was applied, an optically equivalent, state was maintained.

Next, one region among four display regions was selected, and after searching the darkest position while rotating the stage of the polarization microscope while applying the intermediate voltage, the angle was fixed. In such a state, while moving the X-Y stage in the X direction and the Y direction, other three different regions were observed. The region which was 180° different from the initially set region was observed to be in a substantially the same dark state, and the region which was 90° different from the initially set region was observed to be in a gray state. Thus, in the region which was at least 90 degrees or 270 degrees different from the initially fixed region, it could be confirmed that the alignment directions of the liquid crystal molecules were different, and if could be confirmed that an alignment division was properly performed.

As described above, it could be confirmed that even in a liquid crystal display apparatus of a horizontal electric field mode (IPS mode, FFS mode), an oblique electric field mode, or a VA mode, by adding the polymerizable liquid crystal compound to a liquid crystal composition having positive or negative dielectric anisotropy and inducing a nanophase separation reaction by irradiation with UV rays, a polymer network is formed in substantially the same direction as the initial alignment direction by a liquid crystal alignment film, and by the synergic action of the anchoring force of the polymer network and the anchoring force of the initial alignment, the response speed, in particular, the response speed at the time of OFF becomes high.

Furthermore, it could be confirmed that it is advantageous for high speed response that a polymer network is formed by polymerization at a lower temperature (about −10° C.) than polymerized at room temperature. With such a high speed response technology, by combining the various alignment division treatment for widening the viewing angle of the liquid crystal by a horizontal electric field mode, a horizontal electric field mode liquid crystal display apparatus having excellent front viewing angle and γ viewing angle characteristics in an oblique direction and having ultra-high speed response characteristics was achieved.

These technologies can also be adopted in a field sequential method in which a color filter is unnecessary, in addition to a video display device such as a TV having simply high speed responsiveness. In addition, in recent years, application and development to an ultra-large high-definition 4K×2K-TV or 4K×8K-TV which has attracted attention is expected.

Examples 63 to 86 and Comparative Examples 28 and 29

As an N-type liquid crystal composition, a composition (Δn of 0.12, viscosity η of 19 mPa·s, Δε of −3.3) represented by the following (LCN-2) and a composition (Δn of 0.11, viscosity η of 17 mPa·s, Δξ of −3.2) represented by (LCN-3) were prepared. By using a compound (LCN-2) represented by Formula (V1-1-4), (V1-1-9), (V1-1-11), (V1-1-12), (V1-1-13), (V1-1-14), (V1-1-15), or (V1-1-16) as a polymerizable compound and adding a photopolymerization initiator Irgacure651 so as to be 2% with respect to the polymerizable compound, polymerizable liquid crystal compositions of Examples 63 to 86 and Comparative Examples 28 and 29 were adjusted as shown in the following table. A VA mode LCD device was produced in the same manner as in Example 3. Here, the cell thickness in Examples 63 to 82 and Comparative Example 28 was 3.2 μm, and the cell thickness in Examples 83 to 86 and Comparative Example 29 was 3.6 μm. Using a polarization microscope, it was confirmed that, if the produced cell was disposed between two polarizing plates which were orthogonal, the cell became a dark field, a homeotropic alignment in which the dark level of the dark field did not change even in a case where the cell was rotated in an azimuth angle direction was formed, and the optical axis direction of the polymer network and the easy alignment axial direction of liquid crystal were the same direction and formed so as to be orthogonal to the cell surface. A rectangular wave of 60 Hz was applied to the LCD device, and the voltage-transmittance characteristics and the response time in a VA mode were examined. The results are shown in the following table.

[Chem. 148]

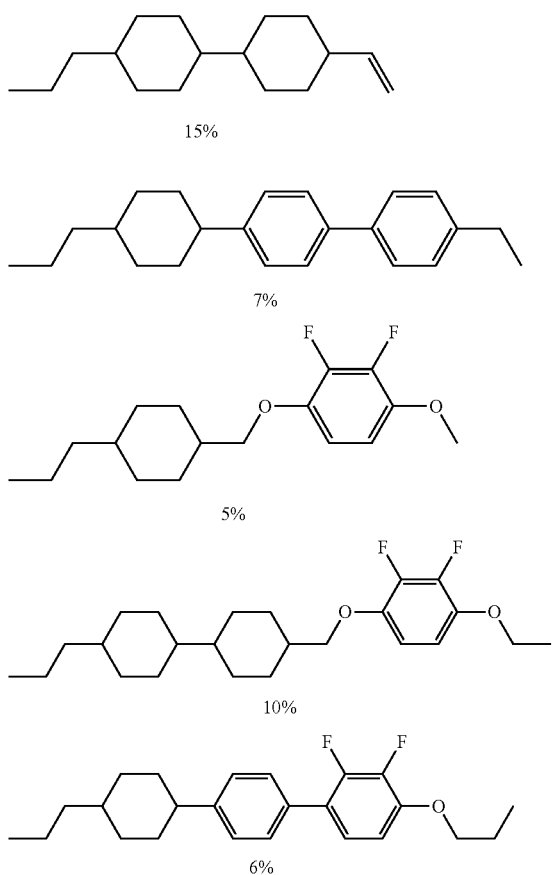

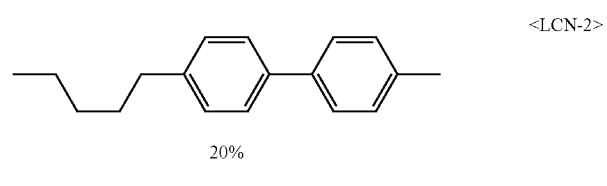

<LCN-2>

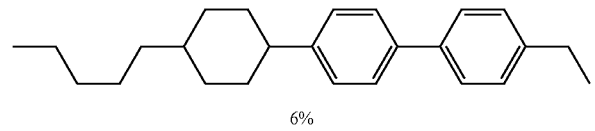

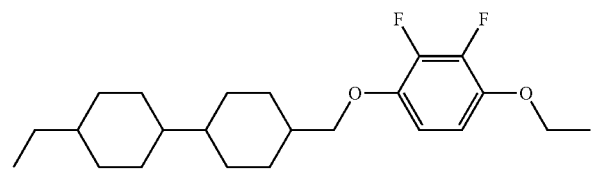

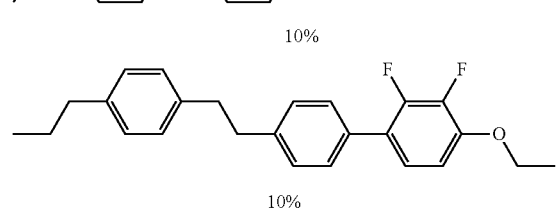

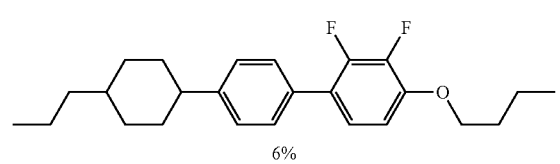

[Chem. 149]

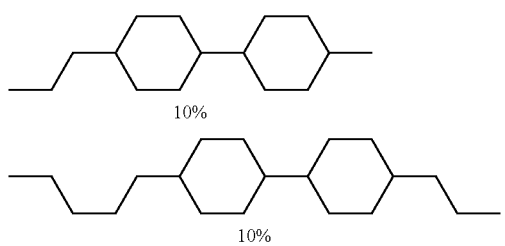

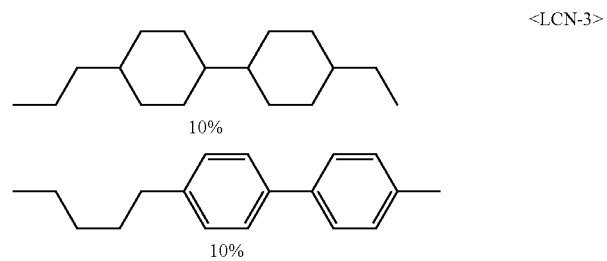

<LCN-3>

165
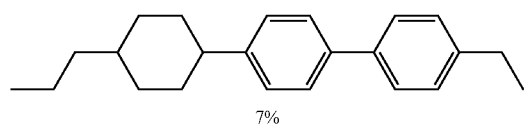
7%
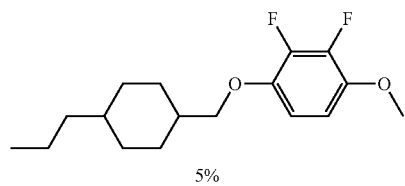
5%
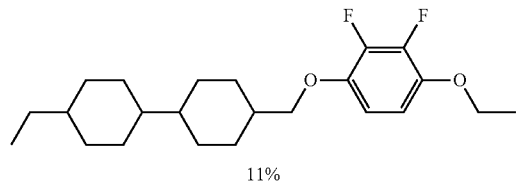
11%
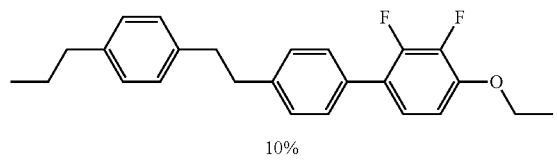
10%
166
-continued
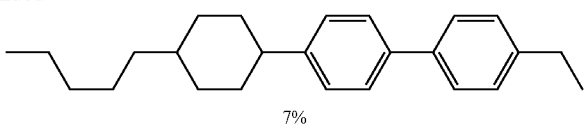
7%
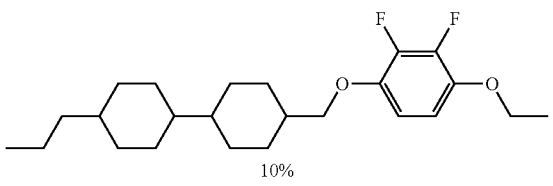
10%
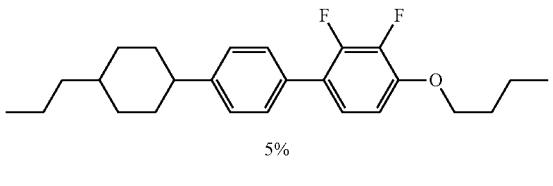
5%
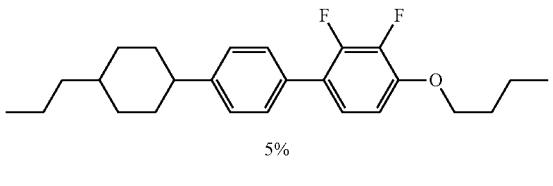
5%
[Chem. 150]
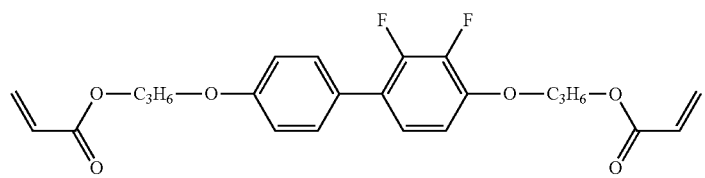
(V1-1-11)
[Chem. 151]
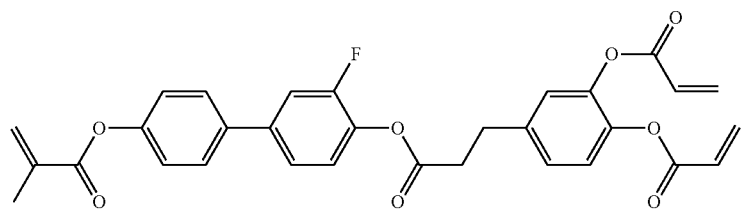
(V1-1-12)
[Chem. 152]
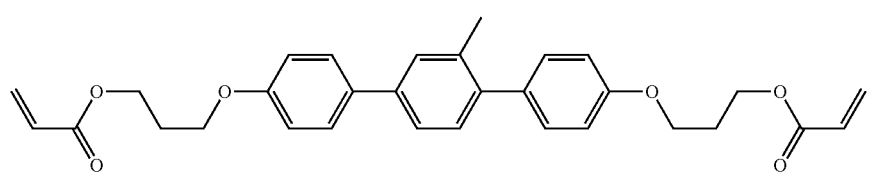
(V1-1-13)
[Chem. 153]
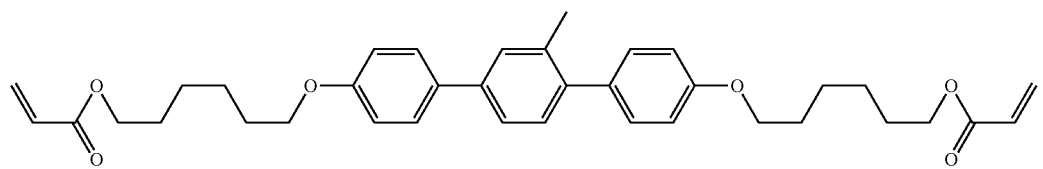
(V1-1-14)

-continued

[Chem. 154]

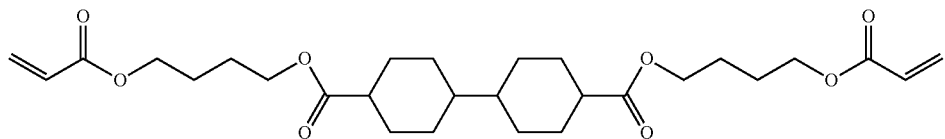

(V1-1-15)

[Chem. 155]

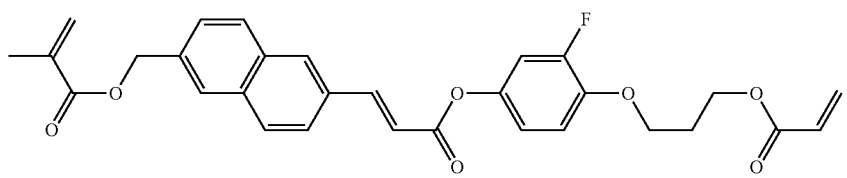

(V1-1-16)

TABLE 14

|  | Liquid crystal | % | Difunctional monomer having alignment function | % | Difunctional monomer having alignment function | % | V90 | T100 | Fall time (msec) | Rise time (msec) | Pretilt angle |
|---|---|---|---|---|---|---|---|---|---|---|---|
| Comparative Example 28 | LCN-2 | 100 | — | 0 | — | 0 | 5 | 79.3 | 6.3 | 7.9 | 0.2 |
| Example 63 | LCN-2 | 98 | V1-1-9 | 1.4 | V1-1-11 | 0.6 | 6.0 | 85.0 | 5.2 | 7.6 | 0.2 |
| Example 64 | LCN-2 | 98 | V1-1-9 | 1.4 | V1-1-11 | 0.6 | 5.3 | 83.4 | 6.1 | 3.4 | 0.2 |
| Example 65 | LCN-2 | 98 | V1-1-13 | 2 | — | 0 | 6.2 | 84.3 | 4.9 | 3.1 | 0.2 |
| Example 66 | LCN-2 | 97 | V1-1-9 | 2.1 | V1-1-11 | 0.9 | 7.3 | 84.7 | 4.5 | 5.6 | 0.5 |
| Example 67 | LCN-2 | 97 | V1-1-9 | 2.1 | V1-1-11 | 0.9 | 7.7 | 84.9 | 4.4 | 5.7 | 0.3 |
| Example 68 | LCN-2 | 97 | V1-1-13 | 3 | — | 0 | 10.1 | 81.5 | 2.9 | 2.4 | 0.3 |
| Example 69 | LCN-2 | 97 | V1-1-14 | 3 | — | 0 | 7.9 | 83.2 | 5.9 | 5.3 | 0.2 |
| Example 70 | LCN-2 | 97 | V1-1-12 | 3 | — | 0 | 9.0 | 79.6 | 3.2 | 2.1 | 0.3 |
| Example 71 | LCN-2 | 97 | V1-1-4 | 3 | — | 0 | 6.3 | 83.6 | 4.8 | 3.2 | 0.3 |

TABLE 15

|  | Liquid crystal | % | Difunctional monomer having alignment function | % | Difunctional monomer having alignment function | % | V90 | T100 | Fall time (msec) | Rise time (msec) | Pretilt angle |
|---|---|---|---|---|---|---|---|---|---|---|---|
| Example 72 | LCN-2 | 97 | V1-1-4 | 2.1 | V1-1-12 | 0.9 | 13.0 | 78.3 | 2.5 | 2.2 | 0.3 |
| Example 73 | LCN-2 | 97 | V1-1-4 | 2.1 | V1-1-12 | 0.9 | 6.0 | 84.9 | 5.6 | 3.5 | 0.0 |
| Example 74 | LCN-2 | 97 | V1-1-4 | 0.9 | V1-1-12 | 2.1 | 9.8 | 81.6 | 3.3 | 1.3 | 4.6 |
| Example 75 | LCN-2 | 96 | V1-1-13 | 4 | — | 0 | 16.2 | 79.0 | 1.5 | 1.0 | 0.2 |
| Example 76 | LCN-2 | 96 | V1-1-14 | 4 | — | 0 | 9.7 | 82.0 | 5.4 | 4.3 | 0.2 |
| Example 77 | LCN-2 | 96 | V1-1-9 | 2.8 | V1-1-11 | 1.2 | 9.6 | 78.4 | 3.2 | 1.4 | 5.6 |
| Example 78 | LCN-2 | 95 | V1-1-14 | 5 | — | 0 | 14.8 | 81.0 | 2.9 | 1.2 | 0.3 |
| Example 79 | LCN-2 | 95 | V1-1-13 | 5 | — | 0 | 22.1 | 69.0 | 0.9 | 0.3 | 0.0 |
| Example 80 | LCN-2 | 95 | V1-1-9 | 2.5 | V1-1-11 | 1.5 | 7.8 | 80.4 | 4.2 | 2.0 | 4.4 |
| Example 81 | LCN-2 | 92 | V1-1-14 | 8 | — | 0 | 28.9 | 75.0 | 0.6 | 0.7 | 0.2 |
| Example 82 | LCN-2 | 92 | V1-1-13 | 8 | — | 0 | 33.3 | 78.0 | 0.2 | 0.2 | 0.2 |

In Comparative Example 28, since a liquid crystal having large birefringence compared with a birefringence of 0.086 optimal for a cell thickness of 3.2 μm was used, the transmittance T100 became low. In Examples 63 to 80, since the cell thickness was 3.2 μm, but the birefringence exhibited by the device was reduced by the effects of formation of a polymer network after polymerization, compared with the actual birefringence value of the liquid crystal, by using a liquid crystal having a birefringence of 0.12, the transmittance was improved to be approached to the optimal birefringence which the device required. For the response time, it was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved.

TABLE 16

| | Liquid crystal | % | Difunctional monomer having alignment function | % | V90 | T100 | Fall time (msec) | Rise time (msec) |
|---|---|---|---|---|---|---|---|---|
| Comparative Example 29 | LCN-3 | 100 | — | 0 | 5.3 | 78.9 | 7.1 | 3.3 |
| Example 83 | LCN-3 | 98 | V1-1-4 | 2 | 18.8 | 82.5 | 3.5 | 0.9 |
| Example 84 | LCN-3 | 98 | V1-1-15 | 2 | 22.2 | 81.7 | 3.0 | 0.5 |
| Example 85 | LCN-3 | 98 | V1-1-3 | 2 | 21.6 | 81.5 | 2.8 | 0.7 |
| Example 86 | LCN-3 | 98 | V1-1-16 | 2 | 14.0 | 80.9 | 3.0 | 1.5 |

In Comparative Example 29, since a liquid crystal having large birefringence compared with a birefringence of 0.077 optimal for a cell thickness of 3.6 μm was used, the transmittance T100 became low. In Examples 83 to 86, since the cell thickness was 3.6 μm, but the birefringence exhibited by the device was reduced by the effects of formation of a polymer network after polymerization, compared with the actual birefringence value of the liquid crystal, by using a liquid crystal having a birefringence of 0.11, the transmittance was improved to be approached to the optimal birefringence which the device required. For the response time, it was confirmed that the fall time was shortened by the effects of an anchoring force of the polymer network formed such that the optical axis direction of the polymer network and the easy alignment axis of liquid crystal matched. Furthermore, with increase of the drive voltage, the rise time was shortened, and the responsiveness is improved. It was confirmed that there was no crystallization by the polymerizable compound by allowing the polymerizable liquid crystal composition used in the cell production to stand at 20° C. for 1 week.

REFERENCE SIGNS LIST

1 . . . POLARIZING PLATE,
2 . . . FIRST TRANSPARENT INSULATING SUBSTRATE,
3 . . . ELECTRODE LAYER,
4 . . . ALIGNMENT FILM,
4a . . . ALIGNMENT DIRECTION,
5 . . . LIQUID CRYSTAL LAYER,
5a . . . LIQUID CRYSTAL MOLECULES AT THE TIME WHEN A VOLTAGE IS NOT APPLIED,
5b . . . LIQUID CRYSTAL MOLECULES AT THE TIME WHEN A VOLTAGE IS APPLIED,
6 . . . COLOR FILTER,
7 . . . SECOND TRANSPARENT INSULATING SUBSTRATE,
8 . . . POLARIZING PLATE,
9 . . . CONTINUOUS OR DISCONTINUOUS POLYMER NETWORK,
10 . . . LCD DEVICE,
11 . . . GATE ELECTRODE,
12 . . . GATE INSULATING LAYER,
13 . . . SEMICONDUCTOR LAYER,
14 . . . PROTECTIVE LAYER,
15 . . . OHMIC CONTACT LAYER,
16 . . . DRAIN ELECTRODE,
17 . . . SOURCE ELECTRODE,
18 . . . INSULATION PROTECTING LAYER,
21 . . . PIXEL ELECTRODE,
22 . . . COMMON ELECTRODE,
23 . . . STORAGE CAPACITOR,
24 . . . GATE WIRE,
25 . . . DATA WIRE,
26 . . . DRAIN ELECTRODE,
27 . . . SOURCE ELECTRODE,
28 . . . GATE ELECTRODE,
29 . . . COMMON LINE,
100 . . . POLARIZING PLATE,
110 . . . GATE ELECTRODE,
120 . . . GATE INSULATING LAYER,
130 . . . SEMICONDUCTOR LAYER,
140 . . . PROTECTIVE LAYER,
160 . . . DRAIN ELECTRODE,
190b . . . ORGANIC INSULATING FILM,
200 . . . FIRST SUBSTRATE,
210 . . . PIXEL ELECTRODE,
220 . . . STORAGE CAPACITOR,
230 . . . DRAIN ELECTRODE,
240 . . . DATA WIRE,
250 . . . GATE WIRE,
260 . . . SOURCE ELECTRODE,
270 . . . GATE ELECTRODE,
300 . . . THIN LAYER TRANSISTOR LAYER,
400 . . . ALIGNMENT FILM,
500 . . . LIQUID CRYSTAL LAYER,
510 . . . LIQUID CRYSTAL DISPLAY APPARATUS,
512 . . . PIXEL ELECTRODE,
512a . . . PIXEL MAIN PORTION ELECTRODE,
512b . . . PIXEL BRANCH PORTION ELECTRODE,
512c . . . PIXEL SLIT,
516 . . . SCANNING WIRE,
517 . . . SIGNAL WIRE,
600 . . . COMMON ELECTRODE,
700 . . . COLOR FILTER,
800 . . . SECOND SUBSTRATE,
900 . . . POLARIZING PLATE,
1000 . . . LCD DEVICE,
1400 . . . TRANSPARENT ELECTRODE (LAYER),
PX . . . PIXEL,
PE . . . PIXEL ELECTRODE,
PA . . . MAIN PIXEL ELECTRODE,
PB . . . SUBPIXEL ELECTRODE,
CE . . . COMMON ELECTRODE,
CA . . . MAIN COMMON ELECTRODE,
CAL . . . LEFT MAIN COMMON ELECTRODE,
CAR . . . RIGHT MAIN COMMON ELECTRODE,
CB . . . SUBCOMMON ELECTRODE,
CBU . . . UPPER SUBCOMMON ELECTRODE,
CBB . . . LOWER SUBCOMMON ELECTRODE

The invention claimed is:
1. An LCD device, comprising:
a liquid crystal composition sandwiched between two transparent substrates, at least one of which has an electrode attached thereto, wherein the liquid crystal composition contains a polymer or a copolymer in an amount of 1% by mass or greater and less than 40% by mass with respect to the total mass of the liquid crystal composition and the polymer or the copolymer, wherein the liquid crystal composition is represented by the following Formula (LC):

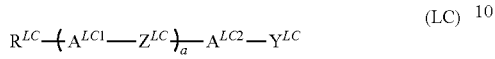
(LC)

wherein $R^{LC}$ represents an alkyl group having 1 to 15 carbon atoms, one or two or more $CH_2$ groups in the alkyl group may be substituted with —O—, —CH=CH—, —CO—, —OCO—, —COO—, or —C≡C— as long as an oxygen atom is not directly adjacent to another oxygen atom, and one or two or more hydrogen atoms in the alkyl group may be arbitrarily substituted with a halogen atom;

$A^{LC1}$ and $A^{LC2}$ each independently represent a group selected from the group consisting of the following groups (a), (b), and (c), (a) a trans-1,4-cyclohexylene group, provided that one $CH_2$ group or two or more non-adjacent $CH_2$ groups present in this group may be substituted with an oxygen atom or a sulfur atom, (b) a 1,4-phenylene group, provided that one CH group or two or more non-adjacent CH groups present in this group may be substituted with a nitrogen atom, (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group, and one or two or more hydrogen atoms included in the group (a), (b), or (c) each may be substituted with a fluorine atom, a chlorine atom, —$CF_3$, or —$OCF_3$;

$Z^{LC}$ represents a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—;

$Y^{LC}$ represents a hydrogen atom, a fluorine atom, a chlorine atom, a cyano group, or an alkyl group having 1 to 15 carbon atoms, and one or two or more $CH_2$ groups in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom, and one or two or more hydrogen atoms in the alkyl group may be arbitrarily substituted by a halogen atom; and a represents an integer of 1 to 4, and when a represents 2, 3, or 4 and a plurality of $A^{LC1}$'s and a plurality of $Z^{LC}$'s are present in Formula (LC), the plurality of $A^{LC1}$'s may be the same as or different from each other and the plurality of $Z^{LC}$'s may be the same as or different from each other, wherein the liquid crystal composition contains a polymer or a copolymer in an amount of 1% by mass or greater and less than 40% by mass with respect to the total mass of the liquid crystal composition and the polymer or the copolymer, and wherein the polymer or the copolymer is obtained by polymerizing at least one polymerizable compound which is selected from the group consisting of the following compounds (A)-(C):

(A) a compound represented by each of the following Formulas (V) and (VI):

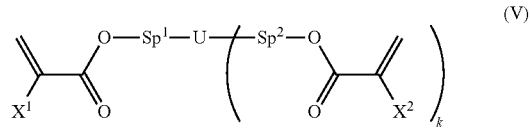
(V)

wherein $X^1$ and $X^2$ each independently represent a hydrogen atom or a methyl group, $Sp^1$ and $Sp^2$ each independently represent a single bond, an alkylene group having 1 to 12 carbon atoms, or —O—$(CH_2)_s$— where s represents an integer of 1 to 11 and the oxygen atom is bonded to an aromatic ring, U represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms and the alkylene group in the alkyl group may be substituted with an oxygen atom as long as an oxygen atom is not adjacent to another oxygen atom, or may be substituted with a cyclic substituent, k represents an integer of 1 to 5, and an arbitrary hydrogen atom in all 1,4-phenylene groups in the formula may be substituted with —$CH_3$, —$OCH_3$, a fluorine atom, or a cyano group;

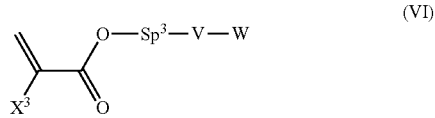
(VI)

wherein $X^3$ represents a hydrogen atom or a methyl group, $Sp^3$ represents a single bond, an alkylene group having 1 to 12 carbon atoms, or —O—$(CH_2)_t$— where t represents an integer of 2 to 11, and the oxygen atom is bonded to an aromatic ring, V represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms and the alkylene group in the alkyl group may be substituted with an oxygen atom as long as an oxygen atom is not adjacent to another oxygen atom, or may be substituted with a cyclic substituent, W represents a hydrogen atom, a halogen atom, or an alkyl group having 1 to 15 carbon atoms, and an arbitrary hydrogen atom in all 1,4-phenylene groups in the formula may be substituted with —$CH_3$, —$OCH_3$, a fluorine atom, or a cyano group;

(B) a compounds represented by the following Formula (X1b):

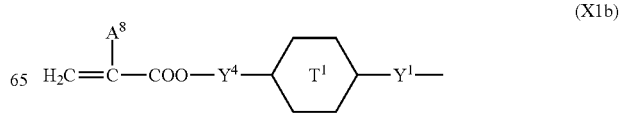
(X1b)

-continued

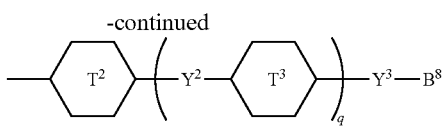

wherein $A^8$ represents a hydrogen atom or a methyl group, six-membered rings $T^1$, $T^2$, and $T^3$ each independently represent any one of the following formulas in which q represents an integer of 1 to 4,

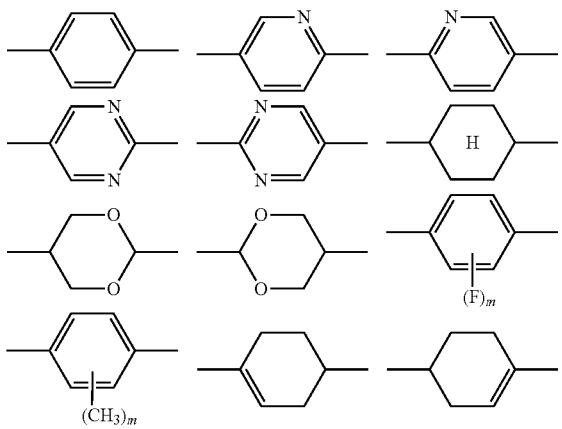

q represents 0 or 1,
$Y^1$ and $Y^2$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—,
$Y^3$ and $Y^4$ each independently represent a single bond or an alkylene group having 1 to 12 carbon atoms, provided that one or two or more methylene groups in the alkylene group each may be independently substituted with an oxygen atom, —CO—, —COO—, or —OCO— as long as an oxygen atom is not directly bonded to another oxygen atom and one or two or more hydrogen atoms in the alkylene group each may be independently substituted with a fluorine atom, a methyl group, or an ethyl group, and
$B^8$ represents a hydrogen atom, a cyano group, a halogen atom, an alkyl group having 1 to 8 carbon atoms, or an alkylene group in which the terminal has an acryloyl group or a methacryloyl group; and
(C) a compound represented by the following Formula (Vb):

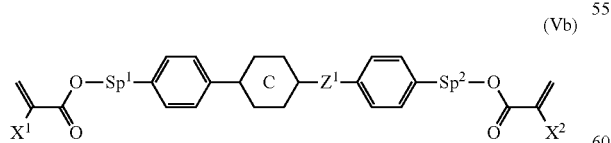

wherein $X^1$ and $X^2$ each independently represent a hydrogen atom or a methyl group, $Sp^1$ and $Sp^2$ each independently represent a single bond, an alkylene group having 1 to 12 carbon atoms, or —O—(CH$_2$)$_s$— where s represents an integer of 1 to 11 and the oxygen atom is bonded to an aromatic ring, $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— where $Y^1$ and $Y^2$ each independently represent a hydrogen atom or a fluorine atom, —C≡C—, or a single bond, C represents a 1,4-phenylene group, a trans-1,4-cyclohexylene group, or a single bond, and an arbitrary hydrogen atom in all 1,4-phenylene groups in the formula may be substituted with a fluorine atom.

2. The LCD device according to claim 1, comprising:
a polymer network as the polymer or the copolymer in the liquid crystal composition; and
an alignment layer for aligning a liquid crystal composition on a transparent substrate.

3. The LCD device according to claim 2,
wherein the polymer network has uniaxial refractive index anisotropy, and an optical axis direction or an easy alignment axial direction of the polymer network is the same as an easy alignment axial direction of a low molecular weight liquid crystal.

4. The LCD device according to claim 1,
wherein the liquid crystal composition comprises liquid crystal molecules of a low molecular weight liquid crystal which have a pretilt angle of 0° to 90° with respect to the transparent substrate.

5. The LCD device according to claim 2,
wherein a polymer network layer having a thickness of at least 0.5% or greater of a cell thickness with respect to a cell sectional direction is formed in the polymer network.

6. The LCD device according to claim 1,
wherein the polymer contained in the liquid crystal composition has refractive index anisotropy or an easy alignment axial direction, which is obtained by polymerizing a polymerizable compound in a liquid crystal composition sandwiched between two transparent substrates, at least one of which has an electrode, by irradiation with energy rays while maintaining the temperature of a liquid crystal layer at −50° C. to 30° C.

7. The LCD device according to claim 1,
wherein the polymer contained in the liquid crystal composition has refractive index anisotropy or an easy alignment axial direction, which is obtained by polymerizing a polymerizable compound in a liquid crystal composition sandwiched between two transparent substrates, at least one of which has an electrode, by irradiation with energy rays while applying a voltage such that a pretilt angle before irradiation with energy rays becomes 0.1 to 30 degrees.

8. The LCD device according to claim 1, wherein the polymerizable compound comprises one or two or more of compounds represented by Formula (V) in which $Sp^1$ and $Sp^2$ are the same as each other.

9. The LCD device according to claim 8, wherein the polymerizable compound comprises two or more of compounds represented by Formula (V) in which $Sp^1$ and $Sp^2$ are the same as each other, the compounds having different $Sp^1$ and $Sp^2$ from each other.

10. The LCD device according to claim 6,
wherein the liquid crystal composition is a polymerizable liquid crystal composition containing the polymerizable compound in an amount of 1% by mass or greater and less than 10% by mass to form a polymer network having refractive index anisotropy or an easy alignment axial direction in the liquid crystal composition.

11. The LCD device according to claim 6,
wherein the liquid crystal composition is a polymerizable liquid crystal composition containing a polymerizable compound of 10% by mass or greater and less than 40% by mass such that the polymer network having refractive index anisotropy or an easy alignment axial direction is formed in the liquid crystal composition.

12. The LCD device according to claim 6, wherein the polymerizable compound comprises one or two or more of compounds having a photo-alignment function.

13. The LCD device according to claim 12,
wherein at least one compound of the compounds having the photo-alignment function is a compound exhibiting photoisomerization.

14. The LCD device according to claim 1, wherein a cell structure is a VA mode, an IPS mode, an FFS mode, a VA-TN mode, a TN mode, or an ECB mode.

15. A polymerizable liquid crystal composition for an LCD device, the composition being represented by the following Formula (LC):

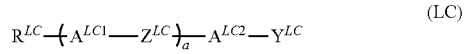

(LC)

wherein $R^{LC}$ represents an alkyl group having 1 to 15 carbon atoms, one or two or more $CH_2$ groups in the alkyl group may be substituted with —O—, —CH=CH—, —CO—, —OCO—, —COO—, or —C≡C— as long as an oxygen atom is not directly adjacent to another oxygen atom, and one or two or more hydrogen atoms in the alkyl group may be arbitrarily substituted with a halogen atom;
$A^{LC1}$ and $A^{LC2}$ each independently represent a group selected from the group consisting of the following groups (a), (b), and (c),
(a) a trans-1,4-cyclohexylene group, provided that one $CH_2$ group or two or more non-adjacent $CH_2$ groups present in this group may be substituted with an oxygen atom or a sulfur atom,
(b) a 1,4-phenylene group, provided that one CH group or two or more non-adjacent CH groups present in this group may be substituted with a nitrogen atom,
(c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group, and
one or two or more hydrogen atoms included in the group (a), (b), or (c) each may be substituted with a fluorine atom, a chlorine atom, —$CF_3$, or —$OCF_3$;
$Z^{LC}$ presents a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—;
$Y^{LC}$ represents a hydrogen atom, a fluorine atom, a chlorine atom, a cyano group, or an alkyl group having 1 to 15 carbon atoms, and one or two or more $CH_2$ groups in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom, and one or two or more hydrogen atoms in the alkyl group may be arbitrarily substituted by a halogen atom; and
a represents an integer of 1 to 4, and when a represents 2, 3, or 4 and a plurality of $A^{LC1}$'s and a plurality of $Z^{LC}$'s are present in Formula (LC), the plurality of $A^{LC1}$'s may be the same as or different from each other and the plurality of $Z^{LC}$'s may be the same as or different from each other,
wherein the liquid crystal composition contains a polymer or a copolymer in an amount of 1% by mass or greater and less than 40% by mass with respect to the total mass of the liquid crystal composition and the polymer or the copolymer, and
wherein the polymer or the copolymer is obtained by polymerizing at least one polymerizable compound which is selected from the group consisting of the following compounds (A)-(C):
(A) a compound represented by each of the following Formulas (V) and (VI):

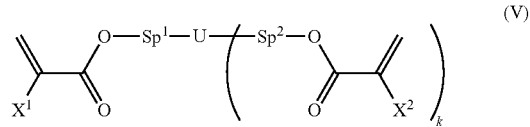

wherein $X^1$ and $X^2$ each independently represent a hydrogen atom or a methyl group, $Sp^1$ and $Sp^2$ each independently represent a single bond, an alkylene group having 1 to 12 carbon atoms, or —O—$(CH_2)_s$— where s represents an integer of 1 to 11 and the oxygen atom is bonded to an aromatic ring, U represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms and the alkylene group in the alkyl group may be substituted with an oxygen atom as long as an oxygen atom is not adjacent to another oxygen atom, or may be substituted with a cyclic substituent, k represents an integer of 1 to 5, and an arbitrary hydrogen atom in all 1,4-phenylene groups in the formula may be substituted with —$CH_3$, —$OCH_3$, a fluorine atom, or a cyano group;

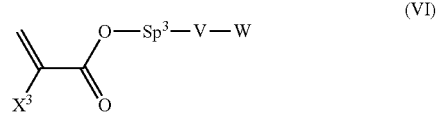

wherein $X^3$ represents a hydrogen atom or a methyl group, $Sp^3$ represents a single bond, an alkylene group having 1 to 12 carbon atoms, or —O—$(CH_2)_t$— where t represents an integer of 2 to 11, and the oxygen atom is bonded to an aromatic ring, V represents a linear or branched polyvalent alkylene group having 2 to 20 carbon atoms or a polyvalent cyclic substituent having 5 to 30 carbon atoms, the alkylene group in the polyvalent alkylene group may be substituted with an oxygen atom as long as an oxygen atom is not adjacent to another oxygen atom, may be substituted with an alkyl group having 5 to 20 carbon atoms and the alkylene group in the alkyl group may be substituted with an oxygen atom as long as an oxygen atom is not adjacent to another oxygen atom, or may be substituted with a cyclic substituent, W represents a hydrogen atom, a halogen atom, or an alkyl group having 1 to 15 carbon atoms, and an arbitrary hydrogen atom in all 1,4-phenylene groups in the formula may be substituted with —CH$_3$, —OCH$_3$, a fluorine atom, or a cyano group;

(B) a compounds represented by the following Formula (X1b):

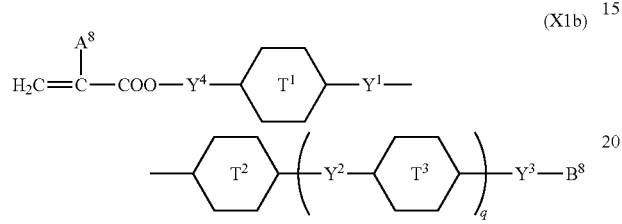

(X1b)

wherein A$^8$ represents a hydrogen atom or a methyl group, six-membered rings T$^1$, T$^2$, and T$^3$ each independently represent any one of the following formulas in which q represents an integer of 1 to 4,

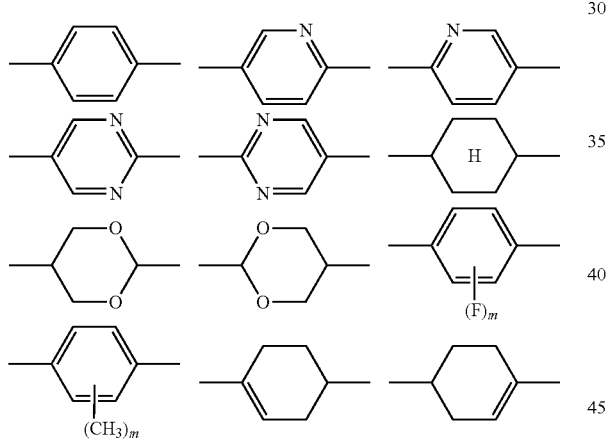

q represents 0 or 1,

Y$^1$ and Y$^2$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—, Y$^3$ and Y$^4$ each independently represent a single bond or an alkylene group having 1 to 12 carbon atoms, provided that one or two or more methylene groups in the alkylene group each may be independently substituted with an oxygen atom, —CO—, —COO—, or —OCO— as long as an oxygen atom is not directly bonded to another oxygen atom and one or two or more hydrogen atoms in the alkylene group each may be independently substituted with a fluorine atom, a methyl group, or an ethyl group, and B$^8$ represents a hydrogen atom, a cyano group, a halogen atom, an alkyl group having 1 to 8 carbon atoms, or an alkylene group in which the terminal has an acryloyl group or a methacryloyl group; and (C) a compound represented by the following Formula (Vb):

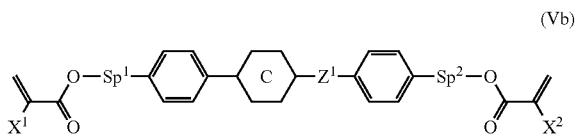

(Vb)

wherein X$^1$ and X$^2$ each independently represent a hydrogen atom or a methyl group, Sp$^1$ and Sp$^2$ each independently represent a single bond, an alkylene group having 1 to 12 carbon atoms, or —O—(CH$_2$)$_s$— where s represents an integer of 1 to 11 and the oxygen atom is bonded to an aromatic ring, Z$^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— where Y$^1$ and Y$^2$ each independently represent a hydrogen atom or a fluorine atom, —C≡C—, or a single bond, C represents a 1,4-phenylene group, a trans-1,4-cyclohexylene group, or a single bond, and an arbitrary hydrogen atom in all 1,4-phenylene groups in the formula may be substituted with a fluorine atom.

* * * * *